United States Patent [19]
Sumita et al.

[11] Patent Number: 5,907,836
[45] Date of Patent: *May 25, 1999

[54] INFORMATION FILTERING APPARATUS FOR SELECTING PREDETERMINED ARTICLE FROM PLURAL ARTICLES TO PRESENT SELECTED ARTICLE TO USER, AND METHOD THEREFORE

[75] Inventors: Kazuo Sumita, Yokohama; Tetsuya Sakai, Tokyo; Masahiro Kajiura; Kenji Ono, both of Fujisawa; Seiji Miike, Yokohama, all of Japan

[73] Assignee: Kabushiki Kaisha Toshiba, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/695,214

[22] Filed: Jul. 31, 1996

[30] Foreign Application Priority Data

| Jul. 31, 1995 | [JP] | Japan | 7-212939 |
| Jul. 31, 1995 | [JP] | Japan | 7-212940 |
| Nov. 30, 1995 | [JP] | Japan | 7-335790 |
| Nov. 30, 1995 | [JP] | Japan | 7-335791 |

[51] Int. Cl.$^6$ .................................................. G06F 17/30
[52] U.S. Cl. ........................ 707/2; 707/6; 707/3; 707/10
[58] Field of Search ................................ 707/2, 6, 3, 10

[56] References Cited

U.S. PATENT DOCUMENTS

| 5,008,853 | 4/1991 | Bly et al. ................................ 345/331 |
| 5,245,656 | 9/1993 | Loeb et al. ............................... 380/23 |
| 5,404,505 | 4/1995 | Levinson .................................. 707/10 |
| 5,530,852 | 6/1996 | Meske, Jr. et al. ................ 395/200.36 |
| 5,617,565 | 4/1997 | Aygenbraun et al. ...................... 707/4 |
| 5,644,686 | 7/1997 | Hekmatpour ............................. 395/50 |
| 5,675,788 | 10/1997 | Husick et al. .......................... 707/104 |
| 5,724,567 | 3/1998 | Rose et al. ................................. 707/2 |
| 5,774,357 | 6/1998 | Hoffberg et al. ....................... 364/188 |
| 5,794,210 | 8/1998 | Goldhaber et al. ...................... 705/14 |
| 5,799,304 | 8/1998 | Miller ........................................ 707/7 |
| 5,822,745 | 10/1998 | Hekmatpour ............................. 706/59 |
| 5,835,087 | 11/1998 | Herz et al. ............................. 345/327 |

*Primary Examiner*—Wayne Amsbury
*Attorney, Agent, or Firm*—Oblon, Spivak, McClelland, Maier & Neustadt, P.C.

[57] ABSTRACT

An information filtering apparatus for receiving articles, such as texts or images, from information sources to select predetermined articles from the supplied articles to a user has a storage portion, an article retrieving portion, a determining portion and a presentation portion. The storage portion stores retrieving conditions previously specified for each user. The article retrieving portion retrieves the supplied articles to select articles which satisfy the retrieving conditions for each user. The determining portion calculates similarities among the articles selected by the article retrieving portion or the selected articles and other articles to determine relevant articles for each article in accordance with the similarities. The presentation portion adds information of the determined relevant articles to the selected articles to present the articles and information to the user.

18 Claims, 124 Drawing Sheets

```
┌─────────────┐
│EXPRESSION OF│
│ARTICLE i    │
└─────────────┘
```

```
┌──────────────────────────────────────────────────────────────┐
│INFORMATION: NEWSPAPER PUBLISHING COMPANY:○○                  │
│SOURCE       MONTH:××, DAY:××, MORNING EDITION, SECOND PAGE   │
│                                                              │
│NUMBER OF WORDS:○○ WORDS                                      │
│                                                              │
│CAPTION OF ARTICLE:○○ CORPORATION HAS START INCREASE          │
│                   IN PRODUCTION OF ○○ TYPE MEMORIES          │
│                                                              │
│TOPIC:SEMICONDUCTOR                                           │
│                                                              │
│DATE:MONTH:△△, DAY:△△                                         │
│                                                              │
│PLACE:PREFECTURE:○○, PLANT:○○                                 │
│                                                              │
│SUBJECT:CORPORATION                                           │
│                                                              │
│AIN VERB:INCREASED IN PRODUCTION                              │
│                           ⋮                                  │
└──────────────────────────────────────────────────────────────┘
```

F I G. 7

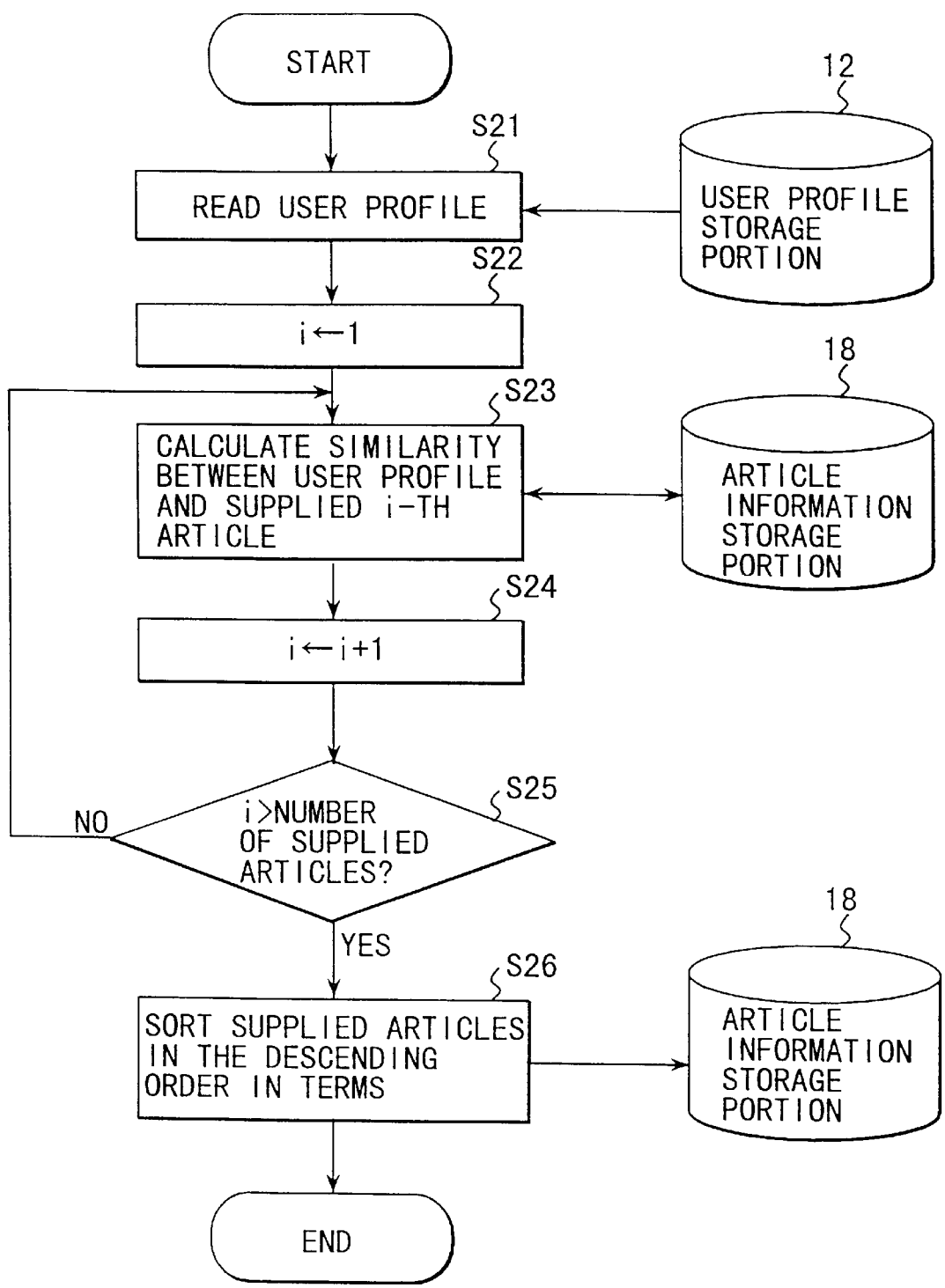
F I G. 8

| ORDER | NAME OF SUPPLIED ARTICLE | SIMILARITY WITH USER PROFILE |
|---|---|---|
| 1 | | 0.97 |
| 2 | | 0.96 |
| 3 | | 0.96 |
| 4 | | 0.94 |
| 5 | | 0.91 |
| 6 | | 0.89 |
| 7 | | 0.89 |
| 8 | | 0.87 |
| 9 | | 0.85 |
| 10 | | 0.79 |
| 11 | | 0.79 |
| 12 | | 0.64 |
| 13 | | 0.63 |
| 14 | | 0.62 |
| 15 | | 0.61 |
| 16 | | 0.60 |
| 17 | | 0.60 |
| 18 | | 0.59 |
| 19 | | 0.57 |
| 20 | | 0.40 |
| ⋮ | ⋮ | ⋮ |

FIG. 9

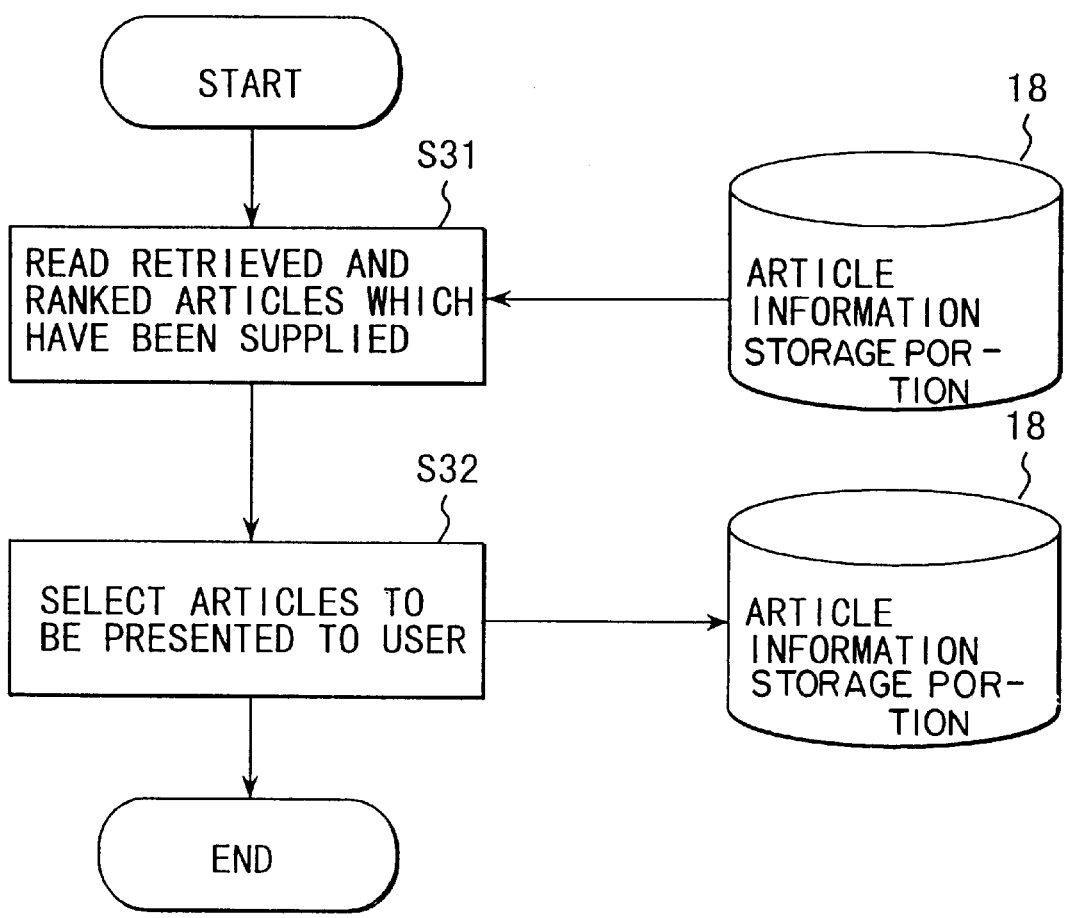
F I G. 10

| ORDER | NAME OF SUPPLIED ARTICLE | SIMILARITY WITH USER PROFILE |
|---|---|---|
| 1 | | 0.97 |
| 2 | | 0.96 |
| 3 | | 0.96 |
| 4 | | 0.94 |
| 5 | | 0.91 |
| 6 | | 0.89 |
| 7 | | 0.89 |
| 8 | | 0.87 |
| 9 | | 0.85 |
| 10 | | 0.79 |

FIG. 11

| ORDER | NAME OF SUPPLIED ARTICLE | SIMILARITY WITH USER PROFILE |
|---|---|---|
| 1 | | 0.97 |
| 2 | | 0.96 |
| 3 | | 0.96 |
| 4 | | 0.94 |
| 5 | | 0.91 |
| 6 | | 0.89 |
| 7 | | 0.89 |
| 8 | | 0.87 |
| | | 0.86 |

FIG. 12

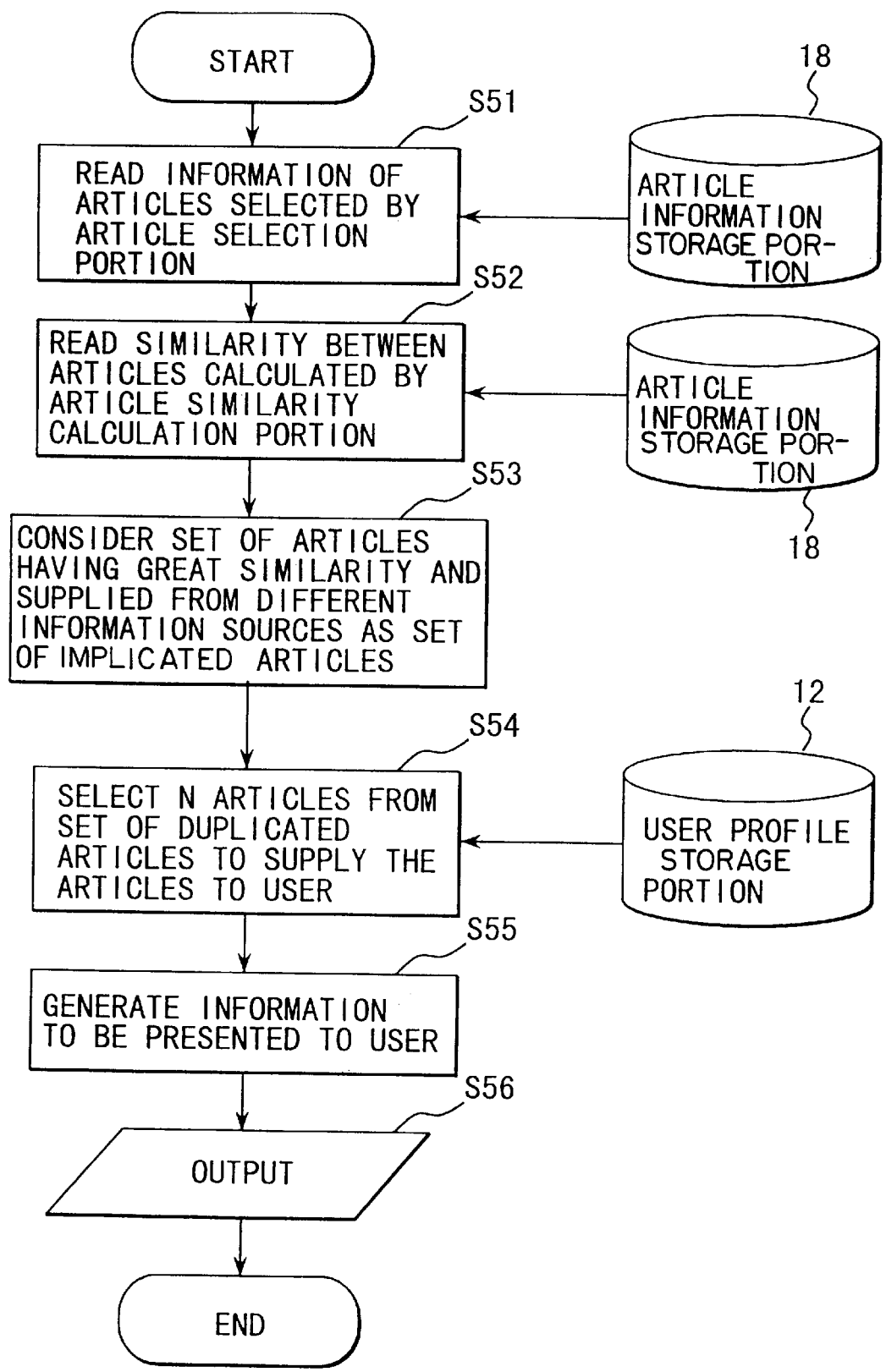
F I G. 16

DUPLICATED ARTICLE SET 1

| NAME OF ARTICLE | INFORMATION SOURCE | SIMILARITY BETWEEN USER PROFILE AND ARTICLE |
|---|---|---|
| ARTICLE A | NEWSPAPER PUBLISHING COMPANY M | 0.71 |
| ARTICLE C | NEWSPAPER PUBLISHING COMPANY O | 0.84 |

F I G. 19A

DUPLICATED ARTICLE SET 2

| NAME OF ARTICLE | INFORMATION SOURCE | SIMILARITY BETWEEN USER PROFILE AND ARTICLE |
|---|---|---|
| ARTICLE B | NEWSPAPER PUBLISHING COMPANY N | 0.76 |
| ARTICLE D | NEWSPAPER PUBLISHING COMPANY M | 0.83 |

F I G. 19B

```
ADDED INFORMATION

RELEVANT ARTICLE (DUPLICATED):
        SIMILARITY WITH ORIGINAL ARTICLE
・「PULLED OUT FROM INFORMATION
SERVICE, ○× CORPORATION」・・・・・・・・・・・・0.98
    NEWSPAPER △△, MORNING ISSUE,
    FIRST PAGE, ×× WORDS
    YEAR: ××, MONTH: ××, DAY: 15
    ARTICLE ID: △△△△△△
・「○× HAS AB AND ONED INFORMATION SERVICE」
                                ・・・・・0.92
    NEWSPAPER □□, MORNING ISSUE,
    ×× WORDS
    YEAR: ××, MONTH: ××, DAY: 15
    ARTICLE ID: △△△△△△
```

```
INFORMATION OF BODY

CAPTION ARTICLE: 「PULLED OUT FROM INFORMATION
SERVICE, ○× CORPORATION」
INFORMATION SOURCE: NEWSPAPER ○○,
MORNING ISSUE, FIRST PAGE, ×× WORDS
    YEAR: ××, MONTH: ××, DAY: 15
ARTICLE ID: △△△△△△
BODY:
```

F I G. 20

ADDED INFORMATION

ORIGINAL ARTICLE/RELEVANT ARTICLE:
- SEMICONDUCTOR CONFERENCE WAS....
  (ORIGINAL ARTICLE)
    NEWSPAPER ○○, MORNING ISSUE, FIRST PAGE OF COLUMN ABOUT ECONOMY
    YEAR: ××, MONTH: ××, DAY: 15
    ARTICLE ID: △△△△△△
- <CAPTION OF RELEVANT ARTICLE 2>
    NEWSPAPER △○, MORNING ISSUE, FIRST PAGE
    YEAR: ××, MONTH: ××, DAY: ××
    ARTICLE ID: △△△△△△

INFORMATION OF BODY

CAPTION OF ARTICLE:
<CAPTION OF RELEVANT ARTICLE 1>
INFORMATION SOURCE: WEEKLY MAGAZINE ○○, PAGE ××
    YEAR: ××, MONTH: ××, DAY: ××
ARTICLE ID: △△△△△△
BODY:

<BODY OF RELEVANT ARTICLE 1>

FIG. 22

SIMILARITY WITH USER PROFILE

1. [CAPTION OF ARTICLE 1] ············ 0.97
   NEWSPAPER ○○, MORNING ISSUE,
   SECOND PAGE, ×× WORDS

2. [CAPTION OF ARTICLE 2] ············ 0.84
   NEWSPAPER △△, FIRST PAGE, ×× WORDS

3. 「○× HAS PULLED OUT FROM INFORMATION
   BUSINESS」·······················0.79
   NEWSPAPER ○○, MORNING ISSUE,
   FIRST PAGE, ×× WORDS

《PUPLICATED ARTICLE》

3.1 「WITHDRAWAL FROM INFORMATION
        SERVICE ○×」  ············ 0.77
       NEWSPAPER △△, MORNING ISSUE,
       FIRST PAGE, ×× WORDS
   《SIMILARTY WITH ORIGINAL ARTICLE》 ···· 0.98

3.2 「○× HAS ABANDONED INFORMATION
        SERVICE」··················0.77
       NEWSPAPER □□, MORNING ISSUE,
       ×× WORDS
   《SIMILARTY WITH ORIGINAL ARTICLE》 ···· 0.92

4. [CAPTION OF ARTICLE 4] ············ 0.78
   WEEKLY MAGAZINE △○, PAGE ××

FIG. 26

ADDED INFORMATION

RELEVANT ARTICLE (UNTIL YESTERDAY):
         SIMILARITY WITH ORIGINAL ARTICLE
· 「JAPAN AND SEMICONDUCTOR CONFERENCE
  WILL BE, TOMORROW....」・・・・・・・・・・・0.82
     ○△TIMES, EVENING EDITION × × WORDS
     YEAR: × ×, MONTH: × ×, DAY:14
     ARTICLE ID:△△△△△△

· 「SERIES:SEMICONDUCTOR FRICTION(PART2)」・・0.79
     ○○TIMES, MORNING ISSUE, FIRST PAGE OF
     COLUMN ABOUT ECONOMY, × × WORDS
     YEAR: × ×, MONTH: × ×, DAY:14
     ARTICLE ID:△△△△△△

INFORMATION OF BODY

CAPTION ARTICLE:「SEMICONDUCTOR CONFERENCE
                 WILL BE.....」
INFORMATION SOURCE:○○ TIMES, MORNING ISSUE,
FIRST PAGE OF COLUMN ABOUT ECONOMY, × × WORD
     YEAR: × ×, MONTH: × ×, DAY:15
ARTICLE ID:△△△△△△
BODY:

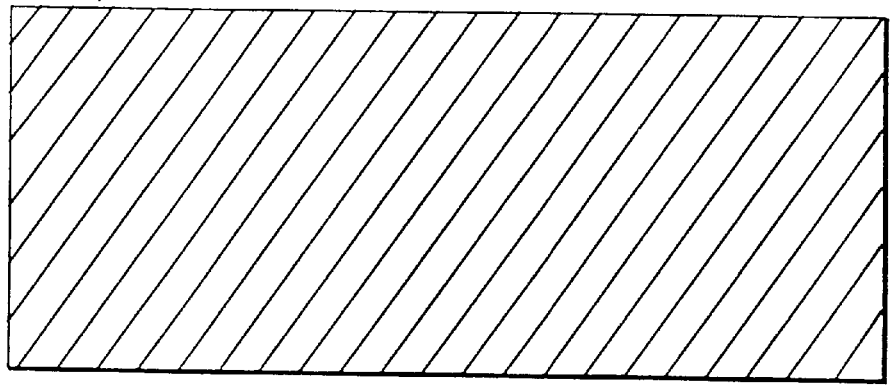

F I G. 30

CAPTION OF ARTICLE: EARTHQUAKES ×× OFF ○○ AGAIN ACTIVATE

INFORMATION SOURCE: ○○TIMES, EVENING EDITION, SECOND PAGE

YEAR; ××, MONTH; ××, DAY; 19

ARTICLE ID: △△△△△△

BODY:

EARTHQUAKES BEGUN 14-TH DAY OF LAST MONTH, OFF ○○ OF ○○

PREFECTURE AGAIN MADE VIOLENCE FURTHERMORE TODAY COORDINATING COMMITTEE FOR EARTHQUAKE PREDICTION HAS ·····

F I G. 32

```
RELEVANT ARTICLE:
        SIMILARITY WITH
        ORIGINAL DOCUMENT
  ┌─────────────────────┐
  │ EARTHQUAKE OFF ○○, │
  │ MAGNITUDE4          │ ···0.80
  └─────────────────────┘
  ○○TIMES, EVENING EDITION,
  FIRST PAGE, × ×WORDS
  YEAR; × ×, MONTH; × ×, DAY;14
  ARTICLE ID:△△△△△△

┌─────────────────────┐
  │ ARTHQUAKE OCCURED OFF│
  │ ○○PREFECTURE, M4    │ ··0.79
  └─────────────────────┘
  YEAR; × ×, MONTH; × ×, DAY;14
  ARTICLE ID:△△△△△△
```

```
CAPTION OF ARTICLE:
「EARTHQUAKE OFF ○○ WA
INFORMATION SOURCE:
○○TIMES, EVENING EDITION,
FIRST PAGE, × ×WORDS
      YEAR; × ×, MONTH;
        × ×, DAY;19
ARTICLE ID:△△△△△△
BODY:
```

INFORMATION OF BODY

```
EARTHQUAKES × × BEGUN ON 14-TH DAY
OF LAST MONTH OFF ○○ OF ○○
PREFECTURE WERE MADE MORE VIOLENT
TODAY, WHICH IS THE SIXTH DAY FROM
THE OCCURRENCE, COOR DINATING COMITTEE
FOR EARTHQUAKE PREDICTION HAS  · · · · ·
```

F I G. 33

CAPTION OF ARTICLE: 「EARTHQUAKES OCCURRED OFF ○○, MAGNITUDE4」

INFORMATION SOURCE: ○○TIMES, EVENING EDITION, FIRST PAGE

YEAR; ××, MONTH; ××, DAY; 14

ARTICLE ID: △△△△△△

BODY:

EARTHQUAKES CONTINUOUSLY OCCURRED OFF ○○ OF ○○ PREFECTURE FROM DAWN TODAY, EARTHQUAKES OFF ○○ OCCURRED AFTER AN INTERVAL OF ×× MONTHS. THE METEO ROLOGICAL AGENCY HAS.......

F I G. 34

```
                    ┌─────────────────────────────────────────────────┐
                    │  RELEVANT ARTICLES (TODAY):                     │
                    │        SIMILARITY WITH ORIGINAL DOCUMENT        │
   ADDED INFORMATION│  ·「××CORPORATION MONOPOLY-CONTROLLED           │
                    │    SHARE OF SEMICONDUCTORS.....」·····0.80      │
                    │       WEEKLY○○, PAGE××, ××WORDS                │
                    │       YEAR:××, MONTH:××, DAY:15                 │
                    │       ARTICLE ID:△△△△△△                         │
                    │  ·「SEMICONDUCTOR PLANT OF ×× CORPORATION       │
                    │    HAS COMMENCED PRODUCTION」·······0.70        │
                    │       △○TIMES, MORNING ISSUE, FIRST PAGE,       │
                    │       ×× WORDS                                  │
                    │       YEAR:××, MONTH:××, DAY:15                 │
                    │       ARTICLE ID:△△△△△△                         │
                    └─────────────────────────────────────────────────┘
                    ┌─────────────────────────────────────────────────┐
                    │  CAPTION OF ARTICLE:「SEMICONDUCTOR             │
                    │  CONFERENCE HAS......」                          │
INFORMATION OF BODY │  INFORMATION SOURCE:○○ TIMES, MORNING ISSUE,   │
                    │  FIRST PAGE OF COLUMN FOR ECONOMY, ×× WORDS    │
                    │       YEAR:××, MONTH:××, DAY:15                 │
                    │  ARTICLE ID:△△△△△△                              │
                    │  BODY:                                          │
                    │  ┌───────────────────────────────────────────┐  │
                    │  │/////////////////////////////////////////// │  │
                    │  └───────────────────────────────────────────┘  │
                    └─────────────────────────────────────────────────┘
```

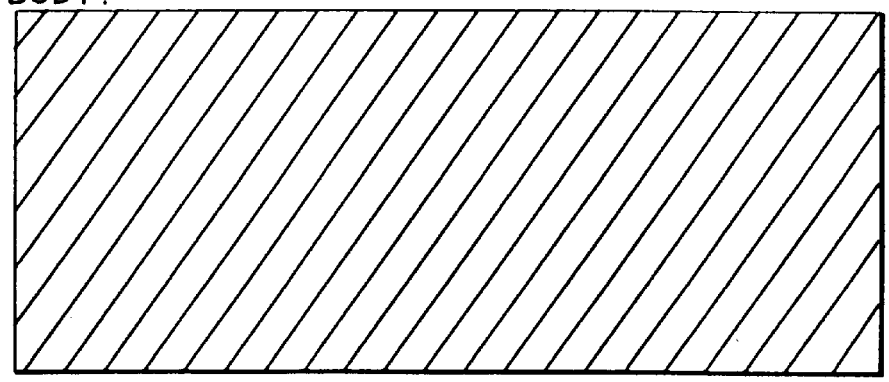

F I G. 37

ADDED INFORMATION

RELEVANT ARTICLES (TODAY):
                SIMILARITY WITH ORIGINAL DOCUMENT
·「SEMICONDUCTOR CONFERENCE WAS...」···0.80
    ○○TIMES, MORNING ISSUE, FIRST PAGE
    OF COLUMN FOR ECONOMY, ××WORDS
    YEAR:××, MONTH:××, DAY:15
    ARTICLE ID:△△△△△△
·「SEMICONDUCTOR PLANT OF ×× CORPORATION
    HAS COMMENCED PRODUCTION」·······0.70
    △○TIMES, MORNING ISSUE, FIRST PAGE,
    ×× WORDS
    YEAR:××, MONTH:××, DAY:15
    ARTICLE ID:△△△△△△

INFORMATION OF BODY

CAPTION OF ARTICLE:「×× CORPORATION
MONOPOLY-CONTROLLED SHAREO SEMICONDUCTORS..」
INFORMATION SOURCE:WEEKLY ○○, PAGE××,
×× WORD
    YEAR:××, MONTH:××, DAY:15
ARTICLE ID:△△△△△△
BODY:

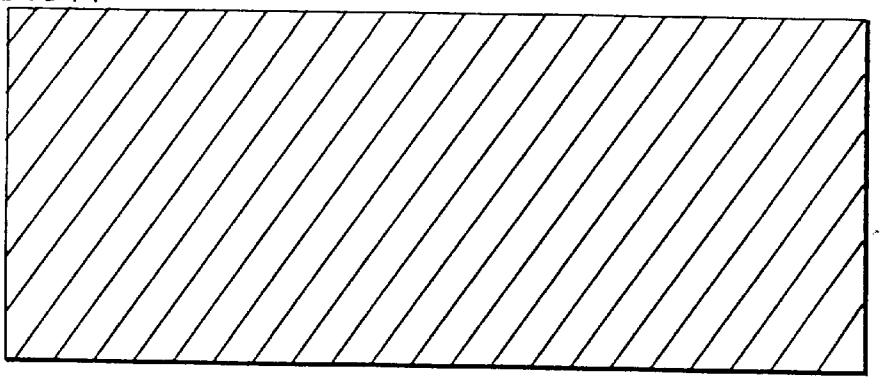

FIG. 38

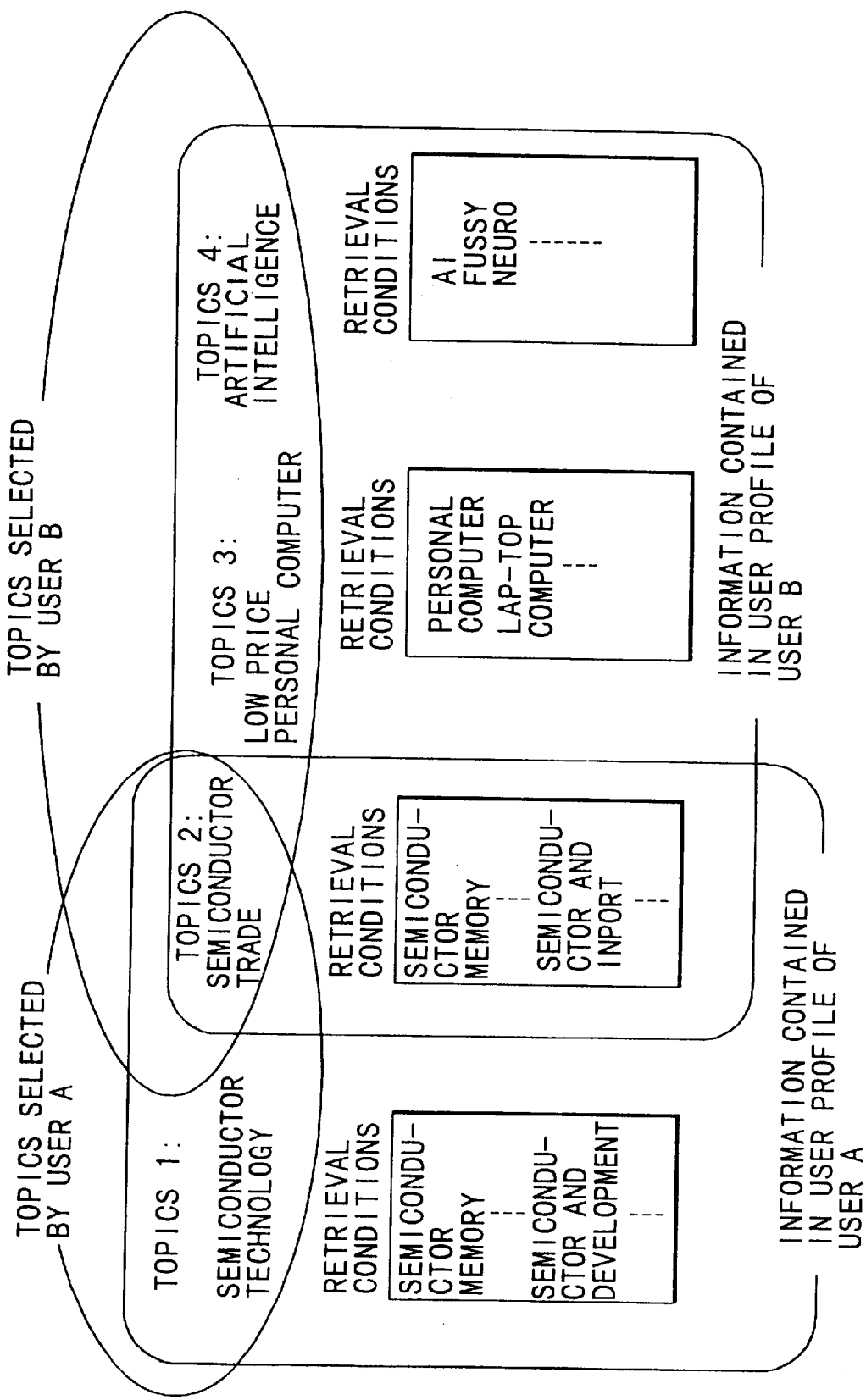
F I G. 40

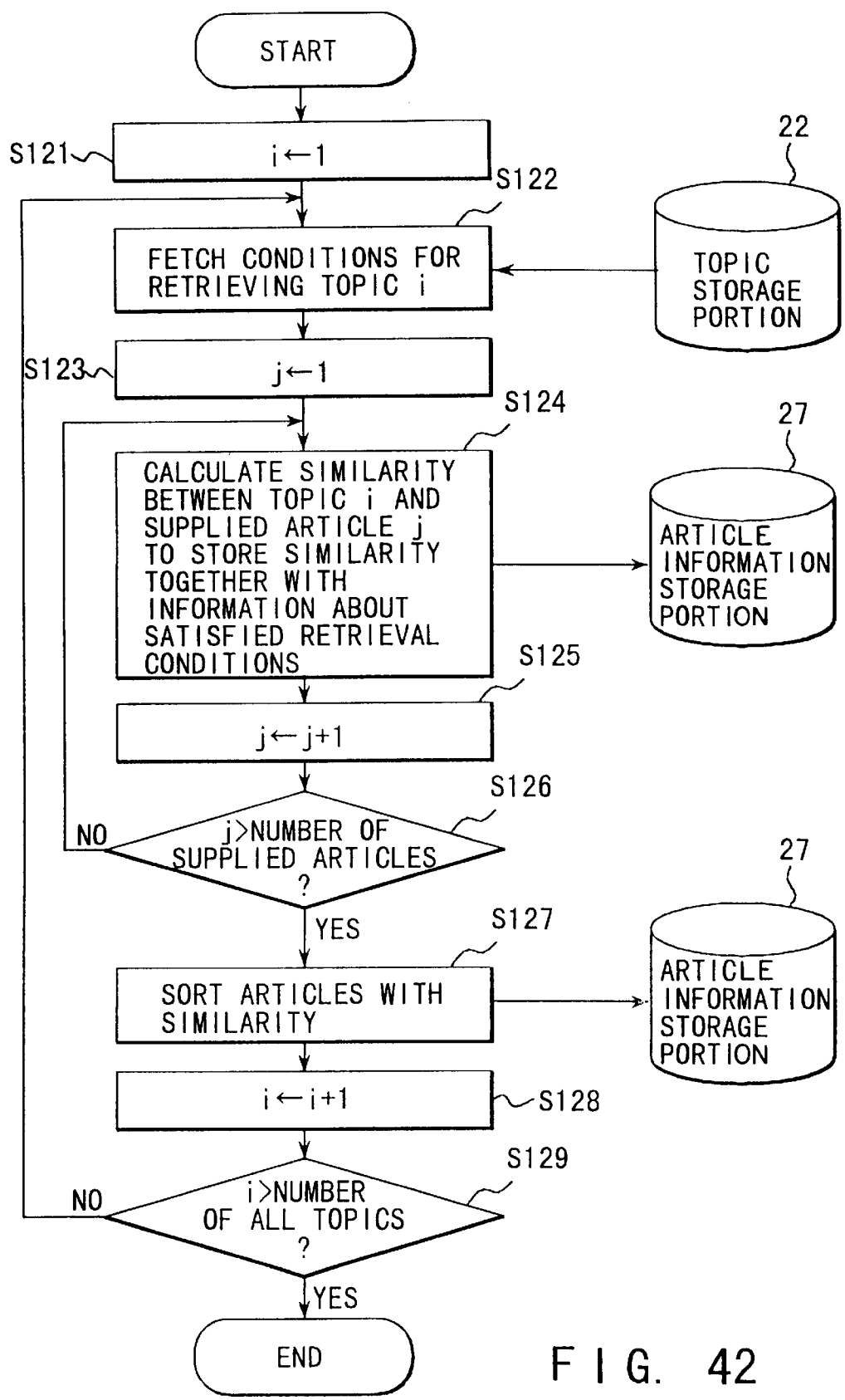
F I G. 42

RESULT OF RETRIEVAL OF TOPIC i

| OPDER | NAME OF SUPPLIED ARTICLE | SIMILARITY WITH PROFILE |
|---|---|---|
| 1 |  | 0.97 |
| 2 |  | 0.96 |
| 3 |  | 0.96 |
| 4 |  | 0.94 |
| 5 |  | 0.91 |
| 6 |  | 0.89 |
| 7 |  | 0.89 |
| 8 |  | 0.87 |
| 9 |  | 0.85 |
| 10 |  | 0.79 |
| 11 |  | 0.64 |
| ⋮ | ⋮ | ⋮ |

F I G. 43

TOPICS SELECTED BY USER

RESULT OF RETRIEVAL

| TOPIC 1 SEMICONDUCTOR TRADE | | TOPIC 2 LOW PRICE PERSONAL COMPUTE | | TOPIC 3 ARTIFICAL INTELLIGENCE | |
|---|---|---|---|---|---|
| 1 | ARTICLE1-1 | 1 | ARTICLE2-1 | 1 | ARTICLE3-1 |
| 2 | ARTICLE1-2 | 2 | ARTICLE2-2 | 2 | ARTICLE3-2 |
| 3 | ARTICLE1-3 | 3 | ARTICLE2-3 | 3 | ARTICLE3-3 |
| 4 | ARTICLE1-4 | 4 | ARTICLE2-4 | 4 | ARTICLE3-4 |
| 5 | ARTICLE1-5 | 5 | ARTICLE2-5 | 5 | ARTICLE3-5 |
| 6 | ARTICLE1-6 | 6 | ARTICLE2-6 | 6 | ARTICLE3-6 |
| 7 | ARTICLE1-7 | 7 | ARTICLE2-7 | 7 | ARTICLE3-7 |
| 8 | ARTICLE1-8 | 8 | ARTICLE2-8 | 8 | ARTICLE3-8 |
| 9 | ARTICLE1-9 | 9 | ARTICLE2-9 | 9 | ARTICLE3-9 |
| 10 | | 10 | | 10 | |

FIG. 45

ARTICLES SUPPLIED THIS TIME
(LIST OF CAPTIONS OF ARTICLES)

| ARTICLE NUMBER | CAPTION OF ARTICLE | INFORMATION SOURCE | SUBJECT TOPIC | SIMILARITY BETWEEN TOPIC AND ARTICLE |
|---|---|---|---|---|
| 1. | ARTICLE CAPTION 1 | ○○TIMES | SEMICONDUCTOR TRADE | 1.32 |
| 2. | ARTICLE CAPTION 2 | ○○TIMES | SEMICONDUCTOR TRADE | 1.30 |
| 3. | ARTICLE CAPTION 3 | △△TIMES | SEMICONDUCTOR TRADE | 1.01 |
| 4. | ARTICLE CAPTION 4 | ○○TIMES | LOW PRICE PERSONAL COMPUTER | 1.20 |
| 5. | ARTICLE CAPTION 5 | WEEKLY ×× | LOW PRICE PERSONAL COMPUTER | 0.91 |
| 6. | ARTICLE CAPTION 6 | □□TIMES | SEMICONDUCTOR TRADE/ LOW PRICE PERSONAL COMPUTER | 1.05/0.80 |

TOTAL
6 CASES

FIG. 47

SELECTED TOPICS: — NUMBER OF ARTICLES SUPPLIED THIS TIME
TOPIC1: SEMICONDUCTOR TRADE    FOUR CASES
TOPIC2: LOW PRICE PERSONAL COMPUTER
                               THREE CASES
TOPIC3: ARTICAL INTELLIGENCE   0
                       TOTAL 6 CASES
           (EXCEPT DUPLICATED ARTCLES)
F I G. 48A
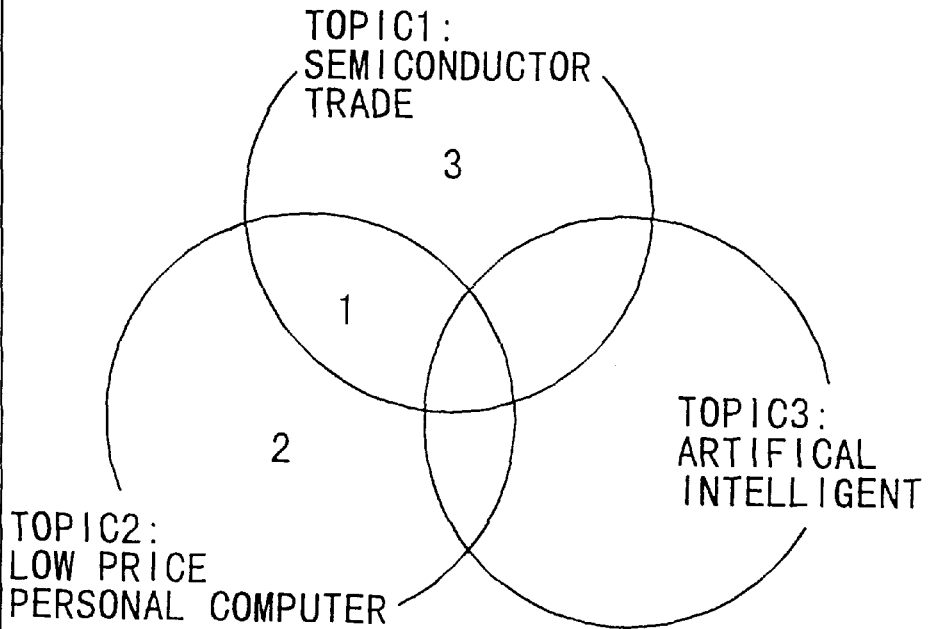
F I G. 48B

ARTICLES SUPPIED THIS TIME

----- TOPIC1:SEMICONDUCTOR TRADE -----

1. ARTICLE CAPTION1    ○○TIMES    1.32

SUMMARY/EXTRACTION/BODY OF ARTICLE 1

2. ARTICLE CAPTION1    ○○TIMES    1.30

SUMMARY/EXTRACTION/BODY OF ARTICLE 2

3. ARTICLE CAPTION1    △△TIMES    1.01

SUMMARY/EXTRACTION/BODY OF ARTICLE 3

----- TOPIC2:LOW PRICE PERSONAL COMPUTER -----

4. ARTICLE CAPTION1    ○○TIMES    1.20

SUMMARY/EXTRACTION/BODY OF ARTICLE 4

FIG. 49

ARTICLE 1
ARTICLE CAPTION:○○CORPORATION PROCURED IC FROM
△△, US
INFORMATION SOURCE: × ×TIMES
SUBJECT TOPIC:SEMICONDUCTOR TRADE
SIMILARITY WITH THE TOPIC ABOVE:1.32
CONDITIONS FOR RETRIEVING THE TOPIC ABOVE:

| CONDITIONS FOR RETRIEVING THE TOPIC | ~ex

RETRIEVING CONDITIONS STATISFIED BY ARTICLE 1:

| RETRIEVING CONDITIONS SATISFIED BY ARTICLE 1 | ~ex

BODY:

○○ CORPORATION, 30-TH DAY, ANNOUNCED TO START PROCURING IC FOR SPECIFIC PURPOSE FORM △△ CORPORATION, SEMICONDUCTOR MANUFACTURER IN US.
IN JAPAN AND US SEMICONDUCTOR TRADE CONFERENCE TO BE HELD ON 10-TH DAY, LAST MONTH, US WILL, TO JAPAN, · · · · ·

F I G. 50

REQUIRED TOPIC: NATURAL LANGUAGE PROCESS

```
┌─ TOPIC RETRIEVAL CONDITIONS: ──────────────────┐
│                                                │
│ WORD:NATURAL LANGUAGE PROCESS, NL, MECHANICAL  │
│ TRANSLATION, KANA-KANZI CONVERSION             │
│                                                │
│ IN ONE SENTENCE:NATURAL LANGUAGE, ANALYSIS     │
│                                                │
│ IN ONE SENTENCE:NATURAL LANGUAGE, COMPREHENSION│
│                      .                         │
│                      .                         │
│                      .                         │
└────────────────────────────────────────────────┘
```

FIG. 51A

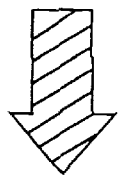

```
┌─ RETRIEVED DOCUMENTS:ARTICLES THAT ARE ────────┐
│  NOT WRITTEN IN NATURAL LANGUAGE PROCESS       │
│                      .                         │
│                      .                         │
│                      .                         │
│                                                │
│ THIS SOFTWARE DOES NOT USE NATURAL LANGUAGE    │
│ PROCESS BUT PERFORMS RETRIEVAL BY SIMPLE       │
│ CHARACTER STRING MATCHING                      │
│                      .                         │
│                      .                         │
│                      .                         │
└────────────────────────────────────────────────┘
```

FIG. 51B

REQUIRED TOPIC: ARTIFICIAL INTELLIGENCE

```
┌─ TOPIC RETRIEVAL CONDITIONS: ──────────────┐
│                                            │
│ WORD: ARTIFICIAL, INTELLIGENCE, AI, FUZZY, NEURAL, │
│       KNOWLEDGE, EXPECT                    │
│                                            │
│                     .                      │
│                     .                      │
│                     .                      │
│                                            │
└────────────────────────────────────────────┘
```

FIG. 52A

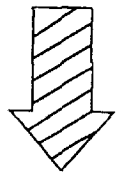

```
┌─ RETRIEVED DOCUMENTS: ARTICLE ABOUT ───────┐
│                       ARTIFICIAL HAND      │
│                     .                      │
│                     .                      │
│                     .                      │
│                                            │
│ ···HAS DEVELOPED AN ARTIFICIAL HAND THAT IS│
│ CAPABLE OF MOVING ITS ARM RIGHT AND LEFT···│
│                     .                      │
│                     .                      │
│                     .                      │
└────────────────────────────────────────────┘
```

FIG. 52B

REQUIRED TOPIC: BRAND NEW PERSONAL COMPUTER

TOPIC RETRIEVAL CONDITIONS:

WORD: PERSONAL COMPUTER, SALE, NOTE TYPE
　　　PERSONAL COMPUTER, LAP-TOP, DESK TOP,
　　○○CORPORATION, △△CORPORATION

．
　　　　　　．
　　　　　　．

RETRIEVED DOCUMENTS:
DOCUMENTS ABOUT BRAND NEW PERSONAL COMPUTER

．
　　　　　．
　　　　　．

△△CORPORATION STARTED SELLING NOTE TYPE
PERSONAL COMPUTER.
PRICE IS...., MODEL IS....

．
　　　．
　　　．

REQUIRED TOPIC: SEMICONDUCTOR TRADE

TOPIC RETRIEVAL CONDITIONS:

(SEMICONDUCTOR OR MEMORY) AND (TRADE OR PROCUREMENT)

IN ONE SENTENCE: SEMICONDUCTOR, TRADE

IN ONE PARAGRAPH: SEMICONDUCTOR, IMPORT

CAPTION OF ARTICLE: SEMICONDUCTOR, MEMORY, IC

FIRST SENTENCE: SEMICONDUCTOR, PROCUREMENT

WORDS: SEMICONDUCTOR, MEMORY, IC, LSI, TRADE, IMPORT, PROCUREMENT

F I G. 54

SUBJECT TOPIC: SEMICONDUCTOR TRADE
SIMILARITY WITH THE TOPIC ABOVE: 1.23

---- TOPIC RETRIEVAL CONDITIONS: ----

(SEMICONDUCTOR OR MEMORY) AND (TRADE OR PROCUREMENT)

IN ONE SENTENCE: SEMICONDUCTOR, TRADE

IN ONE PARAGRAPH: SEMICONDUCTOR, IMPORT

CAPTION OF ARTICLE: SEMICONDUCTOR, MEMORY, IC

FIRST SENTENCE: SEMICONDUCTOR, PROCUREMENT

WORDS: SEMICONDUCTOR, MEMORY, IC, LSI, TRADE, IMPORT,
       PROCUREMENT

---- RETRIEVAL CONDITIONS SATISFIED BY ARTICLE 1 ----

(SEMICONDUCTOR OR MEMORY) AND (TRADE OR PROCUREMENT)

CAPTION OF ARTICLE: IC (ONE TIME)

FIRST SENTENSE: SEMICONDUCTOR (ONE TIME),
                PROCUREMENT (ONE TIME)

WORDS: SEMICONDUCTOR,            IC,
       (FIRST SENTENCE;    (CAPTION OF ARTICLE,
        ONE TIME)           FIRST SENTENCE;
       PROCUREMENT          TWO TIMES)
       (FIRST SENTENCE;
        ONE TIME)

FIG. 55

TOPIC: SEMICONDUCTOR TRADE

---TOPIC RETRIEVAL CONDITIONS:------

(SEMICONDUCTOR OR MEMORY) AND (TRADE OR PROCUREMENT)

IN ONE SENTENCE: SEMICONDUCTOR, TRADE

IN ONE PARAGRAPH: SEMICONDUCTOR, IMPORT

CAPTION OF ARTICLE: SEMICONDUCTOR, MEMORY, IC

FIRST SENTENCE: SEMICONDUCTOR, PROCUREMENT

WORDS: SEMICONDUCTOR, MEMORY, IC, LSI, TRADE, IMPORT,
    (FIRST SENTENCE;  (CAPTION OF ARTICLE,
     ONE TIME)      FIRST SENTENCE;
                    TWO TIMES)
    PROCUREMENT
    (FIRST SENTENCE; ONE TIME)

F I G. 56

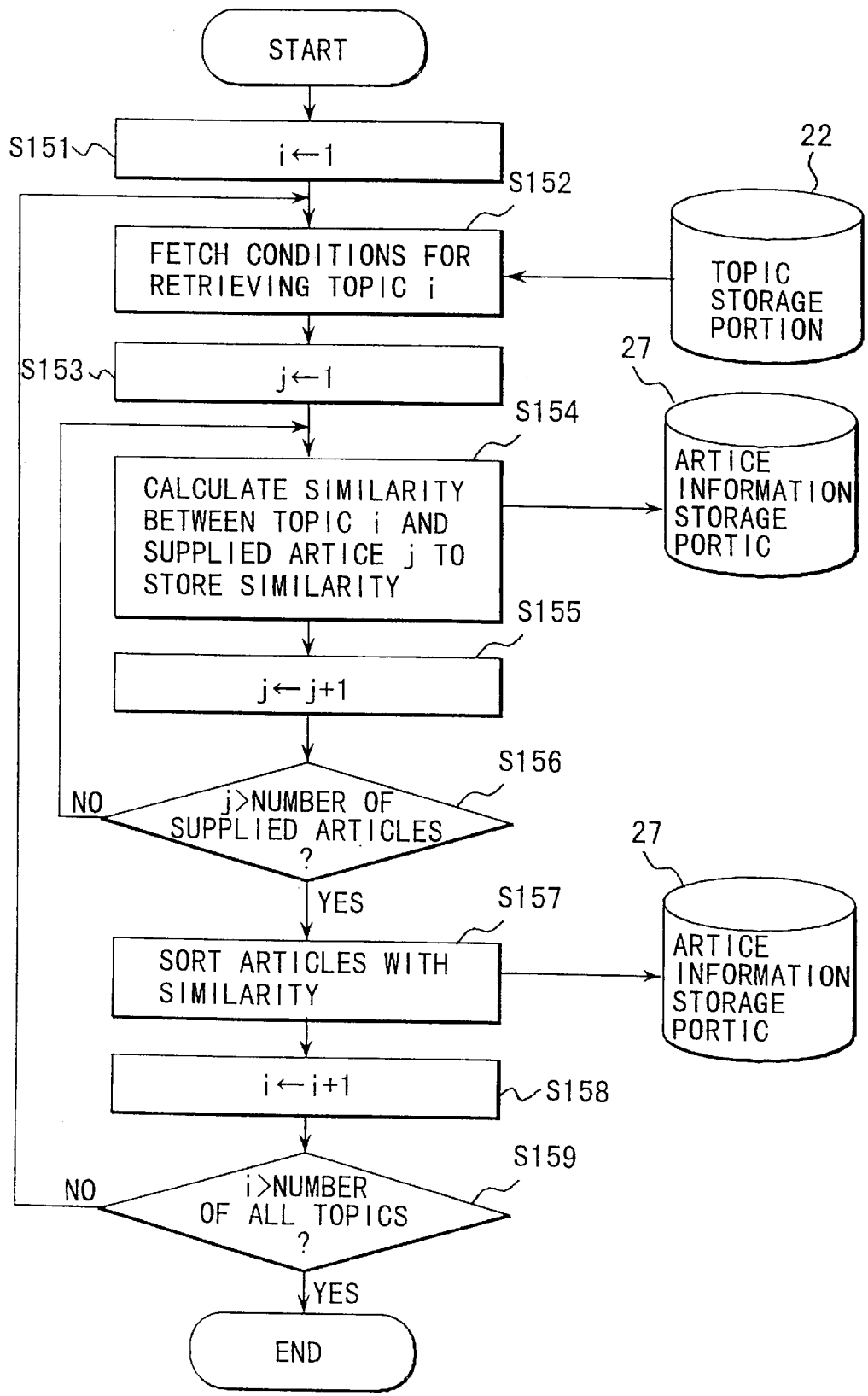
F I G. 57

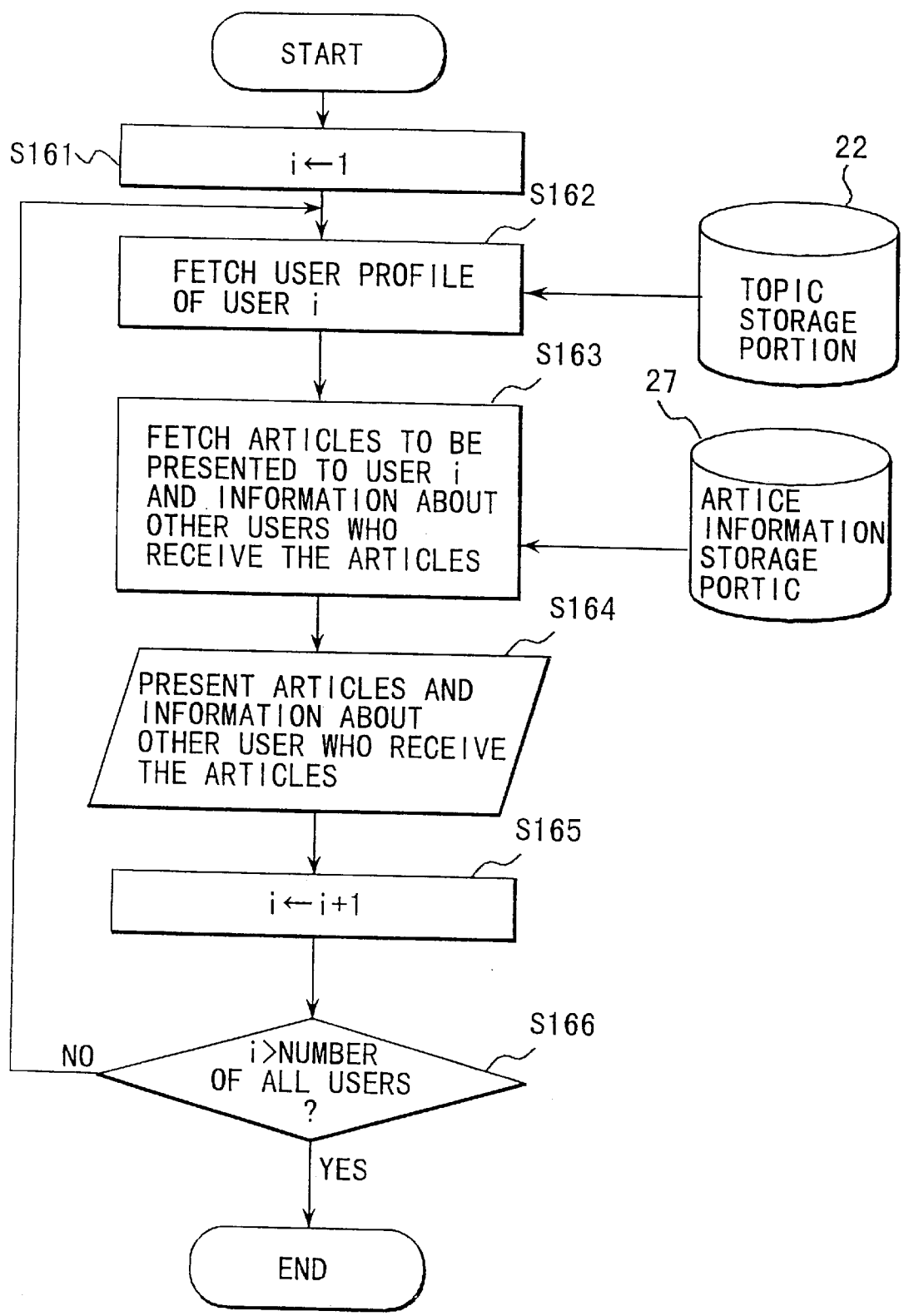
F I G. 58

|  | USER 1 | USER 2 | USER 3 | USER 4 | .... |
|---|---|---|---|---|---|
| ARTICLE 1 | TRANSMIT |  | TRANSMIT | TRANSMIT |  |
| ARTICLE 2 | TRANSMIT | TRANSMIT |  | TRANSMIT |  |
| ARTICLE 3 |  | TRANSMIT |  |  |  |
| ARTICLE 4 |  | TRANSMIT |  |  |  |
| ARTICLE 5 |  |  |  | TRANSMIT |  |
| ⋮ |  |  |  |  |  |

FIG. 59

ARTICLES SUPPLIED THIS TIME
(LIST OF CAPTIONS OF ARTICLES):

| ARTICLE NO. | CAPTION OF ARTICLE | INFORMATION SOURCE | NUMBER OF RECEIVING/ NUMBER OF ALL USERS |
|---|---|---|---|
| 1. | ARTICLE CAPTION 1 | ○○ TIMES | 250/4,000 |
| 2. | ARTICLE CAPTION 2 | ○○ TIMES | 250/4,000 |
| 3. | ARTICLE CAPTION 3 | △△ TIMES | 200/4,000 |
| 4. | ARTICLE CAPTION 4 | ○○ TIMES | 1,000/4,000 |
| 5. | ARTICLE CAPTION 5 | WEEKLY ×× | 500/4,000 |
| 6. | ARTICLE CAPTION 6 | □□ TIMES | 300/4,000 |

FIG. 60

ARTICLES SUPPIED THIS TIME
(SUMMARY/EXTRACTION)

1. ARTICLE CAPTION 1   ○○TIMES   250/4,000

SUMMARY/EXTRACTION OF ARTICLE 1

2. ARTICLE CAPTION 2   ○○TIMES   250/4,000

SUMMARY/EXTRACTION OF ARTICLE 2

3. ARTICLE CAPTION 3   △△TIMES   200/4,000

SUMMARY/EXTRACTION OF ARTICLE 3

4. ARTICLE CAPTION 4   ○○TIMES   1,000/4,000

SUMMARY/EXTRACTION OF ARTICLE 4

⋮

F I G.  61

ARITCLE 1

CAPTION OF ARTICLE: ○○ CORPORATION,
PROCURE IC FROM △△ CORPORATION

INFORMATION SOURCES: ×× TIMES

SUBJECT TOPIC: SEMICONDUCTOR TRADE

NUMBER OF RECEIVING USER/NUMBER OF ALL USERS:
250/4,000

BODY:

INFORMATION OF BODY

F I G. 62

ARITCLE 1

CAPTION OF ARTICLE: ○○ CORPORATION, PROCURE IC FROM △△ CORPORATION

INFORMATION SOURCES: × × TIMES

SUBJECT TOPIC: SEMICONDUCTOR TRADE

NUMBER OF RECEIVING USER/NUMBER OF ALL USERS:
250/4,000

《BREAKDOWN》
- SEX: MALE 150
- FEMALE 100

- COUNTRY: JAPAN 200
- US 30
- OTHERS 20

- TOPICS: SEMICONDUCTOR TRADE 180
- IC 50
- BOTH 20

BODY:

INFORMATION OF BODY

F I G. 63

PREVIOUS RELEVANCE FEEDBACK INFORMATION:

| ARTICLE NO. | CAPTION OF ARTICLE | INFORMATION SOURCE | PREVIOUS EVALUATION | PREVIOUS EVALUATION MADE BY OTHER USERS | | | |
|---|---|---|---|---|---|---|---|
| | | | | USEFUL | SOMEWHAT USEFUL | DISUSE | TOTAL |
| a1. | ARTICLE CAPTION 1 | ○○TIMES | USEFUL | 100 | 100 | 50 | 250 |
| a2. | ARTICLE CAPTION 2 | ○○TIMES | USEFUL | 200 | 50 | 0 | 250 |
| a3. | ARTICLE CAPTION 3 | △△TIMES | DISUSE | 0 | 150 | 50 | 200 |
| a4. | ARTICLE CAPTION 4 | ○○TIMES | SOMEWHAT USEFUL | 600 | 300 | 100 | 1,000 |
| a5. | ARTICLE CAPTION 5 | WEEKLY×× | DISUSE | 100 | 0 | 400 | 500 |
| a6. | ARTICLE CAPTION 6 | □□TIMES | USEFUL | 200 | 100 | 0 | 300 |

ARTICLES SUPPLIED THIS TIME:

b1. ☐ b2. ☐ b3. ☐ b4. ☐

F I G. 64

PREVIOUS RELEVANCE FEEDBACK INFORMATION:

| ARTICLE NO. | CAPTION OF ARTICLE | INFORMATION SOURCE | PREVIOUS EVALUATION | PREVIOUS EVALUATION MADE BY OTHER USERS AVERAGE |
|---|---|---|---|---|
| a1. | ARTICLE CAPTION 1 | ○○TIMES | 10 POINT | 8.9 POINT (250) |
| a2. | ARTICLE CAPTION 2 | ○○TIMES | 9 POINT | 9.0 POINT (250) |
| a3. | ARTICLE CAPTION 3 | △△TIMES | 0 POINT | 4.0 POINT (200) |
| a4. | ARTICLE CAPTION 4 | ○○TIMES | 4 POINT | 5.2 POINT (1,000) |
| a5. | ARTICLE CAPTION 5 | WEEKLY×× | 1 POINT | 7.4 POINT (500) |
| a6. | ARTICLE CAPTION 6 | □□TIMES | 9 POINT | 9.9 POINT (300) |

ARTICLES SUPPLIED THIS TIME:

b1.
b2.
b3.
b4.

F I G. 65

| KEY WORD | WEIGHT |
|---|---|
| DRAM | 5 |
| SRAM | 5 |
| EPROM | 5 |
| MEMORY | 7 |
| INTEGRATED CIRCUIT | 7 |
| SEMICONDUCTOR | 10 |
| COUNCIL OF SEMICONDUCTOR USER | 3 |

FIG. 67

TOPICS SELECTED BY USER i    PRIORITY ORDER

| TOPIC A | 1 |
|---------|---|
| TOPIC B | 2 |
| TOPIC C | 3 |
| TOPIC D | 4 |

FIG. 69

ARTICLES TO BE PRESENTED TO USER i    ADAPTED TOPIC

| ARTICLE 1 | TOPIC A |
|-----------|---------|
| ARTICLE 2 | TOPIC A |
| ARTICLE 3 | TOPIC B |
| ARTICLE 4 | TOPIC C, TOPIC D |

FIG. 70

| TOPIC SELECTED BY USER | DEGREE OF IMPORTANCE |
|---|---|
| TOPIC A | 2.0 |
| TOPIC B | 1.5 |
| TOPIC C | 1.0 |
| TOPIC D | 0.5 |
F I G. 72
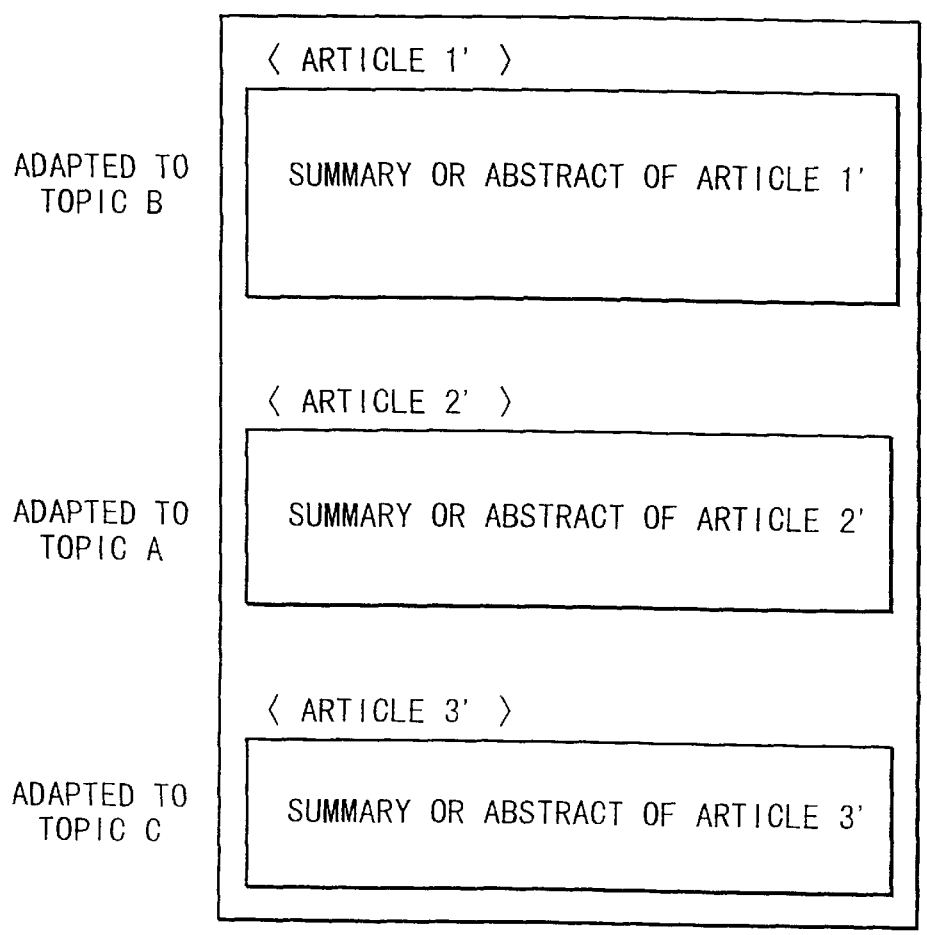
F I G. 73

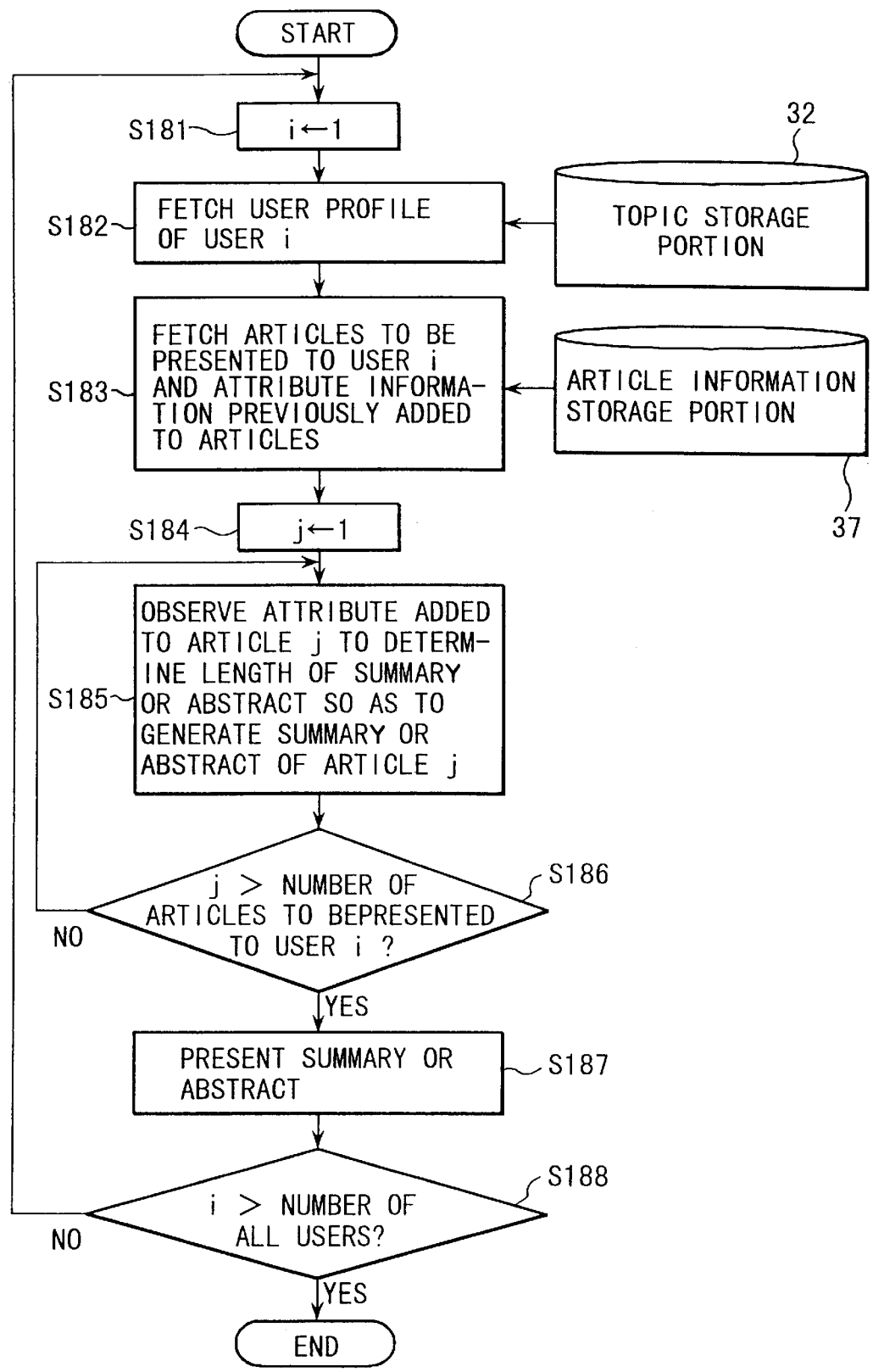
F I G. 74

| ARTICLES TO BE PRESENTED TO USER i | ATTRIBUTE (DATA) |
|---|---|
| ARTICLE 1 | MAY 26, 19××  |
| ARTICLE 2 | MAY 23, 19××  |
| ARTICLE 3 | MAY 23, 19××  |
| ARTICLE 4 | MAY 20, 19××  |
F I G. 75
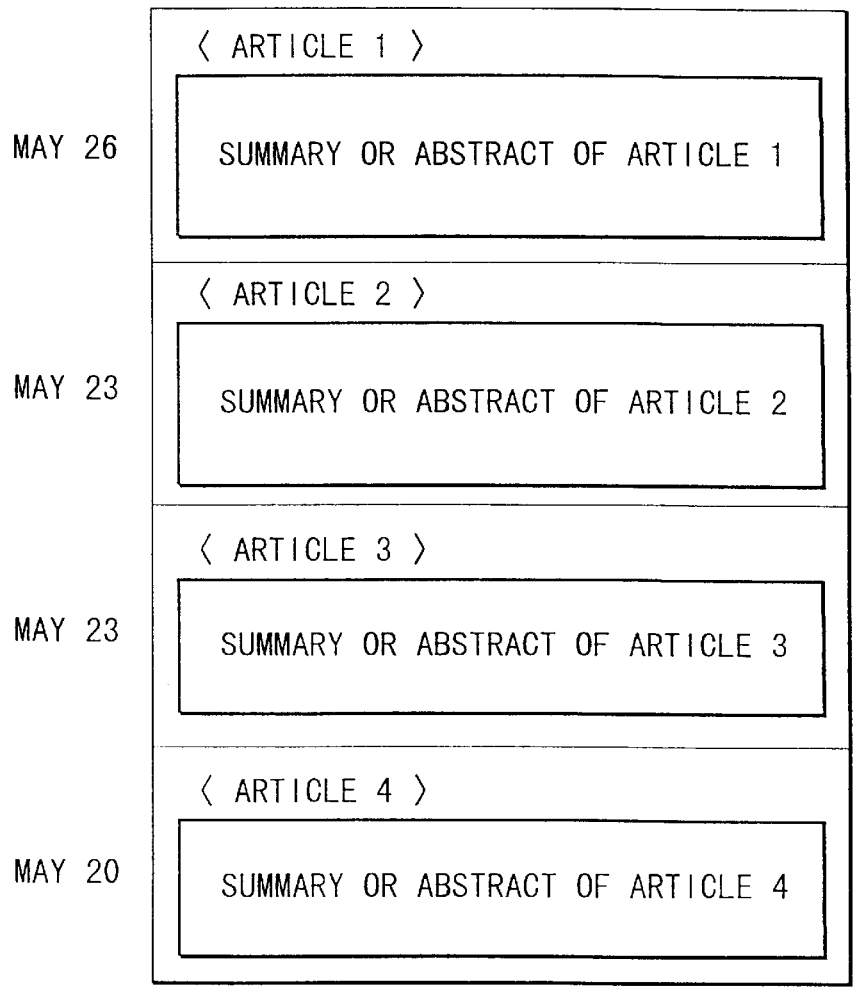
F I G. 76

| ARTICLE TO BE PRESENTED TO USER i | ATTRIBUTE (NEWSPAPER PUBLISHING COMPANY) |
|---|---|
| ARTICLE 1 | ○○ TIMES |
| ARTICLE 2 | △△ TIMES |
| ARTICLE 3 | △△ TIMES |
| ARTICLE 4 | ×× TIMES |

△△TIMES

⟨ ARTICLE 1' ⟩

SUMMARY OR ABSTRACT OF ARTICLE 1'

○○TIMES

⟨ ARTICLE 2' ⟩

SUMMARY OR ABSTRACT OF ARTICLE 2'

××TIMES

⟨ ARTICLE 3' ⟩

SUMMARY OR ABSTRACT OF ARTICLE 3'

F I G. 7 9

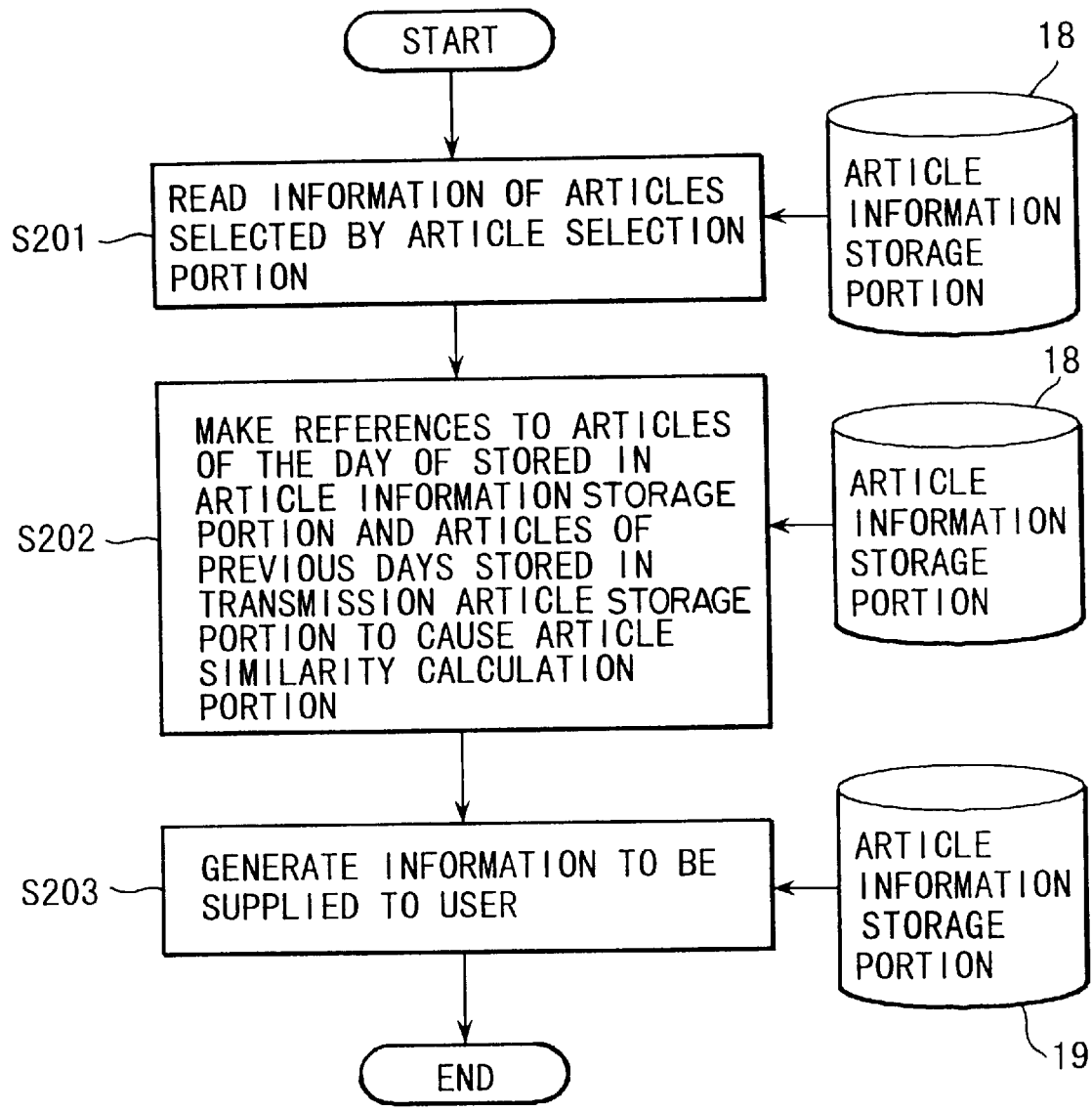
F I G. 8 2

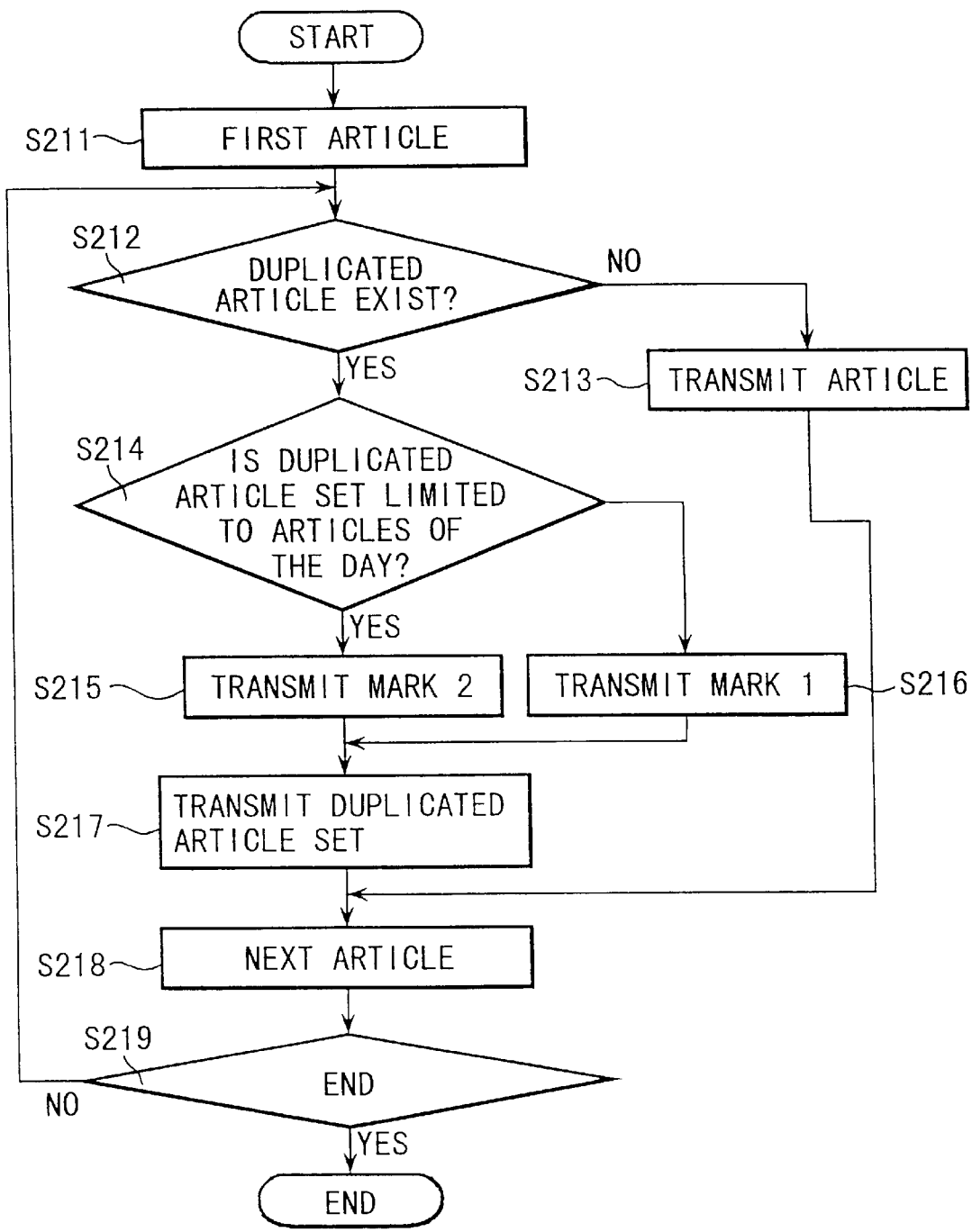
F I G. 83

| ARTICLE 1 TITLE | 8/4 |
|---|---|
| ☐ ARTICLE 2 TITLE | 8/4 |
| ARTICLE 3 TITLE | 8/4 |
| ARTICLE 4 TITLE | 8/4 |
| ARTICLE 5 TITLE | 8/4 |
| △ ARTICLE 6 TITLE | 8/4 |
| ARTICLE 7 TITLE | 8/3 |

FIG. 84

001: SCALE OF MULTIMEDIA MARKET REACHED ONE TRILLION AND SIXTY HUNDREDS AND TWENTY TWO BILLIONS AND ONE HUNDRED MLLION YEN, LAST YEAR, INCREASED BY 35%OF PREVIOUS YEAR - ANNOUNCED FROM COUNICIL OF PROMOTION
☐01 JAPAN ○○TEMES, MORNING ISSUE, PP. 11, 513 WORDS

002: PART-4 TAKE N MULTIMEDIA(7)AVIATION AND INFORMATION NETWORK MADE GREAT COMBINATION (SERVICE AND INDUSTRY PROMOTION)
××INDUSTRIAL TIMES, PP. 15, 1,864 WORDS

003: <FISH VIEW> CONTENTS INDUSTRY
○○TIMES, EVENING EDITION, PP. 6,704 WORDS

004: MULTIMEDIA EXPERIMENT GERMANY/FIRST JOIN OF JAPANESE
××TIMES, MORNING ISSUE, PP. 13,388 WORDS

005: RAPID GROWTH OF MULTIMEDIA MARKET, INCREASED BY 35% IN '94, ONE TRILLION AND SIXTY HUNDREDS BILLION YEN

006: FROM REPORT OF MULTIMEDIA ISSUE ELECTRONIC INFORMATION COMMUNICATION SOCIETY(8) INFORMATION GULF BETWEEN RICH AND POOR HAS BEEN ENLARGED (END)
△03 ○○INDUSTRIAL TIMES, PP. 5,844 WORDS

F I G . 8 5

1995/08/04

01: SCALE OF MULTIMEIDA MARKET REACHED ONE TRILLION AND SIXTY HUNDREDS AND TWENTY TWO BILLIONS AND ONE HUNDRED MILLION YEN, LAST YEAR, INCREASED BY 35% OF PREVIOUS YEAR -ANNOUNCED FROM COUNCIL OF PROMOTION
   JAPAN ○○ TIMES, MORNING ISSUE, PP. 11, 513 WORDS

02: MULTIMEDIA MARKET INCREASED BY 35% LAST YEAR, SUMMARIZED BY COUNCIL OF SOFTWARE PROMOTION
   ××INDUSTRY TIMES, PP. 6, 452 WORDS

03: MULTIMEDIA BUSINESS INCREASED BY 35% LAST YEAR, SUMMARIZED BY COUNCIL OF SOFTWARE PROMOTION
   ○○○ TIMES, PP. 12, 351 WORDS

01: FROM REPORT OF MULTIMEDIA ISSUE ELECTRONIC INFORMATION COMMUNICATION SOCIETY (8)
INFORMATION GULF BETWEEN RICH AND POOR HAS BEEN ENLARGED (END)
× × INDUSTRY TIMES, PP. 5, 844 WORDS

1995/08/03

01: FROM REPORT OF MULTIMEDIA ISSUE ELECTRONIC INFORMATION COMMUNICATION SOCIETY (7)
ELECTRONIC LIBRARY
× × INDUSTRY TIMES, PP. 4, 893 WORDS

1995/08/02

01: FROM REPORT OF MULTIMEDIA ISSUE ELECTRONIC INFORMATION COMMUNICATION SOCIETY (6)
NETWORK FEE
× × INDUSTRY TIMES, PP. 5, 821 WORDS

F I G. 87

FIG. 91A FORMAT
<WORD> (<WEIGHT>, {<WORD> <WEIGHT>)} *

FIG. 91B EXAMPLE
SUPER COMPUTER (3), START OF SALES (2)

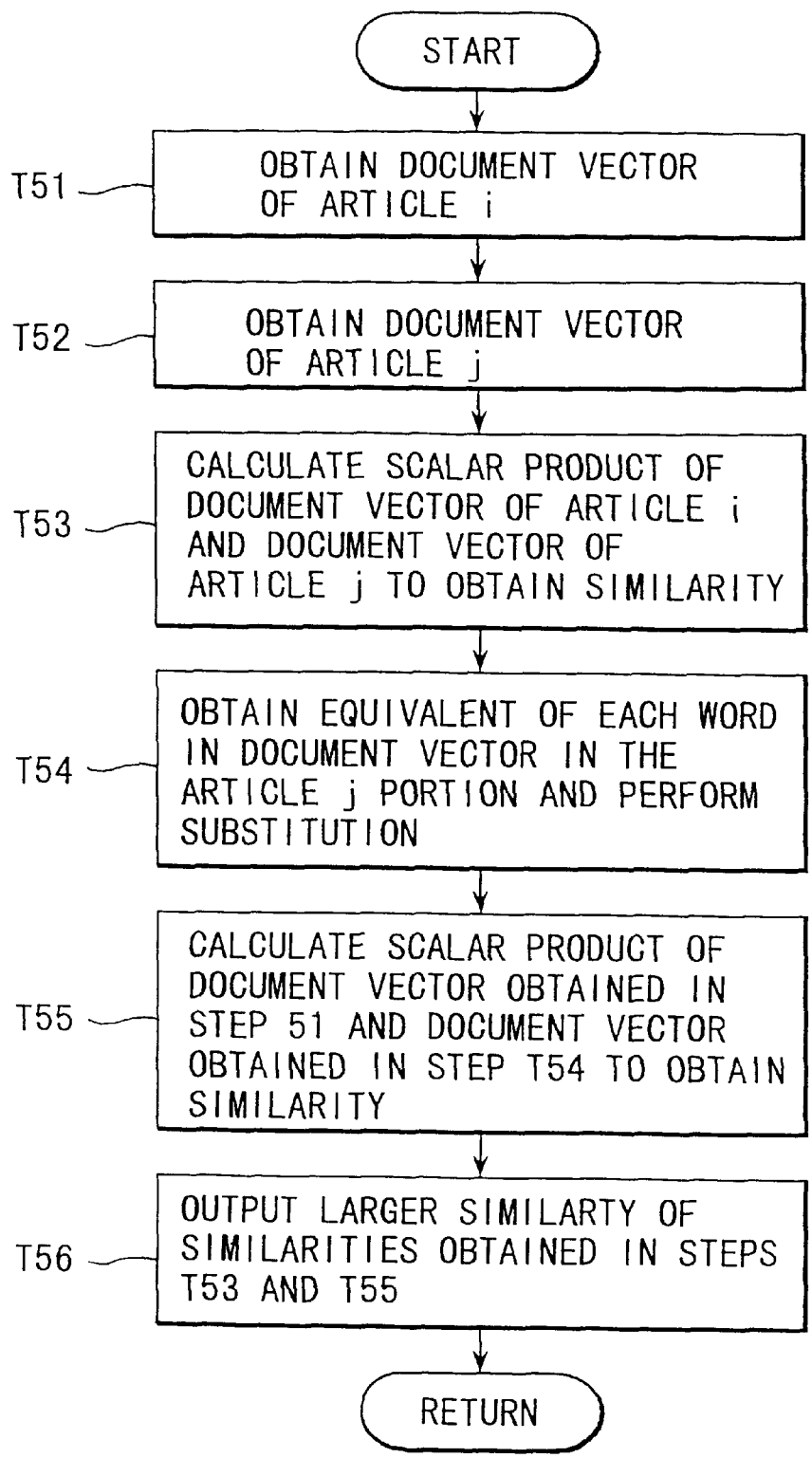
F I G. 96

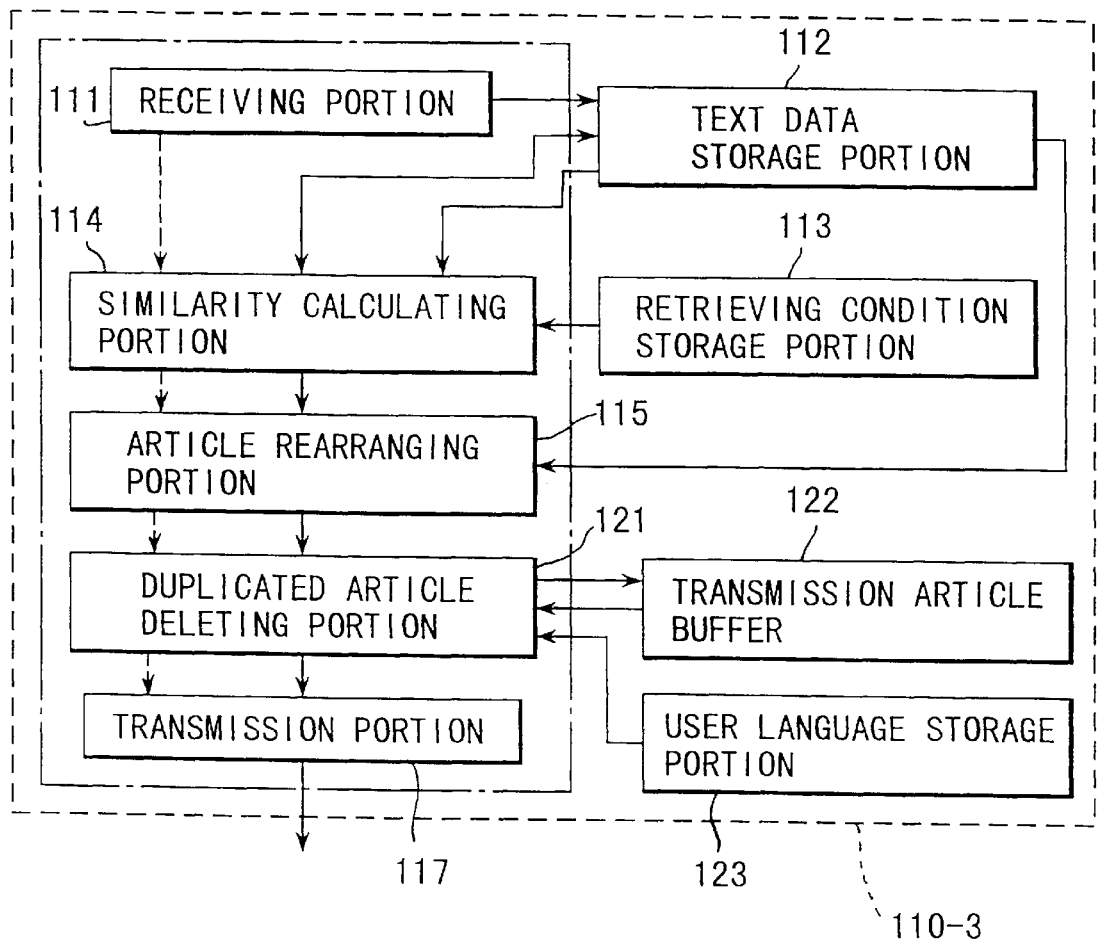
F I G. 97

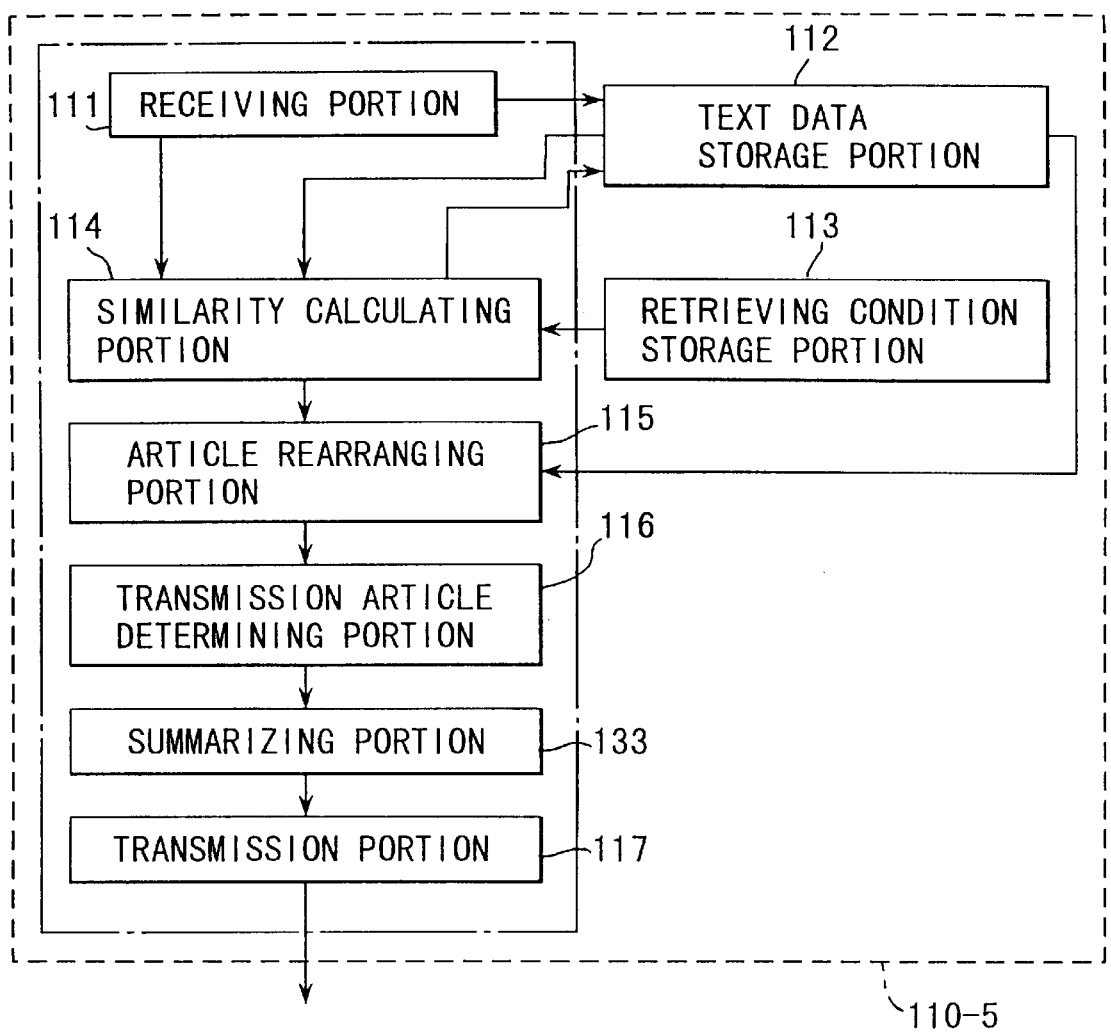
F I G. 99

```
<ENGLISH TITLE>
<JAPANESE TRANSLATION OF ENGLISH TITLE>

(BODY OF ENGLISH PORTION)
```

FIG. 100A

```
<JAPANESE TRANSLATION OF ENGLISH TITLE>

(BODY OF ENGLISH PORTION)
```

FIG. 100B

IN THE CASE WHERE UN IS SPECIFIED

IN THE CASE WHERE US IS SPECIFIED

ALGORITHM FOR DETERMINING A FACT THAT
NUMBER OF RETRIEVED DOCUMENTS BEING SMALLER
THAN SPECIFIED NUMBER IS CONTINUED BY SPECIFIED
NUMBER OF TIMES c : PRESENT SEQUENTIAL ORDER OF RETRIEVAL
m : VARIABLE OF THE RETREIVING SEQUENTIAL ORDER
Thres : SPECIFIED NUMBER OF TIMES
dus : CHANGE WIDTH OF NUMBER OF OUTPUT DOCUMENTS
dUN : CHANGE THE WIDTH OF THRESHOLD F I G. 1 1 0
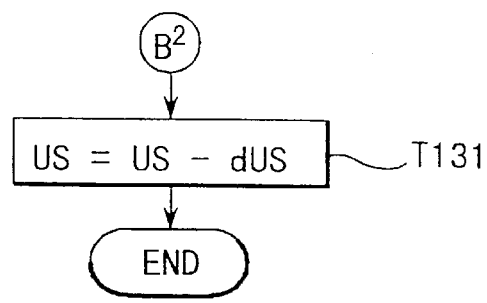
F I G. 1 1 1
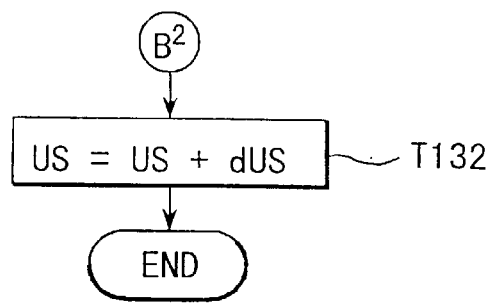
F I G. 1 1 2
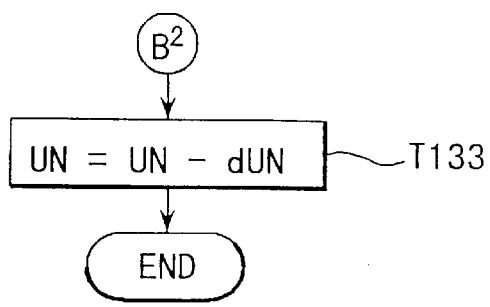
F I G. 1 1 3
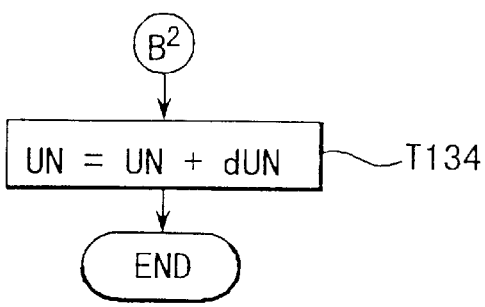

Text DB Thres Rate = 10%
N = 3
NUMBER OF RETRIEVED DOCUMENTS
| NUMBER OF RETRIEVALS | 1 | 2 | 3 | total | ratio |
|---|---|---|---|---|---|
| TextDB1 | 0 | 0 | 1 | 1 | 1%<10% |
| TextDB2 | 20 | 18 | 17 | 55 | 55% |
| TextDB3 | 20 | 9 | 15 | 44 | 33% |
|  |  |  |  | 100 |  |
F I G. 1 1 6
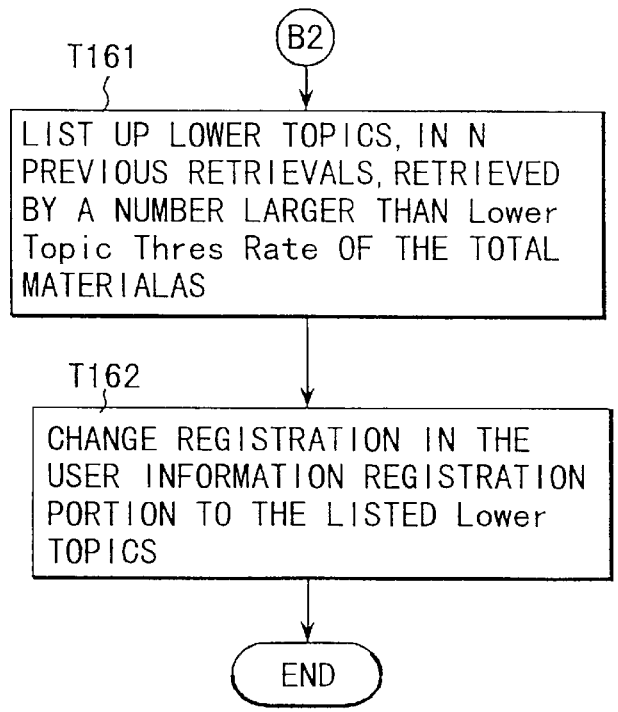
F I G. 1 1 7

N = 3
Thres = 100
Lower Topic Thres Rate = 60%

NUMBER OF RETRIEVED DOCUMENTS

| NUMBER OF RETRIEVALS | 1 | 2 | 3 | total | ratio |
|---|---|---|---|---|---|
| Topic | 200 | 300 | 150 | 650 | |
| Subtopic1 | 100 | 200 | 100 | 400 | 61%>60% |
| Subtopic2 | 50 | 50 | 25 | 125 | 19% |
| Subtopic3 | 50 | 50 | 25 | 125 | 19% |

N = 3
Thres = 5
Upper Topic Thres Num = 10
NUMBER OF RETRIEVED DOCUMENTS
| NUMBER OF RETRIEVALS | 1 | 2 | 3 | total |
|---|---|---|---|---|
| Topic | 0 | 0 | 1 | |
| Upper Topic1 | 0 | 0 | 2 | 2 |
| Upper Topic2 | 0 | 3 | 3 | 6 |
| Upper Topic3 | 5 | 8 | 10 | 23>10 |
F I G. 1 2 2
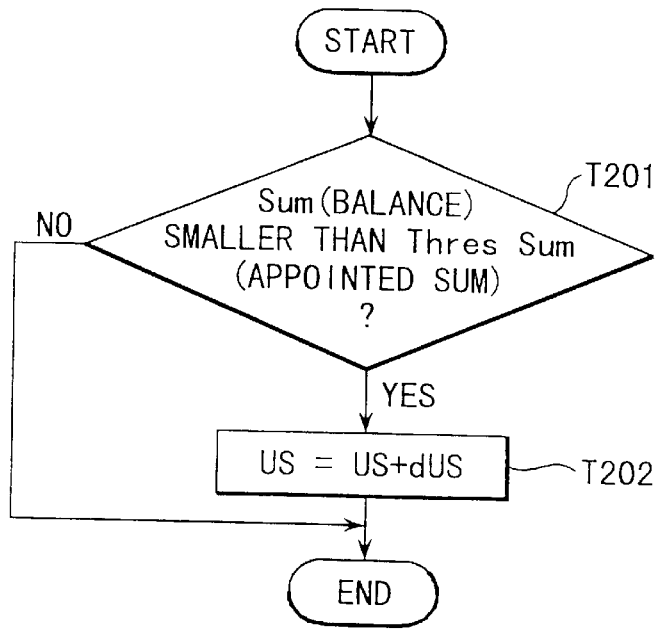
F I G. 1 2 3

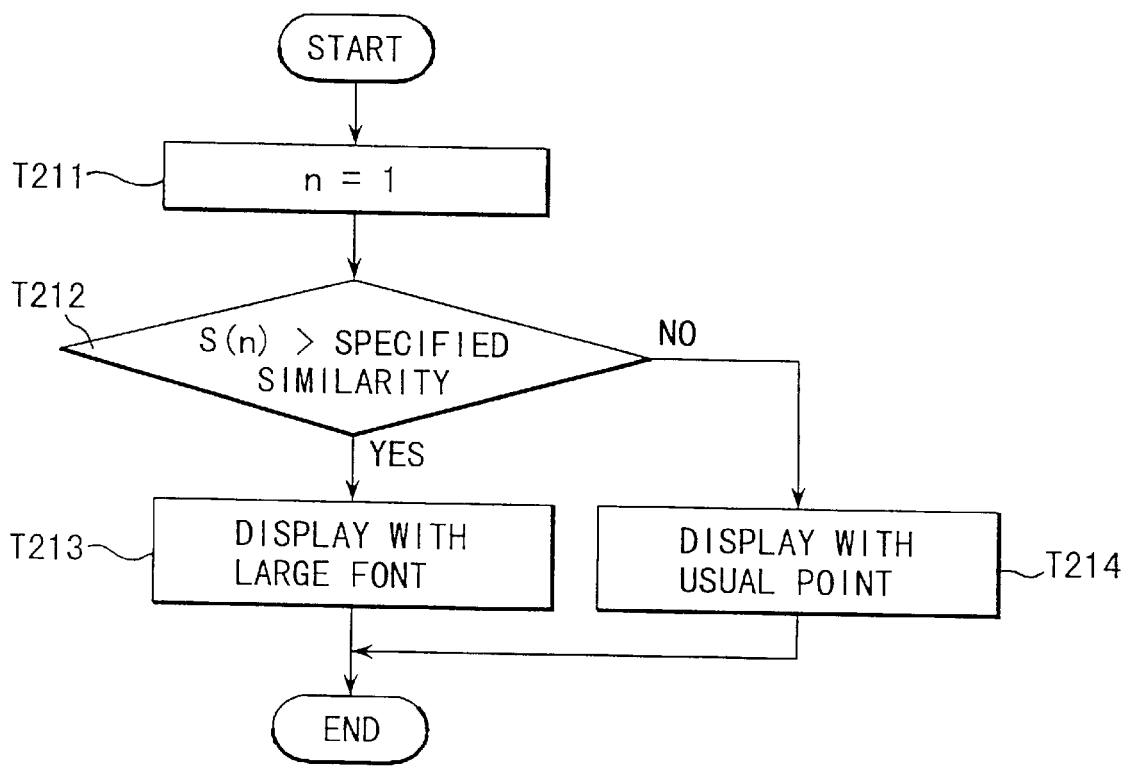
F I G. 1 2 4

```
% LOWER TOPIC OF LIQUOR
SAKE
 ·SHOCHU
 ··MLLET RICE BRANDY
 ··SPIRIT DISTILLED FROM SWEET POTATOES
 ··SOBA SHOCHU
 ··CHIHAI
 ··TOMATO SHOCHU
 ··MUGI SHOCHU
 ·SUPPON-SHU
 ·REFINED SAKE
 ··NAMA-SAKE
 ··GINJYO-SHU
 ··JI-SAKE
 ··JUNMAI-SHU
 ·TAMAGO SAKE
 ·CHINESE SAKE
 ··SAMSHU
 ·FROZEN SAKE
 ·BEER
 ··CANNED BEER
 ··BLACK BEER
 ··BLACK DRAFT BEER
 ··DRY BEER
 ··DRAFT BEER
 ··BLACK DRAFT BEER
 ··DRAUGHT BEER
 ··BOTTLED DRAFT BEER
 ··DRY BEER
 ··BEER COCKTAIL
 ··LIGHT BEER
 ·SAKE ONLY FOR BATH
 ·POWDER SAKE
 ·FOREIGN LIQUORS
 ··WHISKY
 ···WHISKY OF LOCAL BREW
 ···BOURBON
 ··VODKA
 ··COCKTAIL
 ···BEER COCK TAIL
 ···VERMOUTH
 ··FRUIT LIQUOR
 ···UME BRANDY
 ···WINE
 ····CHAMPAGNE
 ··GIN
 ··TEQUILA
 ··BRADY
 ···COGNAC
 ··RUM
 ··LIQUEOR
 ·LIQUEOR FOR COOKING
------------------------------
% UPPER TOPIC
FOOD
BEVERAGE
SAKE
------------------------------
% RELATIVE TOPIC TO SAKE
LIQUOR TAX
```

FIG. 125

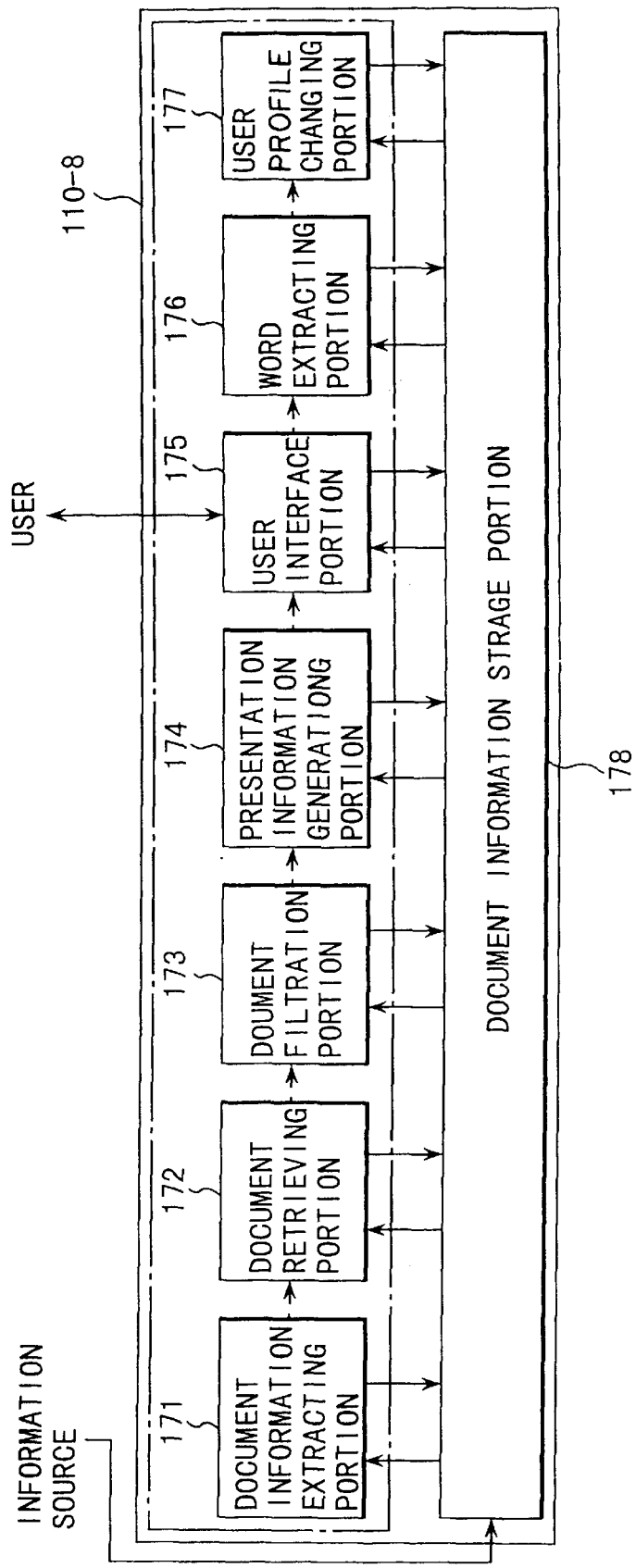
F I G. 126

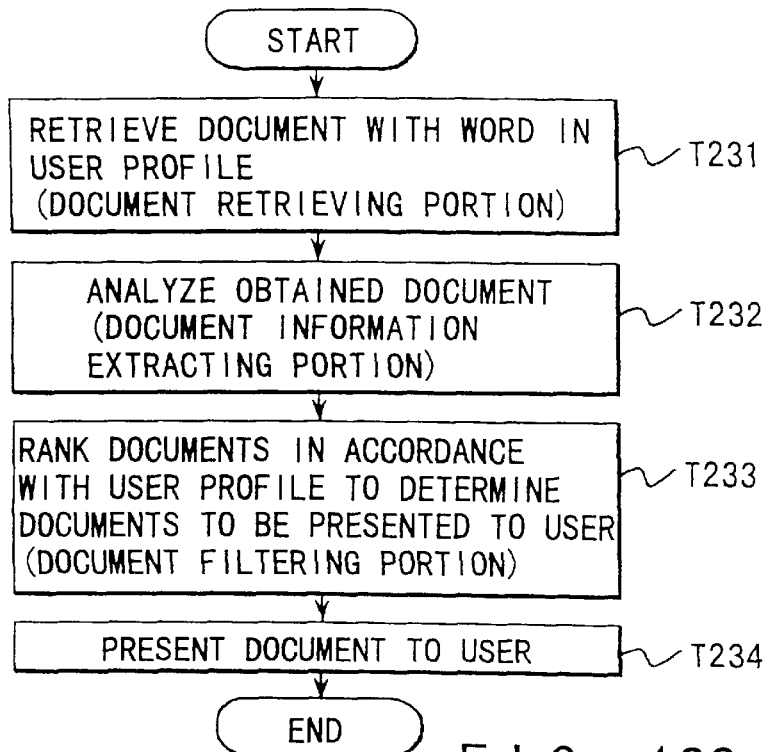
F I G. 128
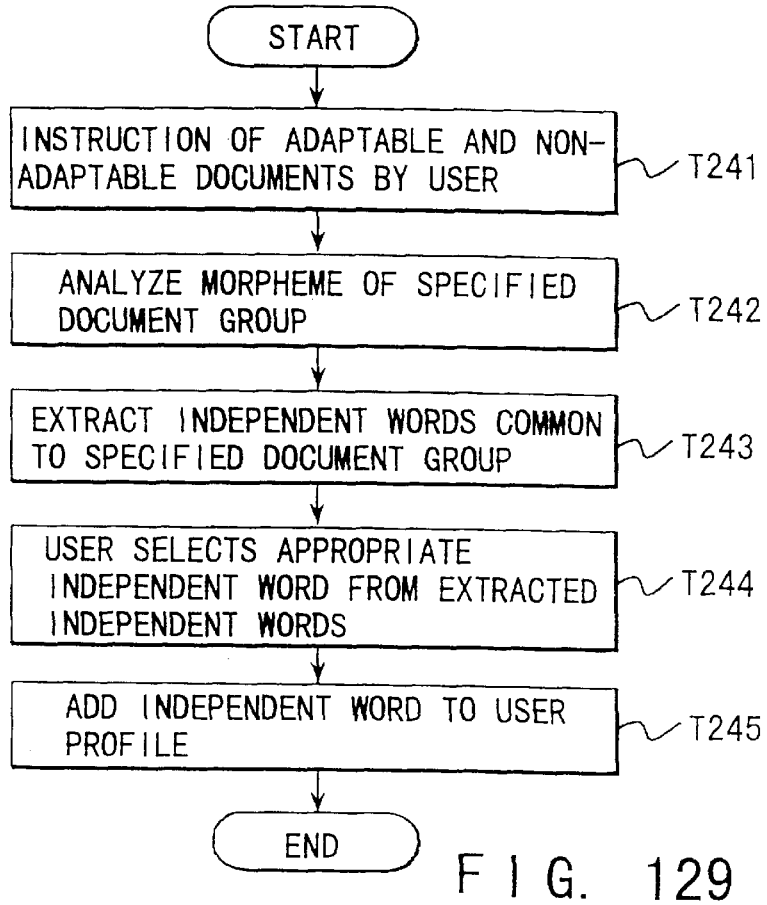
F I G. 129

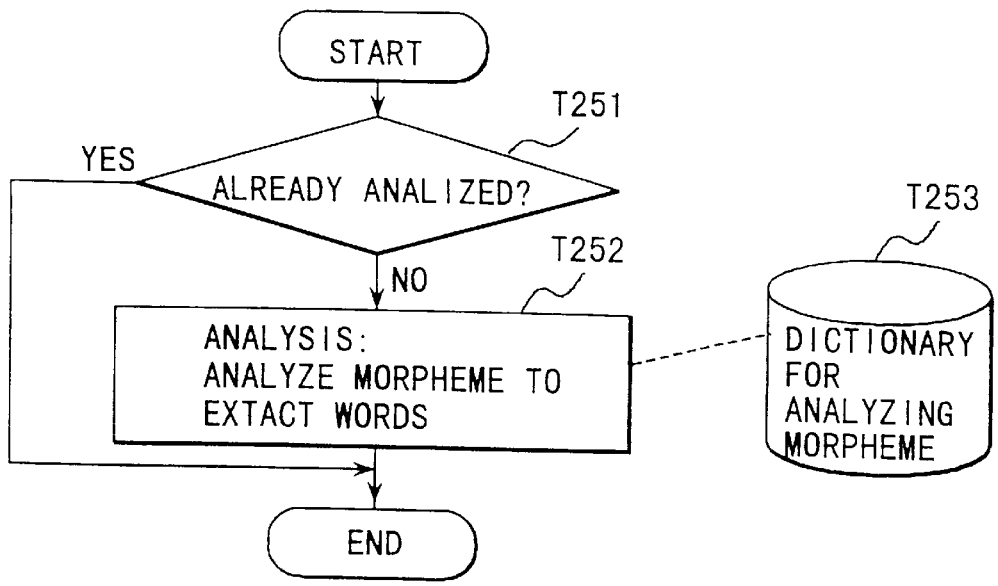
F I G. 130
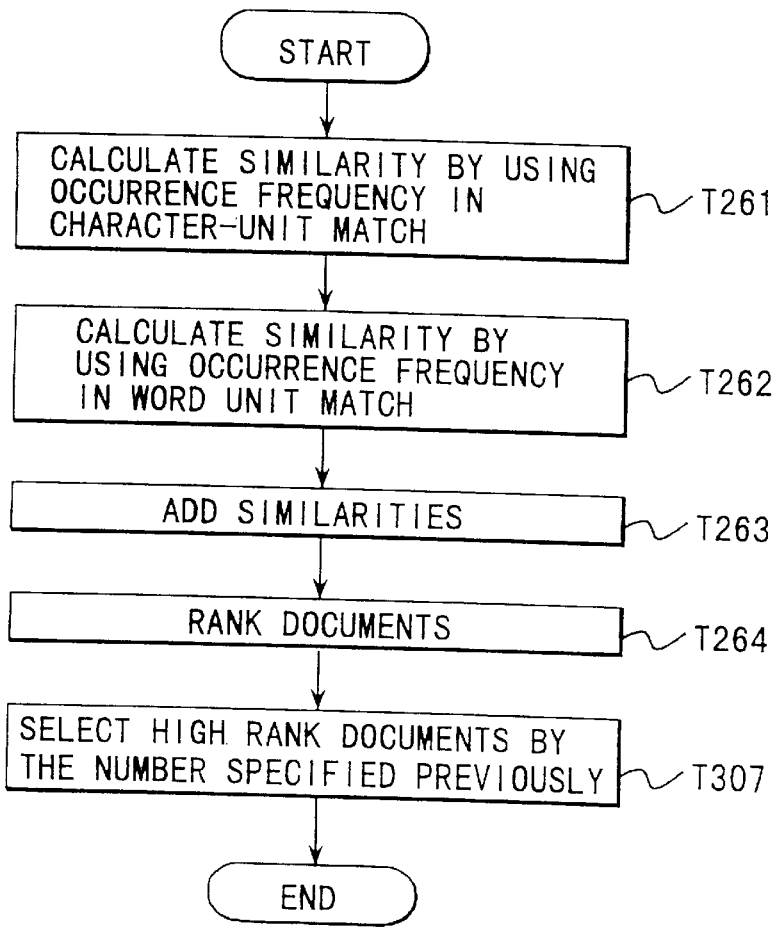
F I G. 131

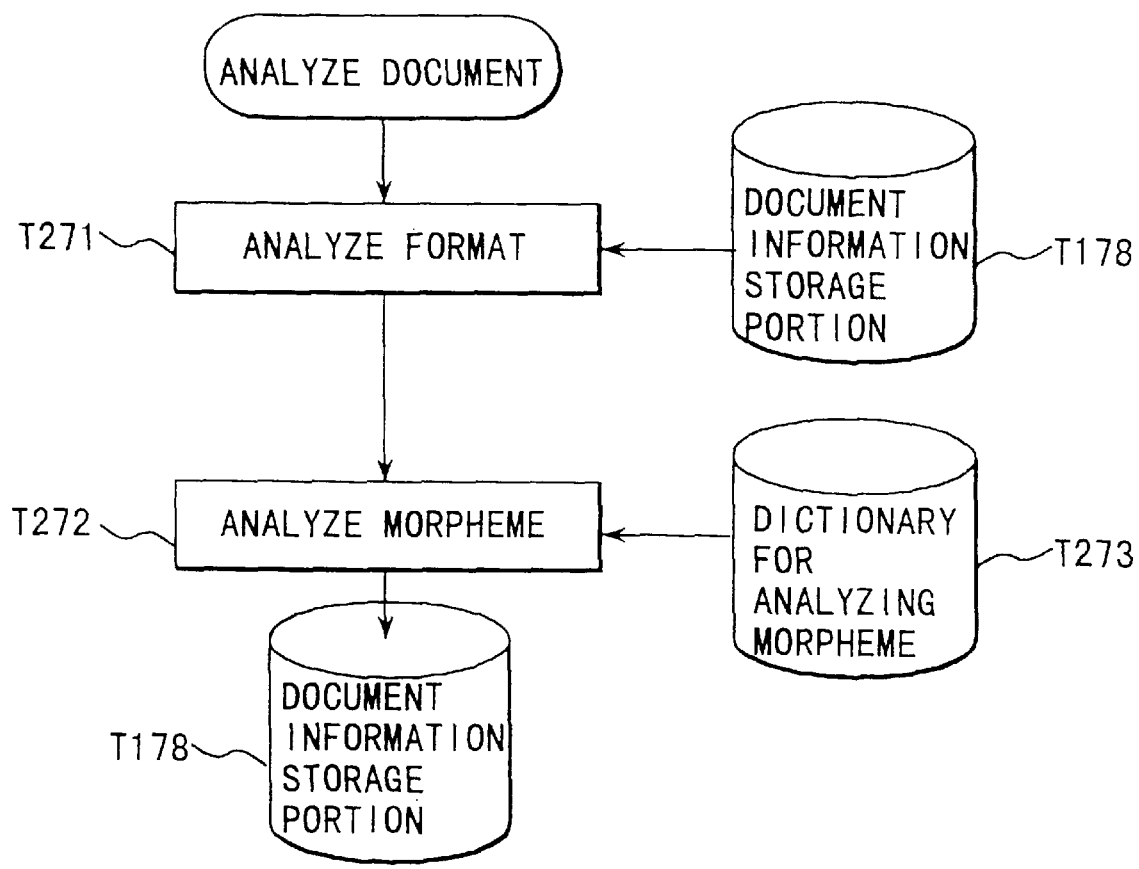
F I G. 132

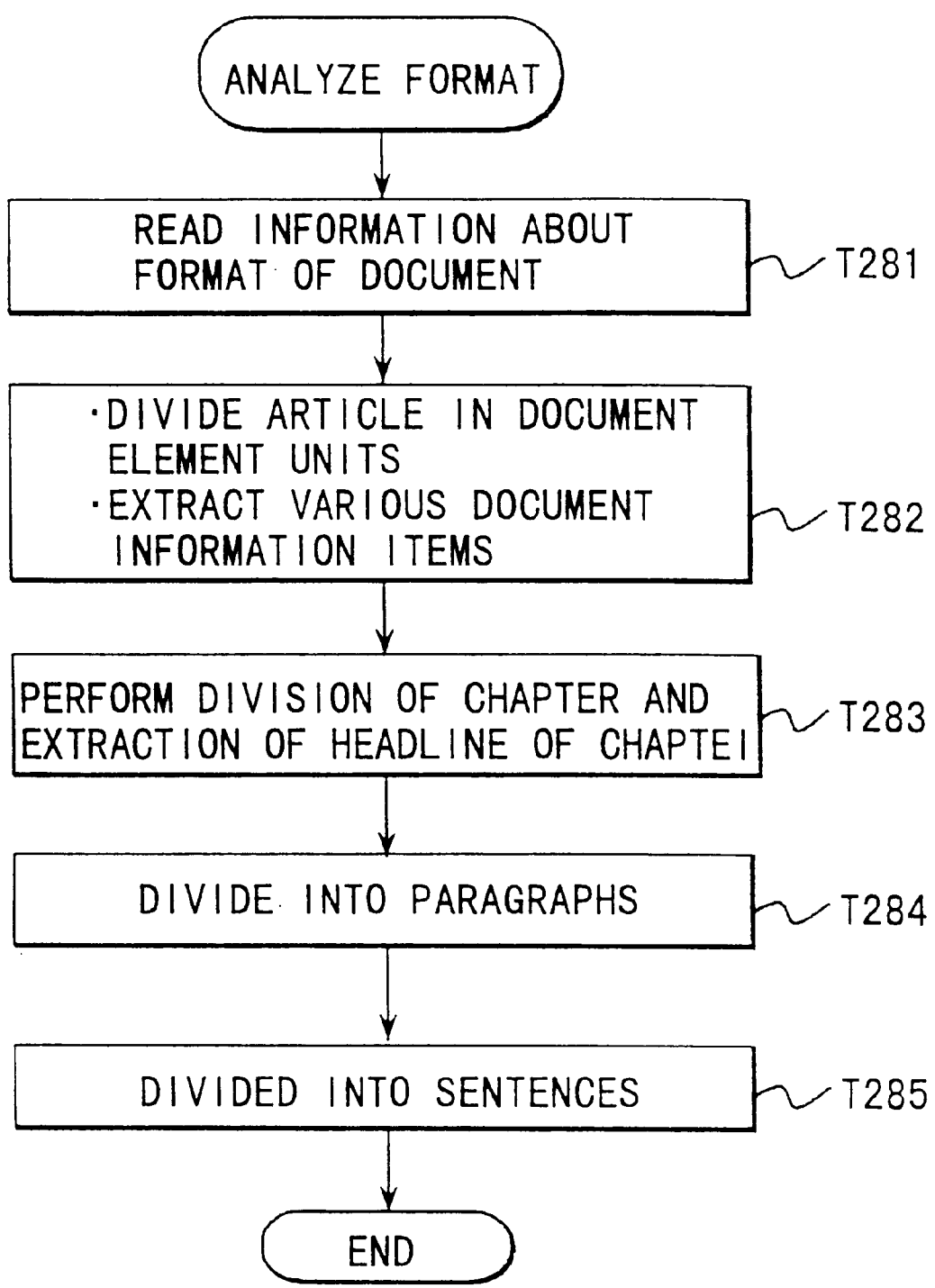
F I G. 133

T1  第2特集
T2  1000万台突破に集じて攻勢に出たA社
T3  落ちる「PC1」の存在感薄
A4  ●A社のPCIの累計出荷台数が1000万台を突破した。
A5  発売以来12年4ヶ月での達成だ。
A6  ●独自路線に対する批判にさされながらもこの3年で500万台以上を出荷、底力を見せつけた。
A7  ●しかも今年前半に出した新製品で「低価格化」「新OS対応」「DOS/V化」という当面の課題への対応もほぼ完了した。
A8  過去の資産を守りながら世界標準に対応するという難題に見事な答を出したのだ。
A9  ●ただ、こうした努力の結果、反面で新規ユーザーが掴めて力に語っていた。
A10 安定的な供給能力以外にA社の特徴がなくなったとの見方もある。
A11 PC1の前にまだ新たな課題が浮上している。
P12 1000万台突破は素直に嬉しい。でも単なる通過点にすぎません。
A13 累計出荷台数100万台を突破したときのPCIたちの中でPC1の出荷台数の伸び率は91年度の29.2%をピークに92年度が22.6%、93年度が20.6%、94年度が16%とすかり下がり続けていた。
14  PCIシリーズの出荷を○○常務は淡々と語った。
15  82年10月の初代モデル発表以来12年4ヶ月かかっての達成だ。
16  B社パソコン出荷台数が500万台強、C社の累計パソコン出荷台数が300万台弱ということを考えれば素直に評価できる実績だ。
P17 とりわけA社が自信をもつのは、94年以降、PC1の低落に歯止めがかかり始めたこと。
18  DOS/Vブームに端を発したPC1たちの中でPC1の出荷台数の伸びは実質的に35%近くの伸び（日本電子工業振興協会）を下回るものの23.3%に回復した。
19  しかし、94年度に関しては「国内のパソコン出荷台数は実質的に35%近くの伸び（日本電子工業振興協会）」（○○○○社販売事業部長）と認める。
20  「色々言われたが結局PC1が衰えていないことを実績で証明した」（○○常務）というわけだ。
21  このまま来年20%超の伸びを維持すれば、3年後には累計2000万台に達するとのOOの発言は荒い。

M22 新機種攻勢で勢いを取り戻す。
P23 A社の回復は今年に入って加速した感がある。
24  '95年第1回半期（95年4月～6月）の出荷台数は57万台と前年同期比38%増を記録した。
25  ライバル・メーカーも「A社は今年（95年4月～6月）になって勢いが戻ってきた」（○○○○社販売事業部）と認める。
P26 今年の勢いを支えるのが相次いで投入した新製品だ。
27  A社が95年度第1回機種17機種1モデル、ソフトウェア759、周辺機器127。
28  パソコン本体17機種1モデル（95年4月～6月）に発表した商品数37だ。
29  A社は新生PCIともいえる新製品を次々と打ち出すことで、昨年まで言われ続けてきた3つの課題「低価格化」「新OS対応」「DOS/V化」を乗り越えつつある。

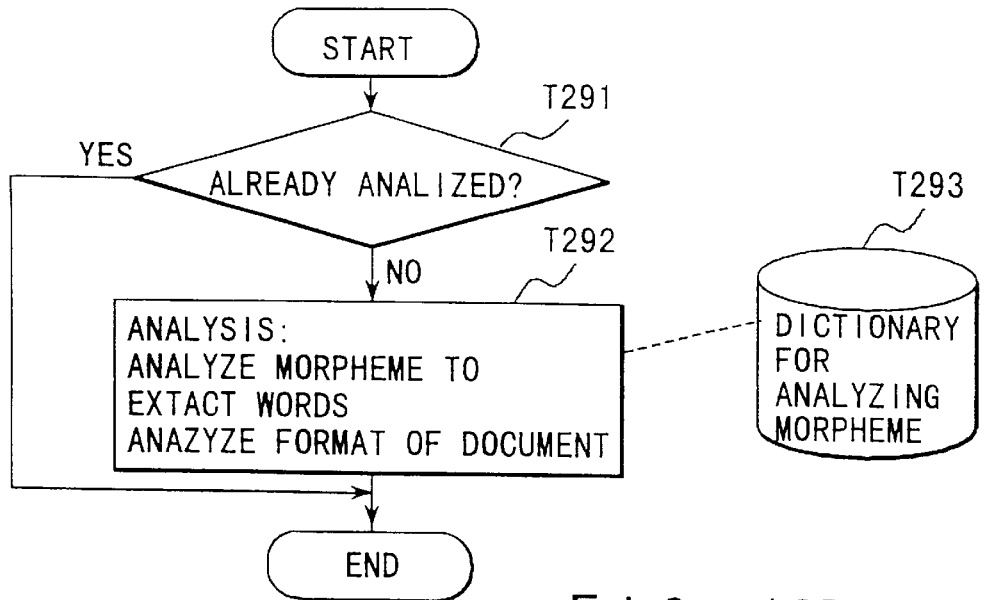
F I G. 137
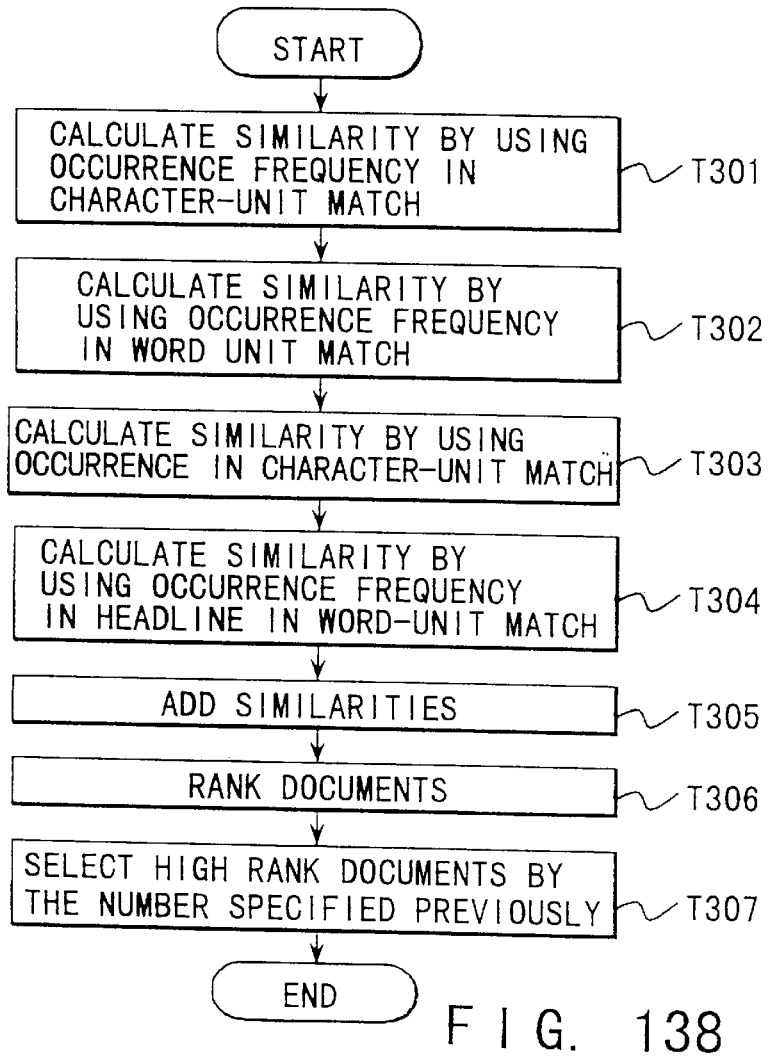
F I G. 138

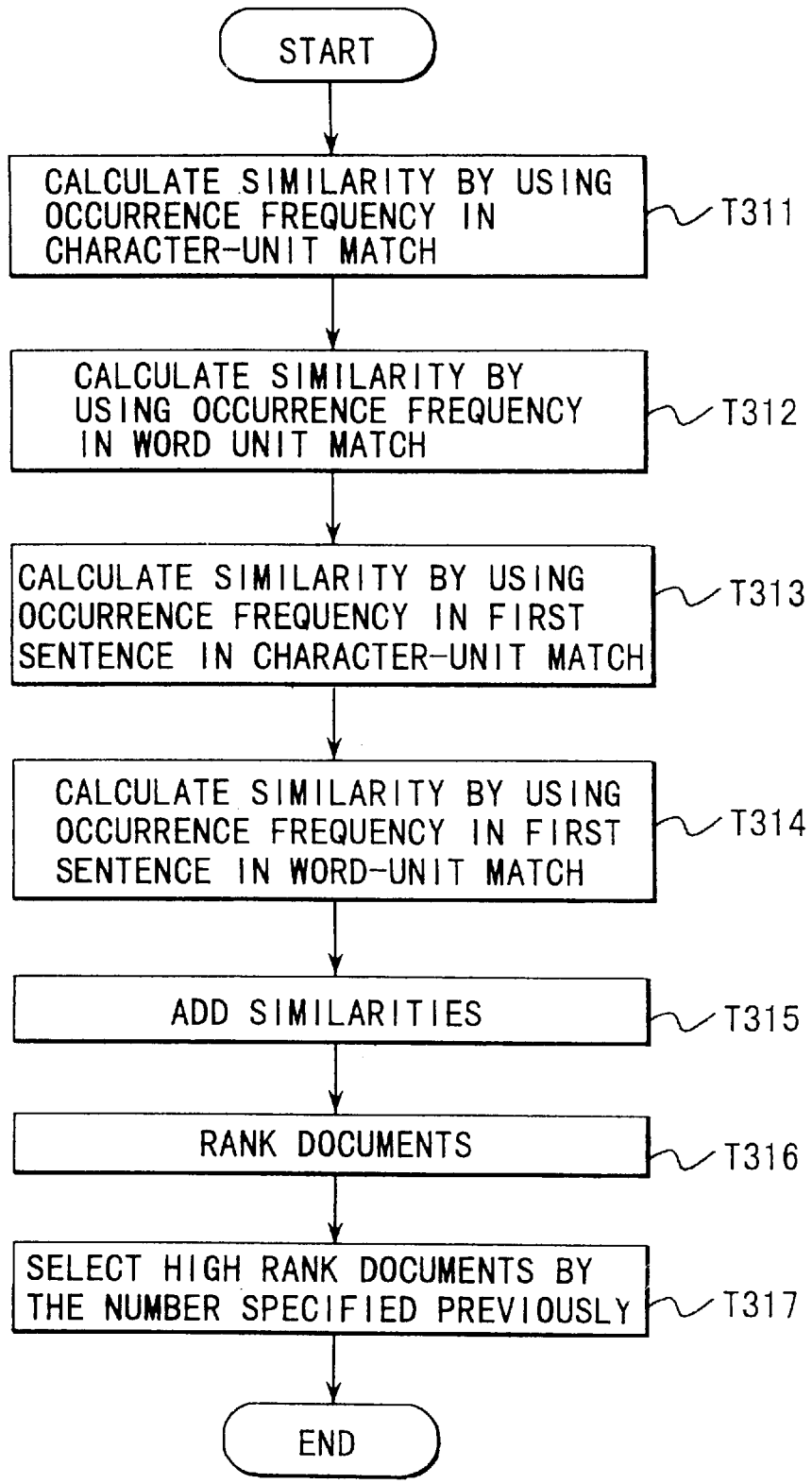
F I G. 139

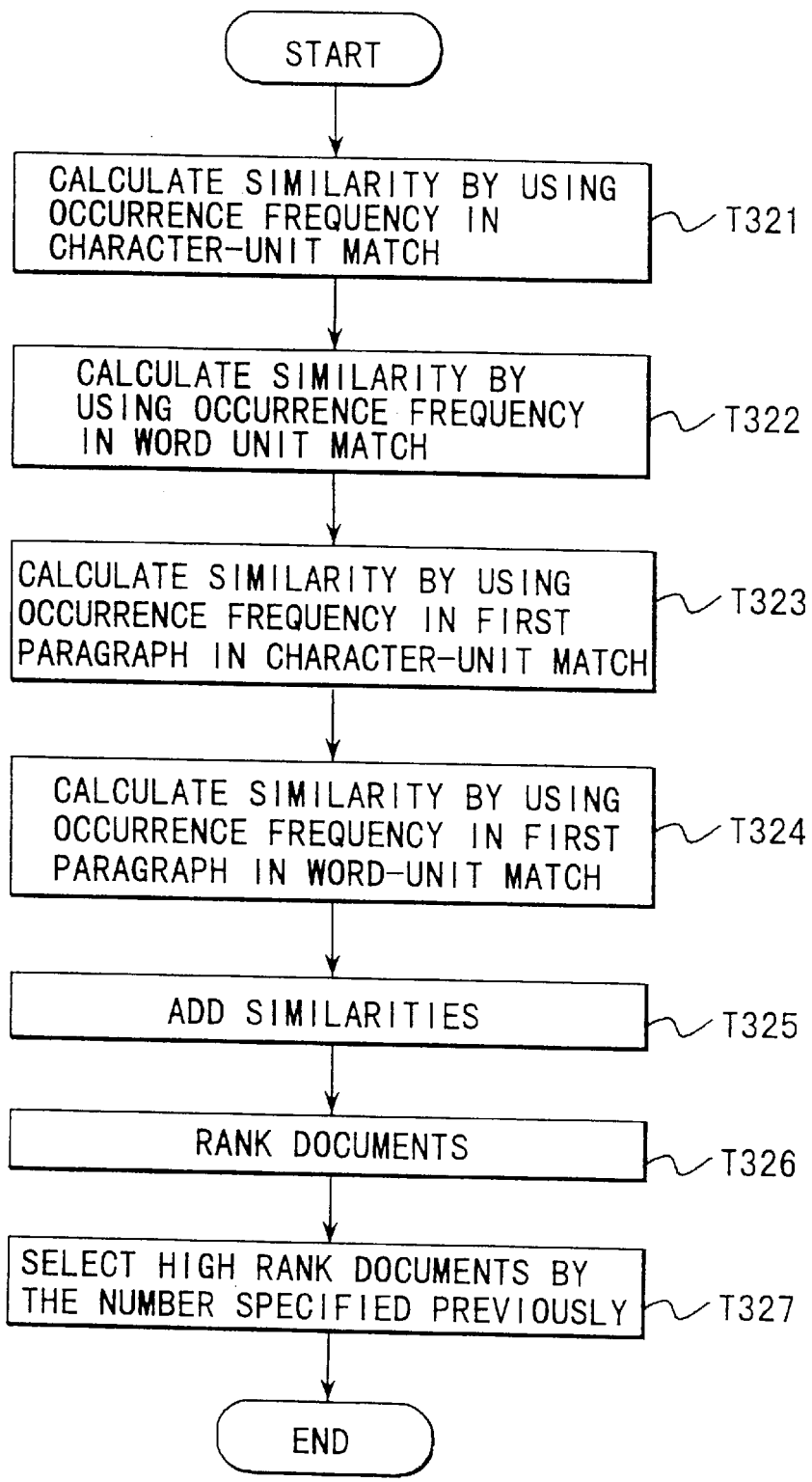
F I G. 140

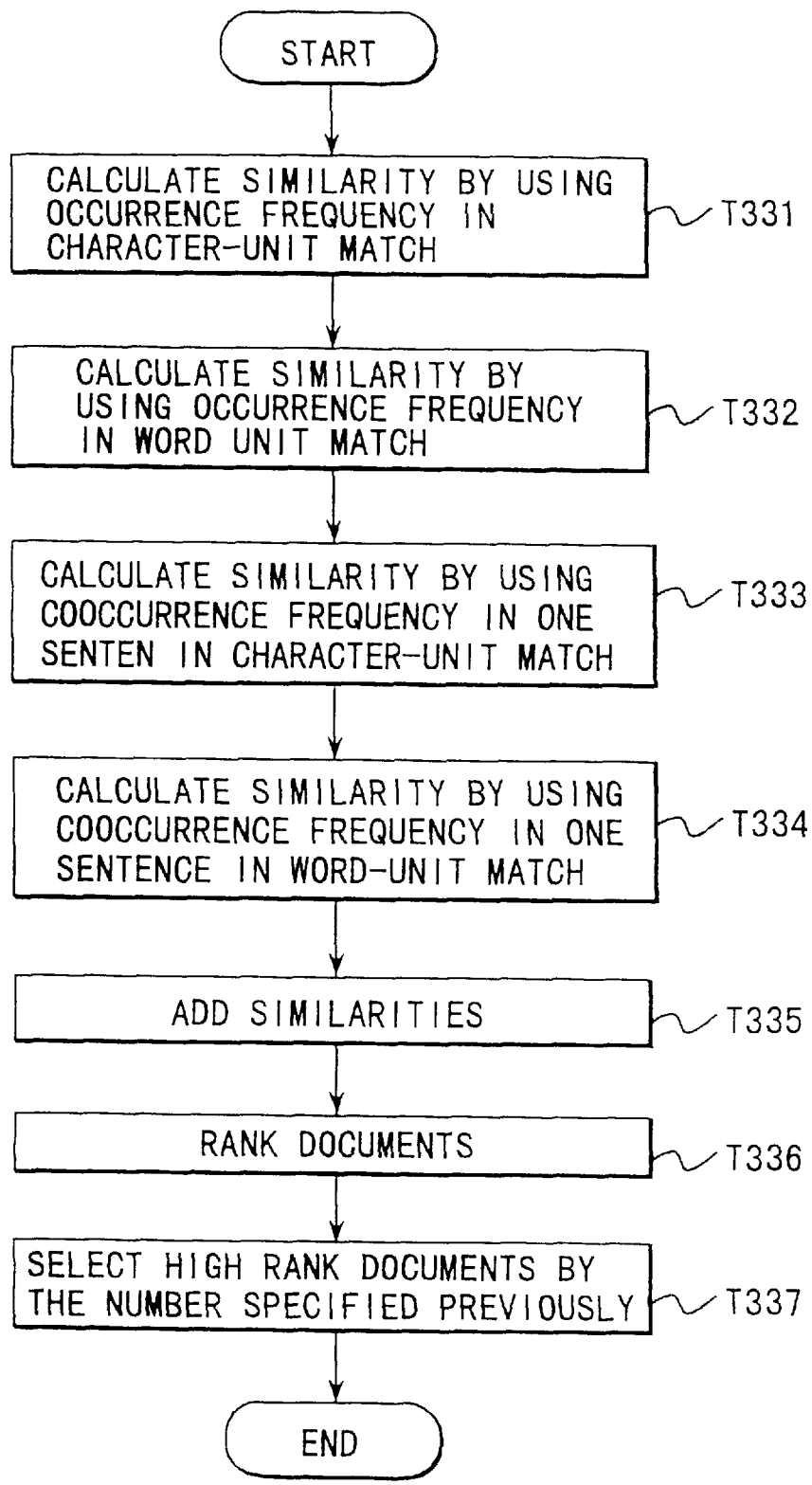
F I G. 141

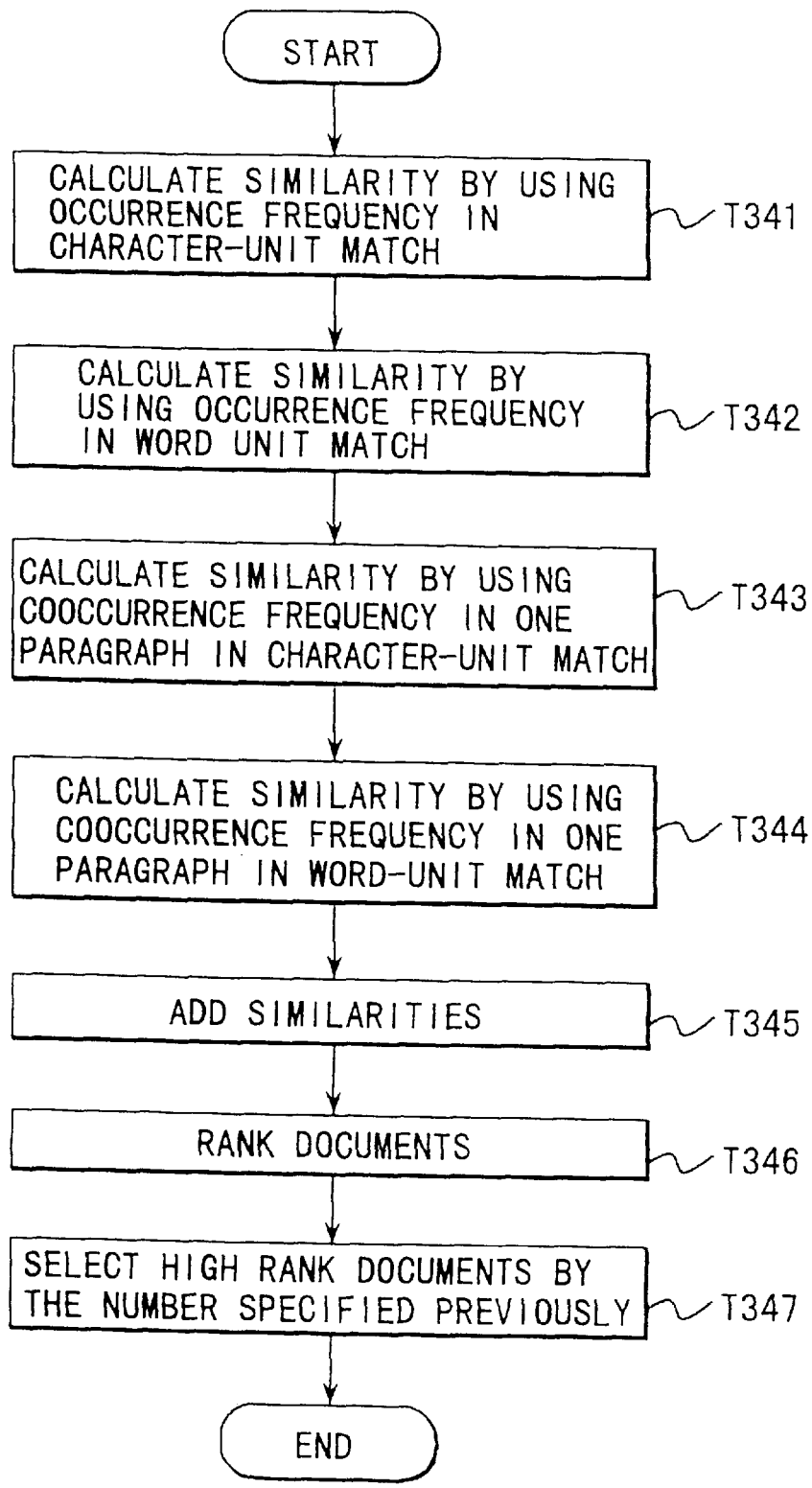
F I G. 142

INFORMATION FILTERING APPARATUS FOR SELECTING PREDETERMINED ARTICLE FROM PLURAL ARTICLES TO PRESENT SELECTED ARTICLE TO USER, AND METHOD THEREFORE

BACKGROUND OF THE INVENTION

1. Field of the Invention

The present invention relates to an information filtering apparatus for selecting articles from a great quantity of text articles that are required by a user or that meet requirements and interests of the user so as to periodically present the selected articles to the user, and a method therefor.

2. Description of the Related Art

In recent years, wide use of word processors and computers and that of electronic mail and electronic news through computer networks has resulted in electronic documents being spread rapidly.

As can be understood from the term "electronic publication", it can be considered that presentation of information of the contents of newspapers, magazines and books will be given generally. As a result, an expectation can be performed that the quantity of text information that is available in real time for persons is enlarged.

Therefore, there has arisen a requirement for an information filtering system or an information filtering service for selecting a text article from a great quantity of text articles of newspaper and magazines that meets requirements and interests of a user to periodically present the selected article to the user.

Conventional information filtering systems have been arranged to retrieve articles that meet a user profile expressing requirements and interests of a user and to give a presentation of the overall body of the articles while lining up the articles.

Generally, the user profile contained a plurality of topics in which a user is interested in.

Moreover, a function called "Relevance Feedback" has been realized with which the availability of the presented article is determined by a user and information about the determination is reflected onto the user profile to improve the adaptability in the ensuing information filtering operations.

However, the conventional systems, having the simple structure such that the selected articles are enumerated so as to be presented to the user, has a problem in that the user cannot easily recognize the relationship between the articles presented this time and those which have previously been presented.

Moreover, the simple presentation of articles performed by the conventional systems lacks information about the topic and the retrieval conditions of the topic with which matching has been made and which has thus caused the article to be presented to the user and information about the method of other users to read the presented article. Therefore, a great labor has been required to determine the availability of the article and consistency cannot easily be maintained.

It is effective for the information filtering system to perform double filtering such that an important article is selected and then an important text in the article is partially selected in view of effectively collecting information from a long article. However, since the conventional system has the structure such that a text having an appropriate length has been mechanically extracted, there arises a problem in that unnecessary information is sometimes included or required information is lacking.

Since the conventional system has the simple structure such that a text to be presented to the user is selected in accordance with similarity of the text supplied from a news source and the retrieval condition, texts even having the same contents are supplied in a disordered manner.

The information filtering system of the foregoing type has been structured under condition that all articles to be supplied from a news source are written in a single language (for example, English) and the system has been designed to be used in only the subject language zone. Therefore, articles obtained from a news source in another language zone cannot be mixed and supplied to the user.

To provide a news source having articles supplied in a certain language zone and a news source having articles in another language zone are mixed and supplied to a user, a system having a structure such that information filtering apparatuses respectively realized in the subject languages are provided individually are insufficient. If the information filtering apparatuses are provided individually, the user is required to set retrieval conditions for each information filtering apparatus. Moreover, articles written in different languages but having the same contents sometimes coexist. Therefore, the system simply having individual information filtering apparatuses encounters a problem in that duplicate articles are supplied to a user.

An object of the present invention is to provide an information filtering apparatus capable of giving a presentation of the relevance of articles to be supplied to a user by information filtering and enabling the user to recognize the relevance of the articles, and to a method therefor.

SUMMARY OF THE INVENTION

An information filtering apparatus and a method therefor according to the present invention are able to present the relativity among articles to present the articles to a user so to enable the user to easily recognize the relativity among the articles.

The information filtering apparatus and the method therefor according to the present invention enable the user to detect the retrieving conditions satisfied by the presented articles so that the user understands and reliably uses the information filtering system.

The information filtering apparatus and the method therefor according to the present invention enable the length of a summary or an abstract to be presented to a user in accordance with the type of the article so that double filtering is performed efficiently.

The information filtering apparatus and the method therefor according to the present invention enable articles having similar contents to be formed into groups or made to be related to one anther before the articles are presented to a user. Thus, the labor required for the user to read the text articles can be reduced considerably.

The information filtering apparatus and the method therefor according to the present invention enable articles supplied from news sources in a plurality of language zones to be mixedly supplied to a user. Thus, a satisfactory retrieving process can be realized to process a variety of articles written in different languages.

The information filtering apparatus and the method therefor according to the present invention permit the retrieving conditions and the threshold of similarities to be dynamically changed so as to always present appropriate articles to a user.

The information filtering apparatus and the method therefor according to the present invention have an improved retrieving process to improve the filtering accuracy and filtering speed.

According to the present invention, there is provided an information filtering apparatus for receiving articles, such as texts and images, from a plurality of information sources to select predetermined articles from the supplied articles to present the selected articles to a user, comprising means for storing retrieving conditions previously specified for each user; article retrieving means for retrieving supplied articles to select articles which meet retrieving conditions for each user; determining means for calculating similarities among articles selected by the article retrieving means or calculating similarities among selected articles and other articles to determine relevant articles for each article; and presentation means for adding information of the determined relevant articles to the selected articles to present information and the articles to the user.

With the information filtering apparatus, the expressions of articles are compared among the articles to calculate the similarities among articles. In accordance with the similarities, the articles to be presented to the user and their relevant articles are determined. Information about the relevant articles is added to information of the body of each article to be presented to the user and supplied to the user. It is preferable that the similarities are calculated among articles supplied this time or among the articles supplied this time and previous articles. As a result, the relationship among the articles selected by the article retrieving means and the relationship among the articles selected this time and articles selected due to the previous filtering operation can be made to be clear. Thus, the relativity among the articles can be notified to the user.

By calculating the similarities among the articles selected by the article retrieving means, existence of duplicated articles is examined. Thus, information of the body of the article retrieving means is not presented to the user and information of only the captions of the duplicated articles is added as information of a relevant article so as to be presented to the user. As a result, presentation of articles supplied from, for example, different information sources and having the same contents to the user can automatically be prevented.

According to the present invention, there is provided an information filtering apparatus for receiving articles, such as texts and images, from a plurality of information sources to select predetermined articles from the supplied articles to present the selected articles to a user, comprising means for storing retrieving conditions previously specified for each user; article retrieving means for retrieving supplied articles to select articles which meet retrieving conditions for each user so as to present the articles to the user; and means for adding information of retrieving conditions satisfied by the articles selected by the article retrieving means to each article to present the articles and information to the user. Thus, the ground with which the articles have been selected can be notified to the user.

As a result, the retrieving condition satisfied by the articles, which are being presented, such as the topic selected by the user and satisfied by the article which is being presented, can be notified to the user. Therefore, the ground of the presentation of the article can easily be understand by the user. Therefore, the user is able to easily determine the usefulness of the article.

Therefore, a relevance feedback function is further provided in which information whether the articles supplied to the user have been useful for the user is fed back from the user to modify the retrieving conditions while reflecting the information item. Thus, the ground of the selection of the article can effectively be used in the relevance feedback function.

The method with which the articles which are being presented are read by other users is presented to the user in place of presenting the ground of the selection of the article enables the relevance feedback to be performed while making a reference to the determinations of other users. Thus, the relevance feedback can effectively be used.

According to the present invention, there is provided an information filtering apparatus for receiving articles, such as texts and images, from a plurality of information sources to select predetermined articles from the supplied articles to present the selected articles to a user, comprising: means for storing retrieving conditions previously specified for each user; article retrieving means for retrieving supplied articles to select articles which meet retrieving conditions for each user so as to present the articles to the user; and means for generating a summary or an abstract having a length corresponding to the type of the article selected by the article retrieving means to present the summary or the abstract to the user.

As a result of the foregoing structure, the summary or the abstract having the length corresponding to the type of the article is generated and present to the user. Therefore, a ratio of text information which is useful for the user is raised among the text to be presented to the user. As a result, effective information collection can be performed.

It is preferable that the classification of the types of the articles be the difference in the retrieving conditions of the topic satisfied by the article or the difference in the attribute of the article, such as the date of publication. In a case where the user has specified a plurality of topics as the retrieving conditions and priority order is given to the topics, the length of the summary or the abstract can be elongated when the article satisfying the topic having high priority is retrieved. Thus, the ratio of text information useful for the user can be raised.

According to the present invention, there is provided an information filtering apparatus having means for receiving articles from one or more information source; means for calculating similarities among retrieving conditions previously specified by a user and the supplied articles; output means for sorting articles in a descending order of the calculated similarities to output articles by a predetermined number or only articles having similarities greater than a predetermined threshold in the descending order in terms of the similarity, comprising means for calculating the similarities among articles output from the output means; and means for forming the articles into groups, making the articles to be related to one another or controlling selection of articles to be output in accordance with the similarities among articles calculated by the means.

According to the present invention, relative articles can be formed into groups or made to be related to one another before the articles are presented to the user. In a case where relative texts are output in a disorder state as has been experienced with the conventional structure, the user is required to change the way of thinking. Thus, a labor is required to understand the result of the filtering operation. However, the information filtering apparatus according to the present invention enables the relative articles to be formed into groups or made to be related to one another when presented to the user. Therefore, the labor required for the user can significantly be reduced.

It is preferable that the similarities with previous articles be obtained as well as the similarities among articles supplied this day to add information indicating whether the article is included in a group consisting of only the articles supplied this day or in a group including previous articles to the article to be output. As a result, the user is able to arrange the relevant articles more efficiently when the user reads the article.

According to the present invention, there is provided an information filtering apparatus comprising: means for receiving articles, such as texts and images, from a plurality of information source; means for calculating similarities among retrieving conditions previously specified by a user and the supplied articles to retrieve articles by a specified number or articles having similarity greater than a predetermined threshold in accordance with the calculated similarity; and means for presenting the retrieved documents to the user, wherein articles written in a different language are supplied to replace retrieving conditions specified in a single language by another language to calculate similarities with the articles to present the article written in the different language to the user while being mixed with the documents to be presented by the means.

In the case where the similarities among the articles and the retrieving conditions are calculated, the retrieving conditions specified in a certain language are directly used and the retrieving conditions are replaced into another language so that similarities among the changed retrieving conditions and the articles are calculated. Therefore, the user is able to simultaneously receive news or the like from a plurality of language zones with specified retrieving conditions written in one language. Thus, a satisfactory retrieving function can be realized with respect to various articles written in different languages.

It is preferable that the apparatus capable of mixedly presenting articles written in different languages to the user has means for calculating the similarities among articles written in different languages to determine articles of a type have similarity greater than a predetermined threshold to be duplicated articles so as to supply either of the articles to the user. As a result, either of the articles written in different languages and having the same contents is not supplied to the user. Thus, waste to read the same articles can be eliminated. In the foregoing case, it is preferable that a language for the user is previously stored to determine the article among the duplicated articles to be supplied or the overall body or a portion of the article written in a language different from the language of the user is translated into the language of the user before the article is supplied to the user.

According to the present invention, there is provided an information filtering apparatus having: means for receiving articles, such as texts and images, from a plurality of information sources; means for calculating similarities among retrieving conditions previously specified by a user and the supplied articles to retrieve articles by a specified number or articles having similarity greater than a predetermined threshold in accordance with the calculated similarity; and means for presenting the retrieved documents to the user, comprising means for changing the threshold of the similarity or the retrieving conditions in accordance with results of retrieval performed by the retrieving means.

According to the present invention, various retrieving conditions or the threshold of the similarities are dynamically changed whenever the retrieval is performed or in accordance with results of plural and successive retrievals. Thus, the retrieving conditions or the threshold of the similarities can be allowed to automatically follow the change in the contents of the article which is being supplied. As a result, an appropriate article can always be presented to the user without a necessity for the user to change the specification of the retrieving conditions.

As the retrieving conditions which are dynamically changed in accordance with the results of retrievals, topics specified by the user or text data bases in which articles to be retrieved are recorded may be employed. It is preferable that the threshold of the similarities be changed in accordance with distribution of the similarities examined over a plurality of articles. As a result, a problem in that retrieval of document which is not considerably appropriate is performed can be prevented. It is effective to change the retrieving conditions in accordance with the balance of the contraction with the user or change the method of displaying the article in accordance with the similarity.

According to the present invention, there is provided an information filtering apparatus for receiving articles, such as texts and images, from a plurality of information sources to be presented to a user, comprising means for storing retrieving conditions previously specified for each user; and filtering means for calculating the similarities among the retrieving conditions for each user and the articles by a method formed by combing a plurality of methods of calculating similarities with one another and selecting articles which satisfy the retrieving conditions for each user in accordance with results of the calculations.

According to the present invention, a plurality of methods of calculating similarities are combined with each other to prevent deterioration in the filtering accuracy which has not been prevented by the single method of calculating the similarities. Thus, the filtering accuracy can be improved. It is preferable that the method of calculating the similarities be formed by combing calculations for obtaining similarities by using the occurrence frequency in a character unit match and calculations for obtaining similarities by using the occurrence frequency in a word unit match. The calculations for obtaining similarities by using the occurrence frequency in the character unit match have a possibility that the similarity is calculated including words having completely different meanings. On the other hand, the calculations for obtaining similarities by using the occurrence frequency in the word unit match is free from the foregoing problem. On the contrary, the calculations for obtaining similarities by using the occurrence frequency in the word unit match has a possibility that a word which is not contained in the dictionary for analyzing the morpheme cannot correctly be analyzed and, thus, it is not included in the calculations for obtaining similarities. However, the calculations for obtaining similarities by using the occurrence frequency in the character unit match is free from the foregoing problem. Therefore, by combining the two calculation methods for obtaining similarities, the mutual disadvantages can be compensated and, therefore, the similarity can be calculated more accurately.

To previously process only articles required for performing the filtering process simultaneously with the filtering process, it is preferable that a primary retrieval is simply performed such that articles including words specified with the retrieving conditions are initially selected. Then, a previous process is performed such that the morpheme and the format of the articles selected due to the primary retrieval are analyzed. As a result, the time required to complete the filtering process can be shortened and the required storage region can be reduced. Moreover, a mechanism is provided with which words for changing the user profile are extracted from the adaptable documents or non-adaptable documents specified by the user to change the user profile with the extracted words to make the user profile to be adaptable to the requirements and the interests of the user. Thus, the filtering performance can be improved further satisfactorily.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 7 is a diagram showing another example of expressions of articles employed in the system according to the first embodiment;

FIG. 8 is a flow chart showing a flow of an article retrieving process to be performed in the system according to the first embodiment;

FIG. 9 is a diagram showing a state of supplied articles ranked by the selection process in the system according to the first embodiment;

FIG. 10 is a flow chart showing a flow of an article selection process in the system according to the first embodiment;

FIG. 11 is a diagram showing an example in which top ten articles have been selected in a case where a result of ranking as shown in FIG. 9 has been obtained in the system according to the first embodiment;

FIG. 12 is a diagram showing an example in which articles having similarities greater than 0.86 with the user profile have been selected in the case where a result of ranking as shown in FIG. 8 has been obtained in the system according to the first embodiment;

FIG. 16 is a flow chart showing a flow of a presentation information generating process in the system according to the first embodiment;

FIGS. 19A and 19B are diagrams showing examples of sets of duplicated articles obtained due to calculations for obtaining similarities among articles performed with respect to four articles shown in FIG. 15 in the system according to the first embodiment;

FIG. 20 is a diagram showing an example in which information about omitted duplicated articles is added to information of the body of the article to be presented in the system according to the first embodiment;

FIG. 22 is a diagram showing another display state of information of relevant articles in the system according to the first embodiment;

FIG. 26 is a diagram showing an example in which a list of articles to be presented to a user is displayed together with information of duplicated articles in the case where duplication of articles takes place as shown in FIG. 20 in the system according to the first embodiment;

FIG. 30 is a diagram showing an example in which information of previous relevant articles is added to information of the article supplied this time in the system according to the first embodiment;

FIG. 32 is a diagram showing an example in which information of previous relevant articles is included in information of the body of the article supplied this time in the system according to the first embodiment;

FIG. 33 is a diagram showing a state where a list of previous articles related to the first sentence shown in FIG. 32 is displayed when the first sentence has been selected in the system according to the first embodiment;

FIG. 34 is a diagram showing an example of display of the body of a relevant article "earthquake off ○○, magnitude 4" shown in FIG. 33 when the relevant articles have been selected in the system according to the first embodiment;

FIG. 37 is a diagram showing another example in which information of the body of an article supplied this time is presented together with information of other relevant articles in the system according to the first embodiment;

FIG. 38 is a diagram showing another example in which information of the body of an article supplied this time is presented together with information of other relevant articles in the system according to the first embodiment;

FIG. 40 is a schematic view showing a user profile for use in an information filtering system according to a second embodiment of the present invention;

FIG. 42 is a flow chart showing a flow of an article retrieving process in the system according to the second embodiment;

FIG. 43 is a schematic view showing supplied articles which have been ranked in the system according to the second embodiment;

FIG. 45 is a diagram showing topics and results of retrieving the topics in the system according to the second embodiment;

FIG. 47 is a diagram showing a state in which information of topics satisfied by each article is added to a list of captions of articles selected for a user in the system according to the second embodiment;

FIGS. 48A and 48B are diagrams showing a state where information of the number of articles satisfying each topic is presented to the user in the system according to the second embodiment;

FIG. 49 is a diagram showing a state where summaries or abstracts or the bodies of articles selected for the user are collected for each topic to be presented to the user in the system according to the second embodiment;

FIG. 50 is a diagram showing a state where information about retrieving conditions satisfied by the article is added as header information to be presented to the user in the system according to the second embodiment;

FIGS. 51A and 51B show an example in which the retrieving conditions satisfied in the system according to the second embodiment are stressed and displayed in the article;

FIGS. 52A and 52B show another example in which the retrieving conditions satisfied in the system according to the second embodiment are stressed and displayed in the article;

FIG. 54 is a diagram showing a specific example of the retrieving conditions for retrieving documents satisfying a certain topic in the system according to the second embodiment;

FIG. 55 is a diagram showing an example of display of the retrieving conditions to be added to an article retrieved under the retrieving conditions shown in FIG. 54 and presented to the user in the system according to the second embodiment;

FIG. 56 is a diagram showing another example of display of the retrieving conditions to be added to an article retrieved under the retrieving conditions shown in FIG. 54 and presented to the user in the system according to the second embodiment;

FIG. 57 is a flow chart showing another example of the article retrieving process in the system according to the second embodiment;

FIG. 58 is a flow chart showing another example of an added information generating process in the system according to the second embodiment;

FIG. 59 is a table showing the relationship among a plurality of users and articles to be transmitted to the users in the system according to the second embodiment;

FIG. 60 is a diagram showing a state where information about other users who have received the article is added to a list of captions of articles selected for a certain user in the system according to the second embodiment;

FIG. 61 is a diagram showing a state where information about other users who have received the article is added to a list of captions of articles selected for a certain user in the system according to the second embodiment;

FIG. 62 is a diagram showing a state where information about other users who have received the article is, as header information, added to the body of the article to be presented to the user in the system according to the second embodiment;

FIG. 63 is a diagram showing another example of the state where information about other users who have received the article is, as header information, added to the body of the article to be presented to the user in the system according to the second embodiment;

FIG. 64 is a diagram showing an example of display in which relevance feedback information previously performed by a certain user or other users is added to information of the article to be presented this time so as to be presented in the system according to the second embodiment;

FIG. 65 is a diagram showing another example of display in which relevance feedback information previously performed by a certain user or other users is added to information of the article to be presented this time so as to be presented in the system according to the second embodiment;

FIG. 67 is a diagram showing examples of keywords and user profiles expressed with the weights of the keyword in the system according to the third embodiment;

FIG. 69 is a diagram showing an example of topics selected by the user and their priorities in the system according to the third embodiment;

FIG. 70 is a diagram showing a list of articles to be presented to a user who has selected the topics shown in FIG. 69 and topics satisfying the articles in the system according to the third embodiment;

FIG. 72 is a diagram showing topics selected by the user and their priorities in the system according to the third embodiment;

FIG. 73 is a diagram showing an example of information of articles to be presented to the user at a next filtering process in a case where feedback has been performed in the system according to the third embodiment;

FIG. 74 is a flow chart of a summary or abstract generating process in the system according to the third embodiment;

FIG. 75 is a diagram showing examples of articles selected by the article selection portion in the system according to the third embodiment;

FIG. 76 is a diagram schematically showing another example of information of articles to be presented to the user in the system according to the third embodiment;

FIG. 79 is a diagram showing another example of information of articles to be presented to the user at a next filtering process in a case where feedback has been performed in the system according to the third embodiment;

FIG. 82 is a flow chart showing a flow of a presentation information generating process in the system according to the fifth embodiment;

FIG. 83 is a flow chart showing a flow of an output process of a duplicated article set in the system according to the fifth embodiment;

FIG. 84 is a diagram showing an example of presentation of articles to the user in the system according to the fifth embodiment;

FIG. 85 is a diagram showing an example of presentation of articles to the user in the form of a hyper text in the system according to the fifth embodiment;

FIG. 86 is a diagram showing an example of presentation of articles to the user in the form of a hyper text in the system according to the fifth embodiment;

FIG. 87 is a diagram showing an example of presentation of articles to the user in the form of a hyper text in the system according to the fifth embodiment;

FIGS. 91A and 91B are diagrams showing a data format of the retrieving conditions and an example of actual data in the apparatus according to the sixth embodiment;

FIG. 96 is a flow chart showing a flow of an article similarity calculating process in the apparatus according to the seventh embodiment;

FIG. 97 is a block diagram showing the function and structure of an apparatus according to an eighth embodiment of the present invention;

FIG. 99 is a block diagram showing the function and structure of an apparatus according to a tenth embodiment of the present invention;

FIGS. 100A and 100B are diagrams showing examples of data format of an article to be transmitted in the apparatus according to an eleventh embodiment of the present invention;

FIG. 110 is a flow chart showing a process for decreasing the specified number of documents to be output in the apparatus according to the thirteenth embodiment;

FIG. 111 is a flow chart showing a process for increasing the specified number of documents to be output in the apparatus according to the thirteenth embodiment;

FIG. 112 is a flow chart showing a process for reducing the specified threshold of similarities in the apparatus according to the thirteenth embodiment;

FIG. 113 is a flow chart showing a process for enlarging the specified threshold of similarities in the apparatus according to the thirteenth embodiment;

FIG. 116 is a diagram showing an example of retrieval in the apparatus according to the thirteenth embodiment;

FIG. 117 is a flow chart showing a process for changing the topic in the apparatus according to the thirteenth embodiment;

FIG. 119 is a diagram showing another example of retrieval in the apparatus according to the thirteenth embodiment;

FIG. 120 is a flow chart showing another process for changing the topic in the apparatus according to the thirteenth embodiment;

FIG. 121 is a flow chart showing another process for changing the topic in the apparatus according to the thirteenth embodiment;

FIG. 122 is a diagram showing another example of retrieval in the apparatus according to the thirteenth embodiment;

FIG. 123 is a flow chart showing a process for changing the threshold of the similarity in accordance with the balance of contraction with the user in the apparatus according to the thirteenth embodiment;

FIG. 124 is a flow chart showing a process for changing the font size of a text to be presented in the apparatus according to the thirteenth embodiment;

FIG. 125 is a diagram showing an example of topics for use in the apparatus according to the thirteenth embodiment;

FIG. 126 is a block diagram showing the function and structure of an apparatus according to a fourteenth embodiment of the present invention;

FIG. 127 is a flow chart showing the overall process in the apparatus according to the fourteenth embodiment;

FIG. 128 is a flow chart showing, in detail, the filtering process shown in FIG. 127;

FIG. 129 is a flow chart showing, in detail, the process for changing the user profile shown in FIG. 127;

FIG. 130 is a flow chart showing, in detail, the document analyzing process shown in FIG. 128;

Figure 143:
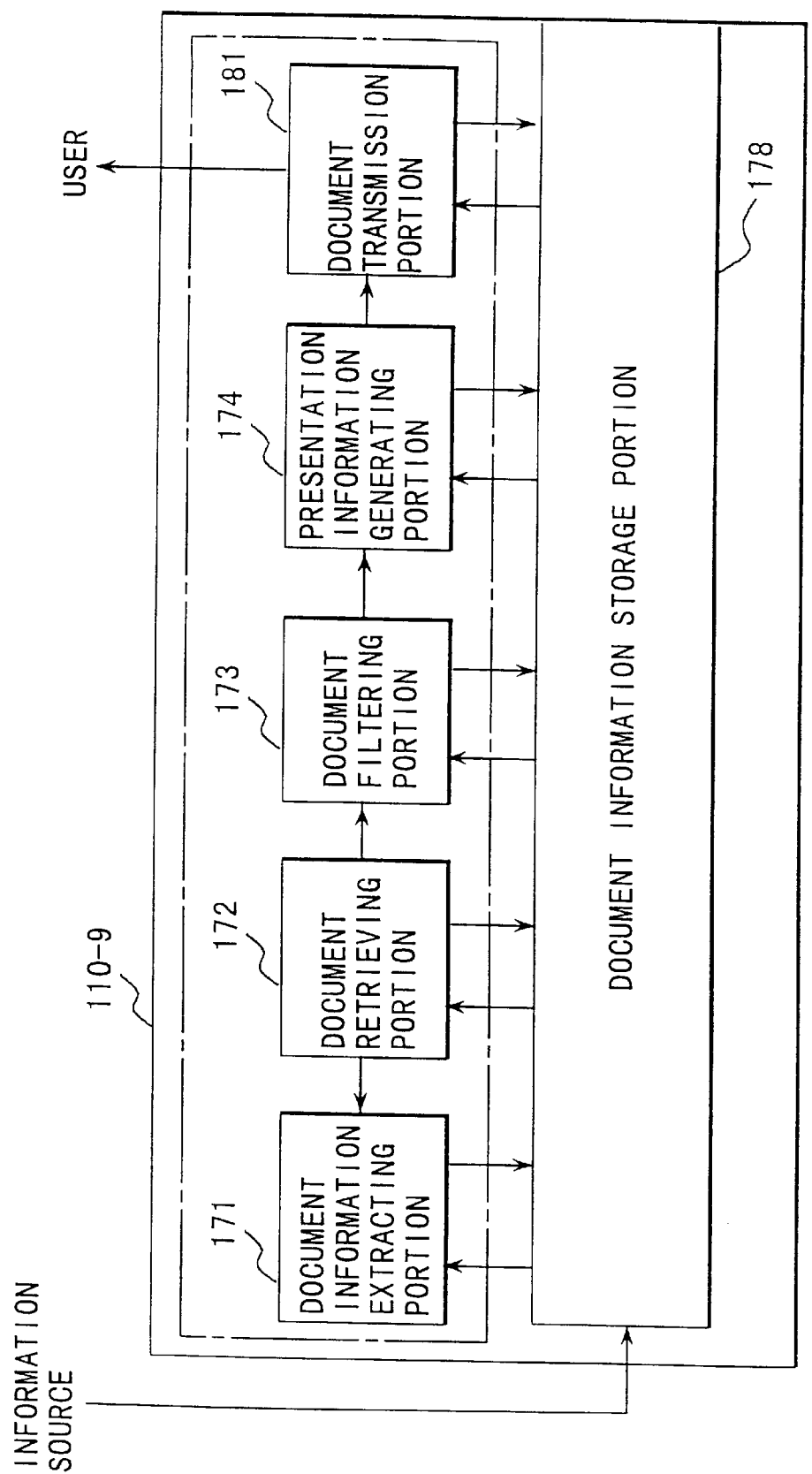
Figure 144:
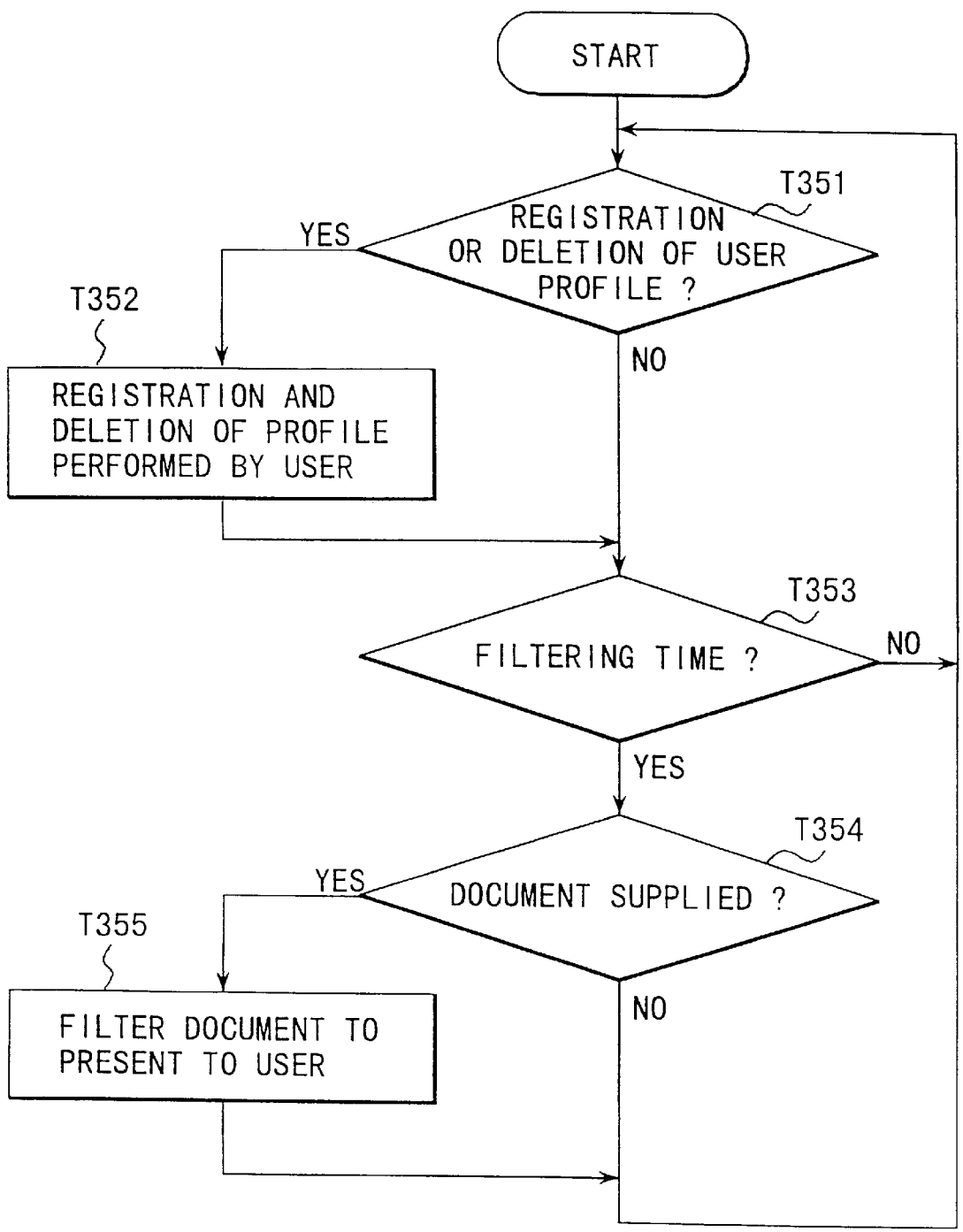

FIG. 131 is a flow chart showing, in detail, the filtering process shown in FIG. 128;

FIG. 132 is a flow chart showing a specific procedure of the document analyzing process shown in FIG. 128;

FIG. 133 is a flow chart showing the procedure of the format analyzing process shown in FIG. 132;

Figure 134:
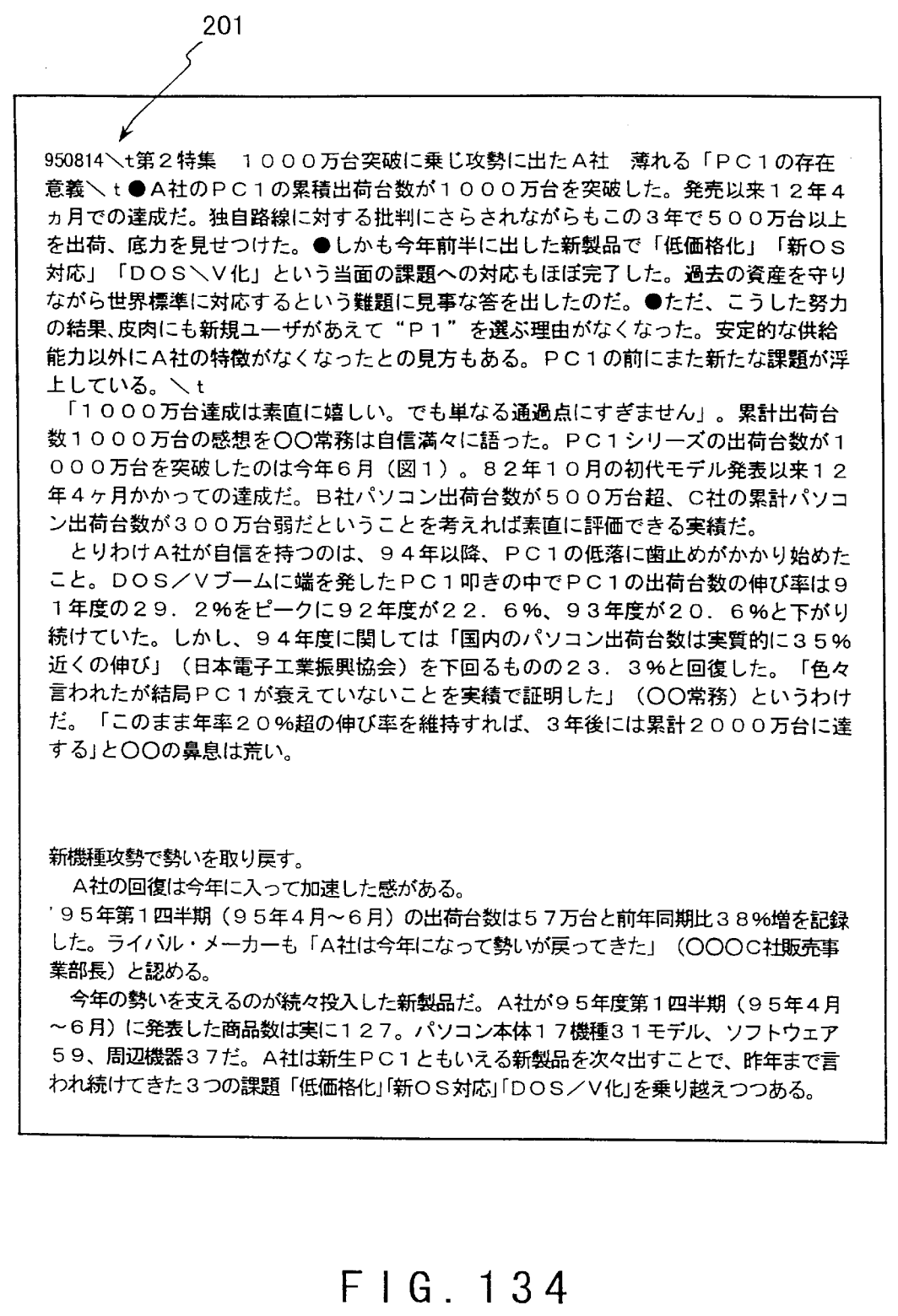

FIG. 134 is a diagram showing an example of a document to be subjected to the format analyzing process shown in FIG. 132;

Figure 135:
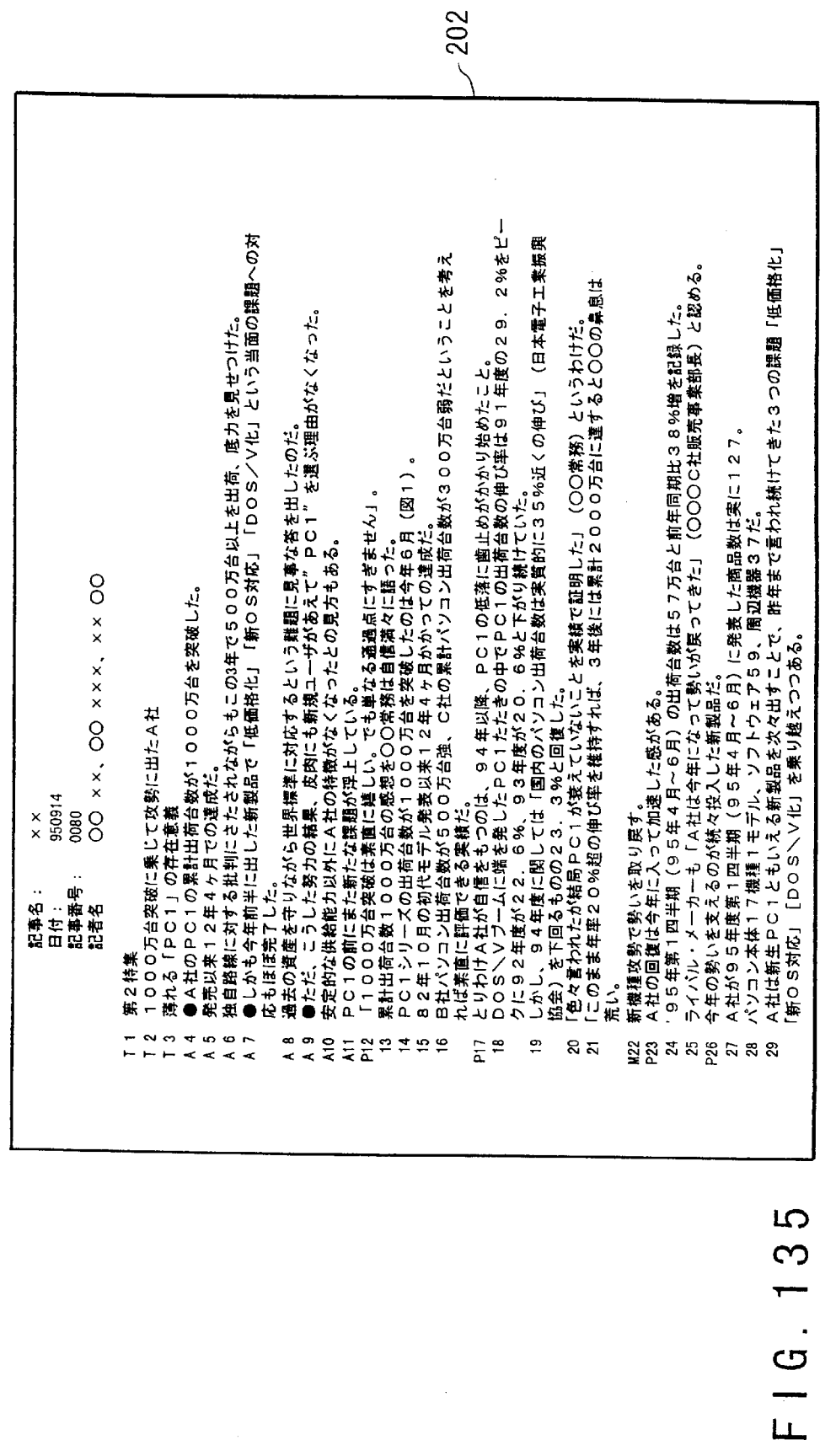

FIG. 135 is a diagram showing results of analysis of the format of the document shown in FIG. 134;

FIG. 136 is a diagram showing an example of results of analysis of the morpheme corresponding to the results of the analysis of the format shown in FIG. 135;

FIG. 137 is a flow chart showing a document analyzing process in the apparatus according to a fifteenth embodiment of the present invention;

FIG. 138 is a flow chart showing another example of the process shown in FIG. 131;

FIG. 139 is a flow chart showing a retrieval process in the apparatus according to the eleventh embodiment of the present invention;

FIG. 140 is a flow chart showing a retrieval process in the apparatus according to the twelfth embodiment of the present invention;

FIG. 141 is a flow chart showing a retrieval process in the apparatus according to the thirteenth embodiment of the present invention;

FIG. 142 is a flow chart showing a retrieval process in the apparatus according to the fourteenth embodiment of the present invention;

FIG. 143 is a flow chart showing a retrieval process in the apparatus according to the fifteenth embodiment of the present invention; and FIG. 144 is a flow chart showing the flow of the overall process in the apparatus according to the fifteenth embodiment.

DETAILED DESCRIPTION OF THE PREFERRED EMBODIMENTS

Referring to the drawings, preferred embodiments of the present invention will now be described.

Figure 1:
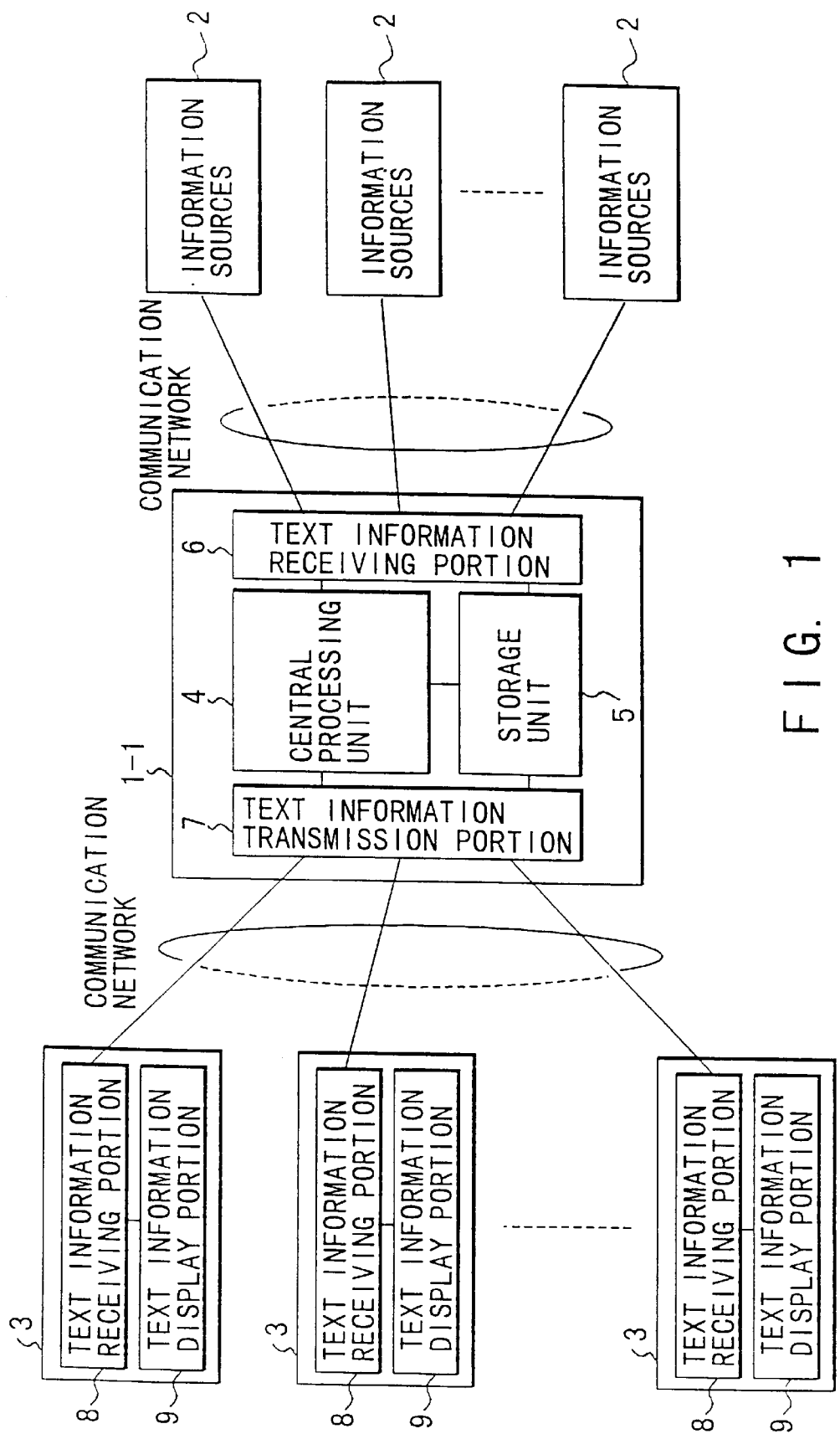
FIG. 1 is a block diagram showing the overall structure of an information filtering system according to the present invention.

Referring to FIG. 1, the overall structure of an information filtering system according to the present invention will now be described.

The information filtering system is an information supply system which receives text articles containing texts and images supplied from a plurality of information sources 2, such as newspaper publishing companies, news agencies and publishers, to periodically transmit the text articles to subscribed user terminals 3. The information supply service is realized by an information filtering center 1-1.

The information filtering center 1-1 is realized by one computer system connected, through a communication network, to the plural information sources 2 and the plural subscribed user terminals 3. The information filtering center 1-1 comprises a central processing unit 4 for performing controls and process for performing an information filtering operation, a storage unit 5, such as a semiconductor memory, a magnetic disk or an optical disk, for storing programs and data, a receiving portion 6 for receiving text articles from the information sources 2 through a communication network, such as a communication line or radio waves and a transmission portion 7 for transmitting text articles to the user terminals 3 through the communication network, such as the communication line or radio waves.

Each of the user terminals 3 is an information processing terminal, for example, a personal computer or a work station, and comprises a text information receiving portion 8 for receiving text articles transmitted from the information filtering center 1-1, a display portion 9 for displaying, on a screen thereof, the supplied text articles.

Figure 2:
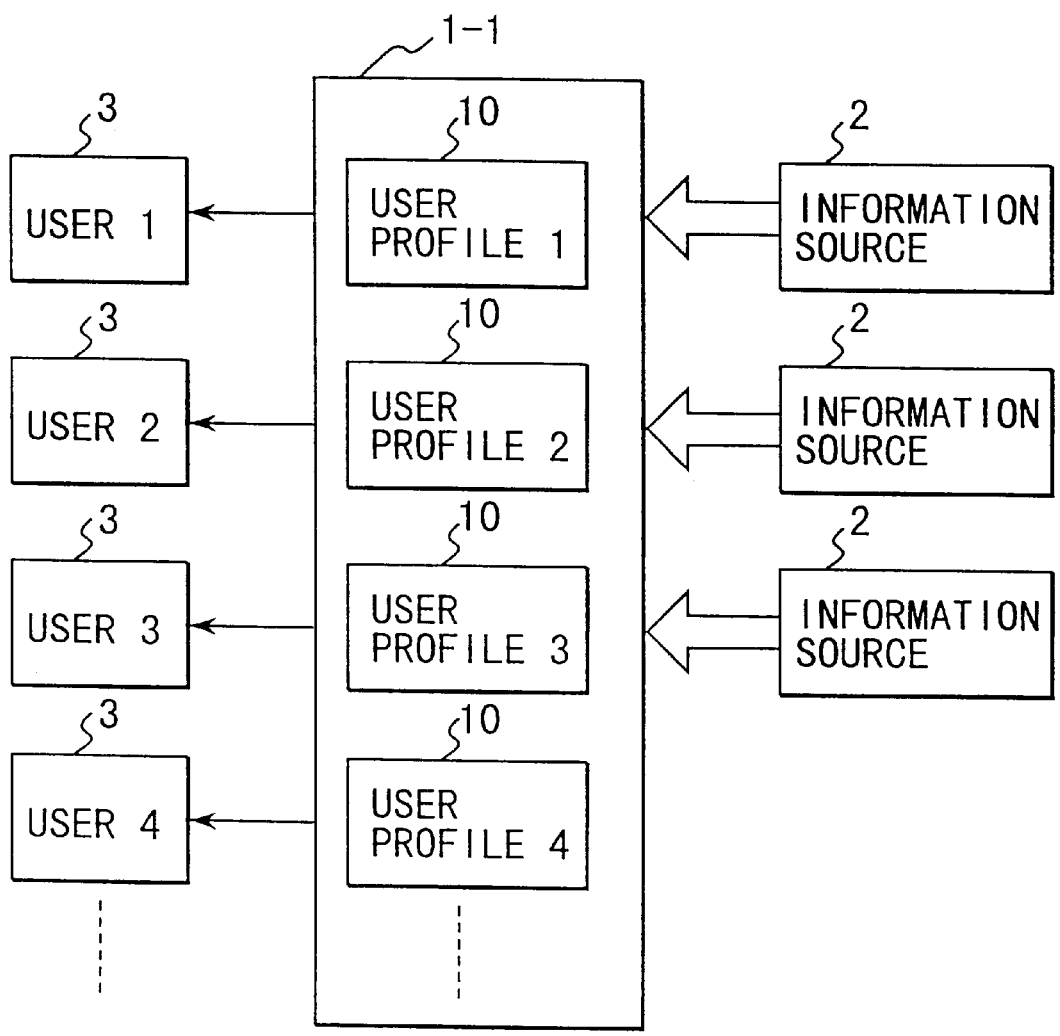
FIG. 2 is a schematic view showing the operational state of the information filtering system shown in FIG. 1.

As shown in FIG. 2, the information filtering center 1-1 stores a kind of retrieval conditions, called a user profile 10, for each user to retrieve articles to be supplied to a subject user in accordance with the user profile 10. The user profile 10 consists of a plurality of topics specified by the user so that an article meeting the topic is retrieved and selected so as to be supplied to the user.

The specific structure of the information filtering center 1-1 will now be described.

First Embodiment

Figure 3:
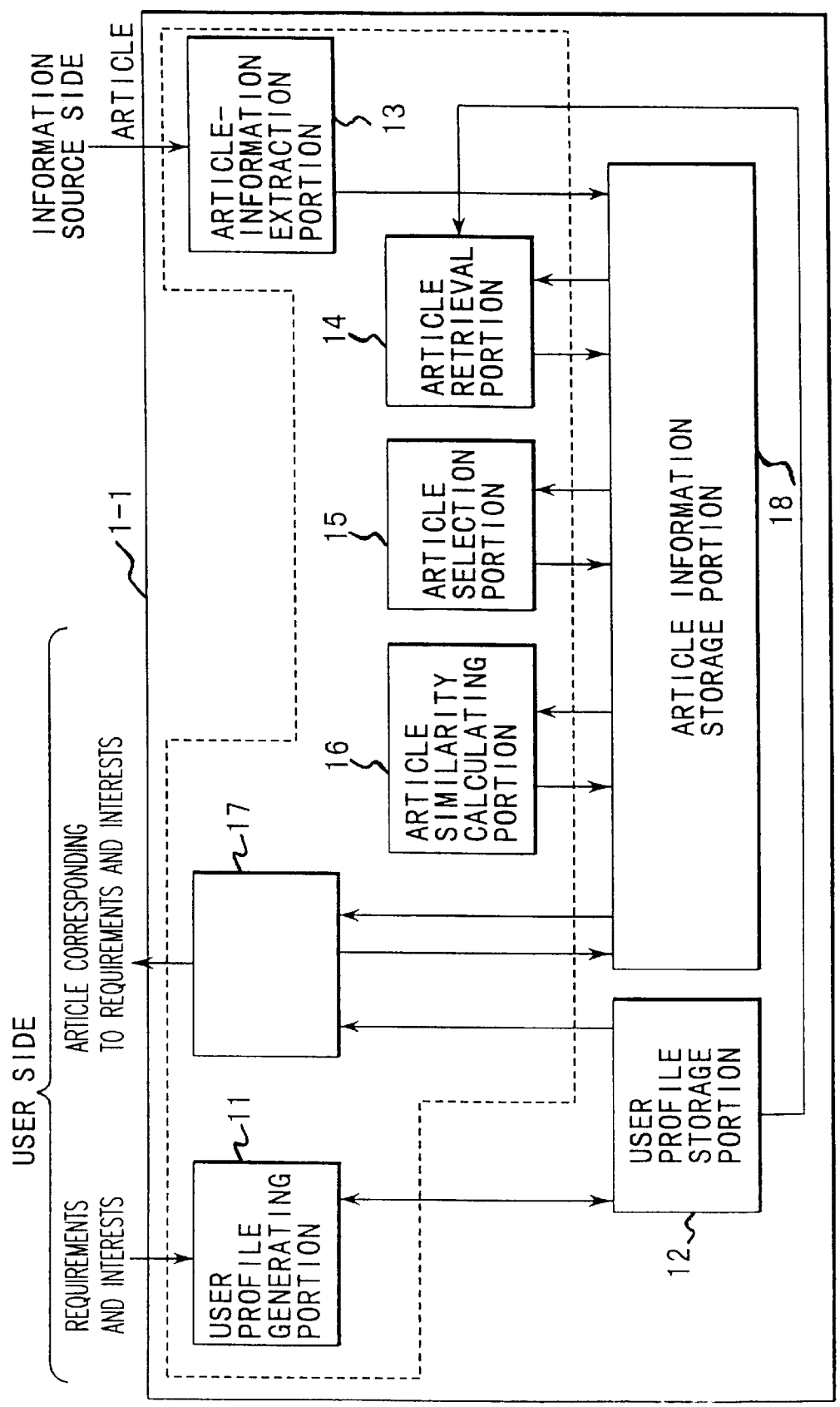
FIG. 3 is a block diagram showing the structure of an information filtering center provided for the information filtering system according to a first embodiment of the present invention.

FIG. 3 shows the structure of the information filtering center 1-1 according to a first embodiment of the present invention. Referring to FIG. 3, continuous line arrows indicate flows of data items.

As shown in FIG. 3, the information filtering center 1-1 consists of a user-profile generating portion 11, a user-profile storage portion 12, an article-information extraction portion 13, an article retrieval portion 14, an article selection portion 15, an article similarity calculating portion 16, a presentation information generating portion 17 and an article information storage portion 18. The elements surrounded by a dashed line, that is, the user-profile generating portion 11, the article-information extraction portion 13, the article retrieval portion 14, the article selection portion 15, the article similarity calculating portion 16 and the presentation information generating portion 17 can be realized by, for example, software to be executed by the article retrieval portion 14 shown in FIG. 1. The user-profile storage portion 12 and the article information storage portion 18 can be realized by the storage unit 5.

The user-profile generating portion 11 analyzes requirements, interests and the like previously specified by each user to generate, for each user, a user profile required to perform the retrieval. The user profiles are stored in the user-profile storage portion 12. The article-information extraction portion 13 extracts information required to perform the retrieval and calculation of the similarity from articles supplied from each of the information sources 2 and stores information in the article information storage portion 18 together with the text article.

The article retrieval portion 14 retrieves the articles supplied from each of the information sources 2 to obtain an article that meets the user profile. In the retrieval process, the similarities among the user profile and the supplied articles and among articles are sorted in the descending order in terms of the similarity. The article selection portion 15 is provided to select an article to be presented to the user in accordance with a result of the retrieval operation. For example, all articles of a type having a similarity level higher than a certain threshold or some articles of a type having a high level similarity are selected.

The article similarity calculating portion 16 is arranged to detect the similarities among articles by calculating the similarities among the selected articles. The presentation information generating portion 17 generates article information to be presented to the user in accordance with a result of the article selection and a result of the calculation of the similarities of the articles. The article information storage portion 18 stores article information and the result of the calculation of the article similarity. Specific processes will now be described which are performed by the user-profile generating portion 11, the article-information extraction portion 13, the article retrieval portion 14, the article selection portion 15, the article similarity calculating portion 16 and the presentation information generating portion 17.

Figure 4:
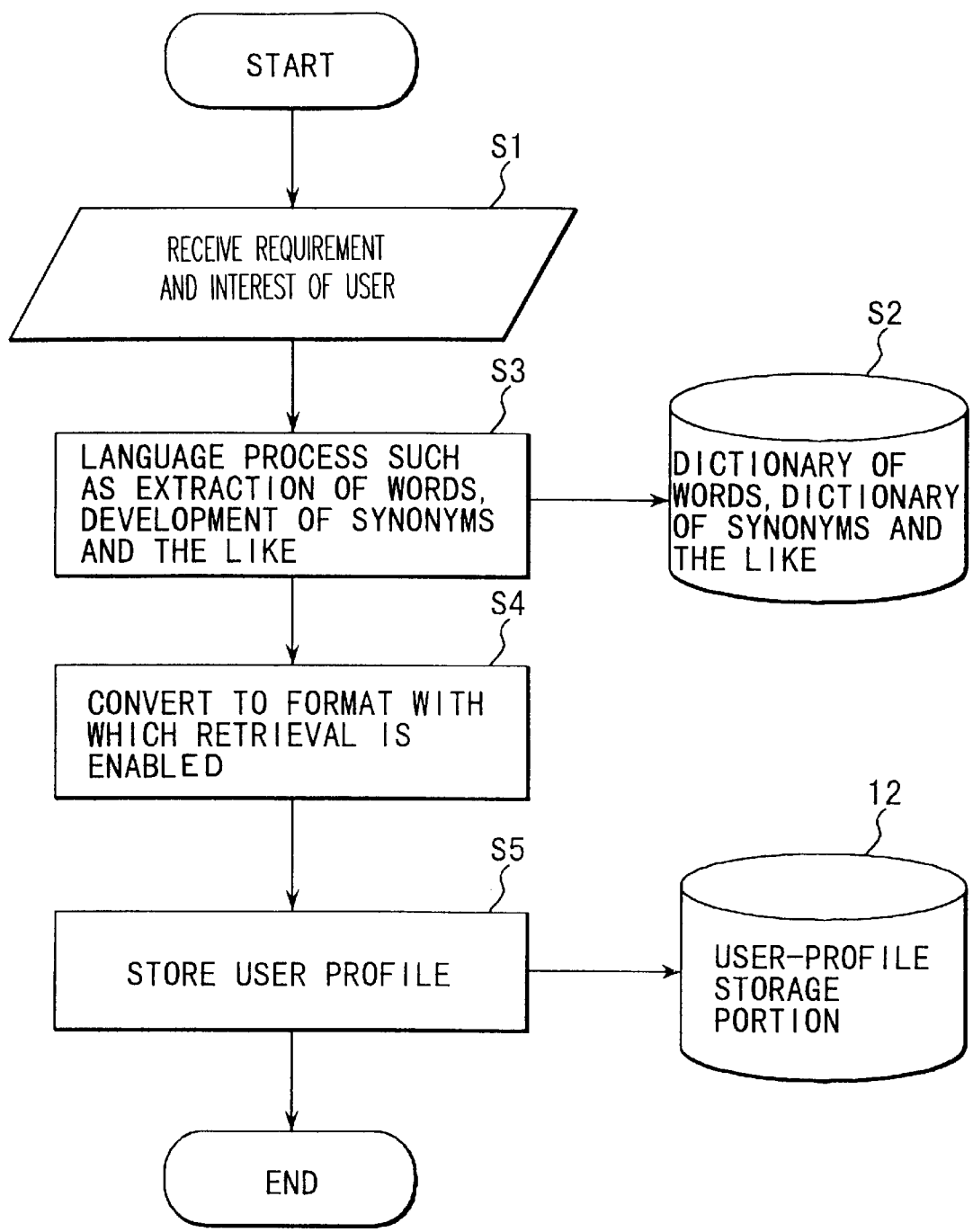
FIG. 4 is a flow chart showing a flow of a user profile generating process to be performed in the system according to the first embodiment.

FIG. 4 shows a flow of the process to be performed by the user-profile generating portion 11.

The user-profile generating portion 11 receives requirements and interests from each user (step S1). The requirements and interests of the user are expressed in a natural language as "I want to read articles about ○○ and XX", or in the form of a set of keywords of frequency occurrence in the topic of interest, the keywords being given a priority order or weighted or by a retrieval equation for use in a usual document retrieval operation.

The user-profile generating portion 11 uses a word dictionary, a dictionary of synonyms and the like to perform language processes, such as extraction of a word and development of a synonym (steps S2 and S3). Then, the user-profile generating portion 11 performs conversion into a format that can be retrieved to generate a user profile (steps S4 and S5). The generated user profile is, for each user, stored in the user-profile storage portion 12 so as to be used as a retrieval condition for retrieving the articles.

Figure 5:
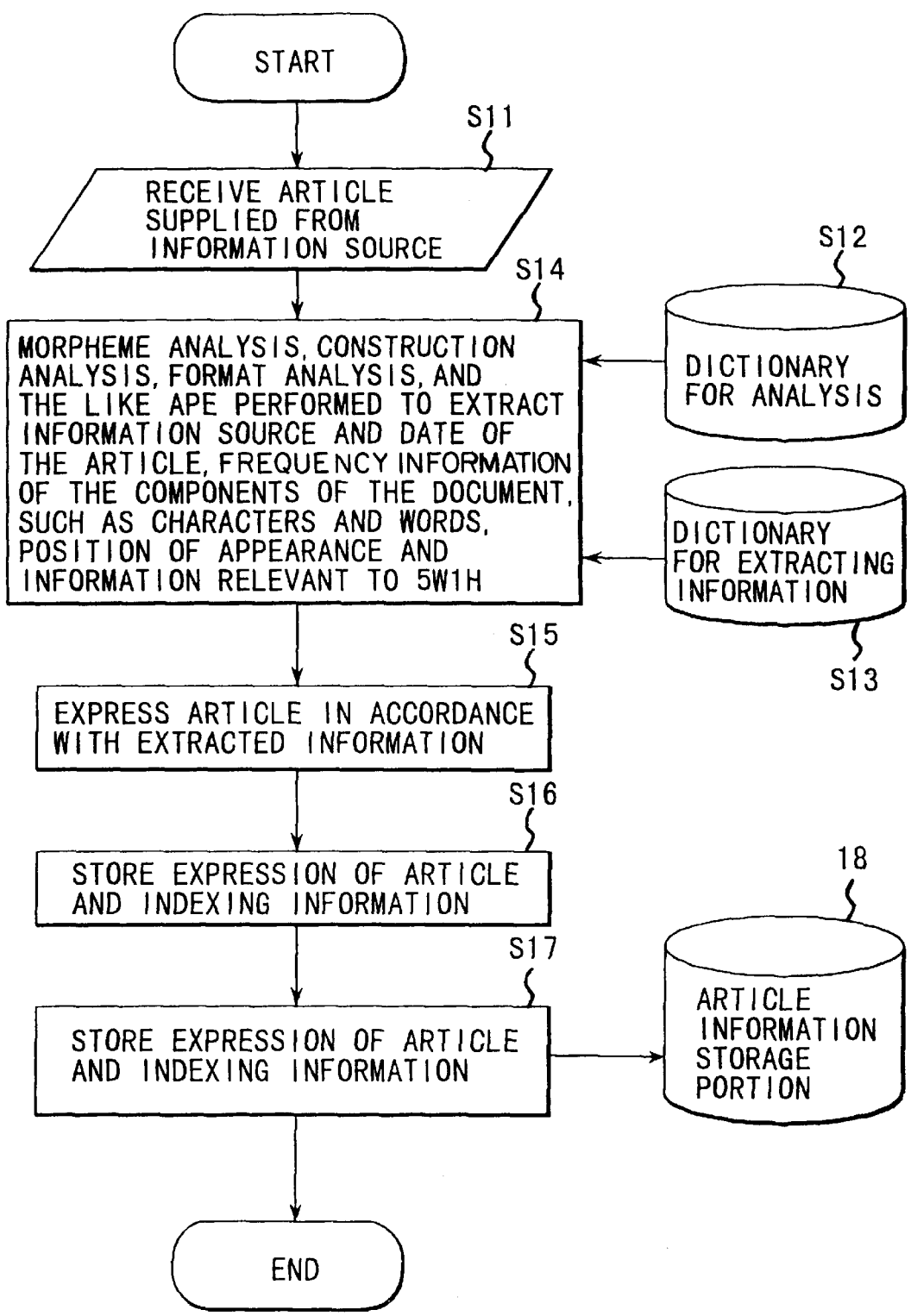
FIG. 5 is a flow chart showing a flow of an article information extracting process to be performed in the system according to the first embodiment.

FIG. 5 shows an example of a flow of the process to be performed by the article-information extraction portion 13.

Figure 6:
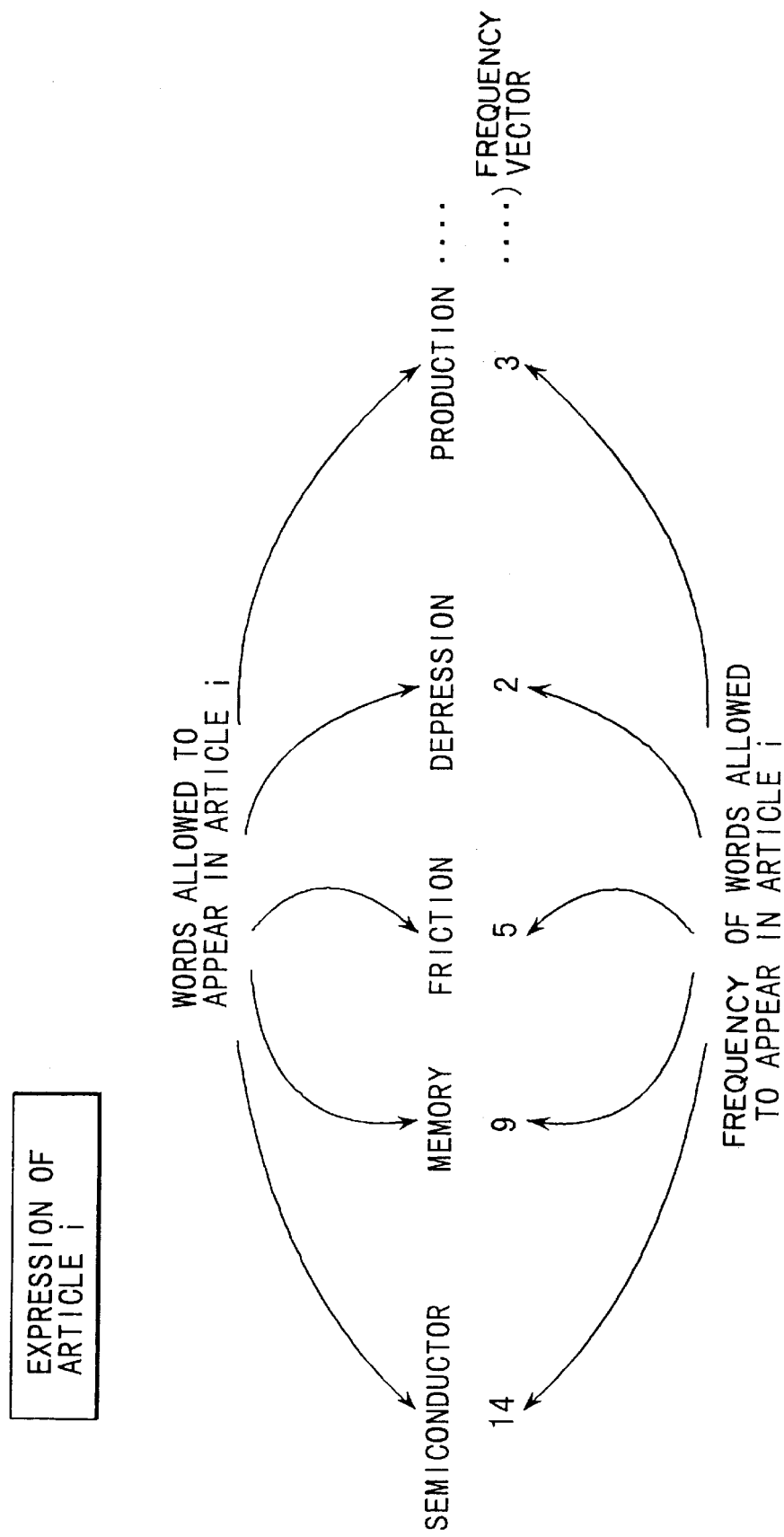
FIG. 6 is a diagram showing an example of expressions of articles employed in the system according to the first embodiment.

The article-information extraction portion 13 receives an article supplied from the information source (step S11) to subject the article to a morpheme analysis, construction analysis and format analysis by using a dictionary for sentence analysis, a dictionary for information extraction and the like so as to extract the information source, date of supply of the article, frequency information of the components of the document, such as characters and words, position of appearance and information relevant to 5W1H (steps S12 to S14). Then, the article-information extraction portion 13 expresses the article as the set of the extracted information items (step S15). For example, the article is expressed by a vector, the component of which is the frequency of words allowed to appear, or by a 5W1H template having substituted apparent values. Examples of expression of the articles are shown in FIGS. 6 and 7. FIG. 6 shows frequency vectors, the component of each of which is frequency of occurrence (14, 9, 5, 2, 3) of words (semiconductor, memory, friction, depression, production, . . . ) allowed to appear in the article. FIG. 7 shows a template having items consisting of an information source, the number of words, caption, topic, date, place, the subject, main verb and the like.

The article-information extraction portion 13 expresses the article as described above, and then also performs an indexing process to quickly retrieve articles (step S16).

Then, the article-information extraction portion 13 expresses the article by the vector or the template and stores the article and indexing information in the article information storage portion 18 (step S17).

FIG. 8 shows a flow of the process to be performed by the article retrieval portion 14.

The article retrieval portion 14 makes a reference to article information extracted by the article-information extraction portion 13 to retrieve an article that meets the user profile from the supplied articles.

The foregoing operation corresponds to a calculation of the similarities among the user profile and the supplied articles. The similarity may be in the form of a discrete value such that "the article meets the user profile" or "the article does not meet the user profile" depending upon the method of the retrieval, or in the form of continuous values in such a manner that articles satisfactorily meeting the user profile are given higher similarly values. The description will be made about the case where the similarity is in the from of continuous values.

The article retrieval portion 14 performs the following process with respect to the user profile for each user.

Initially, the article retrieval portion 14 reads the user profile from the user-profile storage portion 12 (step S21). Then, the article retrieval portion 14 substitutes "1" for variable i (step S22), and then calculates the similarity between the i-th article (the first article) and the user profile (step S23). The calculation of the similarity corresponds to a usual retrieval process in which references are made to the expression of the article and the retrieval index stored in the article information storage portion 18.

Then, the article retrieval portion 14 updates the value of the variable i by increasing the same by one, and then examines whether the value of i is larger than the number of the supplied articles (steps S24 and S25). If the value of i is not larger than the number of the supplied articles, the article retrieval portion 14 recognizes that articles, the similarity of each of which has not been calculated, exist. Thus, the article retrieval portion 14 repeats steps S23 to S25 until the value of i is made to be lager than the number of the supplied articles. When the calculations of the similarities among all of the supplied articles and the user profile have been completed, that is, when the retrieval process in which all of the supplied articles are retrieved has been completed, the article retrieval portion 14 sorts the supplied articles in the descending order in terms of the similarity with the user profile to rank the articles (step S26). A result of the ranking operation is stored in the article information storage portion 18. An example of a result of the ranking operation is shown in FIG. 9.

FIG. 10 shows a flow of a process to be performed by the article selection portion 15.

The article selection portion 15 reads, from the article information storage portion 18, the supplied articles retrieved and ranked by the article retrieval portion 14 (step S31) to select an article to be presented to the user (step S32). Information of the article determined to be presented to the user is again stored in the article information storage portion 18.

The selection of the article may be performed such that the number N of articles to be presented to the user is previously determined by the information filtering center 1-1 to present N upper rank articles or that articles having the similarity higher than a certain threshold are presented. FIG. 11 shows an example in which 10 upper rank articles are selected in a state where a result of ranking shown in FIG. 9 has been obtained.

FIG. 12 shows an example in which articles each having a similarity with the user profile of 0.86 or greater have been selected in the state where a result of ranking shown in FIG. 9 has been obtained.

Figure 13:
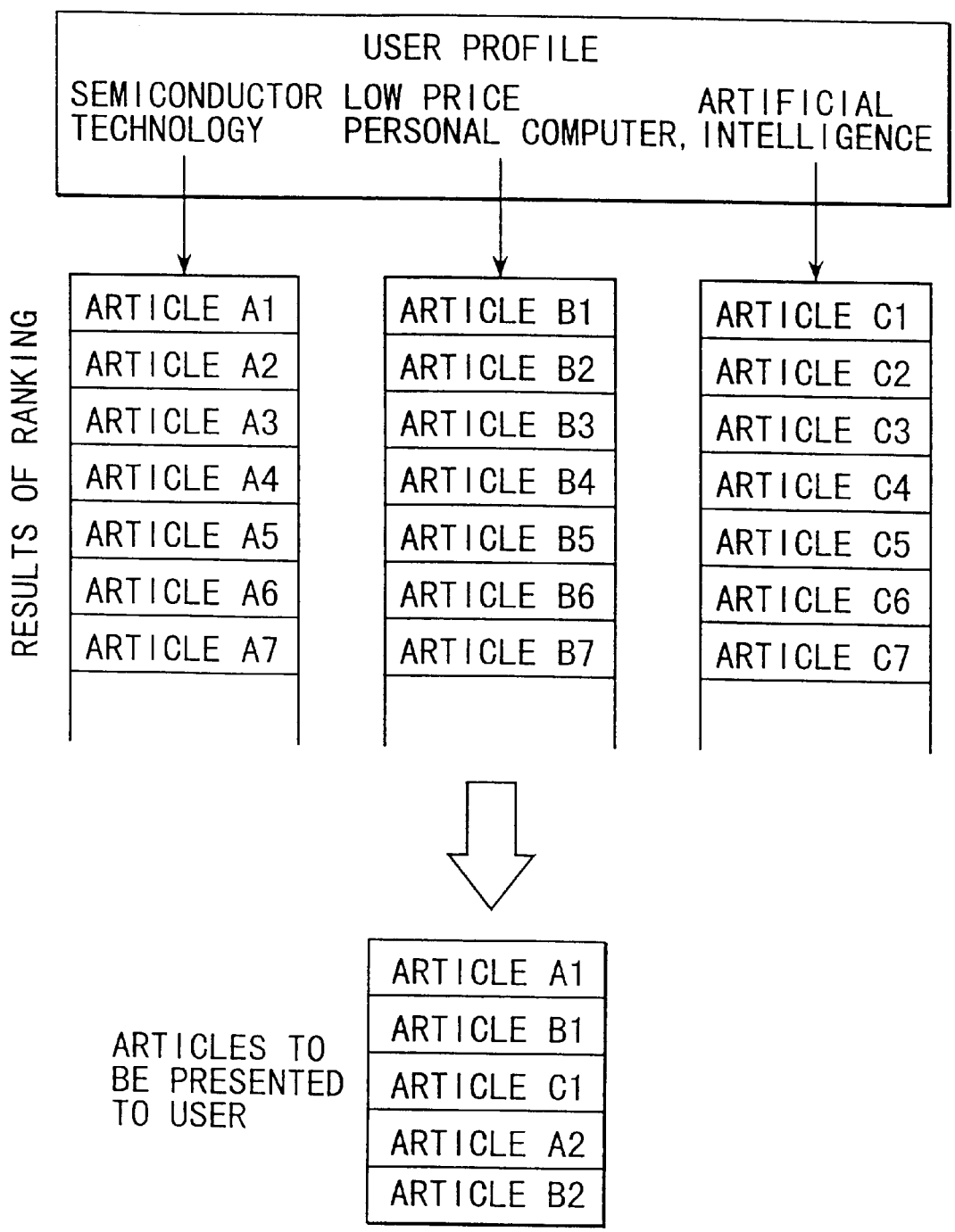
FIG. 13 is a diagram showing a state where the top portion of a plurality of results of ranking is merged to select articles to be presented to a user in a case where a plurality of retrievals and ranking are performed with respect to one user in the system according to the present invention.

FIG. 13 shows an example in which upper portions of results of ranking of a plurality articles are merged to select articles to be presented to the user in a case where a plurality of retrieval operations and ranking operations have been performed for one user.

In the foregoing case, retrieval operations for three topics as "semiconductor technology", "low price personal computer" and "artificial intelligence" have been performed individually so that articles A1, B1, C1, A2 and B2 have been selected from the higher rank articles as a result of each of the three retrievals.

Articles A1 and A2 are those meeting the topic "semiconductor technology", articles B1 and B2 are those meeting the topic "low price personal computer" and article C1 is an article meeting the artificial intelligence".

As a method of selecting articles, a method may be employed in which a predetermined number of articles are selected as shown in FIG. 11 or a method in which articles each having a similarity greater than a predetermined value are selected, as shown in FIG. 12.

Figures 14, 15:
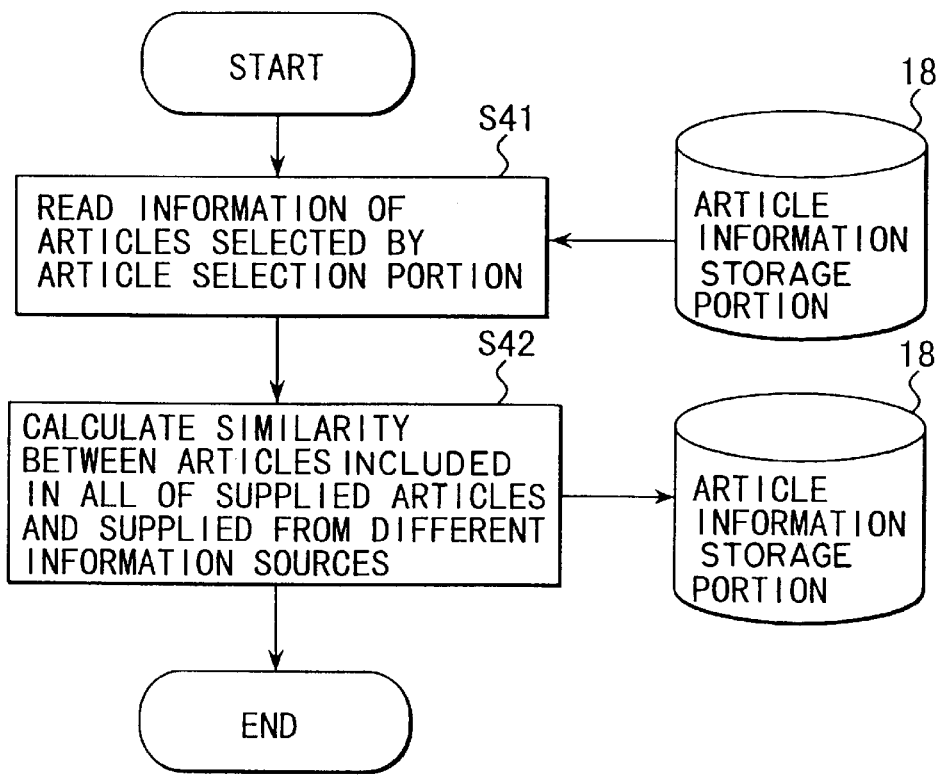
FIG. 14 is a flow chart showing a flow of an article similarity calculating process in the system according to the first embodiment.
FIG. 15 is a diagram showing an example of articles supplied from different information sources in the system according to the first embodiment.

FIG. 14 shows a flow of the process to be performed by the article similarity calculating portion 16.

The article retrieval portion 14 calculates the similarity between the user profile and the article, that is, the article retrieval portion 14 uses the user profile as a retrieval equation to perform a usual retrieval of the articles. On the other hand, the article similarity calculating portion 16 calculates the similarity between articles.

The calculation of the similarity is performed by subjecting the expressions of the articles, for example, as shown in FIGS. 6 and 7, to a comparison and a result of the calculation is stored in the article information storage portion 18.

An assumption is performed here that a plurality of information sources 2, such as newspaper publishing companies, exist and articles supplied from different information sources, for example, articles supplied from newspaper publishing company M and those supplied from newspaper publishing company N are subject to the process for calculating the similarity between articles.

Although all of combinations of the articles supplied from the different information sources may be subjected to the process of calculating the similarity, a description will be performed hereinafter about case of a low calculation cost where only the articles selected by the article selection portion 15 are subjected to the process of calculating the similarity.

That is, the article similarity calculating portion 16 initially reads, from the article information storage portion 18, articles selected by the article selection portion 15 (step S41). Then, the article similarity calculating portion 16 selects articles among the read articles that have been supplied from different information sources to calculate their similarity so as to store a result of the calculation in the article information storage portion 18 (step S42).

A specific example of the calculation for obtaining the similarity among articles will now be described.

FIG. 15 shows examples of articles selected by the article selection portion 15 and supplied from different information sources. FIG. 15 shows a case where four articles A to D are presented to the user.

Articles A and D are those supplied from newspaper publishing company M, article B is an article supplied from newspaper publishing company N and article C is an article supplied from publishing company O.

In this case, combination of article A and article B, that of article A and article C, that of article B and article C and that of article C and article D are subjected to the similarity calculations. Since article A and article D are those supplied from the same information source, their similarity is not calculated.

FIG. 16 shows a flow of a process to be performed by the presentation information generating portion 17.

The presentation information generating portion 17 reads, from the article information storage portion 18, information about the article selected by the article selection portion 15 and the similarity calculated by the article similarity calculating portion 16 (steps S51 and S52).

Then, the presentation information generating portion 17 classifies, as a set of duplicated articles, a set of articles having great similarity and supplied from different information sources (step S53). The duplicated articles are articles of a type about the same event individually produced by a plurality of information sources. Thus, the duplicated articles are those which can be considered to be the articles having the same or substantially the same contents.

Then, the presentation information generating portion 17 selects, from the set of the duplicated articles, one, generally, N articles, to be presented to the user as a representative articles (step S54). Thus, the presentation information generating portion 17 generates information to be presented to the user by, for example, adding information about the articles, that have not been selected, as relevant article information, to the contents of the selected article, and then transmits the information item (steps S55 and S56).

Specific examples of the duplicated articles and relevant article information will now be described.

Figure 17:
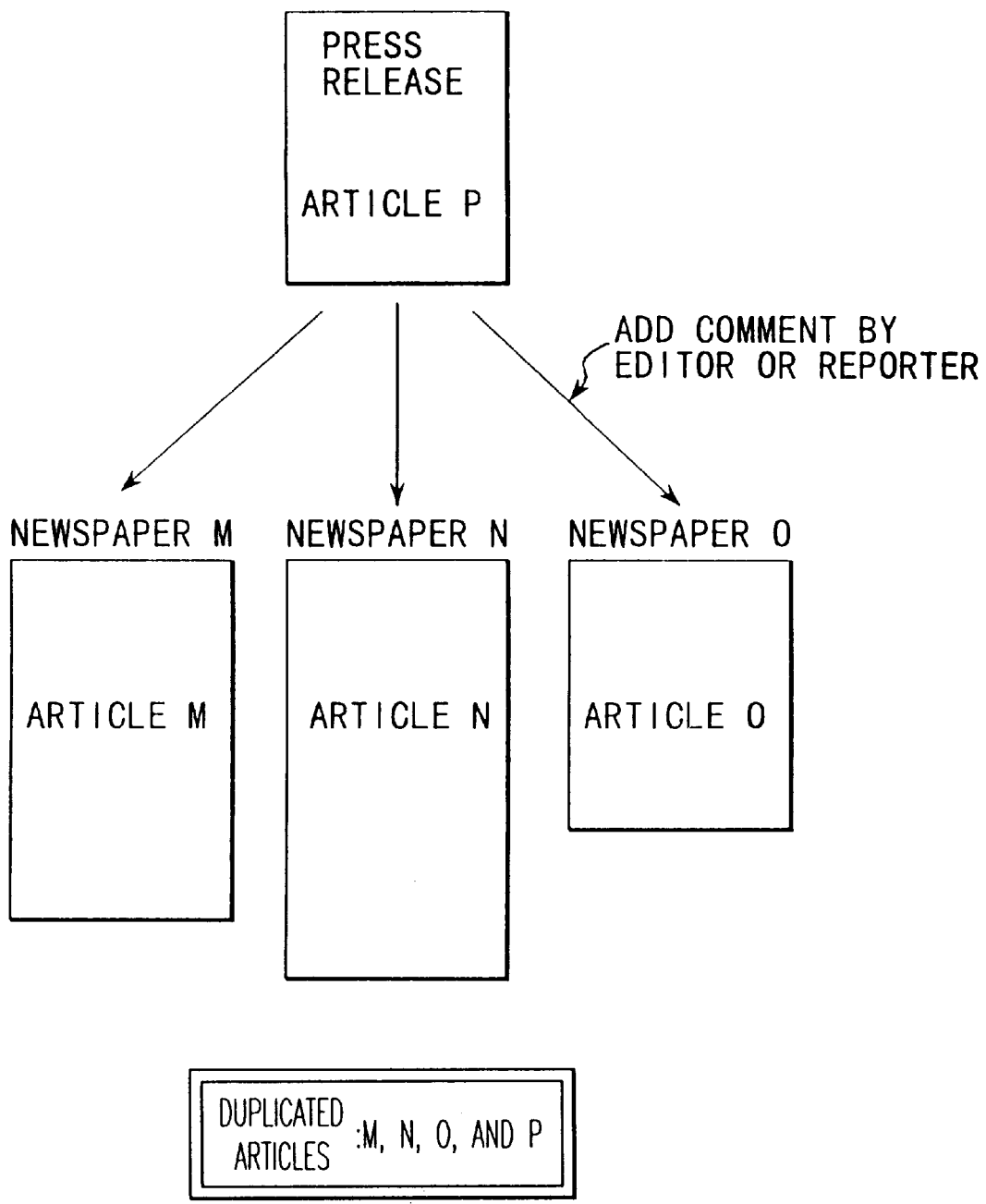
FIG. 17 is a diagram showing a state where duplicated articles are generated from one press release in the system according to the first embodiment.

FIG. 17 shows an example in which duplicated articles are derived from one press release. When press release article P describing a certain event has been supplied to newspaper publishing companies M, N and O, each newspaper publishing company edits the press release article P and, for example, adds a comment so that individual articles M, N and O are produced. If articles M, N and O are supplied from respective information sources to the information filtering center 1-1, the articles M, N and O are duplicated articles.

Figure 18:
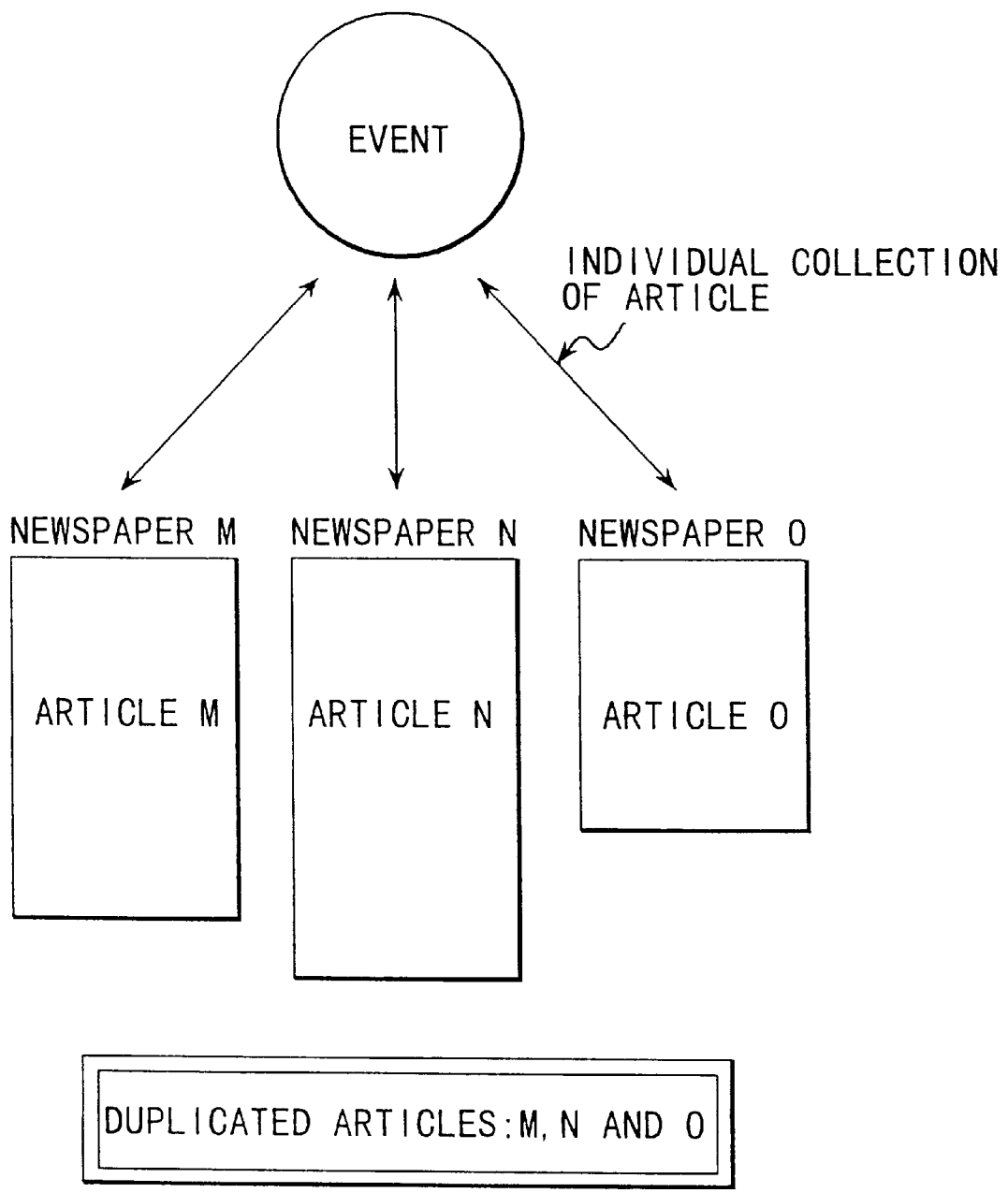
FIG. 18 is a diagram showing a state where duplicated articles are generated from one even in the system according to the first embodiment.

FIG. 18 shows an example in which duplicated articles are produced from one event.

In this example, newspaper publishing companies M, N and O individually collect materials so that articles M, N and O are produced. If the articles are supplied to the information filtering center 1-1, the articles M, N and O are duplicated articles.

Since the information filtering center is provided for the purpose of most effectively causing the user to make an access to required information among a great quantity of information items, it can be considered that it is not preferable that the articles to be presented to the user include duplicated articles. If all of the articles M, N and O are presented to the user in the case, for example, shown in FIG. 18, the user is required to read three articles to obtain information about one event.

To prevent the presentation of duplicated articles, the presentation information generating portion 17 selects one, generally, N articles to the user from a set of duplicated articles as a representative article. Then, an operation to be performed when only one article is selected will now be described.

FIGS. 19A and 19B each show an example of a set of duplicated articles obtained as a result of calculations of four articles shown in FIG. 15 to obtain similarity among articles.

In the foregoing examples, articles A and C and articles B and D have great similarity, thus resulting in two sets of duplicated articles being obtained.

The presentation information generating portion 17 selects one article from the sets of duplicated articles in accordance with a predetermined algorithm.

Assuming that the user or the service center has determined to give the newspaper publishing company M, articles A and D supplied to the user are presented.

Similarly, a method may be employed in which a press release having the largest quantity of information is given highest priority and is selected.

Another method may be employed in which the article given the highest rank as a result of the retrieval is selected.

The similarity between the user profile and the article is, in the case shown in FIG. 19, such that article C has the greatest similarity in the set of duplicated articles 1 and article D has the greatest similarity in the set of duplicated articles 2. Therefore, the articles C and D are presented to the user.

Another algorithm may be employed in which the longest or shortest article is selected.

As a result of the foregoing process, duplicated articles are omitted from candidates of articles to be presented to the user. Information about the omitted duplicated articles is added to information about the body of each article, and then presented to the user.

FIG. 20 shows an example in which information about the duplicated articles, which have been omitted, is added to information about the body of the article.

In this example, the information about the body of the article which is presented to the user and information about articles determined to have the same contents as the foregoing article and supplied from other information sources is supplied as added information. Specifically, the caption, the information source, the number of words of the article and the similarity of the article with the article, the body of which is being presented to the user, are listed up.

In the foregoing example, although articles each having "○X corporation has pulled out from the service business" have been obtained from three information sources, ○○, ΔΔ and □□ newspaper publishing companies, the article supplied from the ○○ newspaper publishing company is selected so as to be presented to the user.

By adding information about the omitted duplicated articles to information about the body of the article and by presenting the information item, repeated reading of articles having the same contents but supplied from different information sources can be prevented. Moreover, the methods of the different information sources to cover the same event can schematically be detected.

Figure 21:
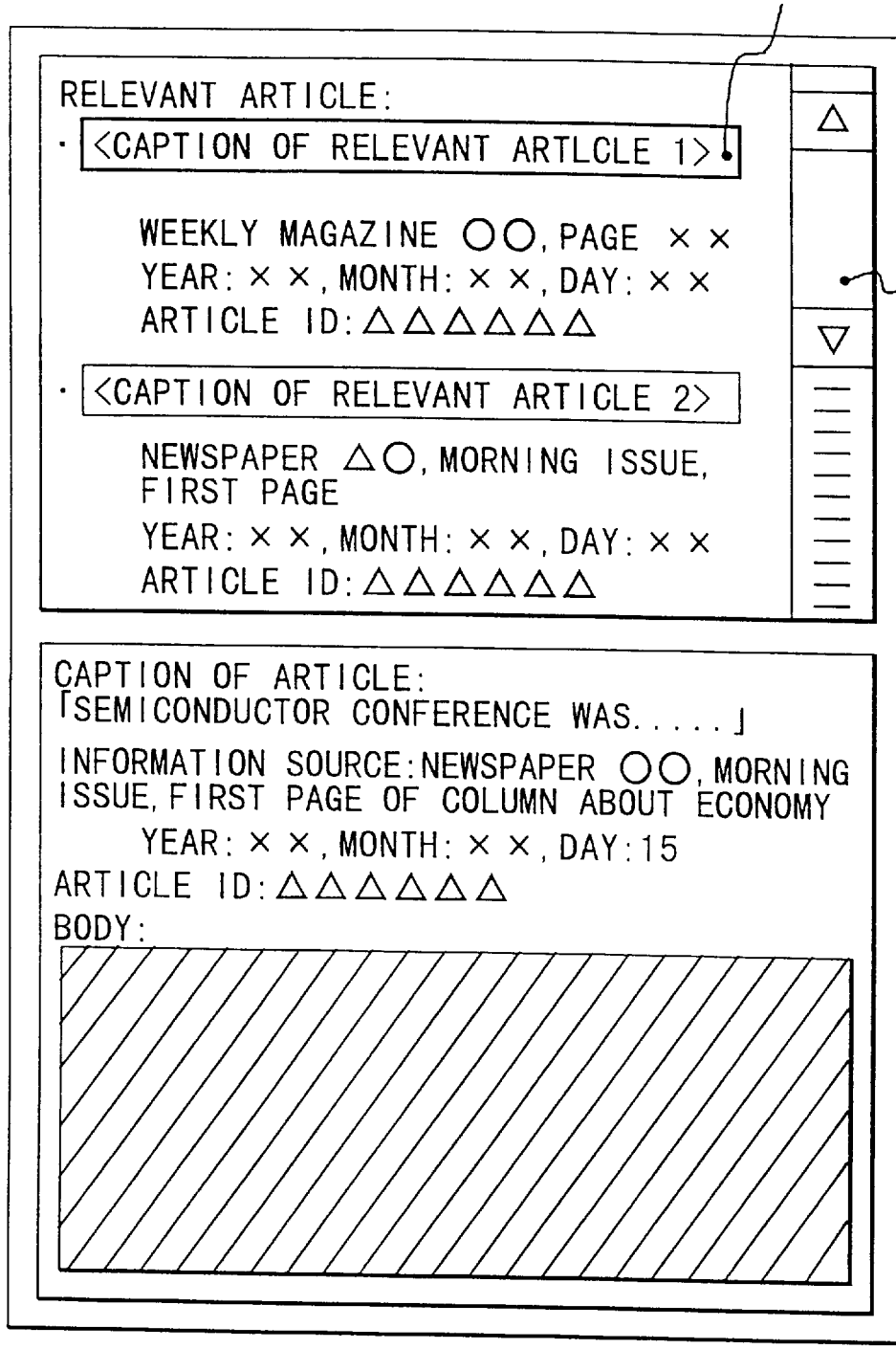
FIG. 21 is a diagram showing a display state of information of relevant articles in the system according to the first embodiment.

FIG. 21 shows a modification of the presentation method of relevant information shown in FIG. 20.

That is, although the structure shown in FIG. 20 presents relevant information in the form of a text, FIG. 21 has a structure such that the text portion of added information is formed into a hyper text structure to enable an access to the body of the duplicated article to be made.

In this case, the caption of the article in the area of the added information is formed into button permitting selection by using a mouse device or the like. Thus, the user is able to make a reference to the body of the relevant article 1 by selecting a relevant article 1.

Figure 23:
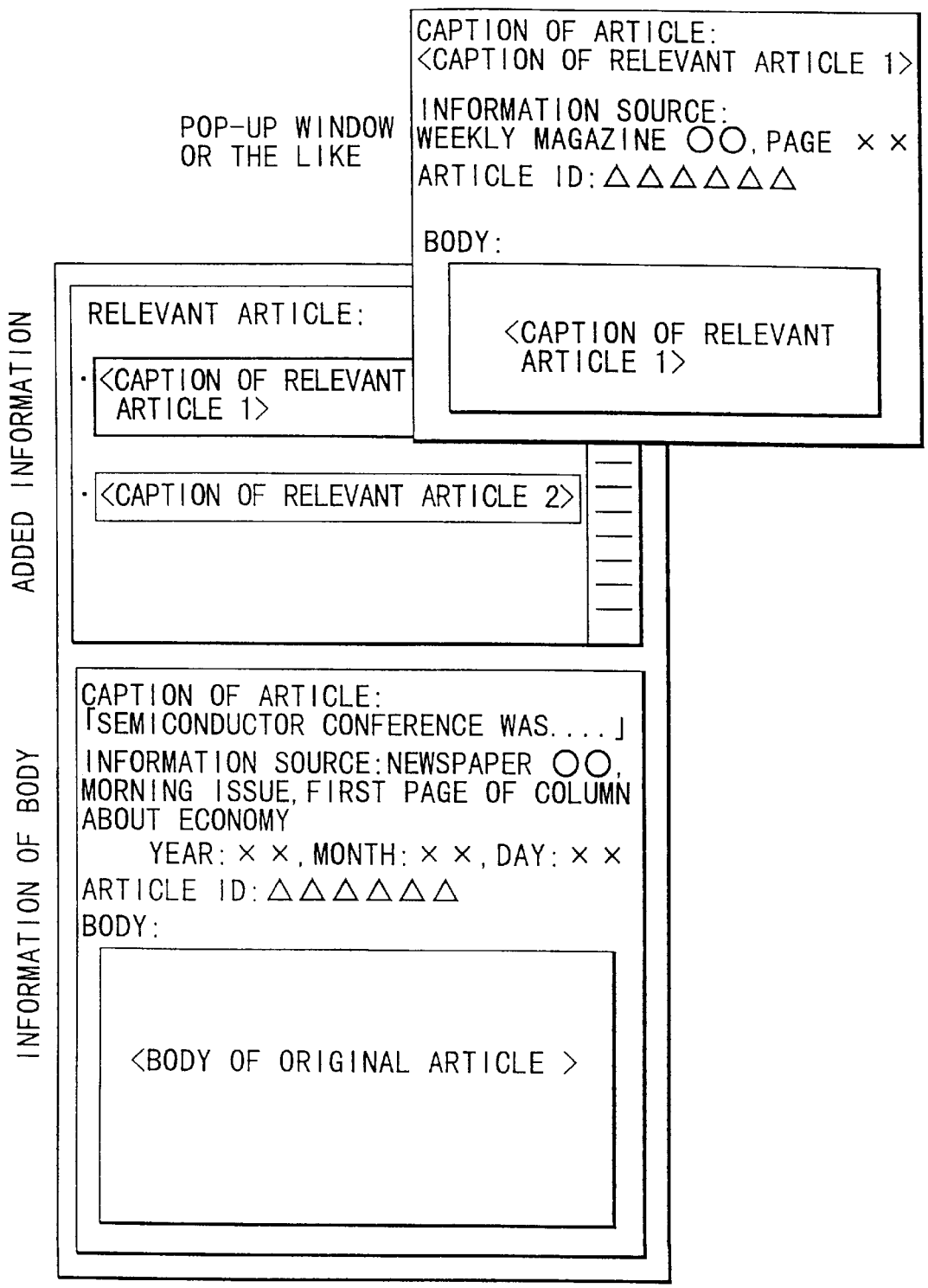
FIG. 23 is a diagram showing another display state of information of relevant articles in the system according to the first embodiment.

FIGS. 22 and 23 show examples in which the body of relevant article 1 is displayed in a case where relevant article 1 has been selected in the case shown in FIG. 21.

The article "semiconductor conference was", the body of which is shown in FIG. 21 is, in FIG. 22, displayed such that only information, such as caption is displayed in an area for added information. As an alternative to this, the body of relevant article 1 is displayed in the area for the information of the body.

To return the state shown in FIG. 22 to that shown in FIG. 21, the user is required to select a button "semiconductor conference . . . (original article)" in the area for the added information shown in FIG. 22.

In the case shown in FIG. 23, information of the body of relevant article 1 is displayed on a window newly opened while maintaining information displayed in FIG. 21. By employing the foregoing display method, a plurality of duplicated articles can be subjected to a comparison.

Figure 24:
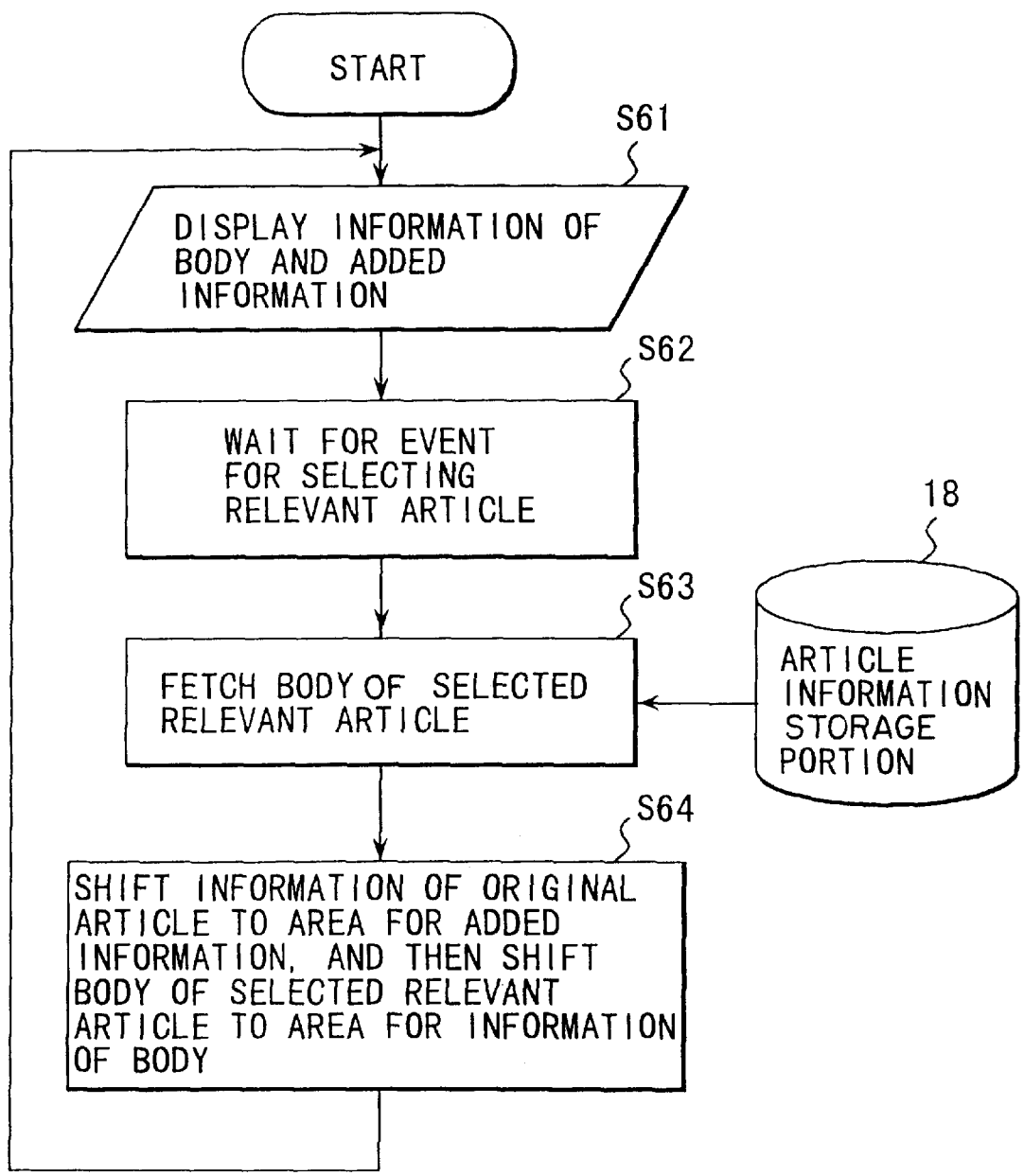
FIG. 24 is a flow chart showing a flow of display screen switching process for information of relevant articles in the system according to the first embodiment.

The screen is shifted from the state shown in FIG. 21 to the state shown in FIG. 22 as follows in accordance with a flow of a process shown in FIG. 24.

The presentation information generating portion 17 adds information about the relevant information to information about the body of the article to be presented, as shown in FIG. 21 (step S61). If an event of the button of the relevant article being selected occurs, the presentation information generating portion 17 fetches information about the body of the selected relevant article (steps S62 and S63) to display information about the original article in the area for added information and the body of the selected relevant article in the area for information about the body (step S64).

The switch of the screen can be performed under control of the user terminals 3 if the information about the body of the relevant article has been transmitted to the user terminals 3 from the information filtering center 1-1.

Figure 25:
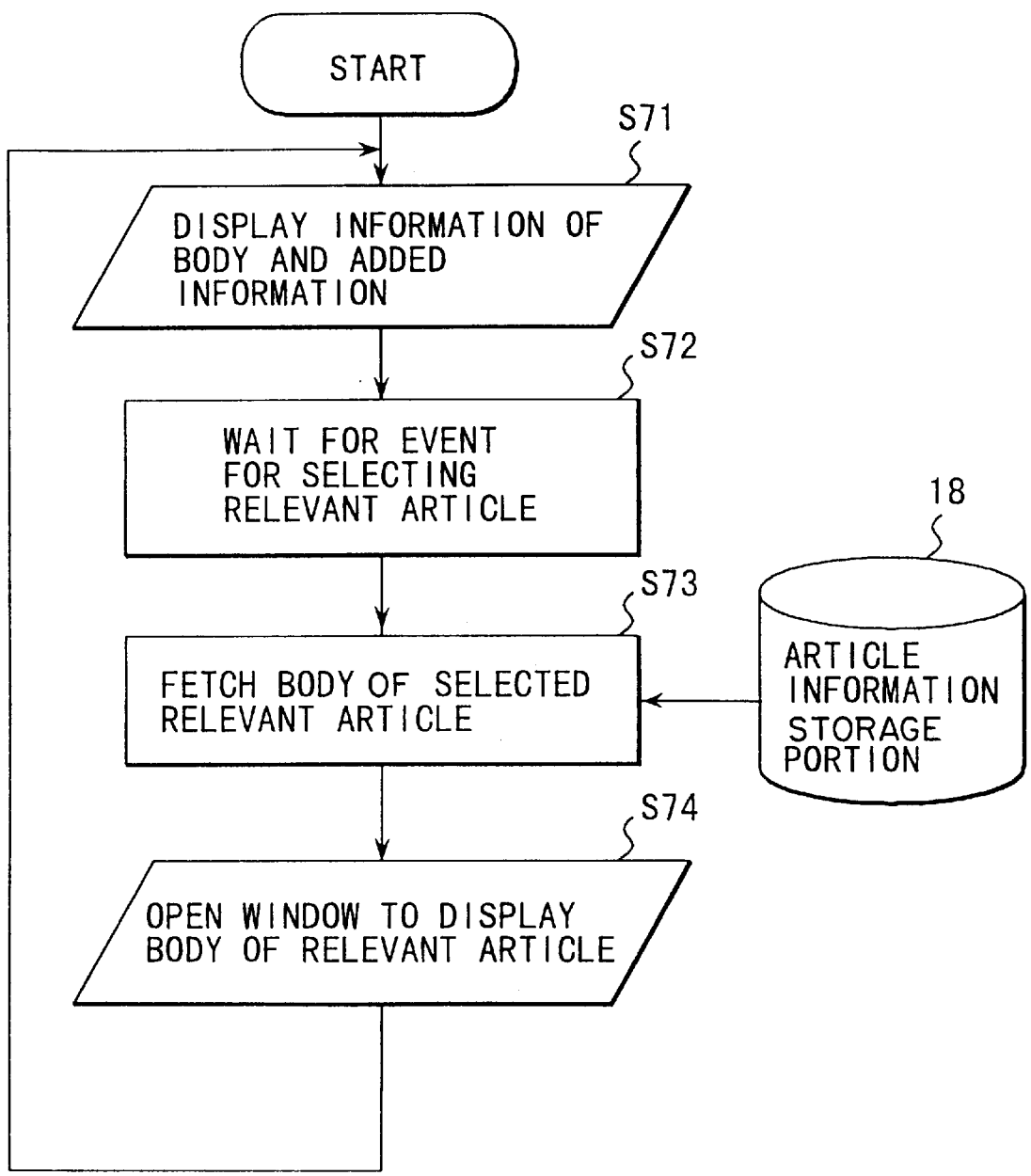
FIG. 25 is a flow chart showing another flow of display screen switching process for information of relevant articles in the system according to the first embodiment.

The shift of the screen from the state shown in FIG. 21 to the state shown in FIG. 23 is performed as follows in accordance with a flow of a process shown in FIG. 25.

The presentation information generating portion 17 adds information of the relevant article to information about the body of the article to be presented so that the user terminals 3 displays information on the display thereof, as shown in FIG. 21 (step S71). Then, if an event that the button of the relevant article is selected occurs, the presentation information generating portion 17 fetches information about the body of the selected relevant article from the article information storage portion 18 (steps S72 and S73) to display the body of the selected relevant article on the window (step S74).

Also the switch of the screen can be performed under control of the user terminals 3 if the information about the body of the relevant article has been transmitted to the user terminals 3 from the information filtering center 1-1.

The relevant article to be added to the area for added information as shown in FIGS. 20 and 21 may be decreased in accordance with an algorithm similar to that employed to select articles from the set of duplicated articles.

By employing the structure which permits an access from the article, which is representative of the set of duplicated articles and the body of which is displayed, to the body of the other duplicated article as shown in FIGS. 21 to 23, the user is able to selectively read the other duplicated articles if the representative article selected by the information filtering system is not an appropriate article.

Even if the information filtering system has an algorithm to give a priority to and select the article supplied from N Times in accordance with a requirement from the user, an effective result can be obtained in a case where the user requires a press release in place of articles which are supplied from N Times.

Moreover, opinions of a plurality of newspaper publishing companies about one event can be subjected to a comparison.

FIG. 26 shows an example in which a list of articles to be presented to a user is displayed together with information about duplicated articles in a case where articles are duplicated.

In this case in which four articles exist to be presented to the user, an article, which is the third article and the content of which is such that "○X corporation has pulled out from information service business" has two duplicated articles.

Similarities between the user profile and the articles are displayed in the end of the caption of the articles. Moreover, similarities between the original article and the duplicated articles are added to the duplicated articles. It can be said that the added similarities indicate the probabilities of the duplicated articles. The original article is, in this case, the article "○X corporation has pulled out from information service business".

The foregoing description has been performed about the process with respect to one user profile.

Since a plurality of users who are supplied with the information filtering service exist in general, the information filtering center holds the user profile for each user to perform the filtering process.

First Modification of the First Embodiment

Figure 27:
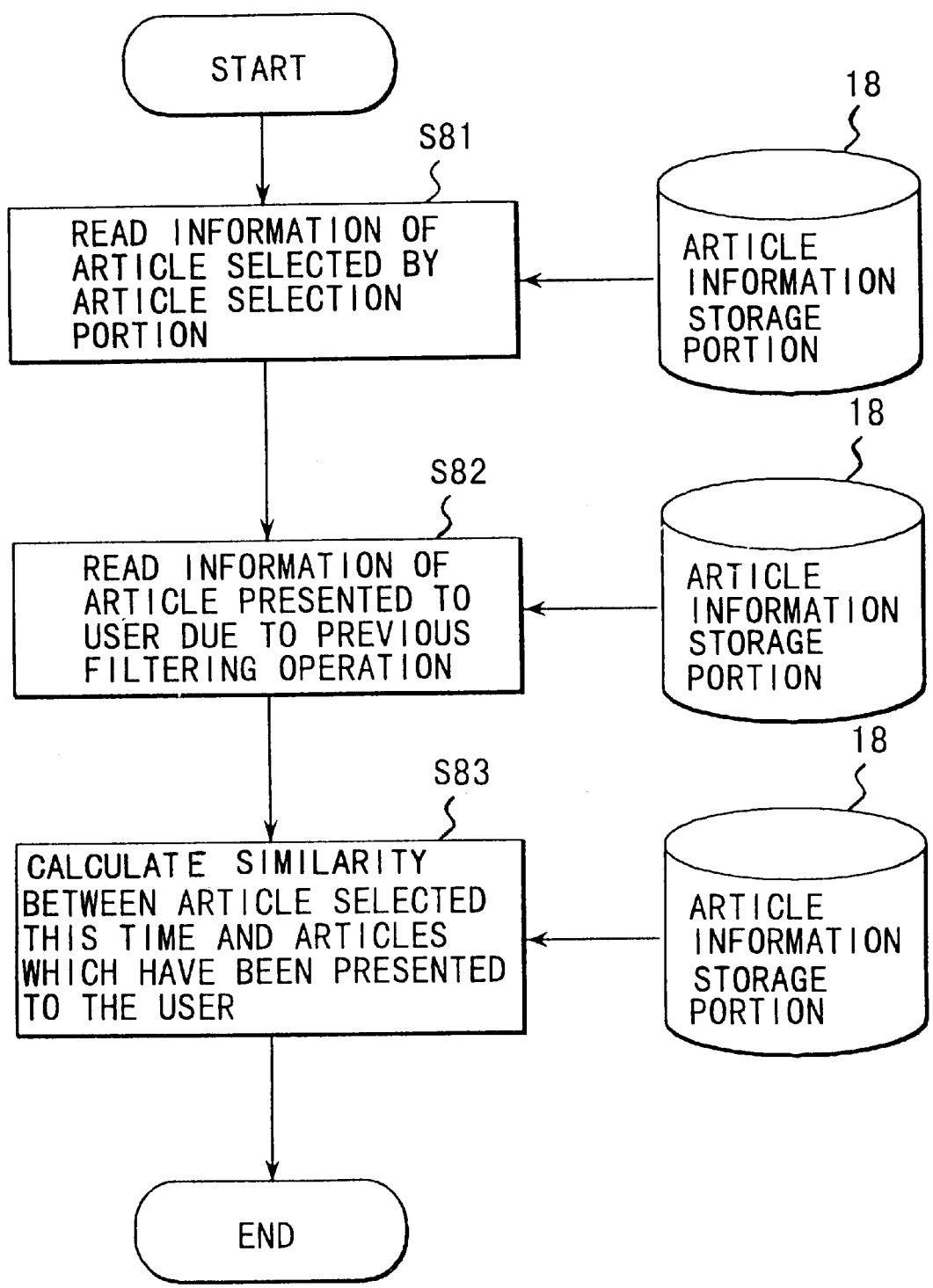
FIG. 27 is a flow chart showing a flow of an article similarity calculating process in the system according to the first embodiment.

Examples of the structure of the article similarity calculating portion 16 and that of the presentation information generating portion 17 will now be described. FIG. 27 shows a flow of a process to be performed by the article similarity calculating portion 16.

The article retrieval portion 14 calculates the similarity between the user profile and the article, that is, the article retrieval portion 14 uses the user profile as the retrieving formula to perform a usual retrieving operation in which the articles are subjects of the retrieval. On the other hand, the article similarity calculating portion 16 calculates the similarity between articles.

The calculations for obtaining the similarity are performed by subjecting expressions of articles shown in, for example, FIGS. 6 and 7 to a comparison. A result of the calculations is stored in the article information storage portion 18.

An assumption is performed here that information of articles obtained by N times of information filter operations is stored in the article information storage portion 18.

In an example case where information filtering service is performed by one time per a day and N is made to be 1, it means a fact that information of articles obtained by the information filtering operation performed yesterday has been stored. Then, the description will be performed mainly in a case where N=1.

In this system, sets of articles supplied this time and articles which have been supplied until the previous operation are subject of the calculations for obtaining similarity between articles.

Although all combinations of the articles supplied this time and the articles, which have been supplied until the previous operation, may be subjected to the calculations for obtaining the similarity between articles, a lower cost method will now be described in which only the similarities of the combinations of articles selected this time by the article selection portion and articles which have been presented to the user until the previous operation are calculated.

That is, the article similarity calculating portion 16 reads information of articles selected by the article selection portion 15, and then reads, from the article information storage portion 18, information of articles which have been presented to the user until the previous filtering operations (steps S81 and S82). Then, the article similarity calculating portion 16 calculates the similarities of the combinations between the articles selected this time by the article selection portion 15 and the articles which have been presented to the user due to the previous operations so as to store results of the calculations in the article information storage portion 18 (step S83).

Figure 28A:
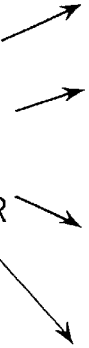
FIGS. 28A and 28B are diagrams showing examples of a set of articles selected by an article selection portion this time and a set of articles presented previously to the user in the system according to the first embodiment.
Figure 28B:

FIGS. 28A and 28B show examples of a set of articles selected by the article selection portion 15 this time and a set of articles presented at the previous operation.

In the foregoing case, articles A, B, C and D have been presented to the user at the previous operation, while articles E, F, G and H will be presented this time.

In the foregoing case, the calculations for obtaining similarity are performed such that 4×4=16 combinations, for example, a combination of article A and article E and that of article A and article F, are calculated.

A modification may be employed in which only articles satisfying a predetermined condition are made to be the subjects of the calculations for obtaining similarities.

If only the similarities of articles supplied from one information source are calculated in the cases shown in FIGS. 28A and 28B, the calculations for obtaining similarity of article E supplied from newspaper publishing company M this time are required to be performed with respect to only articles A and B supplied from newspaper publishing company M at the previous operation.

Another structure may be employed in the cases shown in FIGS. 28A and 28B, in which only articles each having a similarity with the user profile which is larger than a predetermined value are employed as the subjects of the calculations for obtaining similarities.

If only articles each having a similarity with the user profile of 0.8 or greater are made to be the subjects, only combination of article E and article A and that of article G and article A are required to be calculated.

Figure 29:
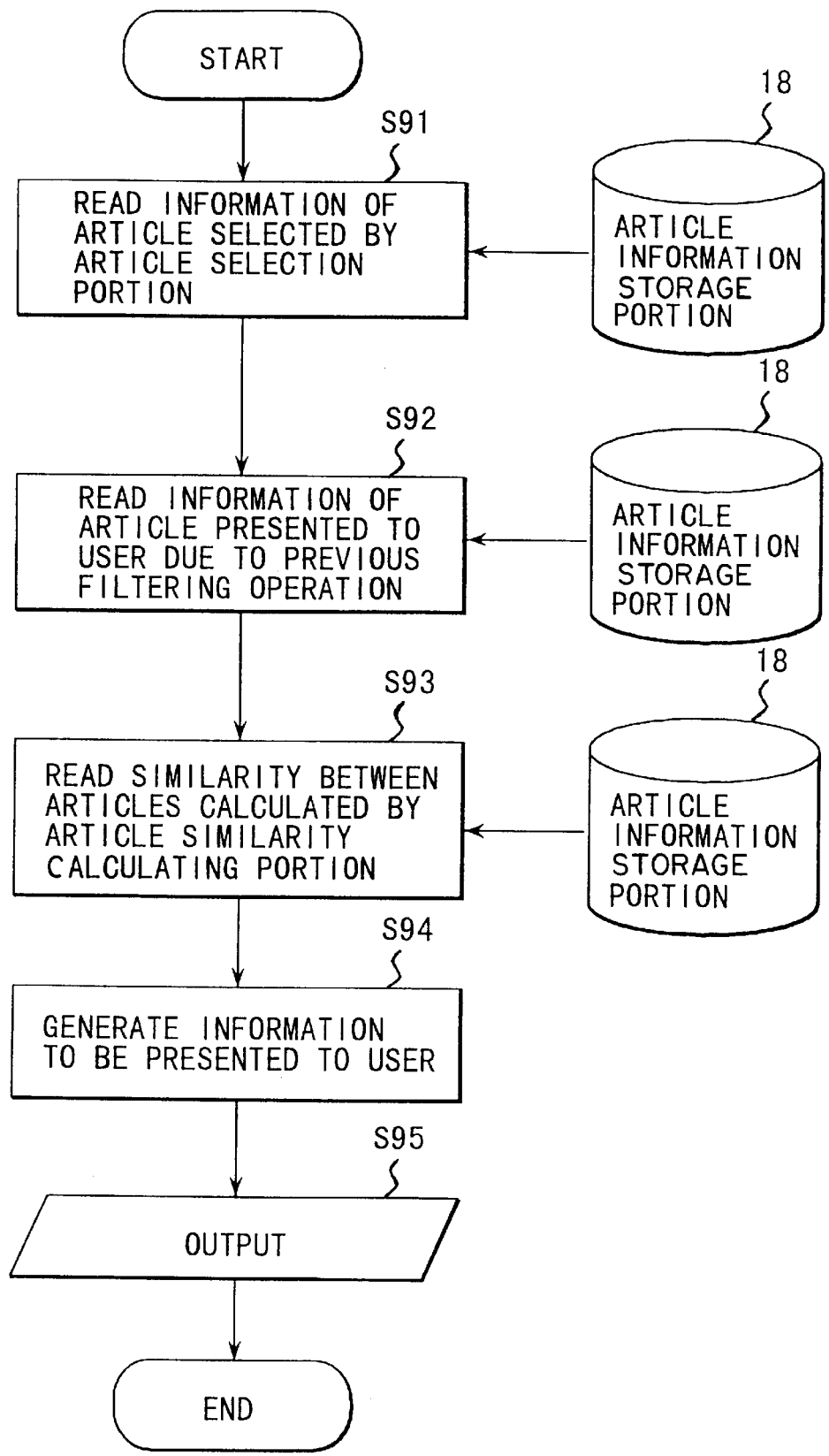
FIG. 29 is a flow chart showing a flow of presentation information generating process in the system according to the first embodiment.

FIG. 29 shows a flow of a process to be performed by the presentation information generating portion 17.

The presentation information generating portion 17 reads, from the article information storage portion 18, information of the articles selected by the article selection portion 15 this time, information of articles presented to the user until the previous operation and the similarity between articles calculated by the article similarity calculating portion 16 (steps S91 to S93). Then, information about the body of the article supplied this time is, together with information about of relevant articles supplied until the previous operation, presented to the user (steps S94 and S95).

Figure 31:
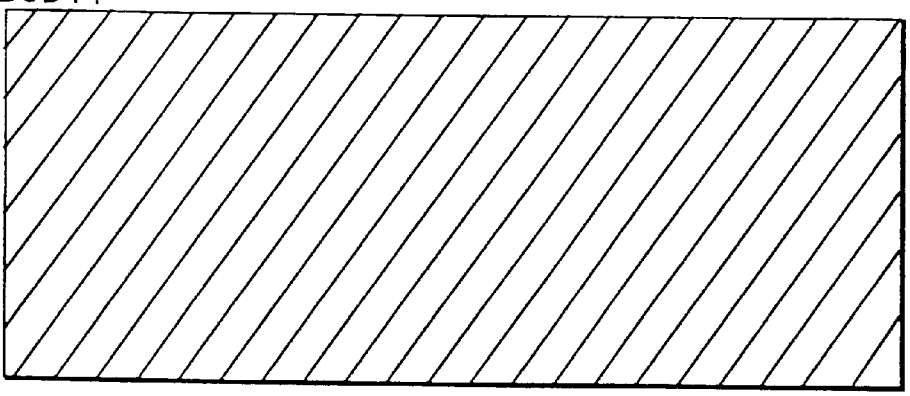
FIG. 31 is a diagram showing another example in which information of previous relevant articles is added to information of the article supplied this time in the system according to the first embodiment.

FIGS. 30 and 31 show examples in which information about the body is, together with information about the relevant articles supplied previously, presented.

In the example shown in FIG. 30, information of articles about a semiconductor and supplied until yesterday is, as added information, supplied in addition to information about the body as "semiconductor conference was . . . . ". Specifically, captions of articles supplied previously, information sources, the number of words and the similarity with the article presented this time are listed up.

In the foregoing example, an article of ○○ Times dated on the 15-th day is presented this time, while articles dated on the 14-th day and supplied from ○△ Times and ○○ Times are displayed as relevant articles supplied previously.

As shown in FIG. 31, information about articles as "Series: Semiconductor Friction (Part 1)" and "Series: Semiconductor Friction (Part 2)" supplied until yesterday from the newspaper publishing company ○○ is displayed in addition to information about the body of the article as "Series: Semiconductor Friction (Part 3)" presented this time.

FIGS. 21 and 23 showing the first embodiment also show modifications of the examples shown in FIGS. 30 and 31.

That is, also the foregoing system permits a user to make an access to the body of each relevant article supplied previously.

Although the examples shown in FIGS. 21 to 23 have the arrangement in which information about the body and added information are completely separated from each other, a structure may be employed in which information about the previous articles is included in information about the body.

FIG. 32 shows an example in which information about the relevant articles is included in information about the body of the article supplied this time.

In this example, a body of an article as "Earthquake XX off ○○ again activated" dated on the 19-th day is displayed. A portion of the first sentence as "Earthquake XX off ○○ of ○○ prefecture commenced on the 14-th day last month was . . . " is formed into a button which can be selected by a mouse or the like.

If a user selects the button, information about previous articles including information similar to the foregoing article is displayed.

FIG. 33 shows an example in which a list of previous articles considerably relating to the sentence is displayed in a case where the user has selected the first sentence.

In this example, captions of the articles dated on the 14-th day as "Earthquake occurred off ○○, magnitude 4", the information sources, the number of words and similarity with the article supplied this time are listed up.

FIG. 34 shows an example in which the body of the relevant articles as "Earthquake occurred off ○○, magnitude 4" is displayed in a case where the user has selected the relevant article above.

Another structure may be employed in which one or more bodies of the relevant articles are displayed as shown in FIG. 34 immediately after the user has selected the first sentence as shown in FIG. 32.

To perform a method in which information about the previous relevant articles is included in information about the body of the article supplied this time as shown in FIG. 32, similarity between each component of the article supplied this time and the previous articles is calculated in place of calculating the similarity between the article supplied this time and previous articles.

As the components of the body, paragraphs, sentences, clauses, phrases and words may be employed.

As a modification of this, also information about the previous relevant articles may be presented in the form of components of the body in place of the article unit.

For example, only the first paragraph may be displayed in place of displaying the overall body of the relevant article as shown in FIG. 34.

The arrangement in which an access from the article presented this time to the previous relevant articles is permitted enables the user to easily recognize the process of an event, the state of which is changed as a lapse of time and to easily obtain information about a plurality of articles, such as a serialized article.

Moreover, the foregoing structure is effective for the user to again confirm the contents of an article in a case where the user has recalled the previous article.

Second Modification of First Embodiment

Another example of the structure of the article similarity calculating portion 16 and that of the presentation information generating portion 17 will now be described.

Figure 35:
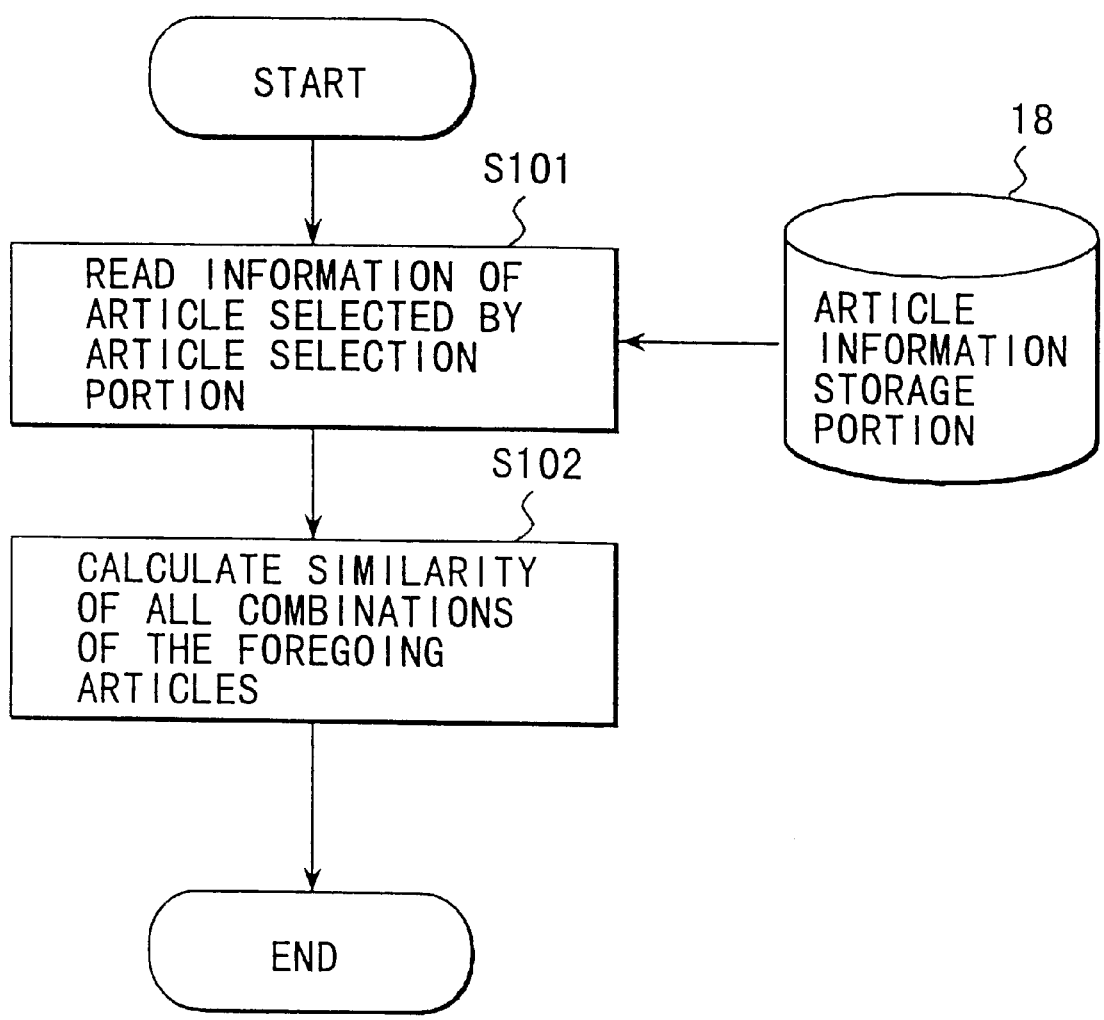
FIG. 35 is a flow chart showing another example of the flow of the article similarity calculating process in the system according to the first embodiment.

FIG. 35 shows a flow of a process to be performed by the article similarity calculating portion 16.

The article retrieval portion 14 calculates the similarity between the user profile and the article, that is, the article retrieval portion 14 uses the user profile as the retrieving formula to perform a usual retrieving operation in which the articles are subjects of the retrieval. On the other hand, the article similarity calculating portion 16 calculates the similarity between articles.

The calculations for obtaining the similarity are performed by subjecting expressions of articles shown in, for example, FIGS. 6 and 7 to a comparison. A result of the calculations is stored in the article information storage portion 18.

In this case, a combination of articles supplied this time is subject of the calculations for obtaining similarities among articles.

Although the similarities of all of the supplied articles may be calculated, a lower cost method will now be described in which only the similarities among the articles selected by the article selection portion 15 this time are calculated.

Although the similarities among the articles supplied this time are calculated similarly to the first embodiment, this modification is different from the first embodiment in which calculations of only articles supplied from different information sources are performed. This modification has no limitation above.

In the case where four articles have been selected by the article selection portion 15, the article similarity calculating portion 16 reads the articles from the article information storage portion 18 (step S101) to calculate the similarities of all of the combination of article A and article B, that of article A and article C, that of article A and article D and that of article B and article D (step S102).

A structure may be employed in which only articles meeting a predetermined condition are made to be the subjects of the calculations for obtaining similarities.

Figure 36:
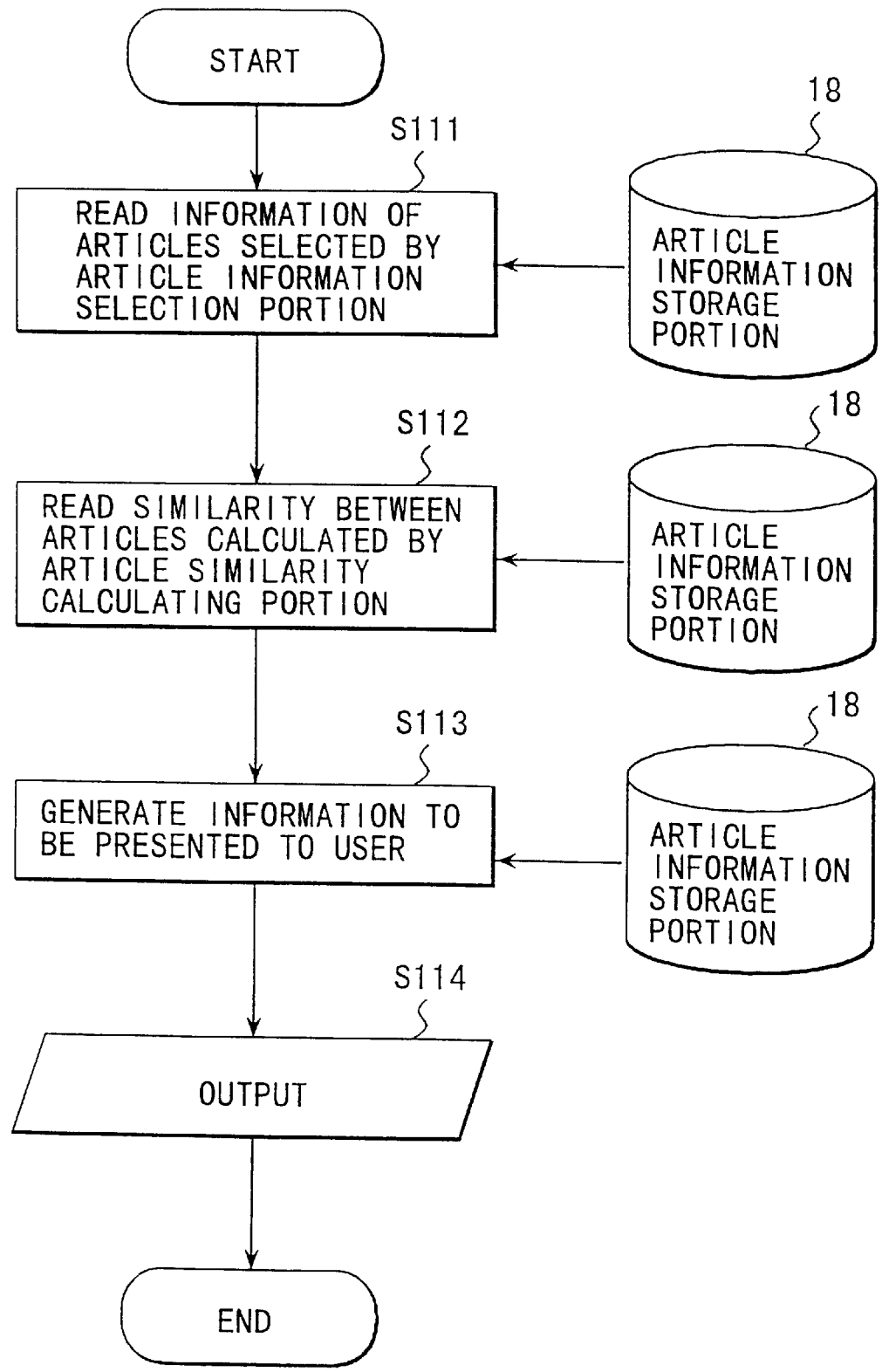
FIG. 36 is a diagram showing another example of the presentation information generating process in the system according to the first embodiment.

FIG. 36 shows a flow of a process to be performed by the presentation information generating portion 17.

The presentation information generating portion 17 reads, from the article information storage portion 18, information of articles selected by the article selection portion 15 and similarity between articles calculated by the article similarity calculating portion 16 (steps S111 and S112). The presentation information generating portion 17 presents, to the user, information about the body of the article supplied this time together with information of other relevant articles supplied this time (steps S113 and S114).

FIG. 37 shows an example in which information about the body of the article supplied this time is displayed together with information about the other relevant articles supplied this time.

In the foregoing example, information about articles relating to a semiconductor and dated on the 15-th day is supplied as added information in addition to information about the body of an article as "semiconductor conference" dated on the 15-th day. As a result, there arises a risk that the duplicated articles are unintentionally displayed as has been experienced with the first embodiment. In this case, a process for deleting duplicated articles employed in the first embodiment may be performed.

When information about the body of the article as "XX Corporation monopoly-controlled share of semiconductors" is read, the article as "Semiconductor Conference" is displayed in the area for added information, as shown in FIG. 38.

FIGS. 21 to 23 showing the first embodiment also show modifications of the structures shown in FIGS. 37 and 38.

That is, similarly to the first embodiment, a structure may be employed in which the user is permitted to make a direct access to the bodies of the relevant articles supplied today.

Reflection of Similarity Between Articles onto Presenting Order of Articles

Although the description has been performed about the addition of information about relevant articles when each article is presented to a user, the presenting order of articles to the user may be determined by using the similarity between articles supplied this time.

Figures 39A, 39B:
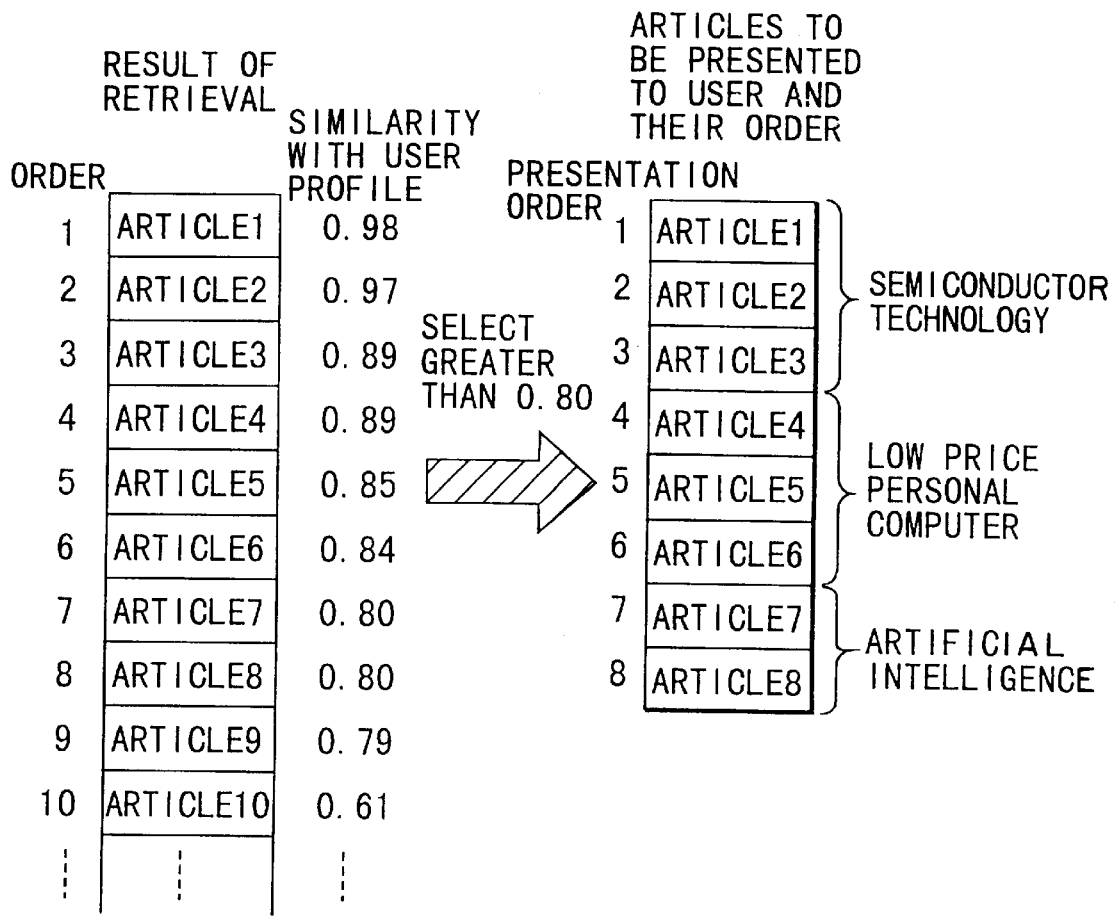
FIGS. 39A and 39B are diagrams showing an example in which similarities among articles is reflected on the article presenting order in the system according to the first embodiment.

FIGS. 39A and 39B show examples in which the similarity between articles is reflected on the article presenting order.

In this example, an assumption is performed that the user profile is a set of words relating to three different fields as "semiconductor technology", "low price personal computer" and "artificial intelligence".

When a retrieval is performed in accordance with the foregoing method, a result of retrieval in which words in three different fields are mixed is obtained, as shown in FIG. 39A.

When, for example, 8 upper cases or articles having a similarity of 0.80 with the user profile are selected and the selected articles are presented to the user in the selected order, the user sometimes and unintentionally reads the articles in the order as semiconductor, low price personal computer, artificial intelligence, semiconductor and low price personal computer.

Although there is sometimes a case where reading of articles having approximate similarities with the user profile is effective, it can be considered that collecting of similar articles and collectively display are easy for the user to understand as shown in FIG. 39B as in the foregoing case where articles in a plurality of fields mixedly exist.

In the foregoing example, three leading articles relate to the semiconductor, three ensuing cases relate to the low price personal computer and the two residual cases relate to the artificial intelligence.

As described above, the system according to the first embodiment has the structure such that the frequency vector or the like is used to compare the expression among articles so that the similarities among articles are calculated. In accordance with the similarities, relevant articles relating to the article to be presented to the user are determined. Information about the relevant articles is added to information about the body of the article to be presented to the user and supplied to the user. As the subjects the similarities of which are calculated, it is preferable that the articles presented this time or article supplied this time and previous articles are subjected to the calculations for obtaining similarities. As a result, the relationship among the articles presented this time and the relationship between the articles presented this time and articles presented due to the previous filtering operation can be made clear. Thus, the relevance of articles can be displayed to the user.

When existence of duplicated articles is examined by calculating the similarity between articles, the information about the body of the duplicated article is not presented to the user but only information of the caption of the duplicated article can be added as information about relevant articles so as to be presented to the user. As a result, a fact that articles about the same contents obtained from a plurality of different information sources are presented in the duplicated manner can automatically be prevented.

As a result, when a plurality of articles are presented to a user by performing an information filtering operation by one time, the relationship among articles can be cleared and presented to the user. Thus, it can be considered that the user is able to easily understand the articles.

Second Embodiment

A second embodiment of the information filtering system according to the present invention will now be described.

The overall structure of the system according to this embodiment is the same as that shown in FIG. 1. A user profile for each user is stored and the user profile is used to retrieve articles. The user profile is a retrieval condition with which articles meeting topics in which the user is interested are retrieved.

FIG. 40 is a conceptual view of the user profile according to the second embodiment.

In this example, a certain user A has selected two topics consisting of "semiconductor technology" and "semiconductor trade". Another user B has selected three topics as "semiconductor trade", "low price personal computer" and "artificial intelligence".

At this time, the user profile of the user A is composed of retrieving conditions for retrieving articles relating to the "semiconductor technology" and retrieving conditions for retrieving articles relating to the "semiconductor trade". Similarly, the user profile of the user B is composed of retrieving conditions for retrieving articles relating to the "semiconductor trade" and retrieving conditions for retrieving articles relating to the "low price personal computer" and retrieving conditions for retrieving articles relating to the "artificial intelligence".

Figure 41:
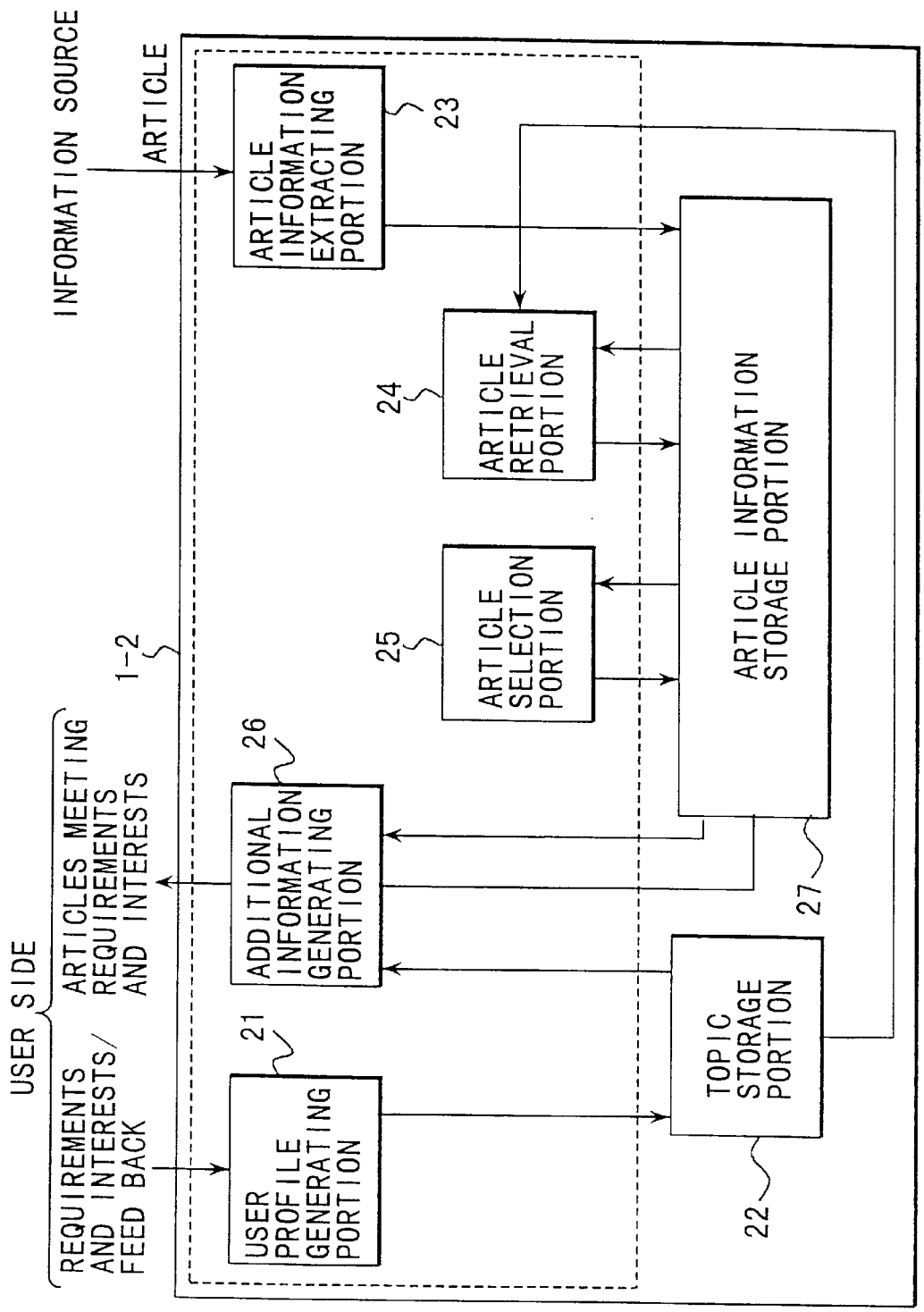
FIG. 41 is a block diagram showing the structure of an information filtering center in the system according to a second embodiment.

FIG. 41 shows the structure of an information filtering center 1-2 according to the second embodiment. As shown in FIG. 41, the information filtering center 1-2 comprises a user profile generating portion 21, a topic storage portion 22, an article information extracting portion 23, an article retrieving portion 24, an article selection portion 25, an added-information generating portion 26 and an article information storage portion 27. Among the components above, elements each surrounded by a dashed line, that is, the user profile generating portion 21, the article information extracting portion 23, the article retrieving portion 24, the article selection portion 25 and the added-information generating portion 26 can be realized by software which is executed by the central processing unit 14 shown in FIG. 1. The topic storage portion 22 and the article information storage portion 27 can be realized by the storage unit 5.

The user profile generating portion 21 is supplied with requirements and interests of each user. The requirements and interests of the user are expressed in the form of a natural language as "I want to read articles relating to ○○ and XX", a set of keywords allowed to frequently appear in a topic of interest, sets give priority order and/or weights or a retrieving formula for use in a usual document retrieval.

On the other hand, the user profile generating portion 21 performs a language process, such as extraction of words and development of synonyms to perform conversion into a format in which the retrieval is enabled so as to generate a user profile. The user profile for each user is stored in the topic storage portion 22.

The user profile generating portion 21 as well has a relevance feedback function in which it receives feedback from the user about a fact whether the articles supplied to the user were useful to modify the retrieving conditions to be employed in the topic storage portion 22 in such a manner that information about the feedback is reflected onto the modification process.

The article information extracting portion 23 receives articles supplied from information sources to subject the articles to analyze the morpheme, construction and format of each article so as to extract information relating to 5W1H, for example, the information source of the article, date, information about occurrence frequency of components of the document, such as characters, words and the like, and positions of appearance. The article information extracting portion 23 expresses the articles as a set of extracted information items. For example, the article information extracting portion 23 expresses the article with vectors, the component of which is the frequency of words allowed to appear or expresses the same by a 5W1H shape template into which realized values are substituted. Examples of expressions of the articles are the same as those according to the first embodiment shown in FIGS. 6 and 7.

The article information extracting portion 23 as well as performs an indexing process for realizing a quick retrieval of articles. Information of articles extracted by the article information extracting portion 23 is stored in the article information storage portion 27.

Referring to FIG. 42, a flow of a process to be performed by the article retrieving portion 24 will now be described.

The article retrieving portion 24 makes references to the conditions for retrieving the topics stored in the topic storage portion 22 and information about articles extracted by the article information extracting portion 23 to retrieve supplied articles that meet the topics. The foregoing operation corresponds to a calculation of the similarity between the topic and the supplied article. The similarity sometimes is, depending upon the method of the retrieval, formed into discrete values, such as "adapted to the topic" or "not adapted to the topic", or continuous values in such a manner that articles adapted satisfactorily have greater similarities. The description will hereinafter be made about the more usual case where the similarities are formed into continuous values.

The article retrieving portion 24 subjects each topic to the following process.

Initially, the article retrieving portion 24 substitutes 1 for variable i (step S121), and then fetches retrieving conditions of the i-th topic (topic 1) from the topic storage portion 22 (step S122). Then, the article retrieving portion 24 substitutes 1 for variable j (step S123), and then calculates the similarity between topic i (topic 1) and supplied article j (supplied article 1), followed by storing the similarity in the article information storage portion 27 together with information about the satisfied retrieving conditions (step S124). The calculations for obtaining similarities correspond to a usual retrieval process in which references are made to the expression of articles and retrieval indexes stored in the article information storage portion 18.

Then, the article retrieving portion 24 updates the value of the variable j by increasing it by one, and then determines whether the value of j is larger than the number of supplied articles (steps S125 and S126). If the value of j is not larger than the number of the supplied articles, the article retrieving portion 24 determines that articles, the similarities of which have not been calculated, remain, and, thus, repeats steps S124 to S126 until the value of j is made to be larger than the number of the supplied articles. When all of the supplied articles have been subjected to the calculations for obtaining the similarity with the topic i, the article retrieving portion 24 sorts the supplied articles in the descending order in terms of the similarity with the user profile to rank the articles (step S127). A result of the ranking operation is stored in the article information storage portion 27.

Then, the article retrieving portion 24 updates the value of the variable i by increasing it by one, and then determines whether the value of i is larger than the number of all topics (steps S128 and S129). If the value of i is not larger than the number of all topics, the article retrieving portion 24 determines that topics, the similarities of which have not been calculated, remain, and, thus, repeats steps S122 to S129 until the value of i is made to be larger than the number of all topics.

FIG. 43 is a conceptual view showing supplied articles with respect to the topics ranked by the article retrieving portion 24. Thus, the supplied articles are ranked in topic units.

Figure 44:
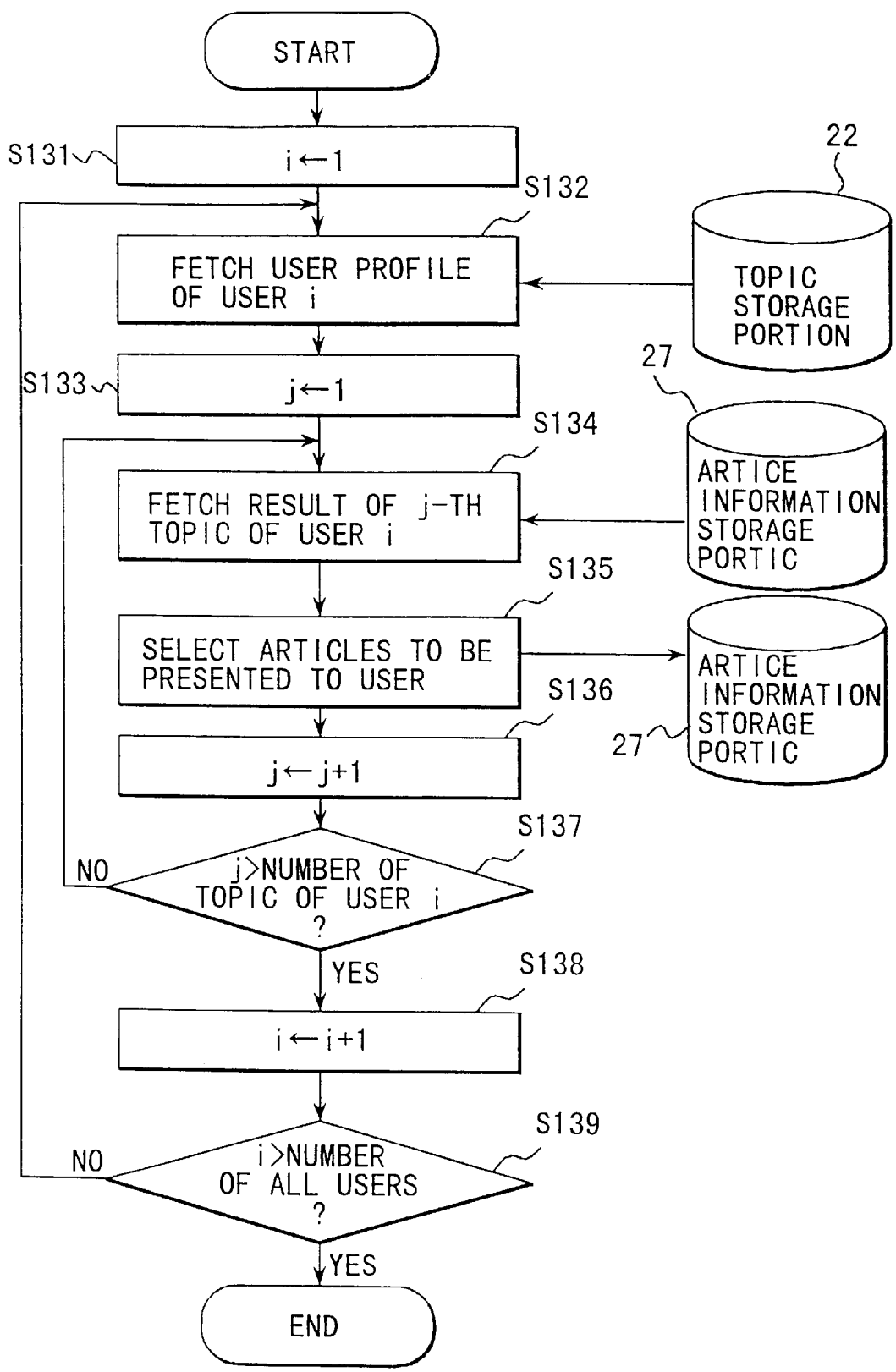
FIG. 44 is a flow chart showing a flow of an article selection process in the system according to the second embodiment.

FIG. 44 shows a flow of a process to be performed by the article selection portion 25.

The article selection portion 25 selects articles to be presented to each user from results of retrieval of the topics obtained by the article retrieving portion 24 and stored in the article information storage portion 27.

That is, the article selection portion 25 substitutes 1 for the variable i (step S131), and then fetches the user profile of user i (user 1) from the topic storage portion 22 (step S132). Then, the article selection portion 25 substitutes 1 for the variable j (step S133), and then fetches a result of retrieval of the topic j (topic 1) of the user i so as to select an article to be presented to the user (step S135). As a method of selecting the article, a method may be employed, for example, in which a number N of articles to be presented to the user is previously determined by the information filtering center 1-2 so as to present N upper ranked articles. Another method may be employed in which articles of a type having a similarity with the user profile which is larger than a certain threshold. Information of the selected articles is stored in the article information storage portion 27.

Then, the article selection portion 25 updates the value of the variable j by increasing it by one, and then determines whether the value of j is larger than the number of topics specified by the user i (steps S136 and S137). If the value of j is not larger than the number of the specified topics, the article selection portion 25 recognizes that results of retrieval of other topics which have not been selected remain, and, thus, repeats steps S134 to S137 until the value of j is made to be larger than the number of the topics of the user i. When articles with respect to all topics of the user i have been selected, the article selection portion 25 updates the value of the variable i by increasing it by one, and then examines whether the value of i is larger than the number of all users (steps S138 and S139). If the value of i is not larger than the number of all users, the article selection portion 25 recognizes that users, for which articles have not been selected, remain, and, thus, repeats steps S132 to S139 until the value of i is made to be larger than the number of all users.

As a result of the process above, a result of "semiconductor trade", that of "low price personal computer" and that of "artificial intelligence" are fetched for the user who has selected three topics, for example, "semiconductor trade", "low price personal computer" and "artificial intelligence", as shown in FIG. 45. From the upper articles, an article to be presented to the user is selected.

Figure 46:
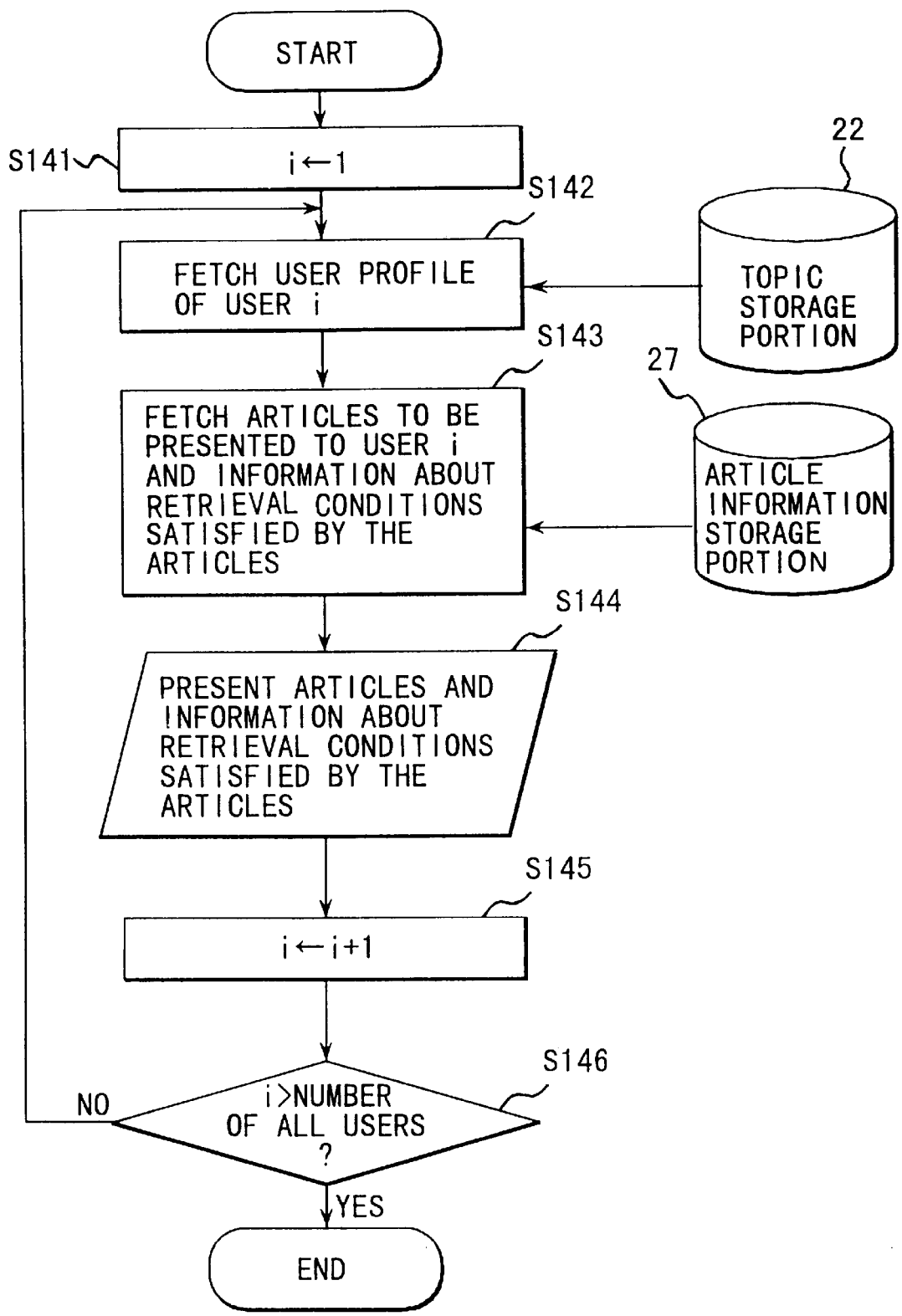
FIG. 46 is a diagram showing topics and an added information generating process in the system according to the second embodiment.

FIG. 46 shows a flow of a process to be performed by the added-information generating portion 26.

The added-information generating portion 26 performs the following process for all users.

Initially, the added-information generating portion 26 substitutes 1 for the variable i (step S141), and then fetches the user profile of the user i (user 1) from the topic storage portion 22 (step S142). Then, the added-information generating portion 26 fetches the articles selected by the article selection portion 25 so as to be presented to the user 1 and information about the retrieving conditions satisfied by the articles (step S143).

Information relating to the retrieving conditions satisfied by the article is information about the topic selected by the user and satisfied by the article and information about satisfied retrieving conditions. The retrieving conditions are conditions needed to be satisfied by the article, for example, the subject of the article or the subject of the action, and expressed by a Boolean expression or a natural language for use in a usual document retrieval or a format which can be processed by the article retrieving portion 24.

Then, the added-information generating portion 26 adds, to the article selected by the article selection portion 25, information relating to the retrieving conditions satisfied by the article to present the information item to the user i (step S144). The added-information generating portion 26 updates the value of variable i by increasing it by one, and then examines whether the value of i is larger than the number of all users (steps S145 and S146). If the value of i is not larger than the number of all users, the added-information generating portion 26 recognizes that users having no added-information remain. Thus, the added-information generating portion 26 repeats steps S142 to S146 until the value of i is made to be larger than the number of all users.

FIG. 47 shows an example of display formed by adding information of the topic satisfied by each article to the caption of the article selected by a certain user and presented to the user. An assumption is performed here that the user has selected three topics, "semiconductor trade", "low price personal computer" and "artificial intelligence".

In this case, six captions of articles are presented to the user such that three articles meet "semiconductor trade", two articles meet "low price personal computer" and one meets both of "semiconductor trade" and "low price personal computer".

Even if one article meets a plurality of topics as described above, the ground causing the article to be presented is displayed.

In the foregoing case, values of similarities between adapted topics and articles and calculated by the article retrieving portion 24 at the time of performing the retrieval are displayed at the ends of each line.

Since an article given number 6 meets two topics, it has two similarities consisting of a value of similarity with "semiconductor trade" of 1.05 and a value of similarity with "low price personal computer" of 0.80.

FIGS. 48A and 48B show examples in which the numbers of articles each of which has satisfied each topic are presented to the user shown in FIG. 47.

In the example shown in FIG. 48A, the numbers of articles which have satisfied each of the topics selected by the user are formed into a table so as to be presented to the user.

Since articles having numbers 1, 2, 3 and 4 shown in FIG. 47 meet "semiconductor trade", 4 is displayed as the number of articles. Similarly, articles having numbers 4, 5 and 6 shown in FIG. 47 meet "low price personal computer", 3 is displayed as the number of articles. Since no article exists that meets "artificial intelligence" in this case, 0 is displayed as the number of articles.

Since four articles meeting "semiconductor trade" and 3 articles meeting "low price personal computer" including one duplicated article, 6 is presented to the user as the number of articles.

As a modification of the foregoing example, the number of the articles meeting a plurality of topics may be individually counted as has been performed with the article having article No. 6 shown in FIG. 47.

In this case, the number of articles meeting, for example, "semiconductor trade" shown in FIG. 48B is three in terms of the number of the articles meeting only the foregoing topic.

In the example shown in FIG. 48B, information of the number of articles meeting the topics selected by the user is displayed in the form of a Venn diagram.

In this example, a fact is displayed in which three articles respectively having numbers 1, 2 and 3 shown in FIG. 47 meet only "semiconductor trade", two articles having numbers 4 and 5 meet only "low price personal computer" and the article having number 6 meets both of the two topics.

In this example, the relationship between the number of articles meeting the topics and the number of all articles can be made more clearly as compared with the example shown in FIG. 48A.

FIG. 49 shows an example of display presented to the user such that summaries, extractions or bodies of articles selected for a certain user are collected in each topic so as to be presented to the user.

The summary is a text formed in such a manner that the body of the original article is processed to enable the user to recognize the gist, while the extraction is a text which is a portion of the body of the original article and which has been extracted without any process.

In this example, three articles relating to "semiconductor trade" are lined up and first displayed, and articles relating to "low price personal computer" follow the foregoing articles.

As described above, topics to which the articles, to be presented to the user, adapt are displayed so that the user recognizes the contents of the articles and determines the articles to be read. Thus, the user is able to efficiently collect information.

FIG. 50 shows an example of display presented to the user such that information relating to the retrieving conditions satisfied by the article is added as header information of the body of the article.

In this case, a fact that the displayed article meets "semiconductor trade" among the topics selected by the user is displayed in the line of the "subject topic".

A fact that the similarity between "semiconductor trade" and the article is 1.32 is displayed below the "subject topic".

Moreover, retrieving conditions employed to retrieve the articles relating to "semiconductor trade" and conditions among the foregoing conditions that have been satisfied by the displayed article are lined up and displayed.

In the body shown in FIG. 50, a portion of the text is emphasis-expressed.

The emphasis-expression is display to be usually performed such that a portion of a text is emphasized as compared with other portions by using an additional symbol, such as an underline, a different font, a character having different size or different color.

In this example, an assumption is performed that the retrieving conditions set for retrieving articles meeting the topic "semiconductor trade" is a condition that "words, such as semiconductor, IC and procurement, are included in the body".

Since the article meets the foregoing condition, words "semiconductor", "IC" and "procurement" in the first sentence of the body are emphasized to clearly display the foregoing fact.

As a modification of this example, the word, for example, "IC" in the "caption of the article" may be emphasized.

As a result of the emphasis-expression above, the user is able to recognize the ground of the retrieval and presentation of the displayed article.

Since the text in the emphasized portion usually contains an important fact, it can be considered that the user is able to recognize the contents of the article by skimming through the article.

The foregoing fact improves the efficiency in performing an operation for determining the usefulness of the article presented for relevance feedback for example.

FIGS. 51A, 51B, 52 and 53 show examples in which the satisfied retrieving condition is emphasized in the article so that the usefulness of the article is efficiently determined.

FIG. 51A shows an example of a retrieving condition for retrieving article meeting a topic as "natural language process".

In this example, an article having the body containing language expressions as "natural language process", "NL", "machine translation" and "kana-kanzi conversion" has a high point.

If expressions as "natural language" and "analysis" are allowed to appear in one sentence, the article has a high point.

Moreover, various conditions for retrieving articles are written.

FIG. 51B shows an example of an article retrieved by using the retrieving conditions shown in FIG. 51A and presented to the user. Since the foregoing article meets the retrieving conditions as "a language expression as a natural language process is contained in the body", the expression "natural language process" in the article is emphasized. The portion of the sentence containing the emphasized expression "natural language process" is such that "this software does not use natural language process and simple character strings are used to perform the retrieval". Thus, the user is able to quickly understand that the foregoing article does not relate to the natural language process.

Since the user is able to determine that the foregoing article is not needed to be read, the user is able to collect information by reading only articles considered to be useful or efficiently perform relevance feedback.

Also FIGS. 52A and 52B show examples for quickly determining a fact that the article is not useful, similarly to FIGS. 51A and 51B.

In this example, English texts are retrieved. FIG. 52A shows conditions for retrieving a topic "artificial intelligence".

In this example, an article containing words "artificial and "intelligence" is arranged to be given a high point.

FIG. 52B shows an example of an article retrieved by using the retrieving conditions shown in FIG. 52A and presented to the user, in which a word "artificial" is emphasized.

The structure shown in FIG. 52B enables the user to skim through only a portion surrounding the emphasized word to instantaneously understand that the foregoing article relates to "artificial hand" and does not relate to "artificial intelligence".

Figures 53A, 53B:
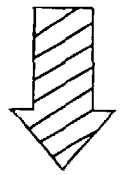
FIGS. 53A and 53B show another example in which the retrieving conditions satisfied in the system according to the second embodiment are stressed and displayed in the article.

FIGS. 51A, 51B, 52A and 52B show examples of displays of needless articles, while FIGS. 53A and 53B show examples of displays of useful articles.

FIG. 53A shows conditions for retrieving articles satisfying a topic "brand new personal computer", in which words to be retrieved in articles as expressions indicating the type of the personal computer exemplified by "note-type personal computer", "lap top" and "desk top" and names of manufacturers, such as ○○ corporation and ΔΔ corporation, are specified.

FIG. 53B shows an example of display of an article obtained by retrieval under the retrieving conditions shown in FIG. 53A and presented to the user.

Since "ΔΔ corporation" is emphasized, a fact can immediately be recognized that the manufacturer described in this article is not ○○ corporation but it is ΔΔ corporation.

Similarly, "note-type personal computer" is emphasized, a fact can immediately be recognized that the type of the personal computer put on the market is neither a lap top personal computer nor a desk top personal computer but it is a note-type personal computer. Also in the case where the presented article is useful for the user, it can be considered that the user is able to easily recognize the contents of the article.

The conditions for retrieving topics and the retrieving conditions satisfied by the article and presented to the user are shown in FIG. 50. Then, examples of displaying the retrieving conditions will now be described.

FIG. 54 shows a specific example of conditions for retrieving articles meeting the topic "semiconductor trade".

A condition shown in the first line is an example of a Boolean expression for use in a usual document retrieval, in which language expressions, such as "semiconductor", "trade" and so forth are combined by operators, such as AND and OR.

The condition on the second line shows a condition that language expressions "semiconductor" and "trade" appear in one sentence.

For example, a condition on the fourth line is a condition under which language expressions, such as "semiconductor", "memory" and "IC" appear in the character string of a caption of the article.

Information, for example, as shown in FIG. 55 is added to the article retrieved under the retrieving conditions shown in FIG. 54, presented to the user and arranged as shown in FIG. 50.

In this example, a fact is displayed that the article, which is being displayed, meets the topic "semiconductor trade". The conditions for retrieving the topic "semiconductor trade" shown in FIG. 54 are presented to the user as it is.

Moreover, conditions satisfied by the article are listed up in the portion below the topic retrieving conditions. Since language expressions, for example, "semiconductor" and "procurement" appear in the first sentence shown in FIG. 50, satisfied conditions "first sentence: semiconductor (one time) and procurement (one time) are displayed in the "retrieving conditions satisfied by article 1" shown in FIG. 55.

The expression "one time" indicates the number of appearances.

A fact that three language expressions "semiconductor", "IC" and "procurement" among the language expressions written on the line of the topic retrieving condition "word:" appeared in the article is displaced on the line "word:" of the "retrieving conditions satisfied by article 1".

Simultaneously, the positions of the language expressions and the number of appearances are displayed.

A Boolean expression "(semiconductor OR memory) AND (trade OR procurement)" on the first line of the topic retrieving condition is satisfied by the article shown in FIG. 50 because the article contains expressions "semiconductor" and "procurement". Therefore, the Boolean expression is displayed in the "retrieving conditions satisfied by article 1". Moreover, expressions "semiconductor" and "procurement" in the Boolean expression are emphasized.

FIG. 56 shows a modification of the example shown in FIG. 55.

In comparison to the example shown in FIG. 55 in which the topic retrieving conditions and the retrieving conditions satisfied by the article are individually displayed, the example shown in FIG. 56 shows an example in which the retrieving conditions satisfied by the article are included in the topic retrieving conditions.

In this example, words of satisfied conditions, such as "semiconductor" and "procurement" are emphasized.

As a result, a percentage of the conditions among the topic retrieving conditions and satisfied by the article can be schematically recognized.

As described above, the topic retrieving conditions which are being displayed and information of the retrieving conditions satisfied by the article are displayed so that the user is able to skim through the article or easily understand the contents of the article while determining the usefulness of the article.

Since the ground with which the article is retrieved and presented can be recognized by the user, it can be considered that the user is able to return more precise and effective information for relevance feedback to the information filtering service.

First Modification of Second Embodiment

As shown in FIG. 57, another example of the structure of the article retrieving portion 24 and that of the added-information generating portion 26 will now be described.

Initially, the article retrieving portion 24 substitutes 1 for variable i (step S151), and then fetches the conditions for retrieving the i-th topic (topic 1) from the topic storage portion 22 (step S152). Then, the article retrieving portion 24 substitutes 1 for variable j (step S153), and then calculates the similarity between the topic i (topic 1) and supplied article j (supplied article 1) to store the obtained similarity in the article information storage portion 27 (step S154). The similarity calculation corresponds to the usual retrieval process in which references are made to the expressions of articles and retrieving indexes stored in the article information storage portion 18.

The second embodiment is different from the example shown in FIG. 42 is that information relating to the retrieving satisfied by the articles is not required to be stored in the article information storage portion 27.

The reason for this lies in that the second embodiment has the structure such that information of the ground of presentation of the article which is being presented to the user is added to the article. This modification has the structure such that information of methods for other users to read the article is added to the article to be presented to the user.

Then, the article retrieving portion 24 updates the value of variable j by increasing it by one, and then examines whether the value of j is larger than the number of supplied articles (steps S155 and S156). If the value of j is not larger than the number of the supplied articles, the article retrieving portion 24 recognizes that articles, the similarities of which have not been calculated, remain. Thus, the article retrieving portion 24 repeats steps S154 to S156 until the value of j is made to be larger than the number of the supplied articles. After all of the supplied articles have been subjected to the calculations for obtaining the similarities with topic i, the article retrieving portion 24 sorts the supplied articles in the descending order in terms of the similarities with the user profile to rank the articles (step S157). A result of the ranking operation is stored in the article information storage portion 27.

Then, the article retrieving portion 24 updates the value of variable i by increasing it by one, and then examines whether the value of i is larger than the number of all topics (steps S158 and S159). If the value i is not larger than the number of all topics, the article retrieving portion 24 recognizes that topics, the similarities of which have not been calculated remain. Thus, the article retrieving portion 24 repeats steps S152 to S159 until the value of i is made to be larger than the number of all topics.

FIG. 58 shows a flow of a process to be performed by the added-information generating portion 26.

The added-information generating portion 26 performs the following process for all users.

Initially, the added-information generating portion 26 substitute 1 for variable i (step S161), and then fetches the user profile of user i (user 1) from the topic storage portion 22 (step S162). Then, the added-information generating portion 26 fetches, from the article information storage portion 27, articles selected by the article selection portion 25 so as to be presented to the user 1 and information about other users for receiving the foregoing articles (step S163).

Then, the added-information generating portion 26 adds information about other users who receive the articles selected by the article selection portion 25 to these articles to present the same to the user (step S164). Then, the added-information generating portion 26 updates the value of i by increasing it by one, and then examines whether the value of i is larger than the number of all users (steps S165 and S166). If the value of i is no larger than the number of all users, the added-information generating portion 26 recognizes that users having no added information remain and, thus, repeats steps S162 to S166 until the value of i is made to be larger than the number of all users.

An assumption is performed that information of articles and users who receive the articles is stored in the article selection portion 25, as shown in FIG. 59.

In this example, facts that articles 1 and 2 are presented to user 1 and that articles 2, 3 and 4 are presented to user 2 are described.

The added-information generating portion 26 adds and presents information about other users 3 and 4 who receive the article 1 when the article 1 is presented to the user 1. In a case where the number of users who receive the article 1 is presented, information representing that three users consisting of users 1, 3 and 4 exist is added or information representing that two users exist excluding the user 1 is added.

Similarly, when the article 2 is presented to the user 1, information about the users 2 and 4 is added and presented.

FIG. 60 shows an example of display in which information about other users who received the articles selected for a certain user is added to a list of captions of the selected articles.

In this example, the number of all users of the information filtering service is 4,000.

Thus, a fact that the number of users who received the article having number 1 is 250 can be understood.

FIG. 61 shows an example of display in which information about other users who received articles is added to a summary or an extraction of the articles selected for a certain user.

Similarly to FIG. 60, information of the number of users who have received the articles is displayed.

FIG. 62 shows an example in which information about other users who have received the article is added as header information of the body of the article and presented to the user.

As shown in FIG. 62, 250 users among 4,000 users has received the article which is being displayed.

FIG. 63 shows a modification of the example shown in FIG. 62.

In this example, the number of the users who received the article is itemized.

It can be understood that male users were 150 and female users were 100 among 250 users who have received the article which is being displayed. Among 250 users above, 200 users were Japanese users, 30 were U.S users and 20 were users in other countries.

Moreover, it can be understood that 180 users among 250 users are users who have selected the topic "semiconductor trade", 50 users are those who have selected the topic "IC" and 20 users are those who have selected both topics of "semiconductor trade" and "IC".

Moreover, statistical information, such as organizations to which the users belong respectively and years may be displayed to a degree that do not invade user's privacy.

As described above, if information of the number of other users who have received the article, which is being displayed, can be detected, the degree of generality of the article can be understood, that is, whether the article is a general article or an article which is read by special users can be understood. Thus, it can be considered that the user is able to determine the degree of usefulness of the article.

In a case where the user who has received information of the article as shown in FIG. 60 has not a sufficiently long time to read all of six articles, a method of use may be permitted to collect general and common information such that only the article having number 4 which has been read by many users is read.

FIG. 64 shows an example of display in which relevance feedback information performed previously by a certain user or another user is added to article information to be presented this time so as to be presented to the user.

In this example, four articles b1 to b4 have been supplied this time. The user determines the usefulness of all or a portion of the article to perform the relevance feedback.

If the user determines the article b1 to be unneeded and transmits information about this to the information filtering center 1, the information filtering center 1 lower the degree of priority of a topic, such as the article b1, to modify the user profile. Thus, articles meeting the requirement from the user can be presented by a larger number in the following operation.

FIG. 64 shows an example in which information about the determination of the usefulness previously performed by the user and information of determinations of usefulness performed by other users are presented as reference information for determining the usefulness.

In this example, 6 articles a1 to a6 were received by the user at the previous operation and their usefulness was determined such that the user has determined the article a1 to be useful and a3 to be unneeded.

As described above, the determination of the usefulness performed by a human being lacks consistency. Therefore, it can be considered that a user sometimes erroneously determines articles of the same type to be useful or sometimes determines the same to be somewhat useful.

Even if information about determinations lacking consistency is fed back to modify the user profile, more satisfactory filter cannot always be performed.

By permitting the user to access to information about the determinations of the usefulness performed by the user, it can be considered that reliability and efficiency in determining the usefulness this time can be improved. If the requirement from the user has changed as the time passes, a method may be employed in which the policy in determining the usefulness is consciously changed while making a reference to a result of the feedback performed by the user.

In the example shown in FIG. 64, information about determinations performed other users is displayed in addition to information about the determinations performed by the user.

For example, it can be understood that the article a1 has been received by 250 other users and its usefulness has been determined, resulting in that 100 users have determined the article to be useful, 100 users have determined the same to be somewhat useful and 50 users have determined the same to be unneeded.

As described above, the user is able to make a reference to information about the determinations previously performed by other users to furnish information when the user performs following determination. Moreover, the user is able to correct the determination of the usefulness performed previously to again perform the relevance feedback.

As a result, relevance feedback can be performed more reliably and efficiently.

A modification of the example shown in FIG. 64 is shown in FIG. 65.

In comparison to the example shown in FIG. 64 in which the user determines the usefulness with discrete values, such as "useful", "somewhat useful" and "unneeded", the example shown in FIG. 65 has an arrangement in which determination is performed with continuous points.

In the portion for information about determinations performed by other uses in the "information about previous relevance feedback", mean values of points given from other users are displayed.

For example, a method of use may be employed in which, in a case where the contents of the article b1 supplied this time has similar contents to that of the article a1 supplied previously, the user give a high point to the article b1 because 10-point was given by the user to the article a1 supplied previously.

When the line of the previous article a5 is observed, the user has given a low point of 1 and a mean value given by other users was a relatively high point of 7.4.

Thus, a method of use may be employed in which the user retracts the evaluation of the usefulness about the article a5 and again give an evaluation value.

As described above, the system according to the second embodiment has the structure such that the topic which has been selected by the user and to which the article which is being presented adapts can be displayed. That is, the retrieving condition satisfied by the article which is being displayed can be displayed. Therefore, the ground with which the article is presented can easily be understood by the user. Thus, the user is able to easily determine the usefulness of the article. Therefore, the relevance feedback function can be used more effectively in which information whether the articles supplied to the user were useful is fed back from the user to modify the retrieving conditions while reflecting the information item above upon the modification.

In place of the ground with which the article has been selected, the method with which the article, which is being presented, is read by other users is presented to the user so that the relevance feedback is performed while making a reference to the determinations performed by other users. Thus, the relevance feedback can effectively be used.

Third Embodiment

A third embodiment of the information filtering system according to the present invention will now be described. The system according to this embodiment has a similar structure to that shown in FIG. 1. The system holds a user profile for each user and uses the user profile to retrieve articles. As described above, the user profile is a set of retrieving conditions for retrieving articles adaptable to topics in which the user is interested.

Figure 66:
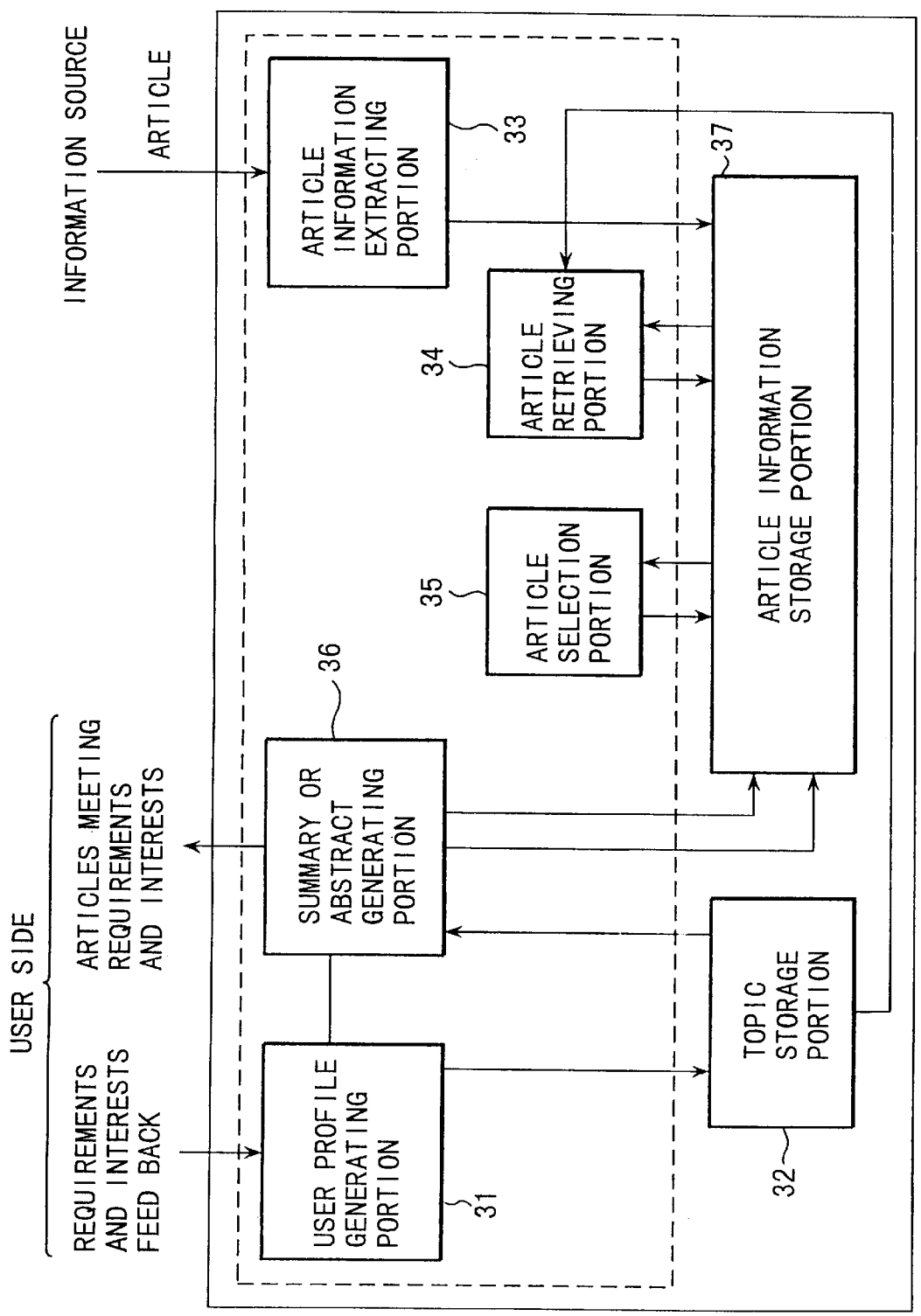
FIG. 66 is a block diagram showing an information filtering center provided for an information filtering system according to a third embodiment of the present invention.

FIG. 66 shows the structure of an information filtering center 1–3 according to the third embodiment. As shown in FIG. 66, the information filtering center 1–3 comprises a user profile generating portion 31, a topic storage portion 32, an article information extracting portion 33, an article retrieving portion 34, an article selection portion 35, a summary or abstract generating portion 36 and an article information storage portion 37. The elements surrounded by a dashed line, that is, the user profile generating portion 31, the article information extracting portion 33, the article retrieving portion 34, the article selection portion 35 and the summary or abstract generating portion 36 can be realized by software to be executed by, for example, the central processing unit 14 shown in FIG. 1. The topic storage portion 32 and article information storage portion 37 can be realized by the storage unit 5.

The user-profile generating portion 31 receives requirements and interests from each user. The requirements and interests of the user are expressed in a natural language as "I want to read articles about ∘∘ and XX", or in the form of a set of keywords of frequent occurrence in the topic of interest, the keywords given a priority order or weighted or by a retrieval equation for use in a usual document retrieval operation.

The user-profile generating portion 31 performs language processes, such as extraction of a word and development of a synonym. Then, the user-profile generating portion 31 performs conversion into a format that can be retrieved to generate a user profile. The generated user profile is, for each user, stored in the user-profile storage portion 32.

The user profile generating portion 31 as well as has a relevance feedback function in which it receives feedback from the user about a fact whether the articles supplied to the user were useful to modify the retrieving conditions to be employed in the topic storage portion 32 in such a manner that information about the feedback is reflected onto the modification process.

FIG. 67 shows an example of the user profile expressed by keywords and their weights.

Since the user is interested in articles relating to semiconductors in this example, relative words, such as "memory" are listed up and each word is given a weight for use in performing the calculations for obtaining similarity.

The article-information extraction portion 33 receives articles supplied from the information source to subject the articles to a morpheme analysis, construction analysis and format analysis so as to extract the information source, date of the article, frequency information of the components of the document, such as characters and words, position of appearance and information relevant to 5W1H. Then, the article-information extraction portion 33 expresses the article as the set of the extracted information items. For example, the article is expressed by a vector, the component of which is the frequency of words allowed to appear, or by a 5W1H template having substituted apparent values. The article-information extraction portion 33 as well as performs in indexing process for quickly retrieving articles. Information of articles extracted by the article information extracting portion 33 is stored in the article information storage portion 37.

The article retrieving portion 34 makes references to the topic retrieving conditions stored in the topic storage portion 32 and information about articles extracted by the article information extracting portion 33 to retrieve supplied articles that meet the respective topics. The foregoing operation corresponds to an operation for calculating the similarity between the topic and the supplied article. The similarity may be in the form of a discrete value such that "the article meets the user profile" or "the article does not meet the user profile" depending upon the method of the retrieval, or in the form of continuous values in such a manner that articles satisfactorily meeting the user profile are given higher similarly values. The description will be made about the usual case where the similarity is in the from of continuous values. In this case, the process to be performed by the article retrieving portion 34 for each topic is similar to that according to each of the first and second embodiments. Initially, the article retrieving portion 34 reads, from the topic storage portion 32, the conditions for retrieving articles adaptable to the topic. Then, the article retrieving portion 34 calculates the similarity between each of the supplied articles and the topic. The calculations for obtaining similarities corresponds to a usual retrieving process in which references are made to the expressions of the articles and retrieving indexes stored in the article information storage portion 37. The similarities of the articles and information about the retrieving condition satisfied by the article are stored in the article information storage portion 37.

After the similarities of all of the supplied articles have been calculated, that is, after the process for retrieving all of the supplied articles has been completed, the supplied articles are sorted in the descending order in terms of the similarities with the topic. That is, the articles are ranked. Also a result of the ranking operation is stored in the article information storage portion 37.

The article selection portion 35 selects articles from the result of retrieval of each topic stored by the article retrieving portion 34 in the article information storage portion 37, the article being selected to be presented to each user. Three results of retrievals, a result of retrieval of "semiconductor trade", that of "low price personal computer" and that of "artificial intelligence" are fetched for a user who has selected three topics "semiconductor trade", "low price personal computer" and "artificial intelligence". Among upper articles, articles to be presented to the user article selected.

Figure 68:
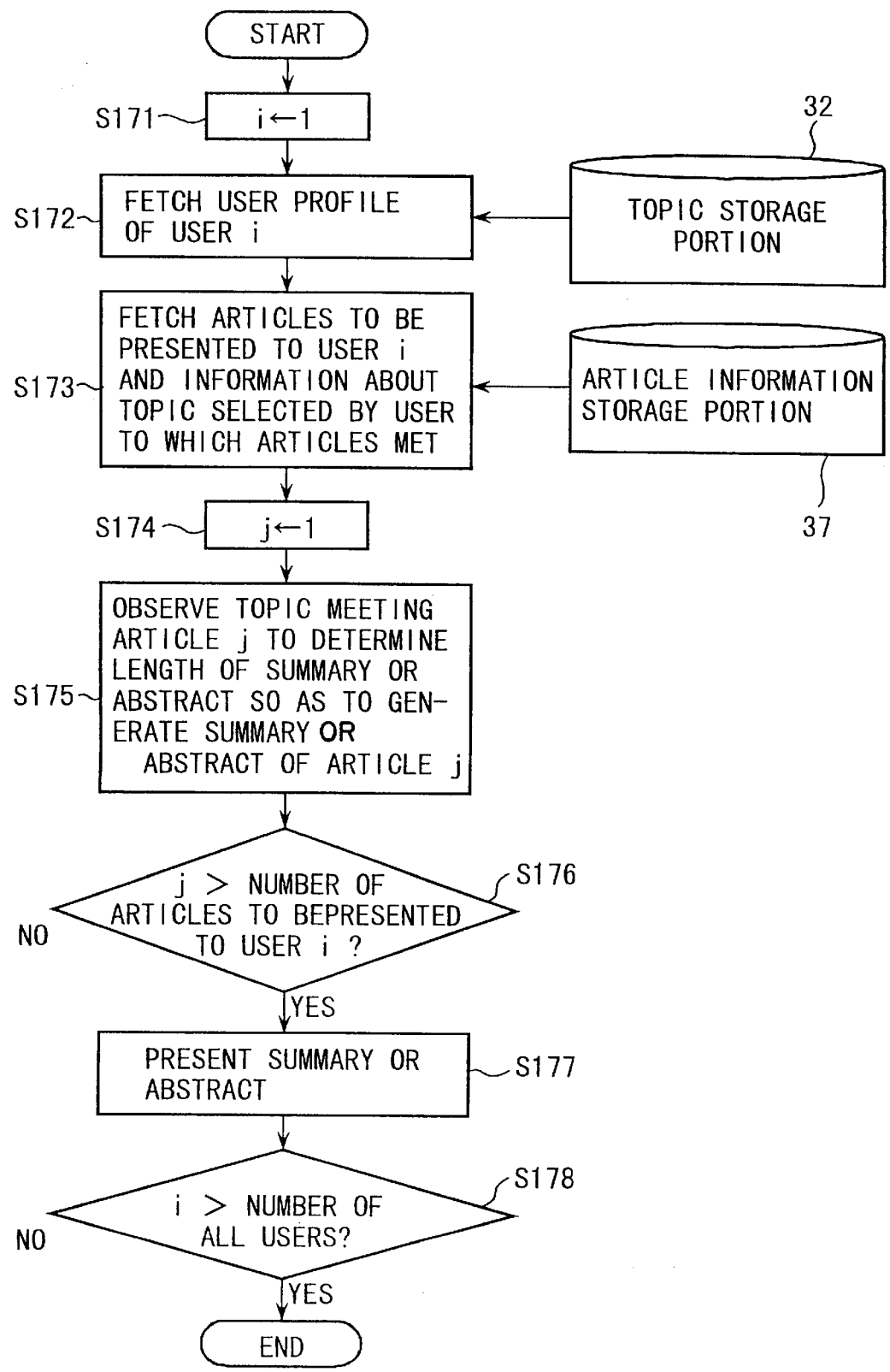
FIG. 68 is a flow chart showing a flow of a summary or abstract generating process in the system according to the third embodiment.

FIG. 68 shows a flow of a process to be performed by the summary or abstract generating portion 36.

The summary or abstract generating portion 36 performs the following process for each user.

Initially, the summary or abstract generating portion 36 substitutes 1 for variable i (step S171) to fetch the user profile for the user i (step S172). Then, the summary or abstract generating portion 36 fetches, from the article information storage portion 37, a set of articles to be presented to the user i and information of the topics satisfied by the articles. The summary or abstract generating portion 36 substitutes 1 for variable j to generate a summary or an abstract having a length corresponding to the satisfied topic while making a reference to information about the satisfied topic (step S175).

The "summary" is a text of a type generated to plainly express the subject of the article and formed from the original, while the "abstract" is an extraction of a portion of the original article, such as an important text.

The length of the summary or the abstract is a compression ratio with respect to the original, the number of sentences, the number of paragraphs, the number of characters or a percentage with respect to the overall body of the text to be presented.

The method of generating the summary or the abstract according to the third embodiment is not limited particularly if the selected method is able to adjust the length into two steps or more.

For example, an automatic summary generating technology using a natural language analysis may be employed or a simply method may be employed in which only the first paragraph is displayed or the overall body is displayed.

Then, the summary or abstract generating portion 36 examines whether the current value of j is larger than the number of articles to be presented to the user i (step S176). If the value of j is not larger than the number of the articles, the summary or abstract generating portion 36 determines that articles which have not been subjected to the summary or abstract generating process remain. Thus, the summary or abstract generating portion 36 repeats steps S175 and S176 until the value of j is made to be larger than the number of articles to be presented to the user i.

Then, the summary or abstract generating portion 36 presents the summary or the abstract of the subject article to the user i (step S177). Then, the summary or abstract generating portion 36 examines whether the current value of i is larger than the number of all users (step S178). If the current value of i is not larger than the number of all users, the processes in steps S172 to S178 are repeated until the value i is made to be larger than the number of all users.

A procedure for generating the summary or the abstract having the length corresponding to the topic satisfied by the article will now be described with reference to the drawings.

FIG. 69 shows topics selected by a certain user and their degrees of priority.

In this example, four topics, A, B, C and D have been selected by the user to require articles relating to the selected topics. The topics are given priorities in the descending order as topics A, B, C and D.

The degree of the priority may be determined by the information filtering center 1 or specified by the user. Assuming that the degree of the priority is specified by the user, it can be said that the user is interested in articles satisfying the topic A as compared with the articles satisfying the topic B.

FIG. 70 shows examples of a list of articles to be presented to the user who has selected the topics shown in FIG. 69 and topics satisfying the same.

In this case, four articles having numbers 1 to 4 have been selected for the user. The articles 1 and 2 satisfy the topic A, the article 3 satisfies the topic B and the article 4 satisfies the topics C and D.

Figure 71:
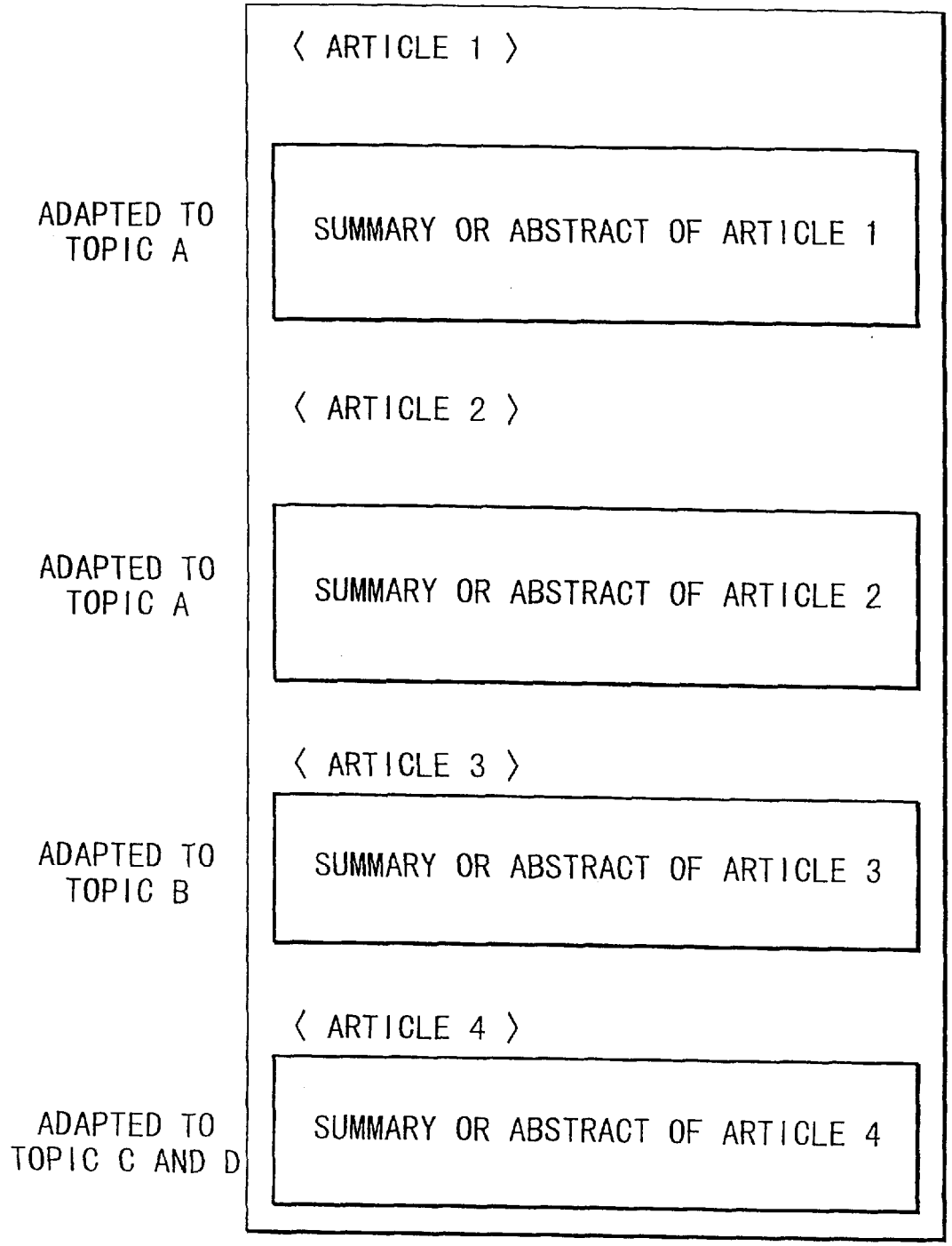
FIG. 71 is a conceptual view showing information of articles to be presented to the user in the system according to the third embodiment.

FIG. 71 is a conceptual view showing information of articles to be presented to the user in the case shown in FIG. 70.

Since the articles 1 and 2 satisfy the topic A having the highest priority among the topics selected by the user, a relatively long summary or an abstract is presented. On the other hand, the article 4 satisfies the topics C and D having the lowest priority among the topics selected by the user, a very short summary or abstract is presented.

As described above, the length of the abstract is changed to correspond to the priority of the topic.

Although the length of the summary or the abstract is expressed by the area shown in FIG. 71, the summary or the abstract of the article satisfying the topic having the highest priority is not always longest.

An assumption is performed that a compression ratio corresponding to the number of sentences of the original is employed and the original of the article 1 consists of 5 sentences and the original of the article 4 consists of 20 sentences.

When the article 1, which is an article of the topic A having high priority, is displayed with a compression ratio of 100%, and the article 4, which is an article of the topic C and D having low priority, is displayed with a compression ratio of 50%, the abstract of the article 1 consists of 5 sentences because the original is employed as it is. On the other hand, the abstract of the article 4 consists of 10 sentences.

As a result of the foregoing function, the user is able to read articles with different detail degree for each topic.

It can be considered that the foregoing structure is effective in a case where topics have clear priority differences.

Relevance Feedback

The relevance feedback is one of technologies for retrieving documents such that a user determines the usefulness of documents, which is the result of the retrieval, to change the weight of each word in the retrieving expression by using the result of the determination so as to retrieve documents more approximate the documents required by the user.

Also in the information filtering industrial field, the foregoing function can substantially be realized.

In this embodiment, information about the result of the determination of the usefulness obtainable when the relevance feedback is performed can be reflected on the length of the summary or the abstract.

An assumption is made that the user returns information that "article 3 was very useful" in response to information presented as shown in FIG. 71.

Another assumption is made that the priorities of topics shown in FIG. 70 are defined with the values of importance as shown in FIG. 72.

Since the article 3 determined by the user to be very useful is an article satisfying the topic B, it is effective to perform display such that the value of importance of the topic B is enlarged by any calculation method to lengthen the article satisfying the topic B.

FIG. 73 shows an example of information of articles to be presented to a user at a next filtering operation in a case where a feedback of the foregoing type has been performed.

Although the topic A has the highest priority in the example shown in FIG. 71, the topic B has the highest priority due to the feedback in the case shown in FIG. 73. Thus, the summary or the abstract of article 1' satisfying the topic B is the longest text.

First Modification of Third Embodiment

Another example of the structure of the summary or abstract generating portion 36 will now be described.

FIG. 74 shows a flow of a process to be performed by the summary or abstract generating portion 36 according to this modification.

The summary or abstract generating portion 36 performed the following process for each user.

The summary or abstract generating portion 36 fetches the user profile of the user i from the topic storage portion 32 (steps S181 and S182). Then, the summary or abstract generating portion 36 fetches, from the article information storage portion 37, a set of articles to be presented to the user i, and attribute information including date previously added to each article, newspaper publishing company, morning issue/evening edition, the size of the caption, the number of lines, the page having the article (step S183). While making a reference to information of the attribute, a summary or an abstract of each article to be presented to the user i is generated corresponding to the length of the attribute (step S185). The "summary", "abstract" and "length" respectively have the same meanings as those according to the third embodiment. Moreover, a similar process to that according to the third embodiment is performed.

Then, the procedure for generating the summary or the abstract having the length corresponding to the attribute of the article will now be described with reference to the drawings.

FIG. 75 shows an example of an article selected by the article selection portion 35 so as to be presented to a certain user. In this example, information of date, such as the date of publication, is employed as the attribute to be previously added to the article.

Articles 1 to 4 respectively are dated on 26, 23, 23 and 20-th day of May.

In a service of a type, for example in which information for one week is collectively supplied, there is a possibility that new and former articles exist mixedly.

FIG. 76 is a conceptual view showing information of articles to be presented to the user in the case shown in FIG. 75.

In this example, articles dated more currently have a longer summary or an abstract.

For example, the article 1 dated on the 26-th day of May is displayed in detail, while the article 4 dated on the 20-th day of May is displayed simply.

Similarly, the length of the summary or the abstract may be changed to correspond to information of the time when the article has been supplied to the information filtering center and information whether the newspaper is morning issue or the evening edition.

A day of the week may be employed as the attribute in terms of the time to perform a process such that articles on Monday are displayed in detail as compared with those on other days.

Figures 77, 78:
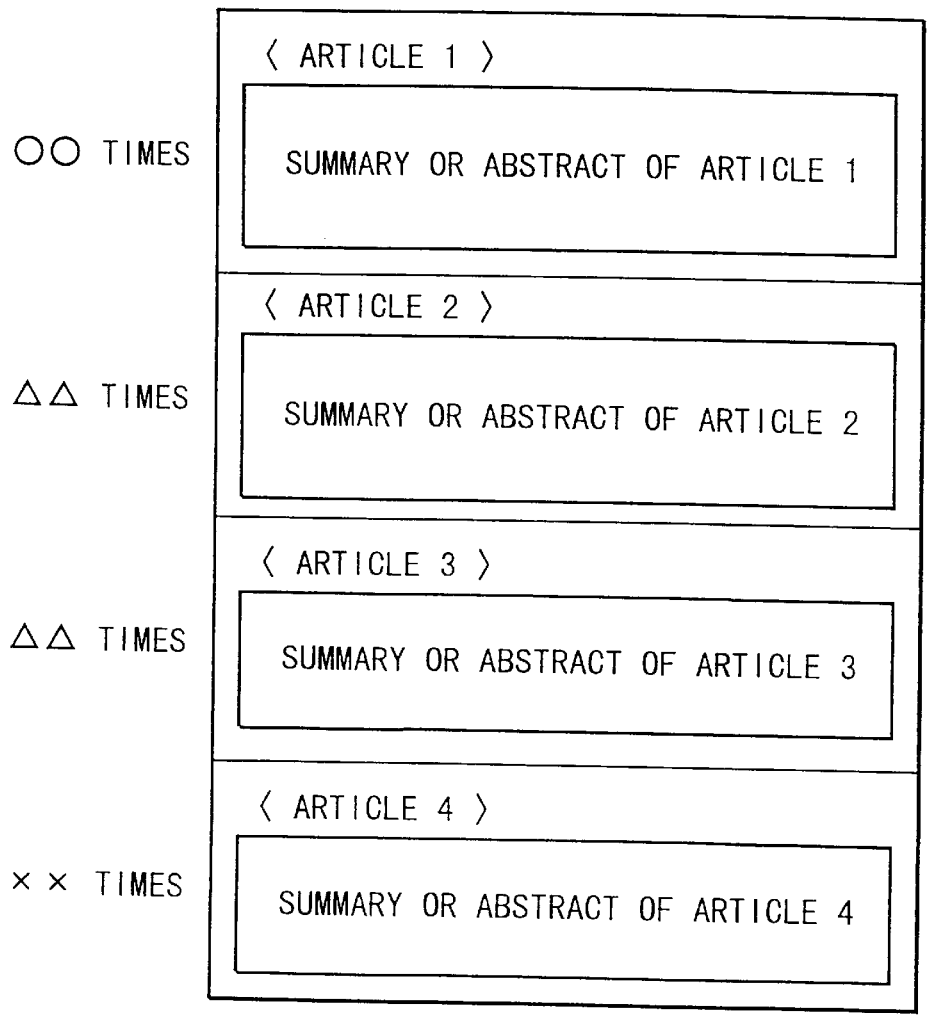
FIG. 77 is a diagram showing examples of articles selected to be presented to the user in a case where newspaper publishing companies have been employed as attributes in the system according to the third embodiment.
FIG. 78 is a diagram showing articles to be presented to the user in the case shown in FIG. 77 in the system according to the third embodiment.

FIG. 77 shows an example of articles selected so as to be presented to a certain user in a case where newspaper publishing company is selected as the attribute.

In this example, the article 1 has been supplied from ○○ Times, the articles 2 and 3 have been supplied from ΔΔ Times and the article 4 has been supplied from XX Times.

If the user or the information filtering center has determined the priority order as ○○ Times, ΔΔ Times and XX Times, for example, information as shown in FIG. 78 is presented to the user.

Since the article 1 is an article of ○○ times given the highest priority, a long summary or abstract is presented. On the other hand, since the article 4 is an article of XX Times given the lowest priority, a short summary or abstract is presented.

Although the newspaper publishing company has been described as the attribute, the length of the summary or the abstract may be changed to correspond to various attributes, such as the page, position and category, which have been given by the publishing side of each article.

Relevance Feedback

Similarly to the third embodiment, this embodiment enables information for determining the usefulness obtainable when the relevance feedback is performed to be reflected on the length of the summary or the abstract.

An assumption is made that a user has returned information "articles 2 and 3 were very useful" in response to the information item presented as shown in FIG. 78.

Since both of the articles 2 and 3 have the attribute as "ΔΔ Times", it is sometime effective that the value of importance of ΔΔ Times is enlarged by any of calculation processes to elongate the articles satisfying ΔΔ Times.

FIG. 79 shows an example of information of articles to be presented to the user due to next filtering in the case where the feedback of the foregoing type has been performed.

Although ○○ Times has the highest priority in the case shown in FIG. 78, the example shown in FIG. 79 has a structure such that article 1' having the attribute ΔΔ Times has the longest summary or the abstract.

As described above, the system according to the third embodiment has the structure such that a summary or abstract having a length corresponding to the type of an article (the retrieving conditions, such as topics, satisfied by the article or the attribute of the article, such as the data of publication) is generated so as to be presented to a user. Therefore, a percentage of useful text information for the user is enlarged in the text to be presented to the user. As a result, information collection can efficiently be performed.

Fourth Embodiment

An information filtering system according to a fourth embodiment of the present invention will now be described. Since the overall system structure is the same as that according to the first embodiment, structures different from the first embodiment will now be described.

Although the article similarity calculating portion 16 shown in FIG. 3 performs the article similarity calculating process shown in FIG. 14, the calculations for obtaining the similarity between certain articles i and j are performed by using the following equation:

$$Sij=|Ci \cap Cj|/(|Ci \cup Cj|) \tag{1}$$

where Ci is a set of different words contained in article i, Cj is a set of different words contained in article j, |A| means to obtain the number of elements in set ∩, n is to obtain a set of common elements between sets and ∪ is to obtain a union set. In this case, similarity Sij between the article i and the article j is the ratio of duplicated words among articles.

As a modification of the equation for obtaining the similarity, for example, the following equation may be employed.

$$Sij=|Ci \cap Cj| \tag{2}$$

$$Sij=|Ci \cap Cj|/(|Ci||Cj|)^{1/2} \tag{3}$$

$$Sij=|Ci \cap Cj|/(|Ci|+|Cj|-|Ci \cap Cj|) \tag{4}$$

$$Sij=2 \cdot (xi \cdot xj)/(xi \cdot xi+xj \cdot xj) \tag{5}$$

$$Sij=xi \cdot xj \tag{6}$$

$$Sij=xi \cdot xj/\{(xi \cdot xi)(xj \cdot xj)\}^{1/2} \tag{7}$$

$$Sij=(xi \cdot xj)/(xi \cdot xi+xj \cdot xj-xi \cdot xj) \tag{8}$$

In the modification of the equation for obtaining the similarity, xi and xj are frequency vectors respectively contained in the articles i and j.

Although all words in the articles are made to be the subjects, limitation to words of plural types of parts of speech. For example, the similarity may be obtained by limiting the parts of speech to noun and verb.

In the calculations for obtaining the similarity between articles, the similarity is obtained in each field on the format, such as the caption and the first sentence; and the weighted mean of the similarities is defined as the similarities among articles. In this case, the similarity corresponding to Equation 1 is as follows:

$$Sij = \sum_f Wf \cdot Sfij \tag{9}$$

$$Sfij = |Cfi \cap Cfj|/(|Cfi \cup Cfj|) \tag{10}$$

where Cfi is a set of words contained in field f and Cfj is a set of words contained in field f of article j.

The caption, a space existing in the leading portion of the document, such as the first sentence, the first paragraph, information of the indent, existence of the punctuation can be used to detect the field. Equations 2 to 8 may be modified similarly.

A modification may be employed in which After the similarity has been calculated numerically, a process for checking information of the construction may be provided to be performed after the similarity has been obtained numerically so as to prevent articles having a similarity greater than a certain threshold from being made to be similar articles. For example, in a news paper, the subject of the first sentence (specifically, a proper noun near the verb) is an important factor. If the subjects are different from each other between articles, the articles are not treated as similar articles.

Figure 80:
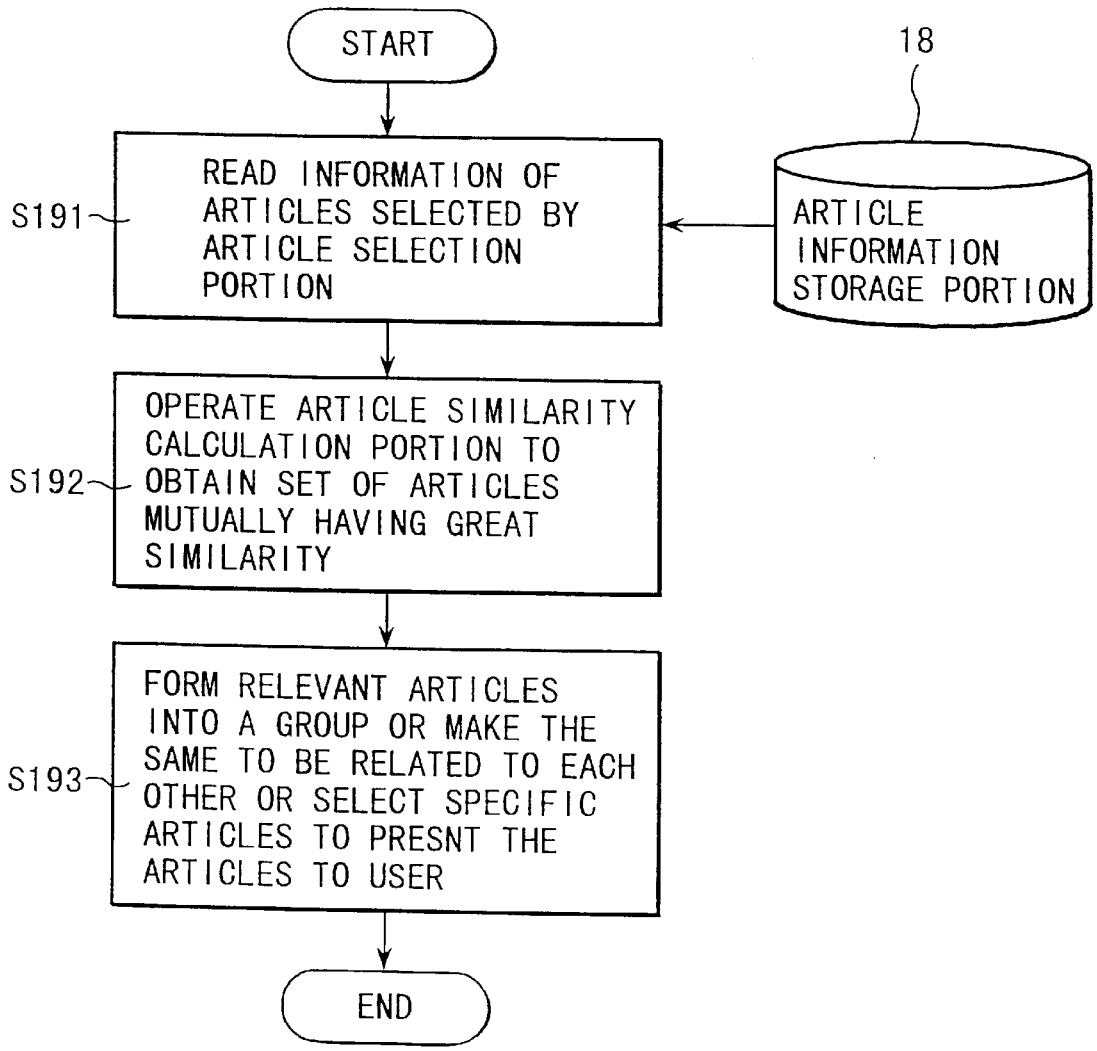
FIG. 80 is a flow chart showing a flow of a presentation information generating process in the system according to a fourth embodiment.

Referring to FIG. 80, a process for generating information to be presented which is performed by a presentation information generating portion 17 shown in FIG. 3 will now be described.

Although the first embodiment has the structure such that an article is selected from a set of duplicated articles so as to be presented to a user in order to prevent presentation of duplicated articles, this embodiment has the structure such that relevant articles are formed into a group or made to be related to each other so as to be presented to the user.

That is, information of articles selected by the article selection portion 15 is read from the article information storage portion 18 (step S201). Then, the article similarity calculating portion 16 uses the foregoing equation to perform calculations for obtaining the similarities among selected articles to obtain a set having considerable similarity (step S202). An output control is performed such that the relevant articles are formed into groups, made to be related to one another or specific articles are selected so as to be presented to the user (step S203).

The process for forming articles into groups means a process for arranging output lists of articles so that relevant articles are lined up so as to be presented to the user. The process for making the articles to be related to one another is exemplified by a process in which information for linking a certain article and articles relating to the certain article is used to generate a hyper text so as to be presented to the user. The process for selecting specific articles is performed such that one or plural articles are selected from relevant articles so that only the selected articles are presented to the user.

By performing the process for forming articles into a group or by making the same to be related to one another, a problem in that relevant text articles are supplied to the user while being out of order, that is, disconnected. Therefore, the user is able to efficiently arrange and read relevant articles.

Fifth Embodiment

Figure 81:
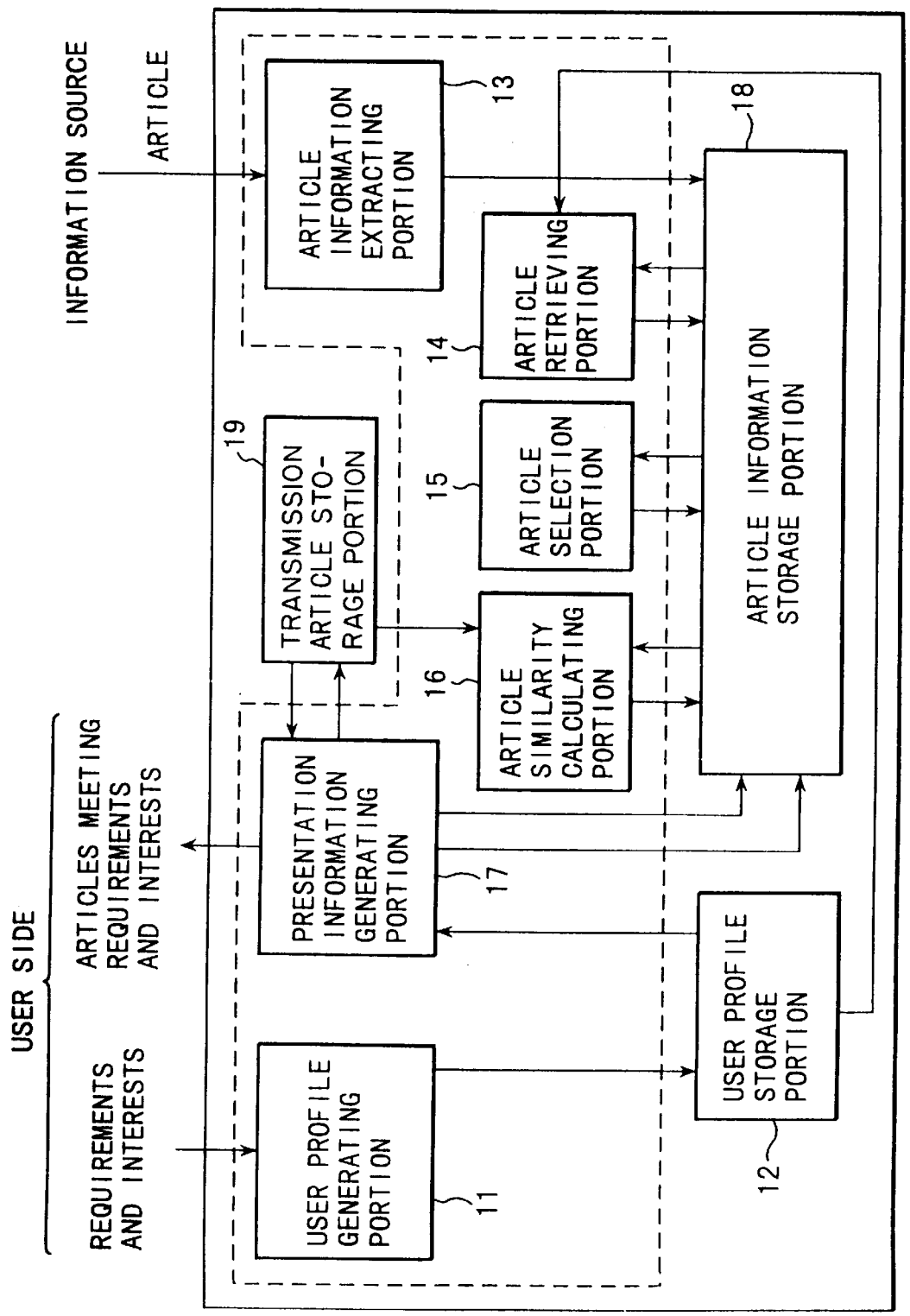
FIG. 81 is a block diagram showing the structure of an information filtering center provided for the information filtering system according to a fifth embodiment of the present invention.

An information filtering system according to a fifth embodiment of the present invention will now be described. Different portions from the first embodiment will mainly be described hereinafter. The structure of the fifth embodiment is shown in FIG. 81. The difference from the first embodiment is that an information filtering center 1–4 according to the fifth embodiment comprises a transmission article storage portion 19 for storing articles supplied to the user.

The transmission article storage portion 19 stores information of the date on which the article has been supplied and the articles presented to the user while making information and the articles to be related to the user. The foregoing operation is performed when the article is supplied to the user.

FIG. 82 shows a flow of a process to be performed by the presentation information generating portion 17. Initially, the presentation information generating portion 17 reads information of articles selected by the article selection portion 15 (step S211). Then, the article similarity calculating portion 16 performs an operation of calculating the similarity among articles is performed such that references are made to the articles selected and stored in the article information storage portion 18 and supplied this day and previous articles stored in the transmission article storage portion 19 and the previous articles are made to be the subject. Thus, a set of duplicated articles is obtained (step S212).

In the foregoing case, duplicated article set φk is defined as follows by using a certain article j as a core:

$$\phi k \text{ where } S_{ij} > T \text{ for } \forall \text{ article } i \in \phi k$$

That is, specifically, articles selected by the article selection portion 15 is scanned in the descending order to obtain articles each having the similarity with respect to article j which is included in a certain threshold. The obtained articles are considered as the duplicated articles so that the set of the duplicated articles is obtained.

Then, the foregoing process of controlling the output is performed by forming the relevant articles into a group, or making the same to be related to one another or selecting specific articles, the result of this process being presented to the user as a result of the filtering operation (step S213).

FIG. 83 shows a flow of the process for supplying a result of the filtering operation to the user. The selected articles are determined in the descending order whether they have a set of the duplicated articles (steps S221 and S222). If no duplicated article exists, the article (for example, the title and the newspaper publishing company of the article) is supplied (step S223). If a duplicated article exists, whether the set of the duplicated articles consist of only articles supplied this day is examined (step S224). If the duplicated articles consist of articles supplied this day, mark 2 is output. If the duplicated articles includes a previous article, mark 1 and the set of the duplicated articles are output (steps S225, S226 and S227). Also the residual portion of the selected articles are subjected to the processes in steps S222 to S227 (steps S228 and S229).

When the duplicated articles are output and the title is output as a flat text, the duplicated articles are lined up before they are output (formed into a group). FIG. 84 shows an example of the output, in which articles surrounded by straight lines are duplicated articles. Mark □ indicates a set of only duplicated articles supplied this day, while mark A indicates a set of duplicated articles including a previous article. Expression "8/4" is the date of the article.

If the output can be performed in the form of a hyper text, only the representative article may be displayed in the top portion of the hierarchy and other duplicated articles may be made to be relative to the representative article. Examples of the hyper text are shown in FIGS. 85 to 87.

Referring to FIG. 85, mark □ indicates a set of duplicated articles and Δ indicates a fact that a set of duplicated articles supplied previously exists. Moreover, the title of each of the representative articles is displayed. When the list of the article at the top of the hierarchy is output, each mark is supplied with information for linking to information of the set of the duplicated articles shown in FIGS. 86 and 87. The foregoing operation can be realized by a known technique, for example, a description method of HTML (Hyper Text Markup Language). In this case, when the user selects, on the screen, mark □ shown in FIG. 85, information of the duplicated articles shown in FIG. 86 is displayed. When the user selects, on the screen, mark Δ shown in FIG. 85 on the screen, information of the duplicated articles shown in FIG. 87 is displayed.

By adding and supplying information indicating that the group consists of only articles supplied this day or information indicating that the group includes a previous article, the user is able to efficiently arrange and read the relevant articles.

The first to fifth embodiments and their modifications may be combined variously, if necessary. Although the foregoing description has been performed about the network system for supplying a result of the filtering operation through a communication network, the function of the center, which is the core of the information filtering system according to the present invention can be constituted on a personal computer. In this case, the user's terminal equipment and the filtering system are formed integrally and no communication network exists between the user's terminal equipment and the filtering system.

Sixth Embodiment

Figure 88:
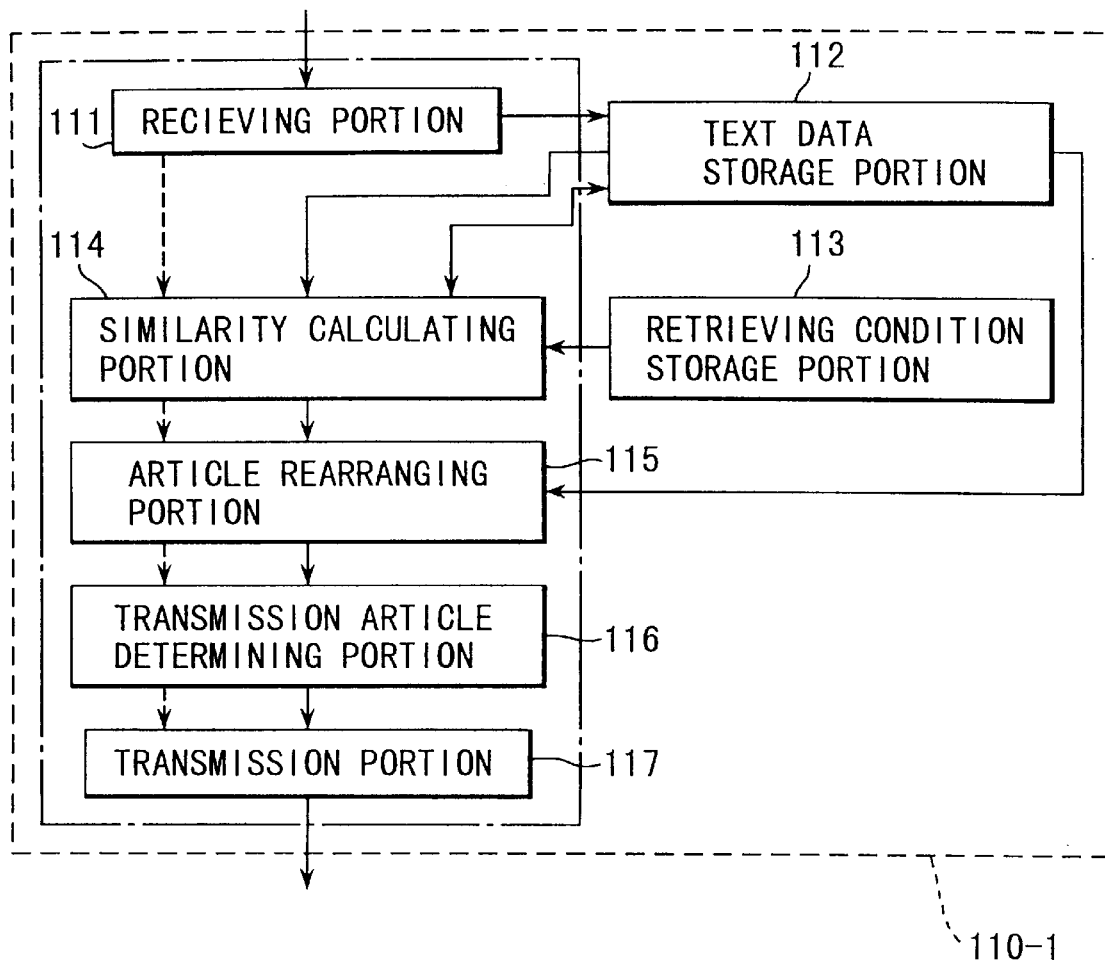
FIG. 88 is a block diagram showing the structure of an information filtering center provided for the information filtering apparatus according to a sixth embodiment of the present invention.

FIG. 88 shows the structure of an information filtering center 110-1 according to a sixth embodiment of the present invention. Referring to FIG. 88, continuous-line arrows show the data flow and arrows drown with dashed lines show the flow of the process.

As shown in FIG. 88, the information filtering center 110-1 comprises a receiving portion 111, a text-data storage portion 112, a retrieving condition storage portion 113, a similarity calculating portion 114, an article rearranging portion 115, a transmission article determining portion 116 and a transmission portion 117. The receiving portion 111, the similarity calculating portion 114, the article rearranging portion 115, the transmission article determining portion 116 and the transmission portion 117 each surrounded by a dashed line can be realized by software executed by the central processing unit 4 shown in FIG. 1. The text-data storage portion 112 and the retrieving condition storage portion 113 can be realized by the retrieving condition storage portion 5.

The receiving portion 111 receives text articles from an information source 2, which is a news source to store the articles in the text-data storage portion 112. The text-data storage portion 112 stores the text article supplied from each information source 2 and received by the receiving portion 111. The retrieving condition storage portion 113 stores retrieving conditions previously specified for each user. The retrieving conditions are generated by analyzing requirements and interests specified by each user, the retrieving conditions corresponding to the user profile.

The similarity calculating portion 114 calculates the similarity between the received text article and the retrieving conditions in accordance with the retrieving conditions determined for each user. The article rearranging portion 115 determines the order for supplying articles to the user in accordance with the similarity calculated for each article. The transmission article determining portion 116 determines articles to be supplied to the user by a predetermined number or articles each having the similarity greater than a predetermined threshold. The transmission portion 117 transmits the article to the user.

Figure 89:
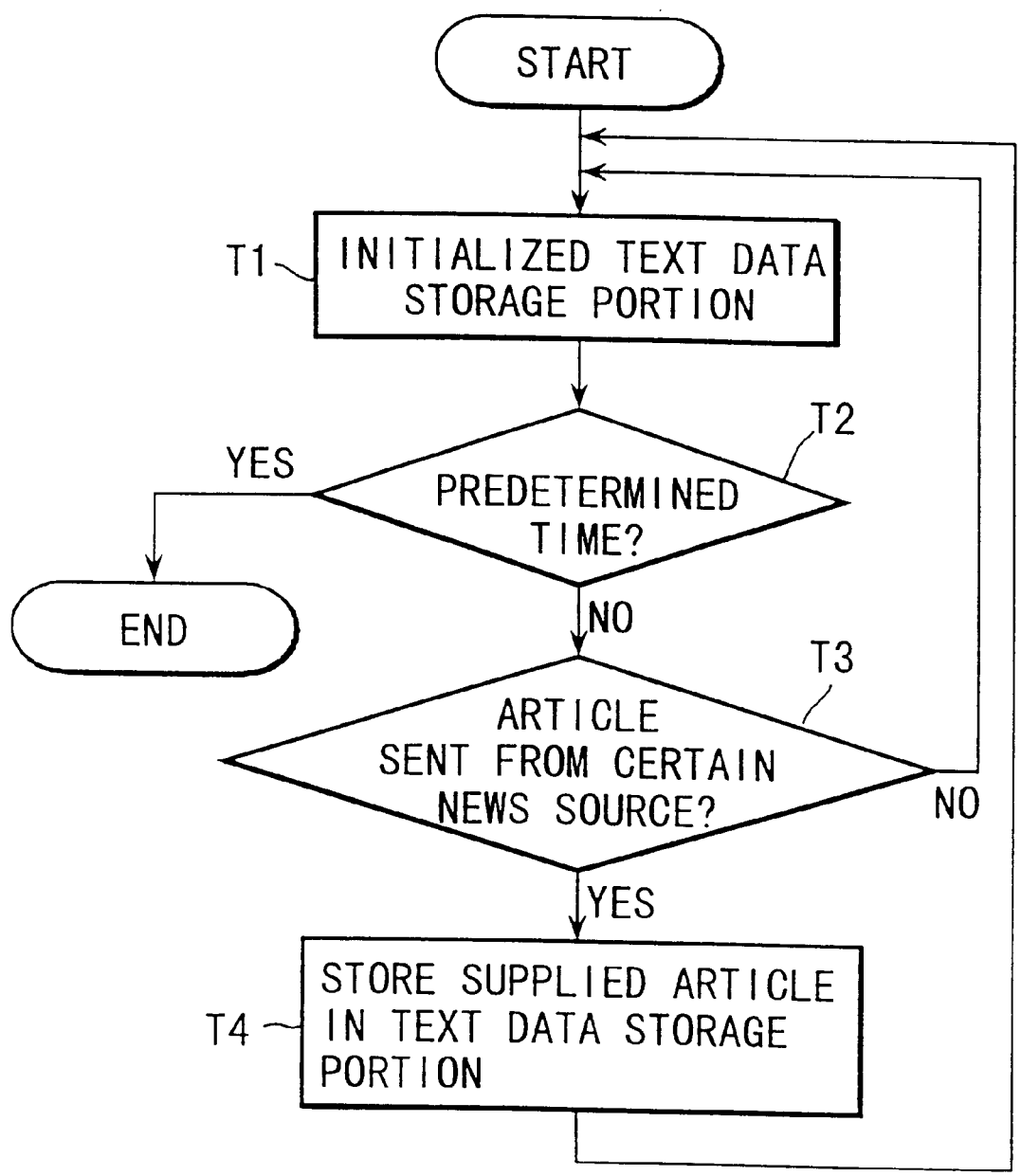
FIG. 89 is a flow chart showing a flow of a text article receiving process in the apparatus according to the sixth embodiment.

FIG. 89 shows a flow of the process to be performed by the receiving portion 111.

Initially, the receiving portion 111 initializes the text-data storage portion 112 (step T1), and then checks whether the predetermined time has come (step T2). During a period until the predetermined time comes, the receiving portion 111 checks whether an article has been supplied from a certain news source (step T3). If an article has been supplied, the article is stored in the text-data storage portion 112 (step T4). After the predetermined time has come, the receiving portion 111 ends the receiving process, and then the control of the process is shifted to the similarity calculating portion 114.

The foregoing receiving process to be performed by the receiving portion Ill in time units is intended to collect text article supplied from a news source in each time unit having a predetermined length into one set. The set is used as one text data base to perform retrieval such that overall body of the text data articles is made to be the subject.

Figure 90:
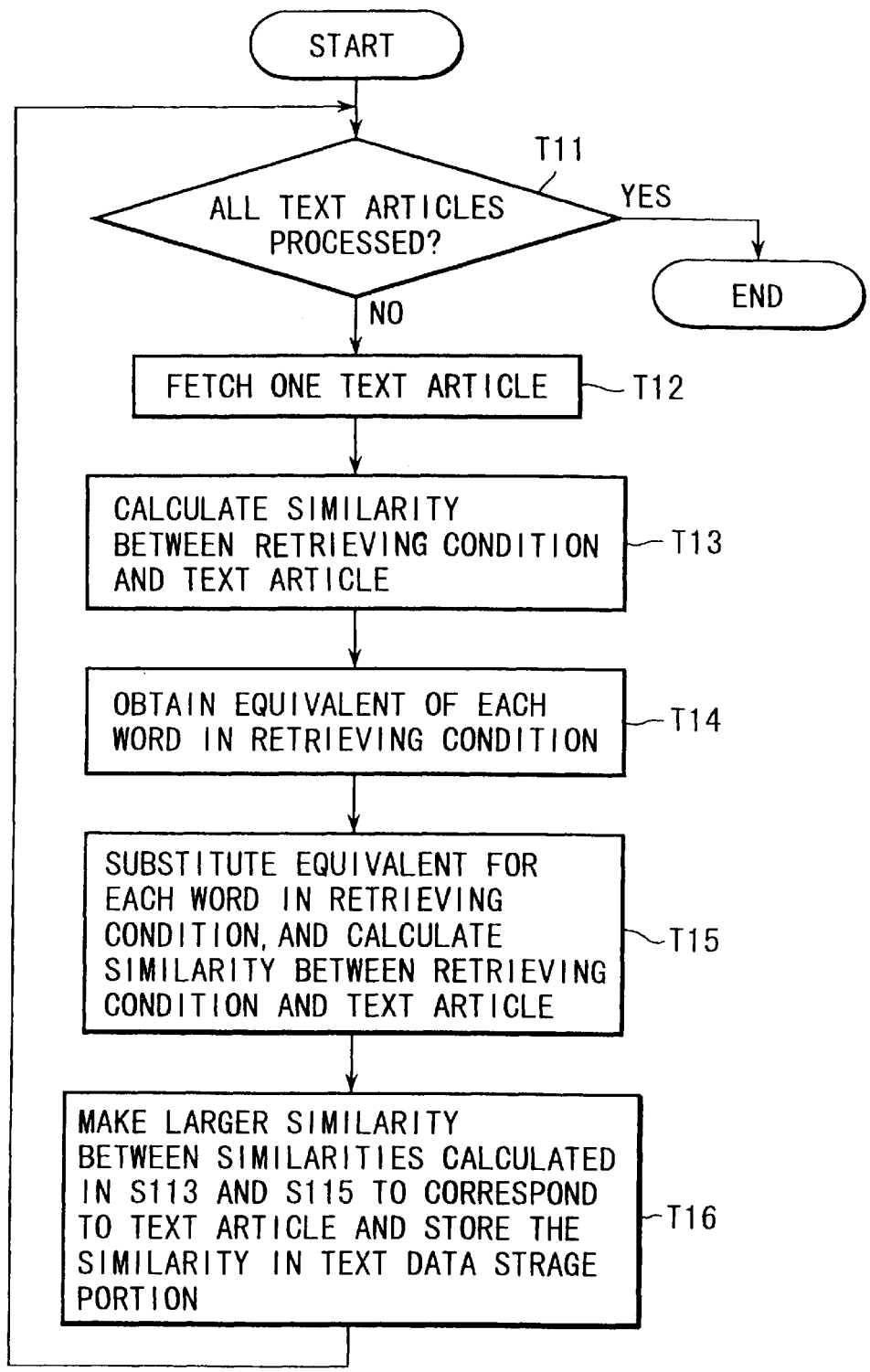
FIG. 90 is a flow chart showing a flow of a similarity calculating process in the apparatus according to the sixth embodiment.

FIG. 90 shows a flow of the process to be performed by the similarity calculating portion 114.

The similarity calculating portion 114 calculates the similarities of all of the text article stored in the text-data storage portion 112 with the retrieving conditions. The calculated similarities are stored in the text-data storage portion 112 while being made to correspond to the text articles so as to be used when the articles are rearranged in accordance with the order of frequency in the similarity calculating portion 114.

Although any limitation exists as the method of calculating the similarity between the retrieving conditions and the text article, for example, the following equation may be employed to calculate the same:

$$S(Di, qj) = \sum ni(tk) \times wj(tk) / \left[ \left\{ \sum ni(tk) \times ni(tk) \right\}^{1/2} \left\{ \sum wj(tk) \times wj(tk) \right\}^{1/2} \right]$$

where

Di: i-th text
qj: j-th retrieving condition
tk: word contained in document Di
ni(tk): frequency of word tk in document i
wj(tk): weight of word tk defined by retrieving condition qj.

Then, tk is arranged in accordance with the frequency in the document i and N high frequency words are calculated.

If the foregoing equation is used, the format of the retrieving conditions to be stored in the retrieving condition storage portion 113 and examples of actual data items are as shown in FIGS. 91A and 91B.

As shown in FIGS. 91A and 91B, the retrieving condition is expressed by at least one word for use as a topic and the weight of the word. As a specific example, words "super computer" and "sales start" are selected, the words having weights 3 and 3, respectively.

A specific procedure for obtaining the similarity will now be described.

Assuming that N is 4, certain document D1 is composed of 5 words and frequencies of four words having high frequencies are as follows:

n1 (super computer)=3
n1 (sales state)=2
n1 (parallel)=2
n1 (computer)=1

At this time, in accordance with the retrieving conditions shown in FIGS. 91A and 91B, the similarity can be calculated as follows:

$$\begin{aligned} S(D1, q) &= (3 \times 3 + 2 \times 2 + 2 \times 0 + 1 \times 0) / \\ &\quad \{(3 \times 3 + 2 \times 2 + 2 \times 2 + 1 \times 1)^{1/2} \\ &\quad (3 \times 3 + 2 \times 2 + 0 \times 0 + 0 \times 0)^{1/2}\} \\ &= 13 / \{(18)^{1/2}(13)^{1/2}\} = 0.85 \end{aligned}$$

On the other hand, assuming that another document D2 is composed of 5 words and frequencies of four words having high frequencies are as follows:

n1 (personal computer)=2
n1 (sales start)=2
n1 (super computer)=1
n1 (computer)=1

At this time, the similarity can be calculated as follows:

$$\begin{aligned} S(D2, q) &= (2 \times 0 + 2 \times 2 + 1 \times 3 + 1 \times 0) / \\ &\quad \{(2 \times 2 + 2 \times 2 + 1 \times 1 + 1 \times 1)^{1/2} \\ &\quad (0 \times 0 + 2 \times 2 + 3 \times 3 + 0 \times 0)^{1/2}\} \\ &= 7 / \{(10)^{1/2}(13)^{1/2}\} = 0.61 \end{aligned}$$

Therefore, in the foregoing example, the document D1 more satisfactorily satisfies the retrieving condition q as compared with the document D2.

Referring to FIG. 90, the procedure for calculating the similarity to be performed by the similarity calculating portion 114 will now be described.

The similarity calculating portion 114 examines whether all text articles have been processed (step T11). If all the text articles have not been processed, the similarity calculating portion 114 repeats the following process until all text articles are processed (step T12).

The similarity calculating portion 114 fetches one text article from the text-data storage portion 112 (step T12) to calculate the similarity between the text article and the retrieving conditions in accordance with the foregoing equation (step T13).

Then, the similarity calculating portion 114 obtains an another language equivalent of each word composing the retrieving conditions (step T14). Then, the similarity calculating portion 114 substitutes the equivalent for the retrieving condition to obtain the similarity with the text article in accordance with the foregoing equation (step T15). In this case, even if the text article is written in a language different from the retrieving condition, a relevant articles can be given a great similarity.

Then, the similarity calculating portion 114 stores larger similarity calculated in steps T13 and T15 in the text-data storage portion 112 while making the similarity to correspond to the text article (step T16). As a result, the similarity of the subject text article can accurately be obtained regardless of the language in which the text article is written.

Although an assumption is performed here that text articles in two language zones, for example, English and Japanese, are processed, text articles written in three or more languages can be processed by increasing the processes in steps T14 and T15 to correspond to the number of the languages.

Hitherto, a variety of methods have been suggested to obtain the similarity between the retrieving condition and the document. Thus, the foregoing method of calculating the similarity may be replaced by any of the suggested methods.

The article rearranging portion 115 sorts all of text articles in the descending order in accordance with the similarity given to each text article by the similarity calculating portion 114. The sorting method may be selected from a variety of methods, such as a bubble sorting method, a quick sorting method and a bucket sorting method.

Figure 92:
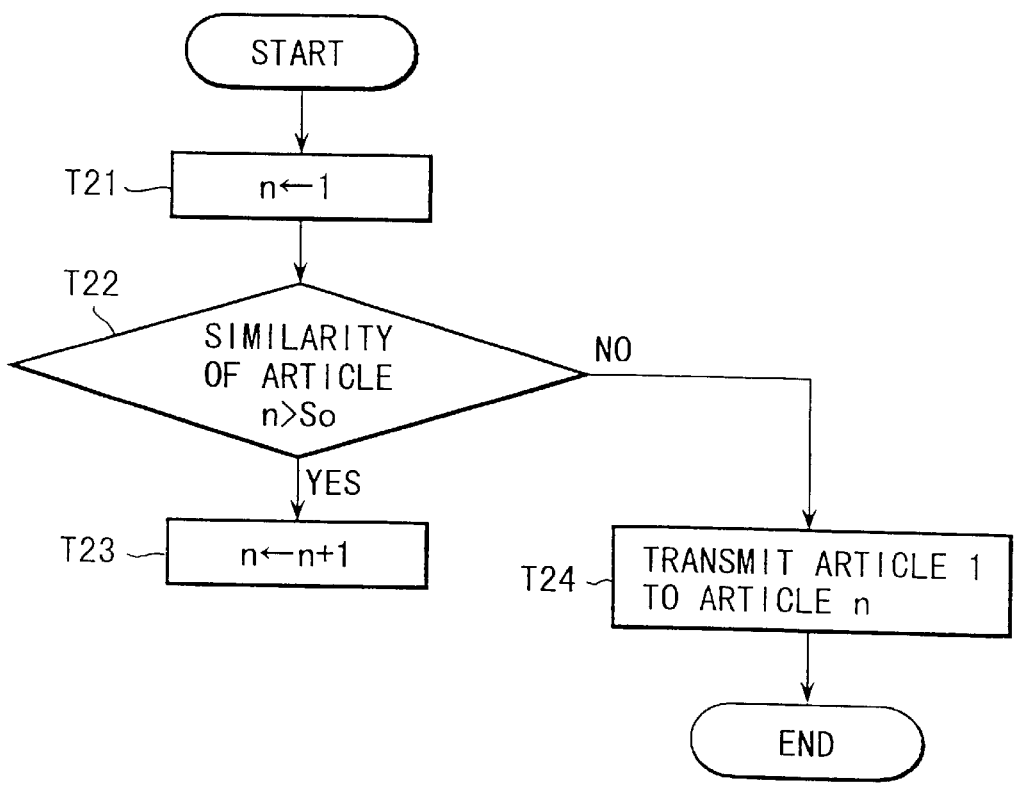
FIG. 92 is a flow chart showing a flow of a transmission article determining process in the apparatus according to the sixth embodiment.

FIG. 92 shows a flow of the process to be performed by the transmission portion 117.

In this case, the process is performed in a state where the transmission article determining portion 116 has rearranged the articles and the similarities in the form of numbers 1, 2 and 3 have been given to the articles.

That is, the transmission portion 117 compares the similarity of the articles with a predetermined similarity S0 (threshold) starting from the leading article (n=1). Then, the transmission portion 117 transmits the text articles each having greater similarity than the threshold to subject users by electronic mail (steps T21 and T24).

Although the foregoing description has been performed about the process for obtaining the similarity with one retrieving condition, a case where a plurality of users exist is processed such that calculations for obtaining the similarity, rearrangement of the articles and transmission of the articles are performed for each user.

Note that the transmission portion 117 may transmit articles by using a facsimile machine or the like as well as the electronic mail.

Although the foregoing embodiment has the structure such that the articles are, by the receiving portion 111, chunk in a predetermined period of time, another structure may be employed in which the receiving portion 111 calculates the similarity whenever it receives an article and stores, in the text-data storage portion 112, only articles of a type having a similarity greater than a predetermined value. In this case, the quantity of text articles to be stored can be reduced.

As described above, the system according to the sixth embodiment has the structure for calculating the similarity between the text article and the retrieving condition such that the retrieving conditions specified in a single language are directly used, as well as the retrieving conditions are replaced by another language so that the similarity between the substituted retrieving conditions and the text article is calculated. Therefore, user is able to simultaneously obtain news from a plurality of language zones under one specified retrieving condition. Thus, a satisfactory retrieving function for obtaining a variety of articles written in different languages can be realized.

Seventh Embodiment

A seventh embodiment of the present invention will now be described.

Figure 93:
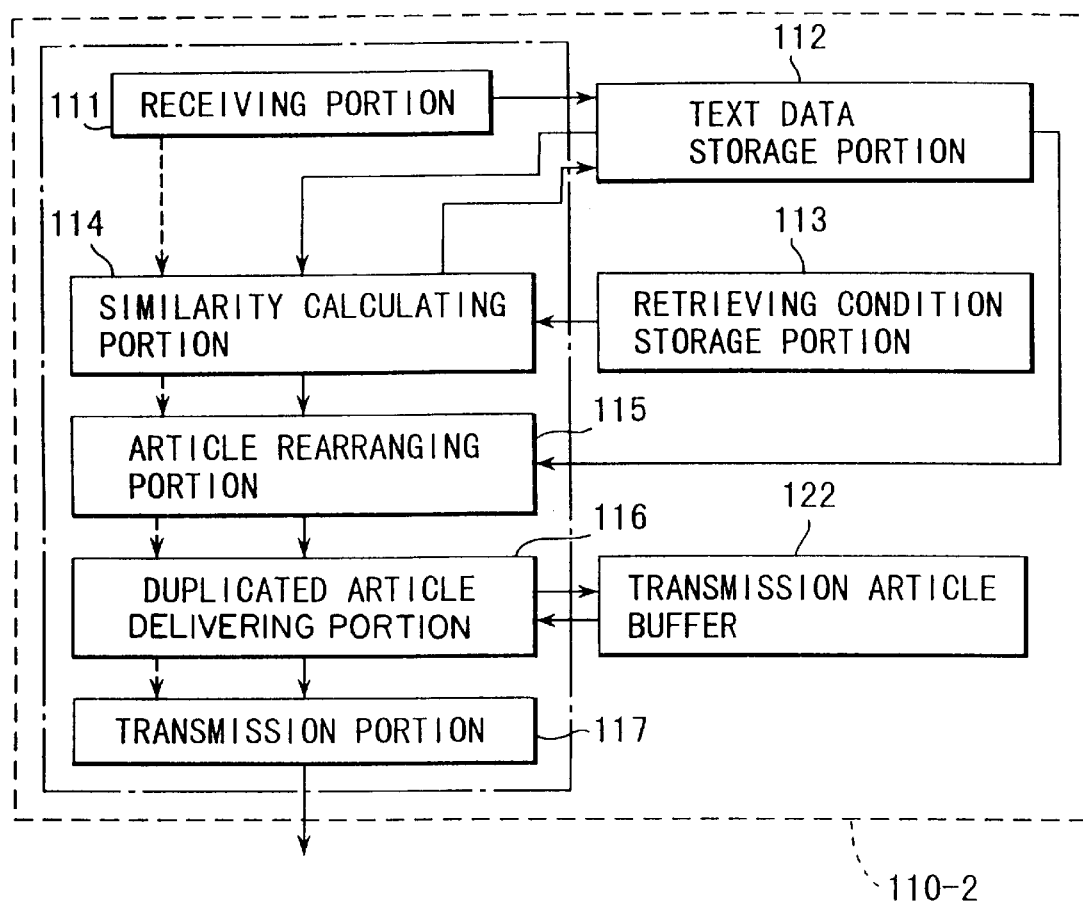
FIG. 93 is a block diagram showing the function and structure of an apparatus according to a seventh embodiment of the present invention.
Figure 94:
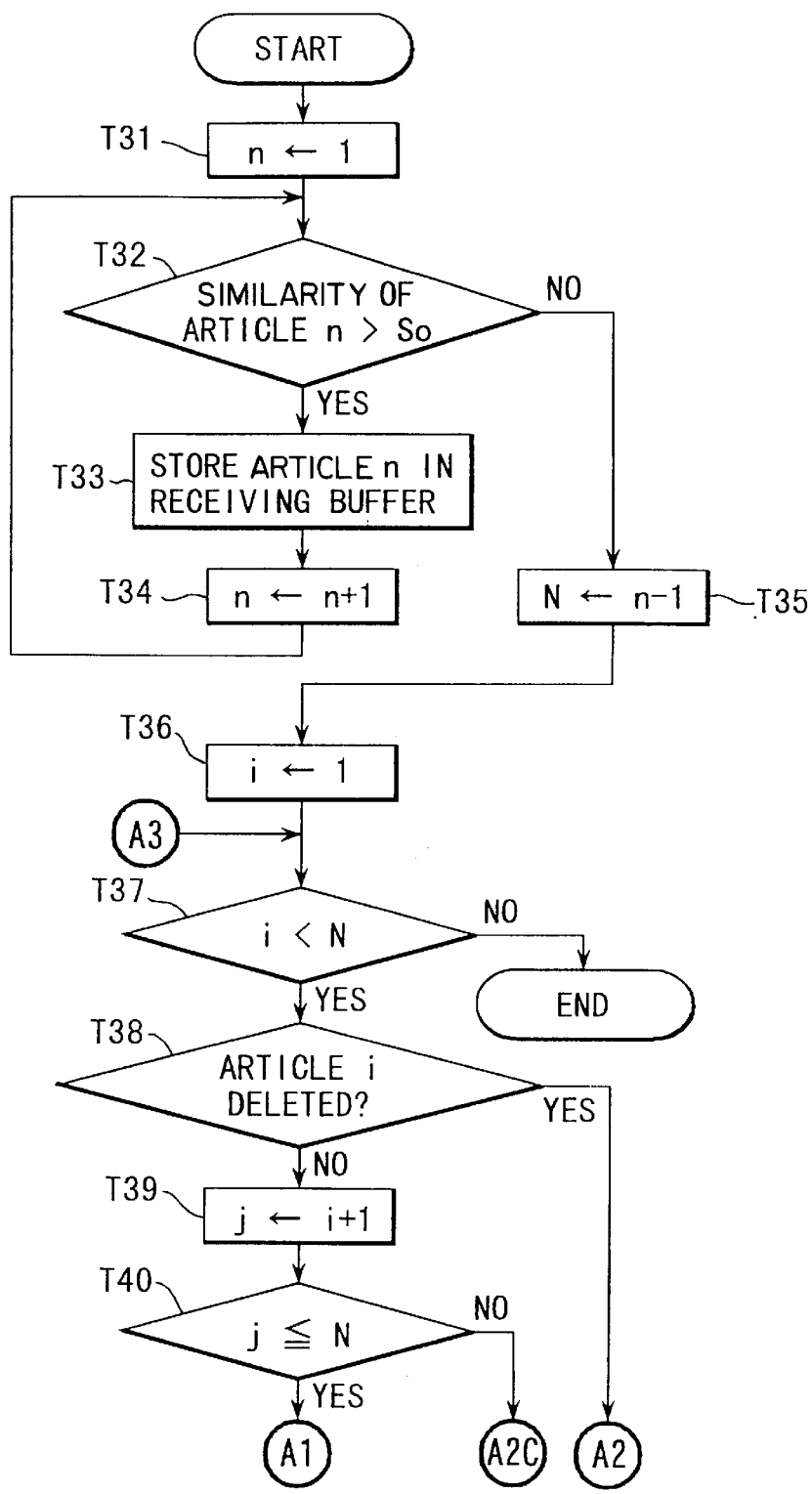
FIG. 94 is a flow chart showing a portion of a flow of a duplicated article deleting process in the apparatus according to the seventh embodiment.
Figure 95:
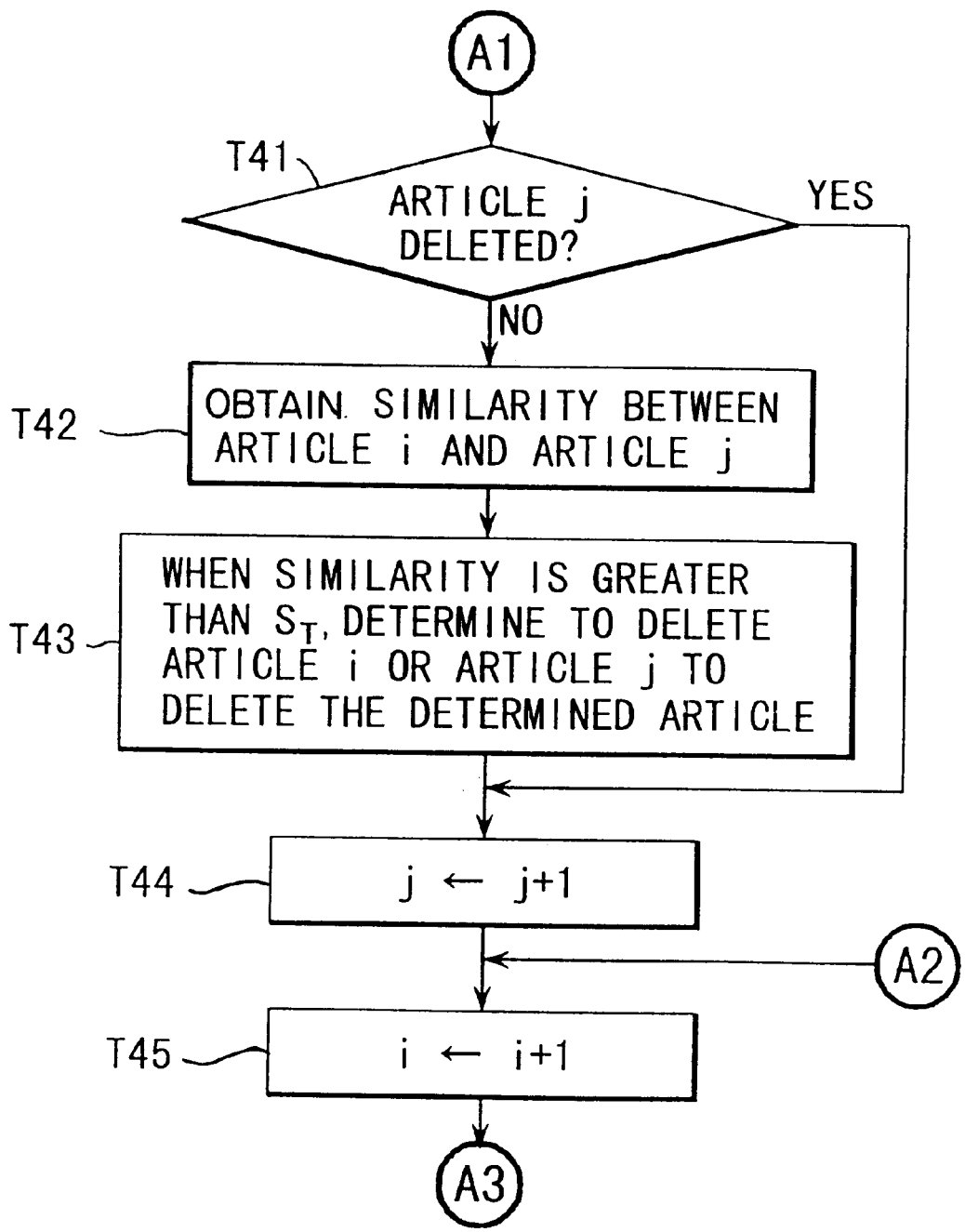
FIG. 95 is a flow chart showing a residual portion of the flow of the duplicated article deleting process in the apparatus according to the seventh embodiment.

FIG. 93 shows the structure of an information filtering center 110-2 according to the seventh embodiment. In this embodiment, a duplicated article deleting portion 121 is provided in place of the transmission article determining portion 116 according to the sixth embodiment shown in FIG. 88. The other elements and functions are the same as those according to the sixth embodiment.

The duplicated article deleting portion 121 is provided for the purpose of transmitting either of the duplicated articles to the user. The duplicated article deleting portion 121 calculates the similarity between text articles written in different languages to determine text articles having similarities greater than a predetermined threshold to be duplicated articles so as to delete either of the duplicated articles.

FIGS. 93 to 96 show a flow of the process to be performed by the duplicated article deleting portion 121.

Initially, the duplicated article deleting portion 121 performs the same process as that performed by the transmission article determining portion 116 according to the sixth embodiment. That is, the duplicated article deleting portion 121 compares the similarity of the articles and a predetermined similarity S0 (the threshold) starting from the leading article (n=1) so as to store text articles of a type having a similarity greater than the threshold in a receiving buffer 122 (steps T31 to T34).

Then, the duplicated article deleting portion 121 obtains all of combination of two articles (article i and article j) which have not been deleted, that is, which have been stored in the receiving buffer 122. Then, the duplicated article deleting portion 121 determines articles having similarity greater than a predetermined value (ST) to be duplicated articles so as to delete either of the articles i or j from the receiving buffer 122 (steps T35 and T45).

As a result, articles having substantially the same contents are deleted from the receiving buffer 122 not to be transmitted to the user.

FIG. 96 shows a procedure for obtaining the similarity between articles i and j.

The method of calculating the similarity between articles is the same as the method according to the sixth embodiment in which the similarity between the retrieving condition and the article is calculated. That is, the articles i and j are subjected to a process in which all words in the articles are made to be the subjects, and a document vector consisting of an arrangement of information of frequency of some words of a type having a high frequency is obtained (steps T51 and T52). Then, the scalar product of the document vectors of the articles i and j is obtained to calculate the similarity (step T53). The more the value, which is the result of the scalar product and which has been normalized approaches 1, the higher the similarity becomes.

In consideration of the fact that the article i and the article j are written in different languages from each other, each word in the document vector of the article j is translated into another language. Moreover, the vector elements are rearranged to be adaptable to the language into which the translation has been performed (step T54). Then, the scalar product between the document vectors of the articles i and j is obtained to calculate the similarity (step T55). Then, the larger similarity between the two similarities respectively calculated in steps T51 and T55 is employed as the similarity between the article i and the article j.

Although the calculations for obtaining the similarity is performed such that all of words in the article are made to be the subjects and the scalar product of words of the type having great similarity is obtained, a modification may be performed such that only words existing in the caption or the first sentence are made to be the subjects in accordance with an empirical rule that almost all information items are gathered in the caption or the first sentence of an article.

Either of the articles of the type having the similarities greater than a predetermined value is deleted in accordance with any of the following criteria:
An article having a smaller article number is simply deleted.
Priority is previously provided for each of the news source to delete an article supplied from the news source having lower priority.
If date of publication is given to the article, a former article is deleted.
An article having a smaller quantity of contents is deleted.

As described above, the system according to the second embodiment is able to mixedly present text articles written in different languages to a user. Moreover, the similarity between text articles written in direction languages is calculated so that a determination of text articles having similarity greater than a predetermined threshold is performed to be duplicated articles. Therefore, only either of the articles can be supplied to the user. As a result, either of articles written in different languages but having the same contents is not supplied to the user. Thus, a waste of time occurring due to reading the same articles can be prevented.

Eighth Embodiment

An eighth embodiment of the present invention will now be described.

FIG. 97 shows the structure of an information filtering center 110-3 according to an eighth embodiment of the present invention. In addition to the structure according to the seventh embodiment, a user language storage portion 123 is provided.

The user language storage portion 123 stores the language of each user (whether the user speaks English or Japanese).

Although the flow of the duplicated article deleting process according to the eighth embodiment is the same as that according to the seventh embodiment, criteria for determining the article of articles having similarities greater than a predetermined value to be deleted is different from that according to the seventh embodiment.

That is, the eighth embodiment has a structure such that the article written in a language which is not used by the user is deleted in accordance with information of the language of the user.

Although the method of determining the language in which the article is written is not specified particularly, it can easily be realized by, for example, previously preparing a word dictionary (not shown) in which words in each language has been registered. That is, character strings in the article are scanned and the word dictionary is retrieved to determine the language of the user in which larger number of words have been retrieved.

Ninth Embodiment

A ninth embodiment of the present invention will now be described.

Figure 98:
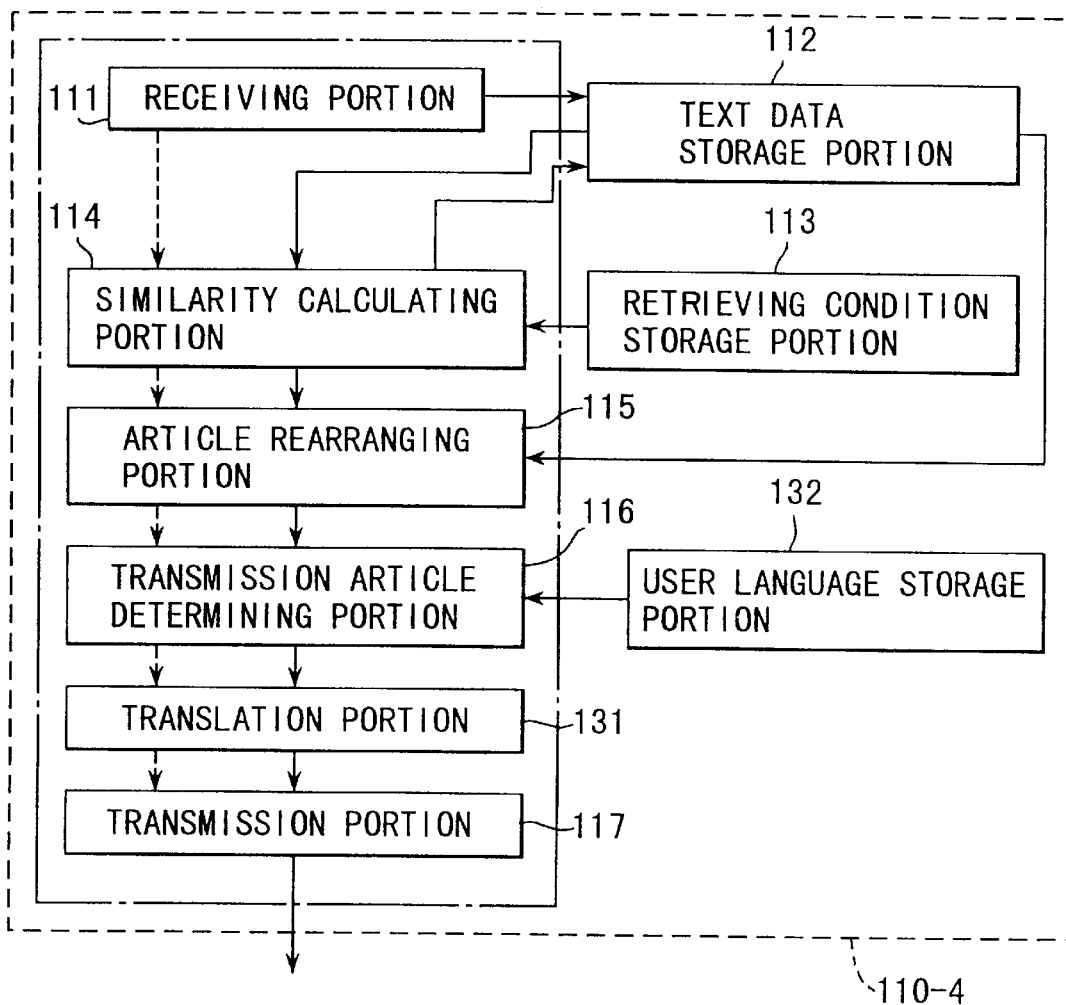
FIG. 98 is a block diagram showing the function and structure of an apparatus according to a ninth embodiment of the present invention.

FIG. 98 shows the structure of a filtering center according to a ninth embodiment, which is different from that of the first embodiment in that a translation portion 131 and a user language storage portion 132 are provided.

The ninth embodiment has a structure such that articles written in a language different from the language of the user is translated into the language of the user so as to be supplied to the user. Therefore, the structure according to the ninth embodiment has the user language storage portion 132 for storing the language of the user and the translation portion 131 for performing translation into the language of the user.

Since the language of the supplied article can be determined by the process according to the eighth embodiment, appropriate translation can be performed by using information indicating the language in which the article is written and the language of the user. If the supplied article is written in English and the language of the user is Japanese, translation from English to Japanese is required.

Automatic translation, such as translation from English to Japanese or that from Japanese to English has been put into practical use and products therefor has been on sale. By using the known technologies, the ninth embodiment can be realized.

Tenth Embodiment

A tenth embodiment of the present invention will now be described.

FIG. 99 shows the structure of the tenth embodiment which is different from the sixth embodiment in that an information filtering center 110-5 has a summarizing portion 33.

The method of realizing the summarizing function is not limited. For example, a technique disclosed in Natural Language Process 99-3, "Thesis Summarizing System GREEN Using Structures in Document in a Composite Manner" Kazuhide Yamamoto, Material, Research Group of Information Processing Society may be employed. Any one of the following simple methods may be employed.

Only the caption of the article is fetched so as to be used as the summary.

The caption and the first sentence are fetched so as to be used as the summary.

Words in a specific category are fetched and list of the words is used as the summary (for example, date, time, proper nouns, such as name of the company and place).

Words allowed to appear frequently in the article are fetched and a list of the words is used as the summary.

Eleventh Embodiment

An eleventh embodiment of the present invention is formed by combining the ninth embodiment and the tenth embodiment to translate only summarized articles into a language of the user so as to be supplied to the user.

Assuming that only the captions of articles are fetched as summaries so as to be translated, the format of the article to be supplied may be as shown in FIGS. 100A and 100B such that the translated sentence is added in front or in the rear of the caption of the language of the article and the body of the article is added (see FIG. 100A). As an alternative to this, only the translated sentence is placed as the caption and the body of the article is added (see FIG. 100B).

Twelfth Embodiment

A twelfth embodiment has a relevance feedback function in which information indicating whether the supplied articles have been necessary for the user is fed back from the user and the retrieving condition is modified in such a manner that the information item is reflected.

Figure 101:
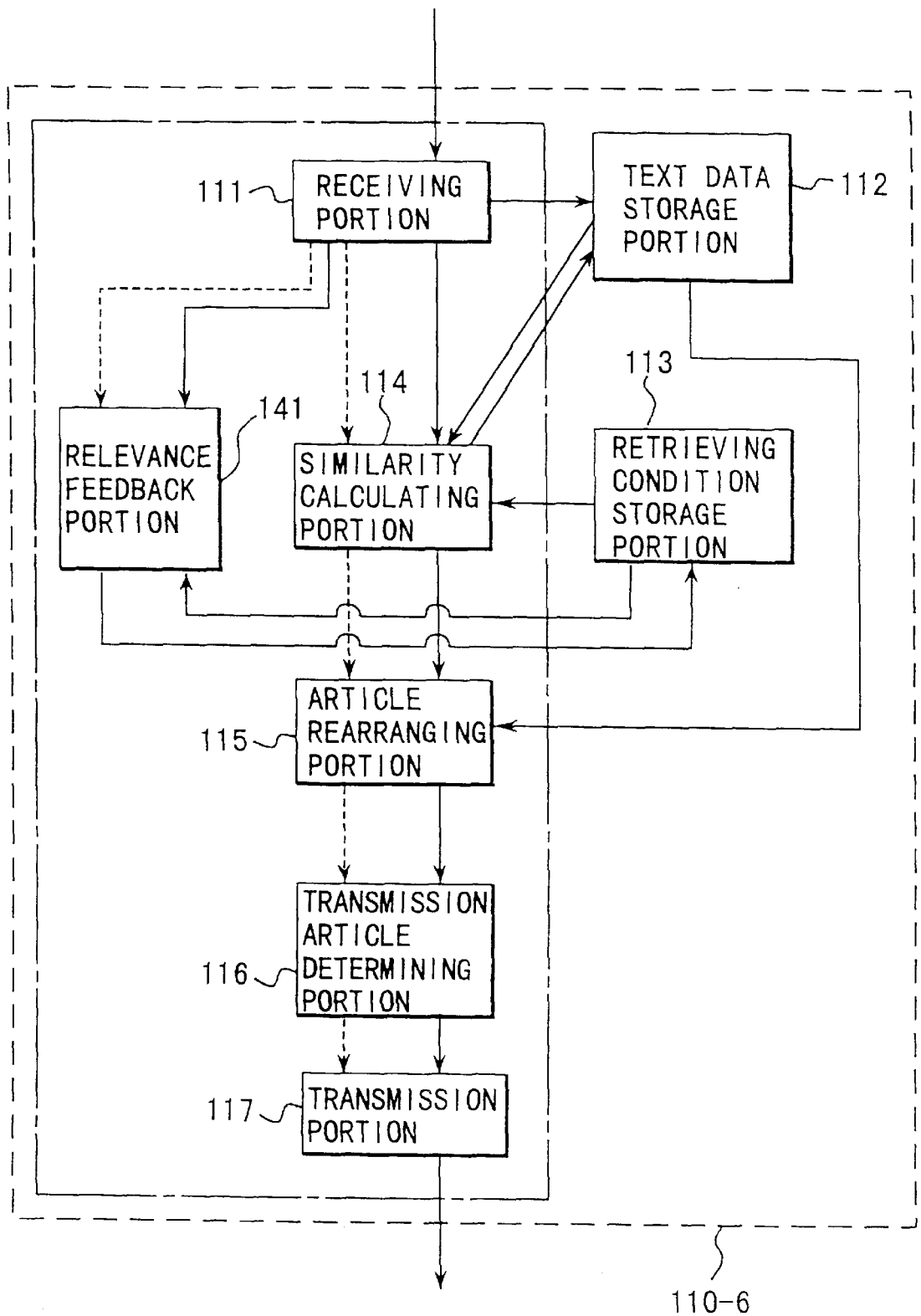
FIG. 101 is a block diagram showing the function and structure of an apparatus according to a twelfth embodiment of the present invention.

FIG. 101 shows the structure of the twelfth embodiment. The difference between the twelfth embodiment and the sixth embodiment is that the information filtering center 110-6 has a relevance feedback portion 141 so as to perform a process for tuning the retrieving conditions to obtain only articles required by the user.

The relevance feedback process is a known technology which can be realized by using a technique disclosed in, for example, "SMART Information Retrieving System", edited by Gerald Sarton, supervised and translated by Kenji Jinbo, Kikaku (Planning) Center.

However, in an information filtering system in which news source adaptable to different languages, the determination of each article performed by the user becomes different in the reflection to the retrieving condition depending upon the language of the article.

That is, if the language is the same as the language of the retrieving condition, a usual relevance feedback process may be performed. If the language is different from that of the retrieving condition, the article required to be first translated into the language of the retrieving condition before the relevance feedback process is performed.

Figure 102:
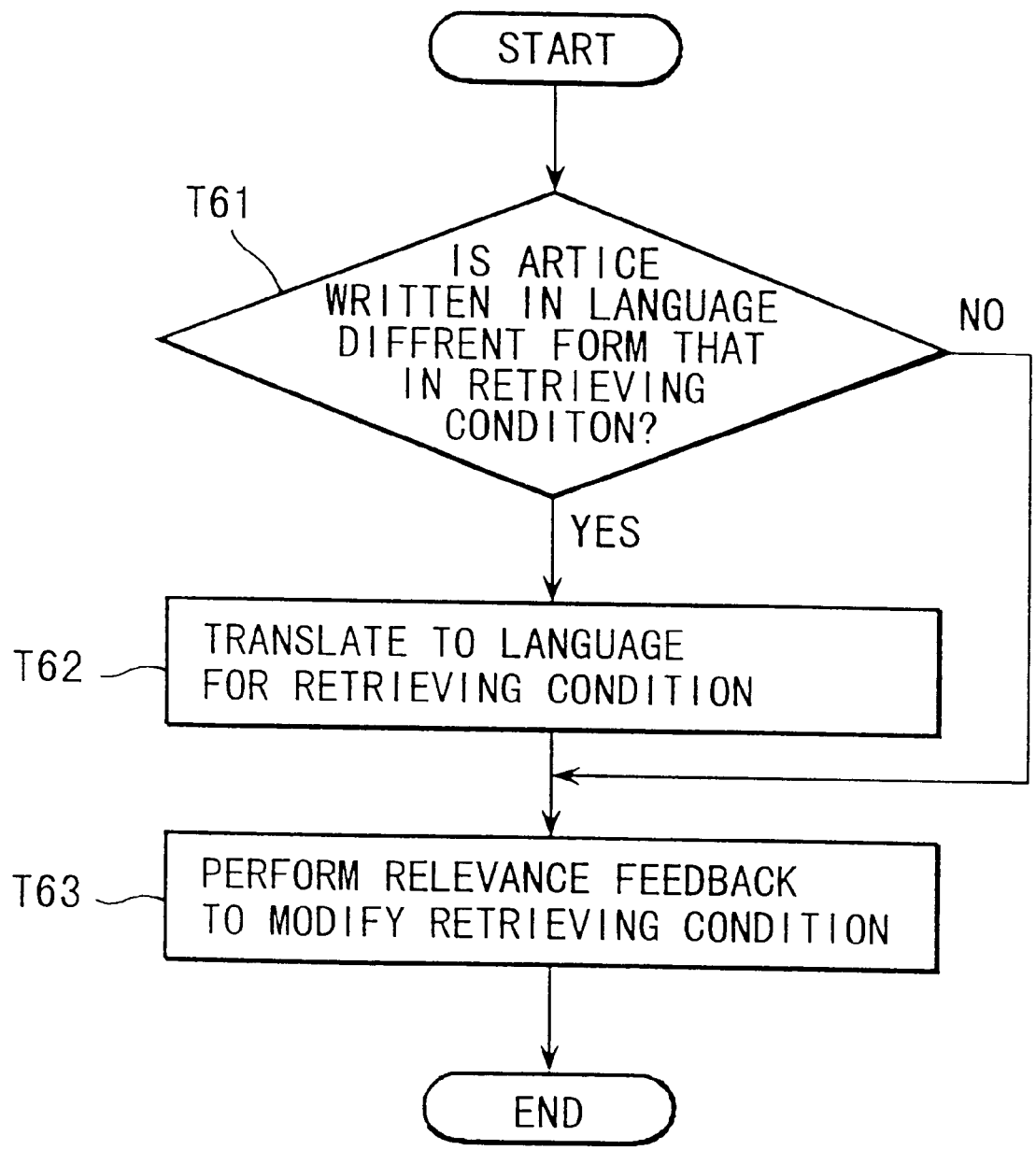
FIG. 102 is a flow chart showing a flow of a process to be performed by a relevance feedback portion in the apparatus according to the twelfth embodiment.

FIG. 102 shows a flow of a process to be performed by the relevance feedback portion 141.

When the relevance feedback portion 141 receives information indicating whether the article supplied to the user is useful, the relevance feedback portion 141 examines whether the article is written in a language which is different from the language of the retrieving condition specified by the user (step T61). If the article is written in another language, the relevance feedback portion 141 translates the article into the language of the retrieving condition, and then performs the relevance feedback process for modifying the retrieving condition by using a result of the translation process (step T63).

Thirteenth Embodiment

A thirteenth embodiment of the present invention will now be described.

Figure 103:
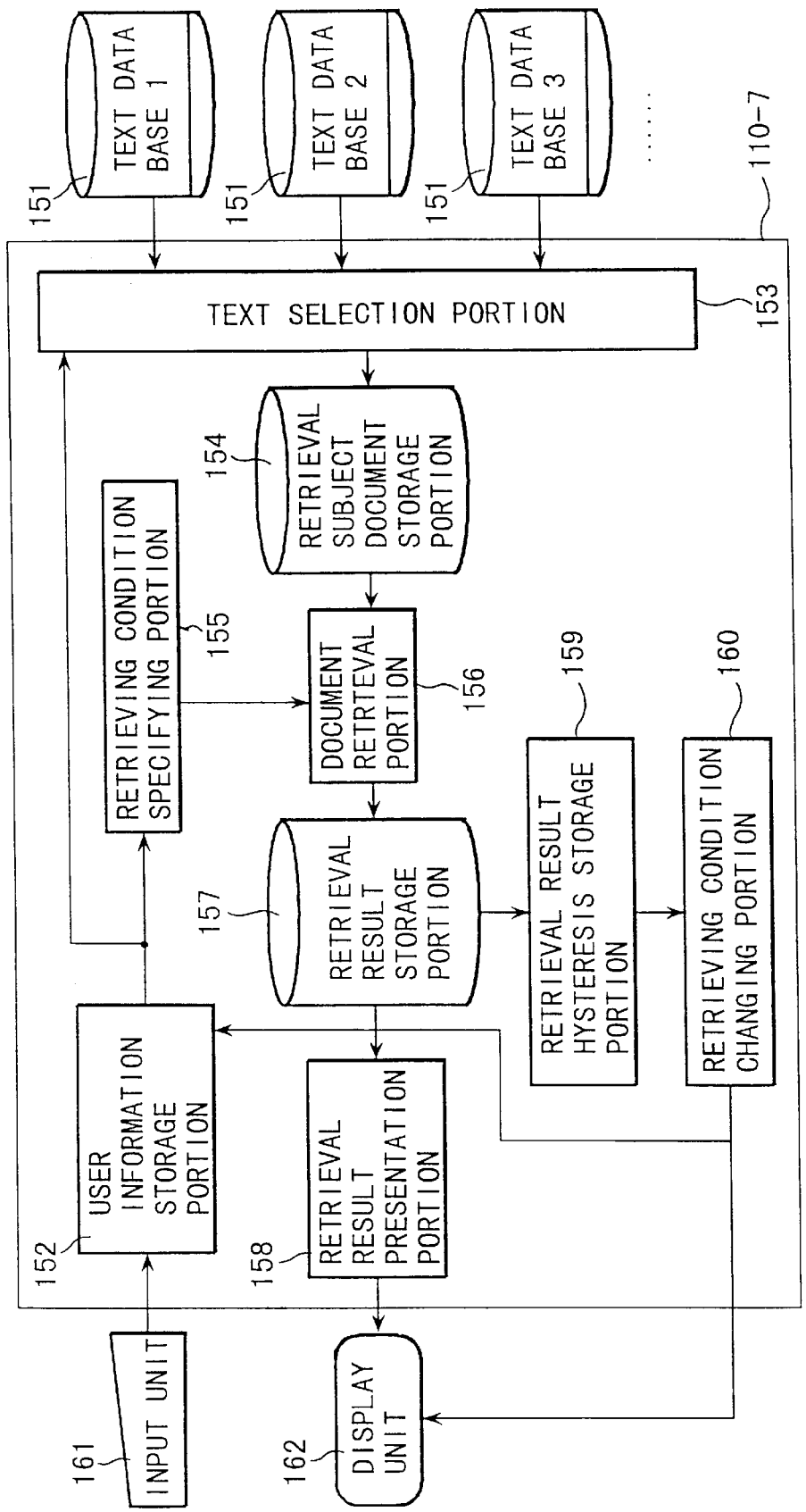
FIG. 103 is a block diagram showing the structure of an apparatus according to a thirteenth embodiment of the present invention.

FIG. 103 shows the structure of an information filtering center 110-7 according to the thirteenth embodiment. Referring to FIG. 103, bold arrows indicate flows of data, and other arrows indicate flows of the process.

The information filtering center 110-7 comprises a plurality of text data bases 151 to 153, a user information storage portion 152, a text selection portion 153, a retrieval subject document storage portion 154, a retrieving condition specifying portion 155, a document retrieving portion 156, a retrieval result storage portion 157, a retrieval result presentation portion 158, a retrieval result hysteresis storage portion 159, a retrieving condition changing portion 160, an input unit 161 and a display unit 162. Although the input unit 161 and the display unit 162 correspond to the user terminal equipment 3 shown in FIG. 1, they may be realized by the user interfaces of the computer system forming the information filtering center 110-7, that is, a keyboard and a display unit.

Each of the text data bases 151 to 153 is a specific text data base connected to the inside portion of the information filtering center 110-7 or the information filtering center 110-7 through a network. The text data bases 151 to 153 to which information is supplied from newspaper, magazine, network and so forth and the contents of which are periodically updated. If a network connection has been established, contrivances may be provided, such as provision of a variety of buffers and a synchronous process with an automatic distribution system. In the thirteenth embodiment, they are omitted from detailed description.

The user information storage portion 152 stores information registered thereto, the information item being, for example, topics of articles required by the user, the number of supplied articles or a threshold of the similarity, the balance of the contraction, a list of current subject text data bases, date of the previous retrieval. Moreover, states of display of the retrieved documents such that only the title was displayed or only the abstract was displayed are registered. In the foregoing case, user information is controlled for each user to permit a plurality of user to use the system.

The text selection portion 153 makes a reference to information registered to the user information storage portion 152 to select articles registered after the previous retrieval from the specified text data base to store the selected article into the retrieval subject document storage portion 154.

If each of the text data bases 151 to 153 is in the form, such as a on-line newspaper article provision service, with which new article information is periodically supplied, a contrivance for receiving the supplied articles to store the same in the system is required.

The retrieving condition specifying portion 155 performs development of synonyms, development of lower and rear words, development of different expressions and development of keywords in accordance with the topics stored in the user information storage portion 152 and required by the user so as to generate retrieving commands (a retrieving logical expression) required by the document retrieving portion 156.

The document retrieving portion 156 subjects duplicated articles stored in the retrieval subject document storage portion 154 to keyword retrieval or a full-text retrieval in accordance with the retrieving command generated by the retrieving condition specifying portion 155. In accordance with the result of the retrieval, the document retrieving portion 156 calculates the similarity between each of the retrieved document and the topic specified by the user. Moreover, the document retrieving portion 156 ranks the results of the retrieval of the documents in terms of the frequency and stores, into the retrieval result storage portion 157, the number of outputs or the threshold of the similarity stored in the user information storage portion 152 together with the similarity of each of the articles of a type having great similarity. The function of the document retrieving portion 156 can be realized by a known document retrieving technique.

The retrieval result presentation portion 158 has an arrangement to display the text articles stored in the retrieval result storage portion 157 on the display unit 162 in accordance with the display specification registered to the user information storage portion 152. In the case where the user is connected through a network, the retrieval result presentation portion 158 processes the result of the display into an electronic mail so as to be transmitted.

The retrieval result hysteresis storage portion 159 stores the breakdown of each text data base, the breakdown of the upper topics or relevant topics or sub-topics of the document and their transitions which are the result of the retrieval.

The retrieving condition changing portion 160 determines hysteresis information registered in the retrieval result hysteresis storage portion 159 to change the threshold of the similarity or the topic or the text data base or the method of displaying the documents which are the results of the retrieval. Then, the retrieving condition changing portion 160 updates the foregoing parameters registered in the user information storage portion 152. As an alternative to this, the retrieving condition changing portion 160 present topics, which are candidates to be changed, to the user to urge the user to change the topic. The retrieving condition changing portion 160 calculates the cost in accordance with the result of the retrieval to reduce the balance of the contraction stored in the user information storage portion 152.

The input unit 161 is a unit to be operated by the user for the purpose of changing the various parameters stored in the user information storage portion 152. In the case where the user is connected through a network, user information is updated by, for example, an electronic mail.

The user information storage portion 152 permits the user to input whether the user considers that the adaptation ratio is important or the user considers that the reduction ratio is important through the input unit 161. The foregoing inputs are used as the retrieving conditions by the retrieving condition specifying portion 155. In this case, the former process is the same as the process for enlarging the threshold of the similarity in which only articles directly relating to the user profile or the topics specified by the user are retrieved. Although the probability that articles which are not required by the user appear in the result of the retrieval can be lowered, leakage of articles of a type required by the user can be taken place. The latter process is the same of the process for setting the threshold of the similarity to be a small value. Although articles of a type which is not required by the user takes place more frequently, leakage of the articles required by the user can be decreased.

The overall operation of the system shown in FIG. 103 will now be described. The user registers required topics to the user information storage portion 152 through the input unit 161. The topics are subjects to be retrieved and previously classified, the topics being in the form of a hierarchy similarly to the thesaurus. Three information items, upper topics, lower topics and relative topics exist with respect to one topic. The user selects and registers required topics from a list of prepared topics. For example, FIG. 125 shows lower topics, upper topics and relative topics of a topic "sake". Although one upper topic exists in this case, it can be considered that a plurality of upper topics exist.

Although the topic likes the thesaurus, the topic includes more current keywords, such as "Earthquake in Hanshin" and "Information Highway", which are mobile, updated frequently and changed many times as compared with the thesaurus which has a fixed characteristic.

The user registers the number of outputs or a threshold which is the lower value of the similarity indicating the degree of the relativity of the document with respect to the topic. A method may be employed in which the user selects from the number of retrieved articles or thresholds previously classified into several steps. Another method may be employed in which the number of outputs or thresholds prepared for each topic or regardless of the topic is, as a default, registered. In this case, the necessity for the user to specify the number of the articles or the threshold can be eliminated. The foregoing fact applies to the sixth to twelfth embodiments.

Moreover, a list of the text data bases, which are the subjects to be retrieved, is registered. In addition, document information or elements are registered by selecting it from the titles, names of the original text data bases, dates, abstracts, bodies, the names of the presses, which are the news sources of the articles if the duplicated articles is newspaper and components of the document.

Moreover, information of the date of the previous retrieval performed by the user is automatically registered to the user information storage portion 152 whenever retrieval is performed. The user information storage portion 152 stores information of the balance of the contraction with the user to calculate the account in accordance with the accounting system of the used text data base in accordance with the result of the retrieval to subtract it from the balance of the contraction with the user.

The information filtering system follows information described in the user information storage portion 152 to periodically retrieve the text data base to extract documents registered after the previous date of retrieval. Then, articles relating to the specified topics are retrieved to reduce the results so as to output the result to the display unit 162 in the display format specified by the user information storage portion 152. The results of retrieval are stored in the retrieval result hysteresis storage portion 159. The retrieving condition changing portion 160 examines the hysteresis of the retrieval stored in the retrieval result hysteresis storage portion 159 to change the retrieving conditions (the threshold of the similarity, the number of outputs, topics, data bases to be retrieved, the display format and the like), if necessary.

Specific functions of the document retrieving portion 156, the retrieving condition changing portion 160 and the retrieval result presentation portion 158 will now be described.

Functions realized mainly by the document retrieving portion 156 are as follows:

(1) The threshold of the similarity is changed in accordance with the result of the retrieval or a new threshold calculated in accordance with the result of the retrieval and the ground of the calculation are presented to the user to urge the user to change the threshold.

(2) The shape of a downward curve of the similarity obtained by ranking the document in the descending order of the similarity is determined to make a portion, in which the similarity is made to be moderate, to be the threshold.

Function realized mainly by the retrieving condition changing portion 160 are as follows:

(1) The text data base to be retrieved is changed in accordance with the result of the retrieval or candidates of the text data base to determined to be changed in accordance with the result of the retrieval and the ground of the determination are presented to the user to urge the user to change the test data base.

(2) In a case where the rate of the total number of the document retrieved in the text data base in a predetermined number of retrieval operations is smaller than a predetermined rate of (a predetermined) total number of retrievals or in a case where a state where the rate of the total number of documents retrieved in the text data base is lower than (a predetermined) rate of the total number of retrievals is continued by several times, the text data base is excluded from the subject to be retrieved.

(3) In accordance with the balance of the contraction with the user, the retrieving conditions are changed.

(4) In accordance with the balance of the contraction with the user, the number of document to be retrieved is decreased to only the upper ranked documents.

Function realized mainly by the retrieval result presentation portion 158 are as follows:

(1) The display format is changed in accordance with the similarity.

(2) Documents of a type having great similarity are displayed with a large font.

(3) Documents of a type having great similarity are displayed with a gothic font.

(4) A larger display region is given to each of documents of a type having great similarity.

Also the retrieving condition changing portion 160 has the following functions:

(1) The threshold of the similarity is changed in accordance with the result of the retrieval or a new threshold calculated in accordance with the result of the result of the retrieval and the ground of the calculation are presented to the user to urge the user to change the threshold.

(2) The topic is changed in accordance with the result of the retrieval or candidates of topics, to be changed, which have been determined in accordance with the result of the retrieval and the ground of the determination are presented to the user to urge the user to change the topic.

(3) If a case where the number of retrieved documents is smaller than a (previously determined) number of retrievals is continued by the times larger than a (previously determined) number of times or if the total number of retrieved documents is smaller than a predetermined number, the threshold is changed, the topic is changed or the text data base is changed or the user is urged to change the foregoing.

(4) If a case where the number of retrieved documents is larger than a (previously determined) number of retrievals is continued by the times larger than a (previously determined) number of times or if the total number of retrieved documents is larger than a predetermined number, the threshold is changed, the topic is changed or the text data base is changed or the user is urged to change the foregoing.

(5) If a case where the number of retrieved documents is smaller than a (previously determined) number of retrievals is continued by the times larger than a (previously determined) number of times or if the total number of retrieved documents is smaller than a predetermined number, the threshold is lowered.

(6) If a case where the number of retrieved documents is larger than a (previously determined) number of retrievals is continued by the times larger than a (previously determined) number of times or if the total number of retrieved documents is larger than a predetermined number, the threshold is raised.

(7) If a case where the number of retrieved documents is smaller than a (previously determined) number of retrievals is continued by the times larger than a (previously determined) number of times or if the total number of retrieved documents is smaller than a predetermined number, the topic is changed to an upper topic or a relative topic.

(8) If a case where the number of retrieved documents is larger than a (previously determined) number of retrievals is continued by the times larger than a (previously determined) number of times or if the total number of retrieved documents is larger than a predetermined number, the topic is changed to a sub-topic.

The operations of the document retrieving portion and the retrieval result presentation portion for realizing the foregoing functions can be realized by a standard document retrieving system as disclosed in "Information Retrieval", Tetsuro Ito, Shoko-Do (1986).

The operation of the document retrieving portion 156 will now be described in detail.

Hitherto, the outputs of the result of the retrieval have been decreased such that the results of the retrieval are arranged in the descending order in terms of the similarities to output upper ranked articles in a case where the number of outputs has been specified or to output documents of a type having the similarity greater than a specified threshold, which is the lower limit value of the similarity, in a case where the threshold has been specified.

In the case where the number of outputs is specified, only articles of a type having a great similarity and determined to be directly related are output even if a multiplicity of articles relating to the specified topic exist. In the case where the threshold is specified, only articles having a certain extent of relativity are output even if a small number of articles relating to the specified topic exists.

In both of the cases, there is a possibility in the vicinity of the border line that either of articles having substantially the same similarity (relativity) is output and the other article having slightly poor similarity is not output.

To overcome the foregoing problem, the system according to this embodiment has a structure such that the total shape of the distribution of the similarities, which are results of the retrievals is determined to form groups each consisting of documents having relatively approximate similarities. Thus, output is performed from the group unit.

Figure 104:
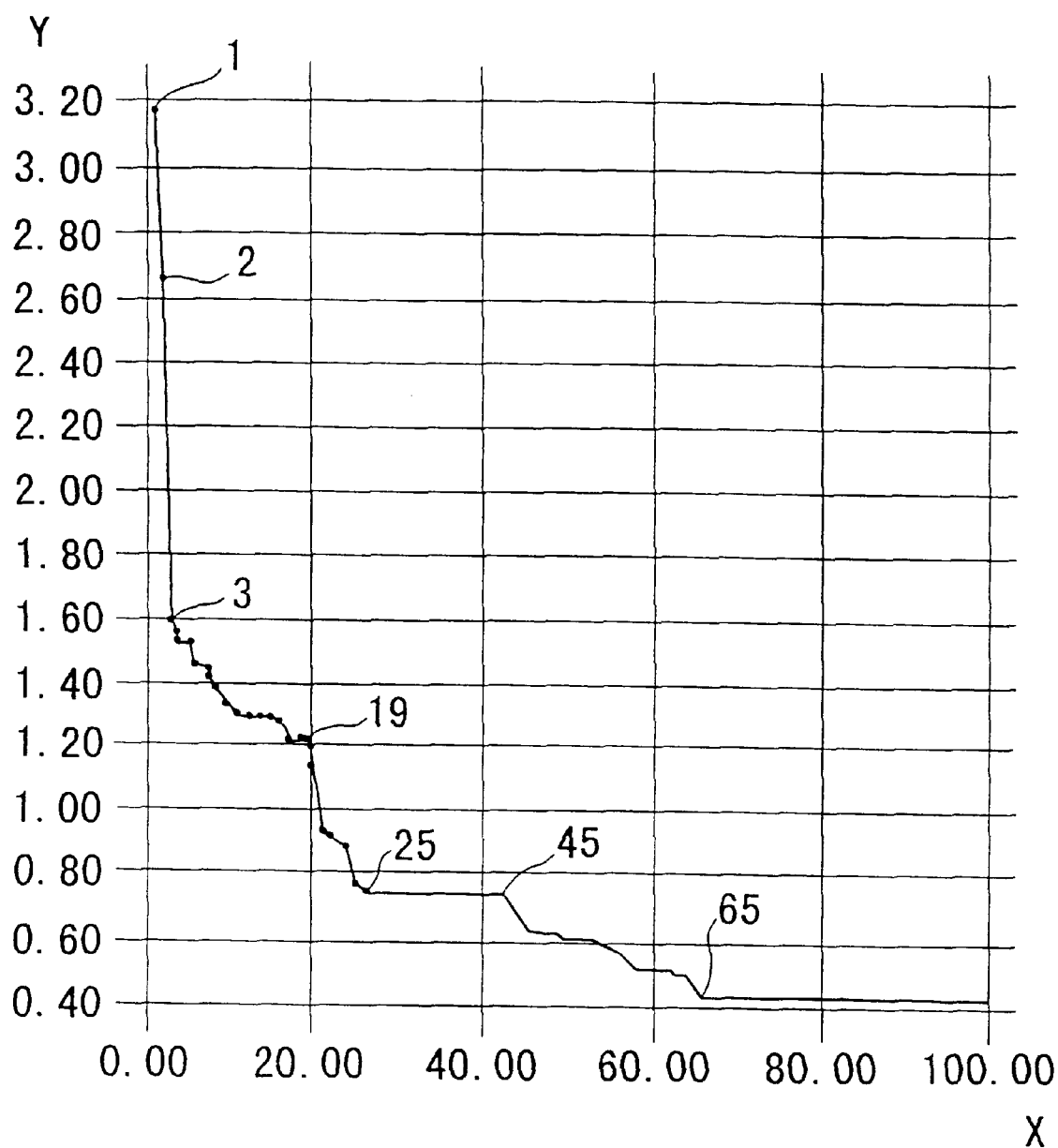
FIG. 104 is a diagram showing a state where results of retrieval of topics are lined up in the descending order in terms of the similarity in the apparatus according to a thirteenth embodiment of the present invention.

Then, the description will be made in accordance with a specific result of retrieval. FIG. 104 is a graph showing results of retrievals with respect to a certain topic in the descending order in terms of the similarities. The axis of ordinate stands for the similarities of documents, while the axis of abscissa stands for the order of the similarities. Referring to FIG. 104, the similarity is rapidly lowered (to 1.55) from the first document to the third document, the same is somewhat moderately lowered (to 1.21) from the third document to the 19-th document, the same is again rapidly lowered (to 0.75) from the 19-th document to the 25-th document, the 25-th to 45-th documents have the same similarities (about 0.75), the similarity is moderately lowered (to 0.45) from the 45-th document to the 65-th document, and the 65-th and ensuing documents have the same similarities (about 0.45).

Therefore, the similarities 1.55, 1.21, 0.75 and 0.45 can be used as criteria to classify the results of the retrievals. The foregoing values depend upon the contents of the topics to be retrieved and the result whenever the retrieval is performed. Thus, the values cannot be determined previously. By performing the output in units respectively classified by the foregoing values, in particular, by sectioning the portion in front and in the rear of the portion in which the similarity is not lowered or in which the similarities changes moderately, a problem can be prevented in that either of articles having substantially the same similarity (relativity) is output and the other one having slightly poor similarity is not output.

Figure 105:
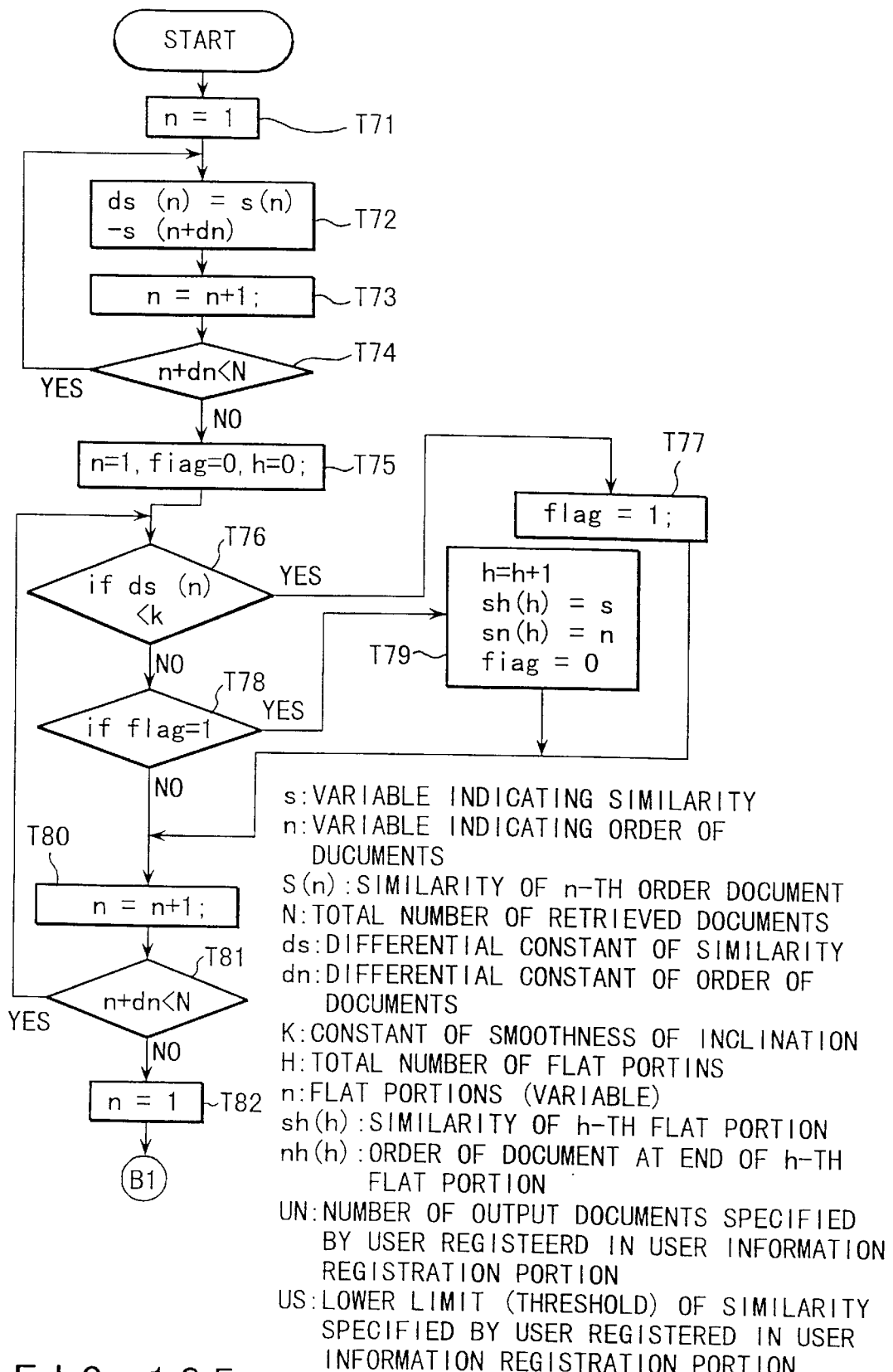
FIG. 105 is a flow chart showing a process for obtaining the right-hand end of a flat portion of a descending curve of similarities, the similarity at the position and the order of documents in the apparatus according to the thirteenth embodiment.
Figure 106:
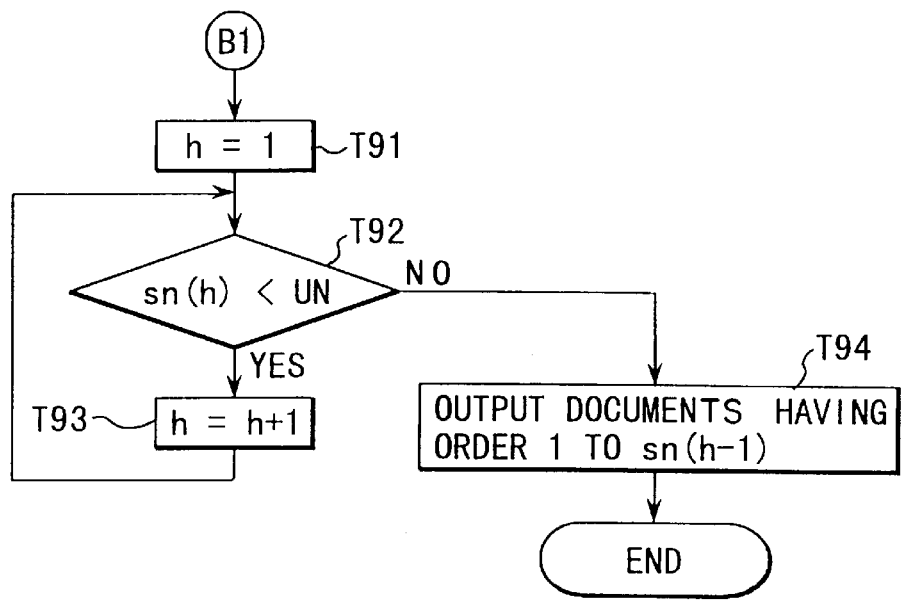
FIG. 106 is a flow chart showing a process for changing the number of documents to be output within a range in which the number is not larger than a specified number of documents to be output in the apparatus according to the thirteenth embodiment.
Figure 107:
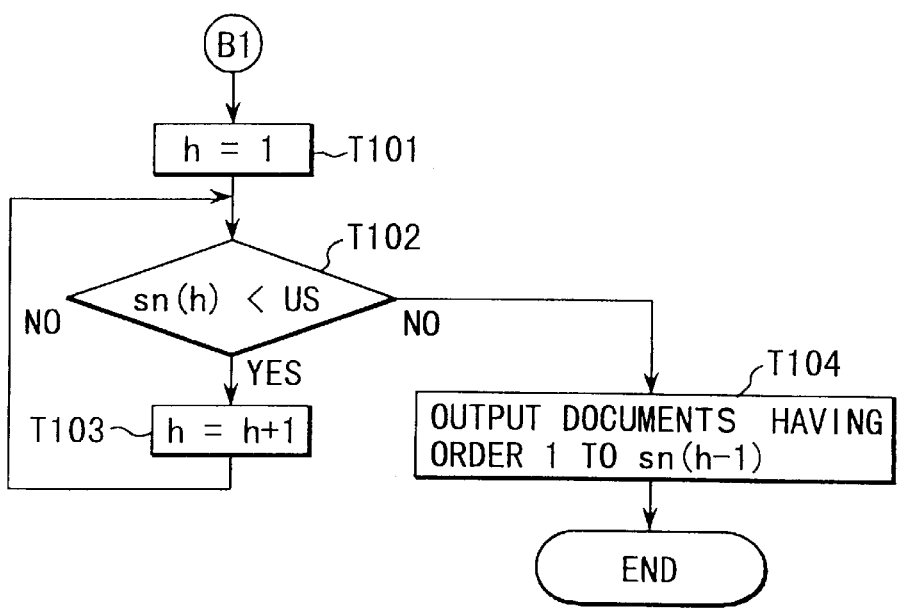
FIG. 107 is a flow chart showing a process for changing the number of documents to be output within a range in which the number is not smaller than a specified number of documents to be output in the apparatus according to the thirteenth embodiment.

FIGS. 105, 106 and 107 show algorithms for performing the foregoing operation. That is the algorithm shown in FIG. 105 and consisting of steps S71 to T82 has a structure such that the difference in the similarity is obtained for each document to obtain the right-hand end of a flat portion in which the similarity is not lowered considerably, the similarity at this position and the order of the document in a descending curve of similarities obtainable by ranking document in the descending order of the similarities as shown in FIG. 104.

The algorithm shown in FIG. 106 and consisting of steps T91 to T94 has a structure such that a flat portion in which the order of the document is the smallest in a range in which the number is not larger than the specified number of outputs is obtained to output document to the obtained position.

The algorithm shown in FIG. 107 and consisting of steps T101 to T104 has a structure such that a flat portion in which the similarity is the smallest within the threshold of the specified similarities is obtained to output document to the obtained position.

As a result of the process shown in FIGS. 105 to 107, the shape of the descending curve of the similarities obtained by ranking the document in terms of the similarities is determined. Thus, the retrieving condition is changed in such a manner that the portion, in which the similarity is made to be moderate, is made to be a new threshold or the number of document to be output.

In a case, which is one of characteristics of this system and in which the number of the document to be retrieved is decreased to only documents having great similarities in accordance with the balance of the contraction with the user, the operations of the document retrieving portion 156 and the retrieval result presentation portion 158 will now be described.

FIG. 123 shows an algorithm for performing the foregoing operation and consists of steps T201 and T202. With the algorithm above, the threshold is raised by a predetermined value if the balance of the contraction with the user has been made to be smaller than a predetermined value.

Although the conventional retrieving system has the structure such that the periodical retrieval service has been interrupted when the balance has been made to be zero, this system has a structure such that the number of retrievals is decreased when the balance has been made to be smaller than a certain value. Thus, rapid interruption of the retrieval is not performed even if the balance is made to be smaller. Thus, retrieval of important documents is continued.

An operation which is one of characteristics of this system, in which documents of a type having great similarity are displayed with a large font and which is performed by the retrieval result presentation portion 158 will now be described.

FIG. 124 shows an algorithm for realizing the foregoing operation and consists of steps T211 to T214. As a result of employment of this system, documents of a type having great similarity are displayed with a large font. Therefore, the user is able to easily determine the document which is most closely related to the retrieval topic among a plurality of presented documents.

Finally, the operation of the retrieving condition changing portion 160 will now be described.

The operation is performed for the purpose of realizing the following functions:

(Function 1) If a case where the number of retrieved documents is smaller than (a previously determined) number of retrievals is continued by the number of times larger than (a previously determined) number of times, or if the total number of documents retrieved during a predetermined number of previous retrievals is smaller than a predetermined number, the threshold is lowered.

(Function 2) If a case where the number of retrieved documents is larger than (a previously determined) number of retrievals is continued by the number of times larger than (a previously determined) number of times, or if the total number of documents retrieved during a predetermined number of previous retrievals is larger than a predetermined number, the threshold is raised.

(Function 3) If a case where the number of retrieved documents is smaller than (a previously determined) number of retrievals is continued by the number of times larger than (a previously determined) number of times, or if the total number of documents retrieved during a predetermined number of previous retrievals is smaller than a predetermined number, the topic is changed to an upper topic or a relative topic.

(Function 4) If a case where the number of retrieved documents is larger than (a previously determined) number of retrievals is continued by the number of times larger than (a previously determined) number of times, or if the total number of documents retrieved during a predetermined number of previous retrievals is larger than a predetermined number, the topic is changed to a sub-topic.

(Function 5) If the rate of the total number of documents retrieved from the text data base is lower than (a previously determined) rate of the total number of retrievals or if a case where the rate of the number of document retrieved from the text data base is lower than (a previously determined) rate of the total number of retrievals is continued by a presented number of retrieval times, the text data base is omitted from the subject to be retrieved.

Figure 108:
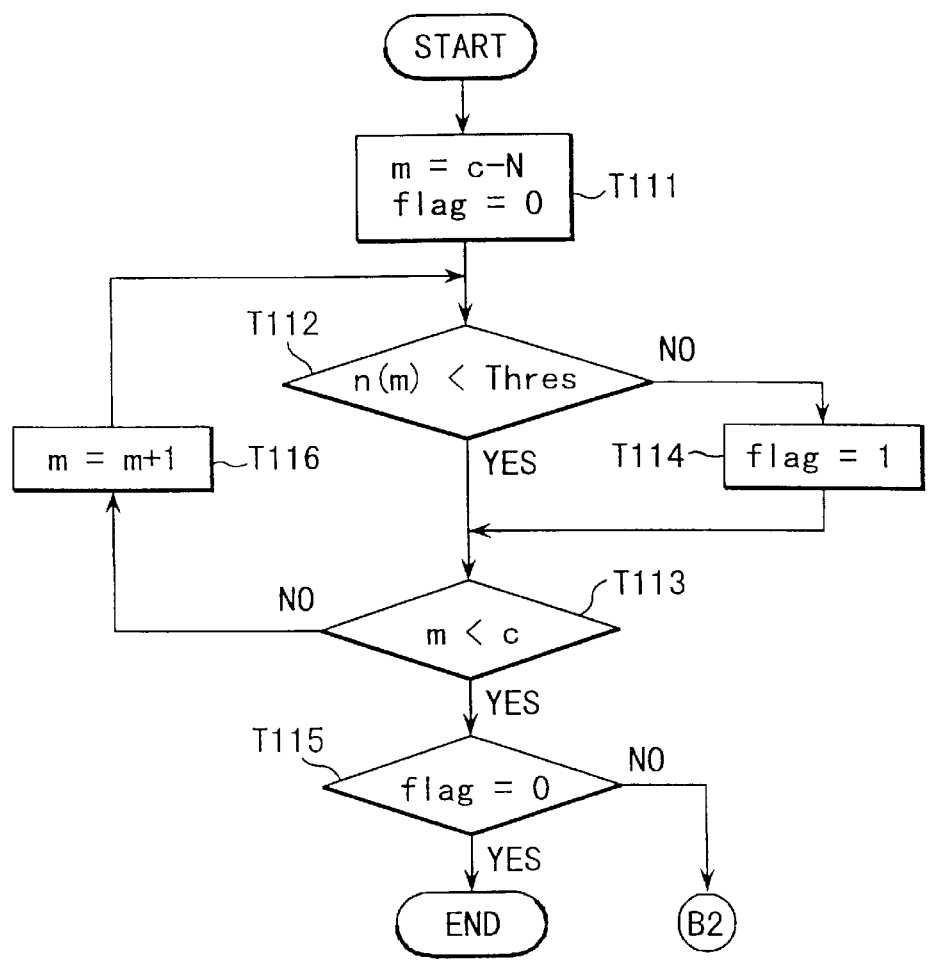
FIG. 108 is a flow chart showing a process for determining continuation of a fact that the number of retrieved documents is larger than a specified number by a specified number of times in the apparatus according to the thirteenth embodiment.

The algorithm shown in FIG. 108 and consisting of steps T111 to T116 is an algorithm for determining continuation of the case where the number of retrieved document is smaller than a specified number by a specified number of times. The foregoing algorithm is used to realize the functions 1 and 3.

Figure 109:
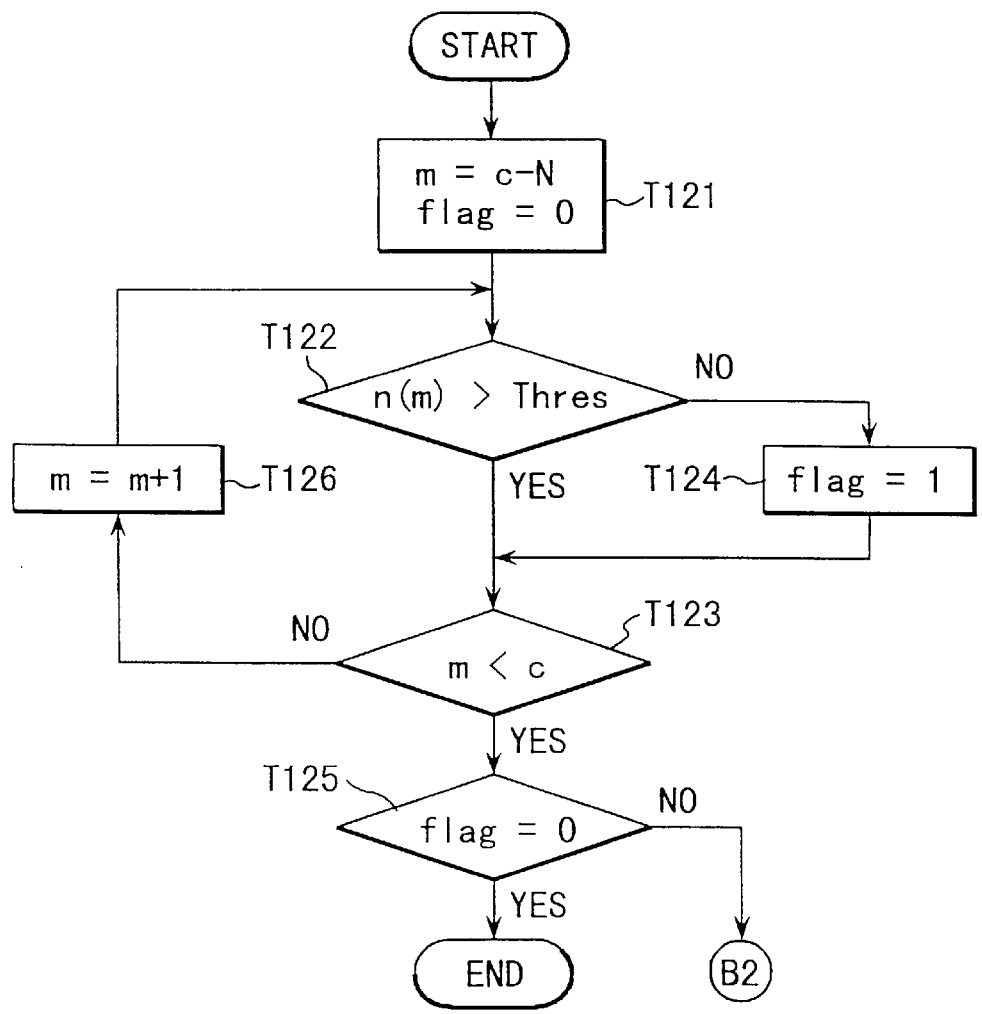
FIG. 109 is a flow chart showing a process for determining continuation of a fact that the number of retrieved documents is larger than a specified number by a specified number of times in the apparatus according to the thirteenth embodiment.

The algorithm shown in FIG. 109 and consisting of steps T121 to T126 is an algorithm for determining continuation of the case where the number of retrieved document is larger than a specified number by a specified number of times. The foregoing algorithm is used to realize the functions 2 and 4.

With Functions 1 and 2, UN or US registered to the user information storage portion 152 is added to or subtracted by a predetermined constant (dUS, dUN) if a determination is performed in accordance with the algorithm shown in FIG. 108 or 109 that change is required. Thus, US or UN is changed.

Figures 118, 119:
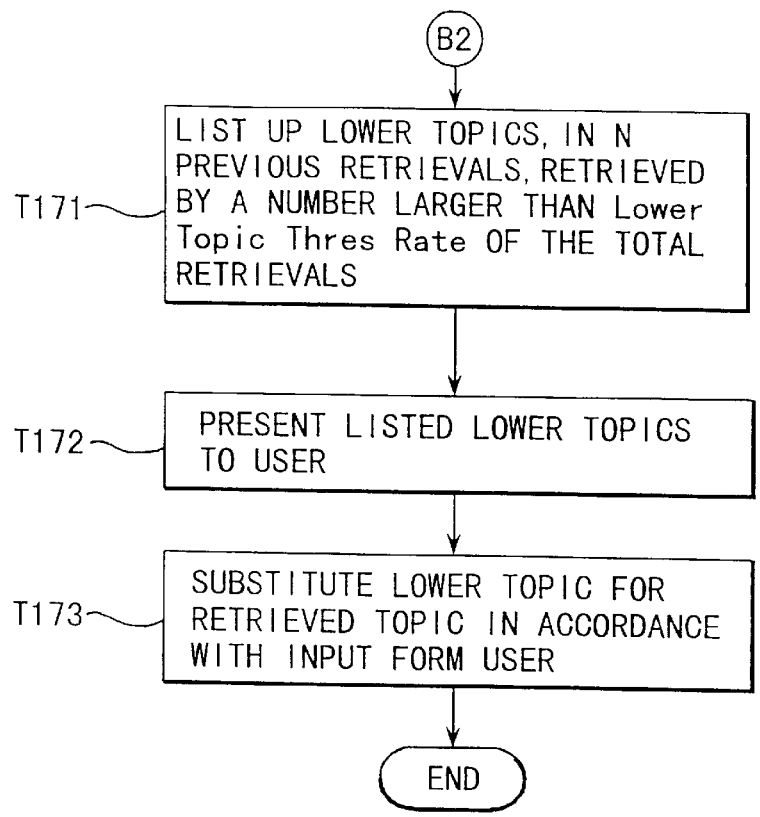
FIG. 118 is a flow chart showing another process for changing the topic in the apparatus according to the thirteenth embodiment.

FIGS. 110, 111, 112 and 113 show an algorithm having steps T131 to T134 and arranged to realize the foregoing function. FIGS. 117 and 118 show an algorithm having steps T161, T162, T171, T172 and T173 and arranged to realize Function 3. FIG. 119 shows an example of retrieval for describing the foregoing algorithm. In this example, the number of retrievals before the specified times (three times) is larger than a specified number (100). Therefore, the retrieval topic is changed to a sub-topic. In this case, the retrieval topic is changed to subtopic1 in which the rate of retrieval for each sub-topic is higher than a specified rate (60%).

Figure 120:
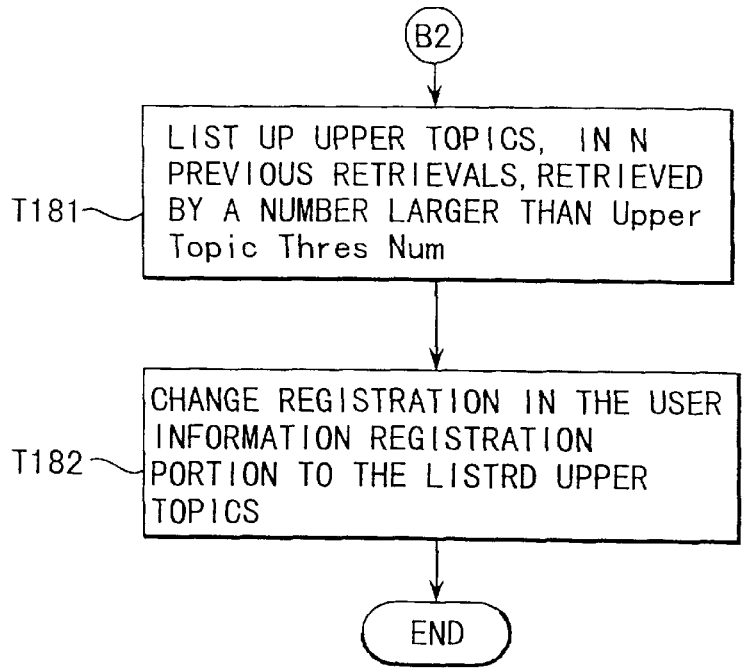
Figure 121:
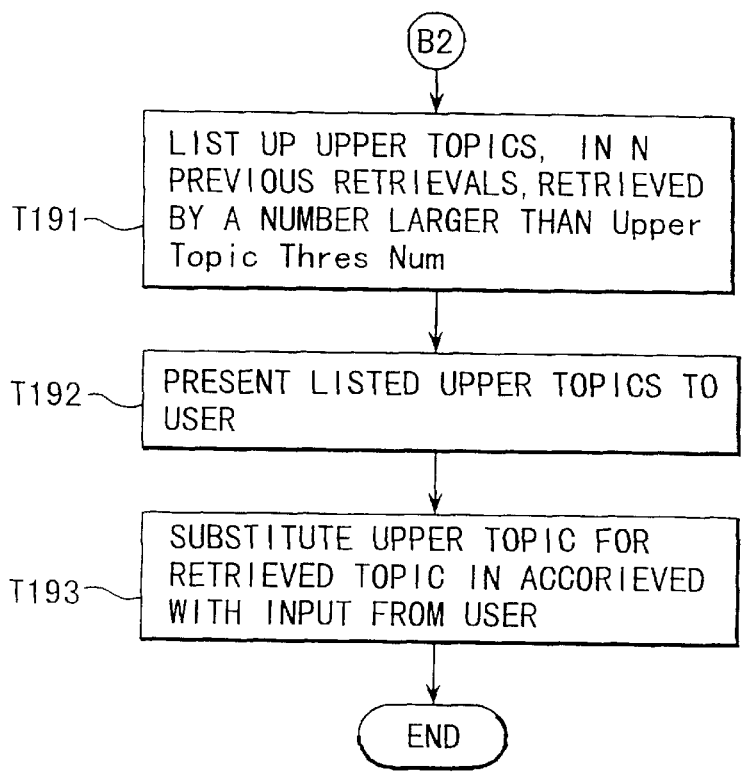

FIGS. 120 and 121 show an algorithm having steps T181, T182, T191, T192 and T193 and arranged to realize Function 4. FIG. 122 shows an example of retrieval for describing the algorithm. In this example, the number of retrievals is smaller than a specified number (five) before a specified number of times (three), the retrieval topic is changed to an upper topic or a relative topic. In the foregoing case, since the number of retrievals of UpperTopic3 is larger than the specified number of 10, the retrieval topic is changed to UpperTopic3.

Figure 114:
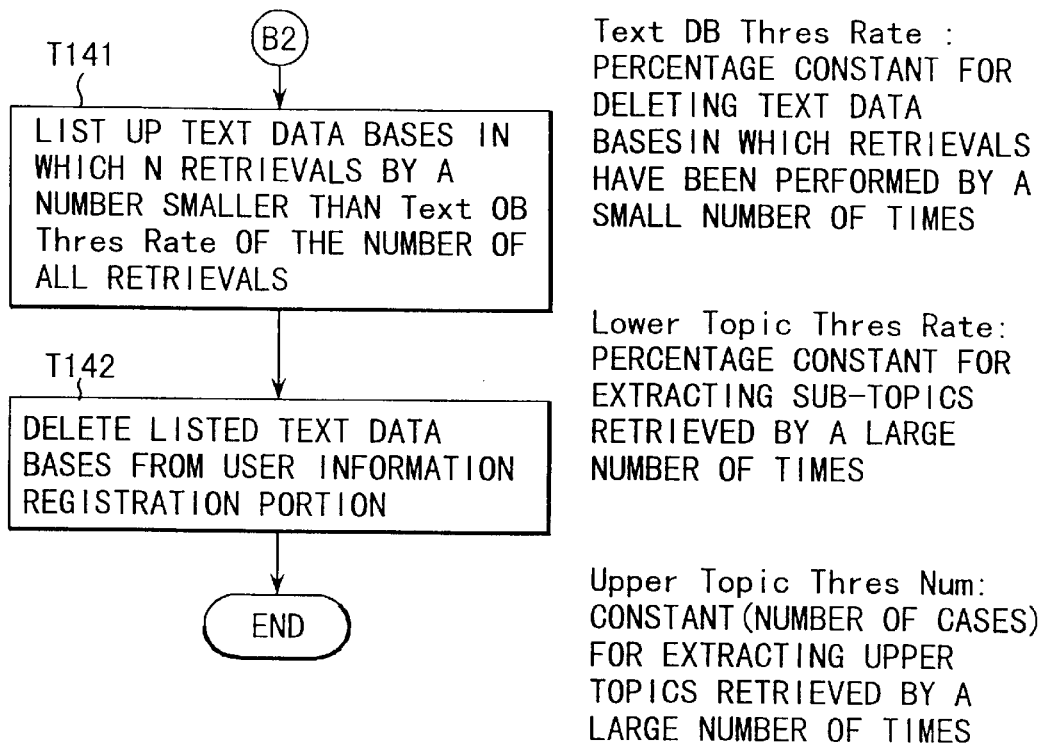
FIG. 114 is a flow chart showing a process for deleting a text data base from a user information storage portion in the apparatus according to the thirteenth embodiment.
Figure 115:
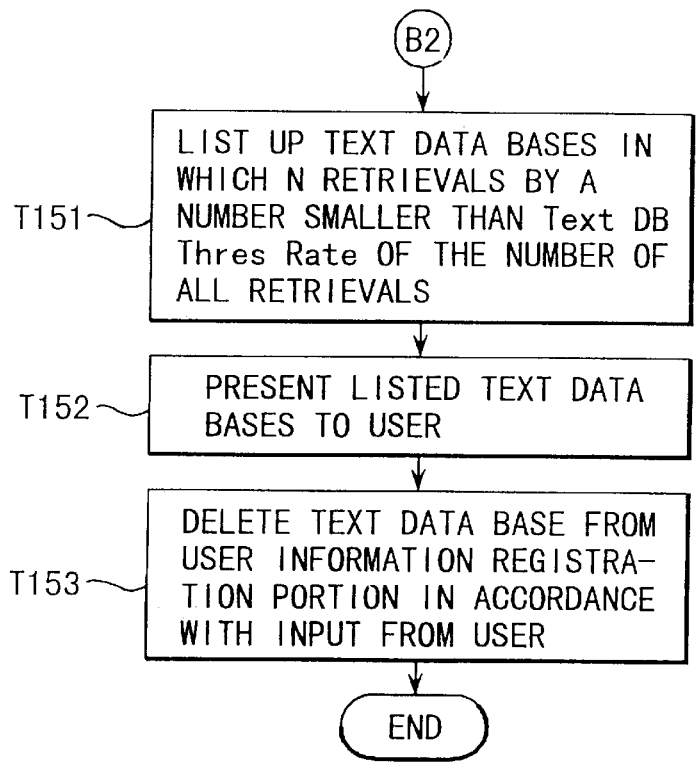
FIG. 115 is a flow chart showing another process for deleting a text data base from a user information storage portion in the apparatus according to the thirteenth embodiment.

FIGS. 114 and 115 shows an algorithm for realizing Function 5. FIG. 116 shows an example of retrieval for describing the algorithm above.

In this case, the ratio of the number of retrievals before the specified number of times (three times) with respect to the total number of retrievals for each text data base is examined, thus resulting in the ratio of text data base 1 being 1%. Since the ratio is lower than the specified ratio (10%), the text data base is omitted from the subject to be retrieved.

As described above, the structure according to the thirteenth embodiment has an arrangement such that the topic or the threshold of the similarity is dynamically changed whenever the retrieval is executed or in accordance with the results of plural times of retrievals. Thus, the retrieving conditions and the threshold of the similarities are enabled to automatically follow the contents of a text article, which are changed as the time passes. Therefore, even if the user does not change the specification of the retrieving conditions, appropriate articles can always be presented to the user.

Fourteenth Embodiment

A fourteenth embodiment of the present invention will now be described.

FIG. 126 shows the structure of an information filtering center 110-8 according to a fourteenth embodiment. Referring to FIG. 126, arrows drawn with continuous lines indicate flows of data and arrows drawn with dashed lines indicate a flow of the process. The information filtering center 110-7 comprises a document information extracting portion 171 for extracting, from documents supplied from information sources, information required to perform a filtering operation, a document retrieving portion 172 for retrieving, from the supplied document, document satisfying the user profile, a document filtering portion 173 for ranking the document obtained by the document retrieving portion 172 to filter documents to be presented to the user, a presentation information generating portion 174 for generating document information to be presented to the user, a user interface portion 175 for transmitting document to the user and receiving requirements from the user, a word extracting portion 176 for extracting, from the document satisfying the requirement of the user or the document that does not satisfy the requirement, important words or needless words, a user profile changing portion 177 for changing the user profile with the words extracted by the word extracting portion 176 and a document information storage portion 178 for storing document information for use in the filtering operation, the user profiles and dictionaries for analyzing documents.

Figure 127:
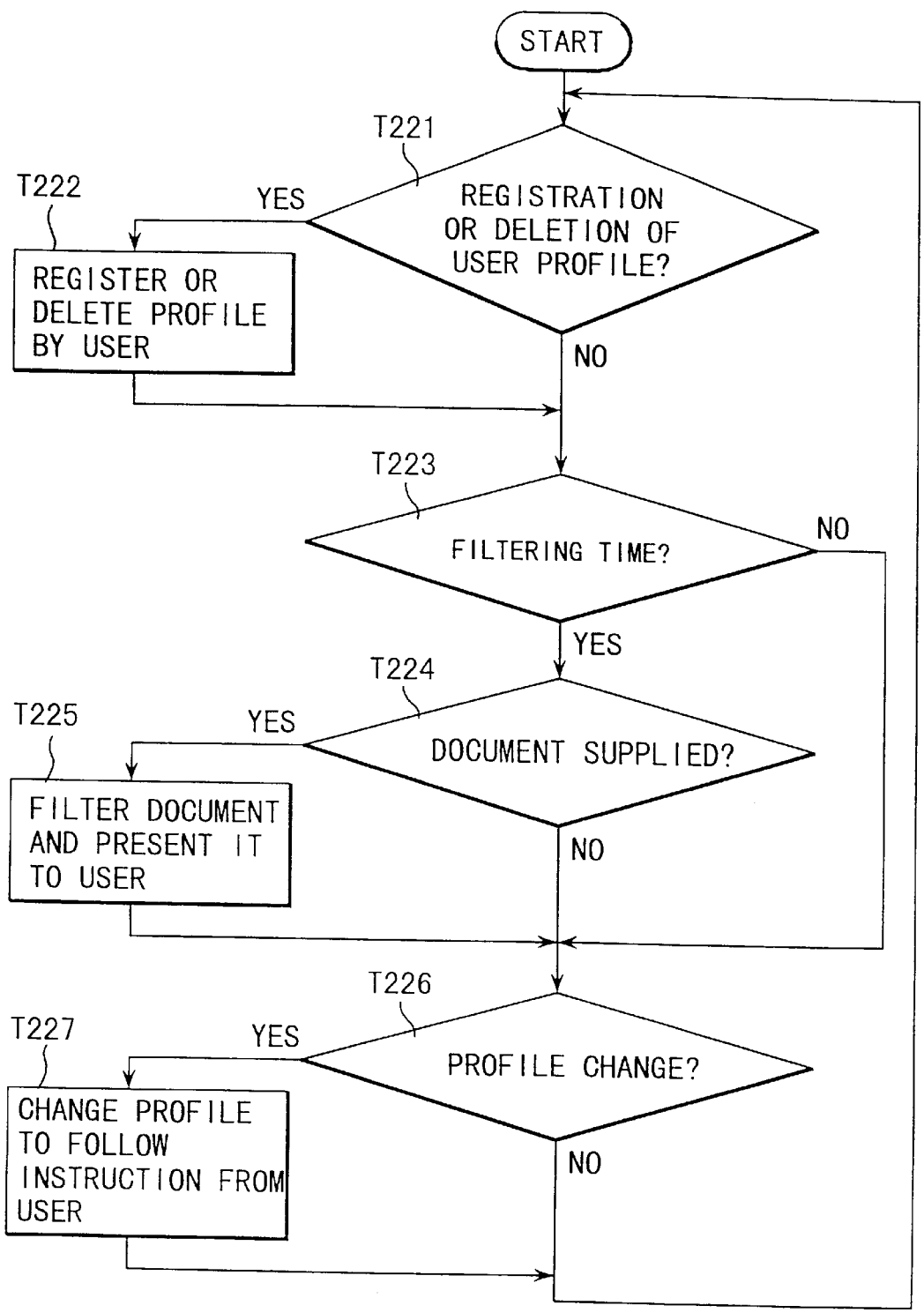

FIG. 127 shows a flow of the process according to the fourteenth embodiment. The process according to the fourteenth embodiment consists of three cycles, that is, a process for registering and deleting the user profile to be performed by the user (steps T221 and T222), a process for filtering a document (steps T223 to T225), and a process for changing the user profile with the specification of documents issued from the user (steps T226 and T227). As described above, the user profile is a set of words for expressing the requirements of the user so as to be used in calculations of the similarity to be described later.

FIG. 128 shows the filtering process (steps T223 to T225) shown in FIG. 127. Initially, the document supplied from an information source is, by the document retrieving portion 172, retrieved with words specified in the user profile to detect document containing the words (step T231).

Since a multiplicity of document retrieving algorithms have been put into the market and realized, the description about the algorithm is omitted here.

Then, analysis of the morpheme, analysis of the format and the analysis of the construction of the document obtained due to the retrieval are performed by the document information extracting portion 171 to generate information required to rank the document and the information item is stored (step T232).

The document filtering portion 173 ranks the documents obtained due to the retrieval of character strings in accordance with the user profile and determines documents to be presented to the user (step T233). The determined documents are presented to the user (step T234).

FIG. 129 shows a process for changing the user profile shown in FIG. 127 (steps T226 and T227). That is, if the user is unsatisfactory about the result of the filtering operation, the user changes the contents of the user profile by specifying a document satisfying the requirement of the user or a document which does not satisfy the same among presented documents or document of the user (step T241). Then, the morpheme of the specified document is analyzed to examine independent words existing commonly in each of the adaptable document group and a non-adaptable document group (steps T242 and T243). The independent words common to the adaptable documents include words important for the requirement from the user, while independent words common to non-adaptable document group as well as include words which do not relate to the requirement from the user.

Then, the user selects appropriate words from the obtained independent words to add the same to the user profile or delete the same from the user profile (steps T244 and T245).

FIG. 130 shows the document analyzing process (step T232) shown in FIG. 128 in detail.

The document information extracting portion 171 analyzes the morpheme of each document obtained due to the document retrieval performed by the document retrieving portion 172 by using the words if the same has not been analyzed to extract independent words in the document (steps T251, T252 and T253).

If the analysis has been performed by a filtering operation performed by another user, analysis of the analyzed document is not performed.

As a result, the time required to perform the process can be shortened as compared with the case where document information is previously extracted.

FIG. 131 shows the filtering process (step T233) shown in FIG. 128 in detail. Initially, calculations for obtaining similarities are performed with the occurrence frequency in character unit match (step T261). In this example, the occurrence frequency of word in the user profile matched in the document in character units is used to calculate the similarity between the document and the user profile. The "similarity" indicates the correlation between a document and a user profile. In general, the greater the similarity is, the more the document likes the user profile. Since a multiplicity of methods of calculating the similarity have been suggested (for example, "SMART Information Retrieving System", by G. Sarton), it is omitted from detailed description.

Then, calculations for obtaining similarities (step T262) such that the frequency of words in the user profile matched to the words extracted due to the morpheme analysis is used to calculate the similarity between the document and the user profile.

The calculations for obtaining similarities by using the occurrence frequency in the character unit match has a possibility the similarity is calculated including words having completely different meanings. On the other hand, the calculations for obtaining similarities using the occurrence frequency in the word unit match is free from the foregoing problem. On the contrary, the calculations for obtaining similarities by using the occurrence frequency in the word unit match has a possibility that a word which is not included in the dictionary for analyzing the morpheme cannot be analyzed correctly and, thus, the word is not included in the calculations for obtaining similarities. However, the calculations for obtaining similarities using the occurrence frequency in the character unit match is free from the foregoing problem. Therefore, use of both of the calculation methods for obtaining similarities compensate the mutual disadvantages to enable the similarity to be calculated more accurately.

After the calculations for obtaining similarities by the two methods have been performed, the results are made up to rank the document (step T263). As a matter of course, a modification may be employed in which the greater similarity between the similarities obtained in steps T261 and T262 is employed.

Then, the documents are ranked (step T264). The operation for ranking documents is performed in the descending order in terms of the total amount of the similarities. Since a multiplicity of sorting algorithms can be available and they are known techniques, the algorithms are omitted from the description.

Then, documents having great similarities are selected by the number specified previously (step T265).

As described above, the structure according to the fourteenth embodiment has the structure such that a plurality of calculation methods for obtaining similarities are combined with each other so that deterioration in the filtering accuracy, experienced with the single calculation method for obtaining similarities, is prevented. Thus, the filtering accuracy can be improved. It is preferable that the similarities are calculated by combining the calculations for obtaining similarities by using the occurrence frequency in the character unit match and the calculations for obtaining similarities by using the occurrence frequency in the word unit match. The calculations for obtaining similarities by using the occurrence frequency in the character unit match have a possibility that the similarity are calculated including words having completely different meanings. On the other hand, the calculations for obtaining similarities by using the occurrence frequency in the word unit match is free from the foregoing problem. On the contrary, the calculations for obtaining similarities by using the occurrence frequency in the word unit match has a possibility that a word which is not contained in the dictionary for analyzing the morpheme cannot correctly be analyzed and, thus, it is not included in the calculations for obtaining similarities. However, the calculations for obtaining similarities by using the occurrence frequency in the character unit match is free from the foregoing problem. Therefore, by combining the two calculation methods for obtaining similarities, the mutual disadvantages can be compensated and, therefore, the similarity can be calculated more accurately.

To previously process only articles required for performing the filtering process simultaneously with the filtering process, a primary retrieval is simply performed such that articles including words specified with the retrieving conditions are initially selected. Then, a previous process is performed such that the morpheme and the format of the articles selected due to the primary retrieval are analyzed. As a result, the time required to complete the filtering process can be shortened and the required storage region can be reduced. Since the function is provided with which words for changing the user profile are extracted from the adaptable documents or non-adaptable documents specified by the user to change the user profile with the extracted words to make the user profile to be adaptable to the requirements and the interests of the user, the filtering performance can be improved further satisfactorily.

A specific example of a process for analyzing documents described in step T233 shown in FIG. 128 will now be described. A flow of the document analyzing process is shown in FIG. 132. The document information storage portion 178 stores information about the electronic format of article files and information (format information) about the arrangement and the structure of documents, such as the date, author, caption, body and abstract, registered thereto.

In the format analyzing process (step T271), the format of each of documents supplied from information sources and formed into a variety of formats is analyzed by using the information about the format to convert the documents into a unified format in sentence units. Then, the morpheme analyzing process (steps T272 and T273) is performed in such a manner that the morpheme is analyzed in sentence units so that results of the analysis are, together with the original article file, stored in the document information storage portion 178.

FIG. 133 shows a flow of the format analyzing process. The document analyzing process will specifically be described.

An article 200 supplied from an information source is formed into a format, for example, as shown in FIG. 134. In the format analyzing process, initially, a reference is made to format information registered to the document information storage portion 178 to obtain information of the format of the article file (step T281). As shown in FIG. 134, the article file has a separator 201 in the form of a symbol "\t" and the date of the article, title, abstract and the body which are elements of the document and which are disposed in this sequential order. The symbol "\t" is previously added to the article file and supplied from the information source.

In the format analyzing process, the document file is divided into document elements in accordance with the foregoing information item. The line of the file is fed at an interval of 40 words for the convenience of processing the file. Therefore, the line feeding symbol is deleted and the lines are connected (step T282).

Then, in the format analyzing process, -the structure of the chapter of the abstract and the body are analyzed and the captions of the chapters are detected (step T283). The foregoing process is performed in accordance with document information registered to the document information storage portion 178. In the case where the document is formed into the SGML (Standard Generalized Markup Language) format, the document structure analysis (SGML baring) is performed in accordance with an appropriate document structure definition file (DTD).

In a case where a specific symbol indicates a chapter or the start or the end position of the caption for the chapter, the chapter is divided and the captions of the chapters are detected in accordance with the information item.

Then, paragraphs of the detected chapters are detected and the paragraphs are divided into sentences (steps T284 and T285).

In the process for dividing the paragraphs into sentences, punctuation marks "." or "," are used as the division units to divide each paragraph into sentences. In this process, a dash symbol "-" and quotation marks may be used as the division units as well as the punctuation marks. In a case where a multiplicity of dash symbols "-" exist successively, the sentence is usually ended here. Therefore, the foregoing position is employed as the dividing point.

In a case where no information about the document file is stored in the document information storage portion 178, the analysis of the chapters and the paragraphs are automatically performed by heuristics rule. In this case, a line positioned between forward and behind blank lines, having a relatively short length and ended without the punctuation mark is determined to be a caption of the chapter. In a case where a space or a tab mark exists in the leading portion of the line, the forward line is ended with a punctuation mark and the length is shorter than a standard length (40 characters), this position can be determined to be the break position of the paragraph.

The heuristics rule enables a variety of document information items to be obtained. For example, in a case where a character string . . . "a character string of name" exists at the end of an article, it can be considered to be the name of the writer.

In a case where " . . . a character string of the name of a place . . . from" or "a character string of the name of a place . . . department" exists at the beginning of the article, it can be considered to a newspaper publishing company or a department of the same which is the source of the article. In accordance with the heuristics, the caption of the chapter, the paragraph and document information are analyzed.

Results of the foregoing process are stored in the text data storage portion of the document information storage portion 178 in accordance with a specified format. A result 202 of the analysis of the format of the document shown in FIG. 134 is shown in FIG. 135. In the leading ends of the line, there are provided symbol "T" representing a title, "A" representing an abstract, "M" representing a caption and "8" representing the leading end of the paragraph. The provided numerals represent the sentence numbers.

Then, the morpheme is analyzed in units of the sentences obtained due to the format analysis. That is, an example 203 which is a result of analysis of the morpheme with respect to the result of the analysis of the format shown in FIG. 135 is shown in FIG. 136.

Symbol "/" represents a break of a clause, "< >" represents the part of a speech of the morpheme and "+" represents a break between an independent word and an annexed word or between annexed words.

Although one original article is in the form of one file in this embodiment, a plurality of documents are sometimes collected into one file.

In the foregoing case, prior to performing the analysis of the format of each article, a process is performed in which the article file is divided into each article.

Although the original article file is in the form of a text file in this embodiment, it is sometimes in the form of a binary file formed by a compression process or an SGML document. Since information of the format of the file has been registered to the document information storage portion 178, a process for expanding the compressed article or a process for barging the SGML file is performed, if necessary.

The dictionary for analyzing the morpheme for use to analyze the morpheme may be switched for each type of the article or each information item.

Fifteenth Embodiment

A fifteenth embodiment of the present invention will now be described.

The structure of the fifteenth embodiment is the same as that according to the fourteenth embodiment except the process for analyzing the document and the filtering process.

FIG. 137 shows, in detail, the document analyzing process (step S232) shown in FIG. 128. The document information extracting portion 171 analyzes the morpheme of each document obtained due to retrieval of documents with the words performed by the document retrieving portion 172 if the same has not been analyzed. Thus, the document information extracting portion 171 extracts independent words in the document and analyzes the format of the document (steps T291 and T292). In this analysis process, the caption and the body of the document are separated from each other.

FIG. 138 shows a process formed by adding, to the process shown in FIG. 131, calculations for obtaining similarities by using occurrence frequency in the captions in the character unit match (step T303) and calculations for obtaining similarities by using the occurrence frequency in the captions in the word unit match (step T304). The other steps T301, T302 and T305 to T307 are the same as the corresponding steps T261, T262 and T263 to T265 shown in FIG. 131.

Since steps T303 and T304 are added, a word existing in the caption which directly expressing the contents of the document can be stressed when the filtering process is performed.

Sixteenth Embodiment

The structure of the apparatus and the functions are the same as those according to the fifteenth embodiment. Only the portions different from the structure shown in FIG. 138 will now be described. A structure shown in FIG. 139 is different from that shown in FIG. 138 in the calculations for obtaining similarities by using the occurrence frequency in the first sentence in the character unit match (step T313) and the calculations for obtaining similarities by using the occurrence frequency in the first sentence in the word unit match (step T314). Steps T311, T312 and T315 to T317 shown in FIG. 139 are the same as steps T301, T302 and T305 to T307 shown in FIG. 138.

Since the overall contents of the document are usually expressed in the first sentence of the document, also the first sentence can be stressed in steps T313 and T314 when the filtering operation is performed.

Seventeenth Embodiment

The structure of the apparatus and the functions are the same as those according to the fifteenth embodiment. Only the portions different from the structure shown in FIG. 138 will now be described. A structure shown in FIG. 140 is different from that shown in FIG. 138 in the calculations for obtaining similarities by using the occurrence frequency in the first paragraph in the character unit match (step T323) and the calculations for obtaining similarities by using the occurrence frequency in the first paragraph in the word unit match (step T324). Since the overall contents of the document are usually expressed in the first paragraph of the document, also the first sentence can be stressed in steps T313 and T314 when the filtering operation is performed. Steps T321, T322 and T325 to T327 shown in FIG. 140 are the same as steps T301, T302 and T305 to T307 shown in FIG. 138.

Eighteenth Embodiment

The structure of the apparatus and the functions are the same as those according to the fifteenth embodiment. Only the portions different from the structure shown in FIG. 141 will now be described. A structure shown in FIG. 141 is formed by adding, to the process shown in FIG. 131, the calculations for obtaining similarities by using a cooccurrence frequency in one sentence in the character unit match (step T333) and the calculations for obtaining similarities by using the cooccurrence frequency in one sentence in the word unit match (step T334). As a result, in a case where two or more words coexist in one sentence, a determination can be performed that the document is an important sentence to raise the similarity. Steps T331, T332 and T335 to T337 shown in FIG. 141 are the same as steps T261, T262 and T265 to T267 shown in FIG. 131.

Nineteenth Embodiment

The structure of the apparatus and the functions are the same as those according to the fifteenth embodiment. Only the portions different from the structure shown in FIG. 131 will now be described.

A structure shown in FIG. 142 is formed by adding, to the structure shown in FIG. 131, the calculations for obtaining similarities by using the cooccurrence frequency in one sentence in the character unit match (step T343) and the calculations for obtaining similarities by using the cooccurrence frequency in the word unit match (T344). As a result, in a case where two or more words coexist in one paragraph, a determination can be performed that the document is an important sentence to raise the similarity. Steps T341, T342 and T345 to T347 shown in FIG. 142 are the same as steps T261, T262 and T265 to T267 shown in FIG. 131.

Twentieth Embodiment

The structure of the apparatus and the functions are different from those according to the fourteenth embodiment shown in FIG. 126. FIG. 143 shows the structure according to the twentieth embodiment which is formed by omitting the word extracting portion 176 and the user profile changing portion 177 from the structure shown in FIG. 126. The bidirectional user interface portion 175 shown in FIG. 126 is replaced by a document transmission portion 81 of a single-direction type.

FIG. 144 shows a flow of the process according to the twentieth embodiment, which is formed by omitting the process for changing the user profile from the embodiment shown in FIG. 127 showing the flow of the process.

As a result, the twentieth embodiment provides an apparatus for only an information filtering system formed by omitting the change of the user profile to be performed by the user from the structure according to the fourteenth embodiment.

The sixth to twentieth embodiments may be combined. Although the description has been performed about the network system in which results of filtering is supplied from the center to the user through the communication network, the function of the center, which is the core of the information filtering system according to the present invention, can be constituted on a personal computer. In this case, the user's terminal equipment and the filtering system are formed integrally and no network exists between the user's terminal equipment and the filtering system.

As described above, according to the present invention, the relativity of the articles to be presented to the user can be made clear due to the information filtering process so that the user understands the contents of the articles. In particular, the process of an event, the state of which is changed as the time passes can be recognized, and information over a plurality of articles, for example, in the serial form can easily be recognized. Thus, the performance of the filtering system can be improved. Moreover, presentation of articles having the same contents and obtained from a plurality of information sources can automatically be prevented.

Since the topics selected by the user and satisfied by the presented articles are displayed to the user, the user is able to easily understand the contents of the article. Since the method of other uses to read the article which is being presented can be clearly displayed for the user, the user is able to identify general articles and articles read by a portion of users. Moreover, the user is permitted to make an access to information about the previous determinations of usefulness performed by the user and those performed by other users so that relevance feedback maintaining consistency and relevance feedback while making a reference to the determinations performed by other users are performed. In addition, the previous determination of the usefulness can be modified to again perform the relevance feedback.

Moreover, a summary, an abstract having a length corresponding to the topic satisfied by the article or a summary or an abstract having a length corresponding to the attribute of the article is presented to the user, the ratio of useful text information for the user can be raised. Thus, the user is able to efficiently collect information.

Since the relevant articles are formed into groups or made to be related to one another when provided for a user, the labor for the user can considerably be reduced. The similarity with previous articles supplied to the user is obtained as well as the similarity between articles supplied this day. Moreover, information to identify whether the articles are in a group consisting of articles supplied this day or a group including previous articles is added to the article to be presented. Therefore, the user is able to efficiently arrange the relevant articles when the user reads the articles.

According to the present invention, the information filtering service, the subject of which is news sources including articles written in a plurality of languages, can be provided for the user. Since the retrieving conditions are dynamically changed whenever the retrieval is performed or in accordance with results of several times of retrieval operations to cause the retrieving conditions to follow the change in the contents of the text data base as the time passes, the necessity for the user to change the non-appropriate retrieving conditions can be eliminated. By combining a plurality of methods of calculating the similarity, the filtering accuracy can be improved. Since information of documents is analyzed when the retrieval is performed, the time required to complete the filtering operation can be shortened.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An information filtering apparatus comprising:
   means for receiving articles from information sources;
   means for storing retrieval conditions previously specified for a user;
   means for storing retrieval conditions previously specified for a user;
   article retrieving means for retrieving the articles received by said receiving means to select articles which match the retrieval conditions stored in said storing means for the user;
   determining means for determining relevant articles for each article selected by said article retrieving means by calculating similarities among the articles selected by said article retrieving means or calculating similarities among the selected articles and other articles received by said receiving means;
   output means for outputting the selected articles with information of the determined relevant articles; and
   means for outputting the selected articles by retrieval conditions specified in a single language by another language calculating similarities among the retrieval conditions replaced into the another language and the articles retrieved by said article retrieving means and written in a different language to select articles in accordance with the similarities.

2. An information filtering apparatus according to claim 1, further comprising means for outputting the selected articles with information of retrieval conditions under which the articles have been selected by said article retrieving means to each article.

3. An information filtering apparatus according to claim 1, further comprising means for generating a summary having a length corresponding to a type of each article selected by said article retrieving means and means for outputting the summary generated by said means for generating to the user.

4. An information filtering apparatus comprising:

means for receiving articles from information sources;

means for storing retrieval conditions previously specified for a user;

article retrieving means for retrieving supplied articles to select articles which match the retrieval conditions for the user so as to present the articles to the user; and means for generating a summary having a length corresponding to similarities among retrieval conditions and a type of the article selected by said article retrieving means to present the summary to the user.

5. An information filtering apparatus, comprising:

means for receiving articles from information sources;

means for storing a retrieval condition;

first calculating means for calculating first similarities between the retrieval condition stored in said storing means and the articles received by said receiving means;

output means for sorting the articles received by said receiving means based on the first similarities and for extracting at least one of 1) a predetermined number of articles selected from articles having a highest first similarity and 2) articles which have the first similarities greater than a predetermined threshold;

second calculating means for calculating second similarities between the articles extracted by said output means based on a field of the articles including at least one of a first sentence, a first paragraph, and a caption; and means for grouping the articles extracted by said output means based on the second similarities.

6. An information filtering apparatus, comprising:

means for receiving articles from information sources;

means for storing a retrieval condition;

means for calculating first similarities between the retrieval condition stored in said storing means and the articles received by said receiving means;

output means for sorting the articles received by said receiving means based on the first similarities and for extracting at least one of 1) a predetermined number of the articles selected from articles having a highest first similarity and 2) articles which have the first similarities greater than a predetermined threshold;

output article storage means for storing the articles extracted by said output means;

means for calculating second similarities between the articles stored by said output article storage means and the articles which are extracted by said output means; and means for grouping the articles stored by said output article storage means and the articles which are extracted by said output means based on the second similarities, the articles grouped having information when the article is received by said receiving means.

7. An information filtering apparatus comprising:

means for receiving articles from information sources;

means for storing retrieval conditions;

means for calculating similarities among retrieval conditions and supplied articles to retrieve articles by a specified number or articles having similarities greater than a predetermined threshold in accordance with the calculated similarities;

means for outputting the retrieved documents to a user; and means for receiving articles written in a different language, replacing retrieval conditions specified in a single language by another language to calculate similarities with the articles to output the article written in the different language to the user while being mixed with the documents to be output by said outputting means.

8. An information filtering apparatus, comprising:

means for receiving articles from information sources;

means for storing a retrieval condition;

means for calculating similarities between the retrieval condition stored in said storing means and the articles received by said receiving means;

output means for sorting the articles received by said receiving means based on the similarities and for extracting at least one of 1) a predetermined number of the articles selected from articles having a highest similarity and 2) articles which have the similarities greater than a predetermined threshold; and means for changing at least one of 1) the predetermined threshold and 2) the retrieval conditions based on a total number of the articles extracted by said output means.

9. An information filtering apparatus, comprising:

means for receiving articles from information sources;

means for storing a retrieval condition; and filtering means for calculating similarities between the retrieval condition stored in said storing means and the articles received by said receiving means using a combination of a character string matching scheme and a word matching scheme; and means for extracting the articles received by said receiving means based on the similarities calculated by said filtering means.

10. An information filtering method comprising:

a step for receiving articles from information sources;

a step for storing retrieval conditions previously specified for a user;

an article retrieving step for retrieving the supplied articles to select articles which satisfy the retrieval conditions for the user;

a determining step for determining relevant articles for each article in accordance with the similarities by calculating similarities among the articles selected in said article retrieving step or similarities among the selected articles; and an output step for outputting the articles with information of the determined relevant articles.

11. An information filtering method comprising:

a step for periodically receiving articles from information sources;

a step for calculating similarities among retrieval conditions previously specified by a user and supplied articles;

a step for sorting the articles in a descending order of the similarities calculated in said step and selecting articles by a predetermined number or only articles having similarities greater than a predetermined threshold;

an output article storage step for storing articles output to the user as a result of filtering;

a step for collecting articles stored in said output article storage step and articles supplied this day to calculate similarities among the articles so as to form the articles into groups or making the articles to be related to one another so as to output the articles to the user; and a step for adding, to each article to be output, information whether the articles are in a group consisting of only articles supplied this day or a group including previous articles.

12. An information filtering method comprising:

a step for receiving articles from information sources;

a step for calculating similarities among retrieving conditions previously specified by a user and supplied articles to retrieve articles by a specified number or articles having similarities greater than a predetermined threshold in accordance with the calculated similarities; and a step for receiving articles written in a different language, replacing retrieving conditions specified in a single language by another language to calculate similarities with the articles to present the article written in the different language to the user while being mixed with the articles to be presented.

13. An information filtering apparatus, comprising:

means for receiving first articles from information sources;

means for storing retrieval conditions previously specified for a user;

article retrieving means for retrieving the first articles received by said means for receiving in order to select second articles which match the retrieved conditions stored in said means for storing; and means for outputting the second articles written in a different language by replacing the retrieval condition specified in a first language with the different language and by calculating similarities among the retrieval conditions replaced into the different language and the second articles to select third articles using the similarities among the retrieval conditions.

14. An information filter apparatus according to claim 13, further comprising:

determining means for determining relevant articles from said second articles by calculating at least one of similarities among the second articles and similarities among the second articles and other articles received by said means for receiving; and output means for outputting the second articles with information about the determined relevant articles.

15. An information filtering apparatus according to claim 13, further comprising:

means for outputting the second articles with information about the retrieval conditions under which the second articles have been selected by said article retrieving means.

16. An information filtering apparatus according to claim 13, further comprising:

means for generating a summary having a length corresponding to a type of an article selected from said second articles; and means for outputting to the user the summary generated by said means for generating.

17. An information filtering apparatus according to claim 14, further comprising:

means for forming the second articles into groups of articles by relating each of the second articles to one another using the similarities calculated by said determining means.

18. An information filtering apparatus according to claim 13, wherein said means for outputting outputs the third articles in a descending order using the similarities among the retrieval conditions.

* * * * *